(12) United States Patent
Imamura et al.

(10) Patent No.: US 10,350,983 B2
(45) Date of Patent: Jul. 16, 2019

(54) POWER TRANSMISSION SYSTEM

(71) Applicant: TOYOTA JIDOSHA KABUSHIKI KAISHA, Toyota-shi, Aichi-ken (JP)

(72) Inventors: Tatsuya Imamura, Okazaki (JP); Atsushi Tabata, Okazaki (JP); Toshiki Kanada, Anjo (JP); Yuji Yasuda, Miyoshi (JP); Hiroshi Kawanishi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 15/463,591

(22) Filed: Mar. 20, 2017

(65) Prior Publication Data

US 2017/0274754 A1    Sep. 28, 2017

(30) Foreign Application Priority Data

Mar. 23, 2016  (JP) ................................. 2016-058529
Jul. 8, 2016    (JP) ................................. 2016-136445
(Continued)

(51) Int. Cl.
*B60K 6/44*    (2007.10)
*B60K 6/445*   (2007.10)
(Continued)

(52) U.S. Cl.
CPC .............. *B60K 6/445* (2013.01); *B60K 6/365* (2013.01); *B60K 6/387* (2013.01); *B60K 6/543* (2013.01);
(Continued)

(58) Field of Classification Search
CPC ................................................ B60K 2006/268
See application file for complete search history.

(56) References Cited

U.S. PATENT DOCUMENTS 9,718,459 B2 *  8/2017  Imamura ............... B60W 20/14
2006/0111213 A1  5/2006  Bucknor et al.
2015/0021110 A1  1/2015  Ono et al.

FOREIGN PATENT DOCUMENTS

CN    101107460 A    1/2008
JP    2016-150673 A   8/2016
(Continued)

*Primary Examiner* — Derek D Knight
(74) *Attorney, Agent, or Firm* — Oliff PLC

(57) ABSTRACT

A power transmission system includes first differential mechanism connected to an engine, and second differential mechanism. The first differential mechanism includes a first rotating element connected to the engine, and second and third rotating elements. The second differential mechanism includes a fourth rotating element connected to second rotating element, fifth rotating element connected to a first electric rotary machine, and sixth rotating element that is an output element of the second differential mechanism. The power transmission system further includes at least one of a first clutch and brake, and a second clutch. The first clutch is configured to releasably couple two of the first, second and third rotating elements to each other. The brake is configured to releasably couple the third rotating element to a stationary element. The second clutch is configured to releasably couple the third rotating element to one of the fifth and sixth rotating elements.

29 Claims, 75 Drawing Sheets

(30) Foreign Application Priority Data

Jul. 8, 2016 (JP) .................................. 2016-136446
Sep. 21, 2016 (JP) .................................. 2016-184345

(51) Int. Cl.

| | |
|---|---|
| *B60K 6/365* | (2007.10) |
| *B60K 6/387* | (2007.10) |
| *F16H 3/72* | (2006.01) |
| *B60K 6/543* | (2007.10) |
| *B60W 10/02* | (2006.01) |
| *B60W 10/06* | (2006.01) |
| *B60W 10/08* | (2006.01) |
| *B60W 20/10* | (2016.01) |
| *B60K 6/26* | (2007.10) |
| *B60K 6/38* | (2007.10) |
| *F16H 37/08* | (2006.01) |

(52) U.S. Cl.
CPC ............ *B60W 10/02* (2013.01); *B60W 10/06* (2013.01); *B60W 10/08* (2013.01); *B60W 20/10* (2013.01); *F16H 3/728* (2013.01); *B60K 2006/268* (2013.01); *B60K 2006/381* (2013.01); *B60W 2510/0208* (2013.01); *B60W 2510/107* (2013.01); *B60W 2710/021* (2013.01); *B60W 2710/0644* (2013.01); *B60W 2710/083* (2013.01); *B60W 2720/30* (2013.01); *B60Y 2200/92* (2013.01); *F16H 2037/0873* (2013.01); *F16H 2200/2007* (2013.01); *F16H 2200/2038* (2013.01); *Y02T 10/6239* (2013.01); *Y10S 903/911* (2013.01); *Y10S 903/918* (2013.01); *Y10S 903/93* (2013.01); *Y10S 903/946* (2013.01)

(56) References Cited

FOREIGN PATENT DOCUMENTS

| | | |
|---|---|---|
| WO | 2006/073537 A2 | 7/2006 |
| WO | 2013019443 A1 | 2/2013 |
| WO | 2013114594 A1 | 8/2013 |
| WO | 2016132207 A1 | 8/2016 |

\* cited by examiner

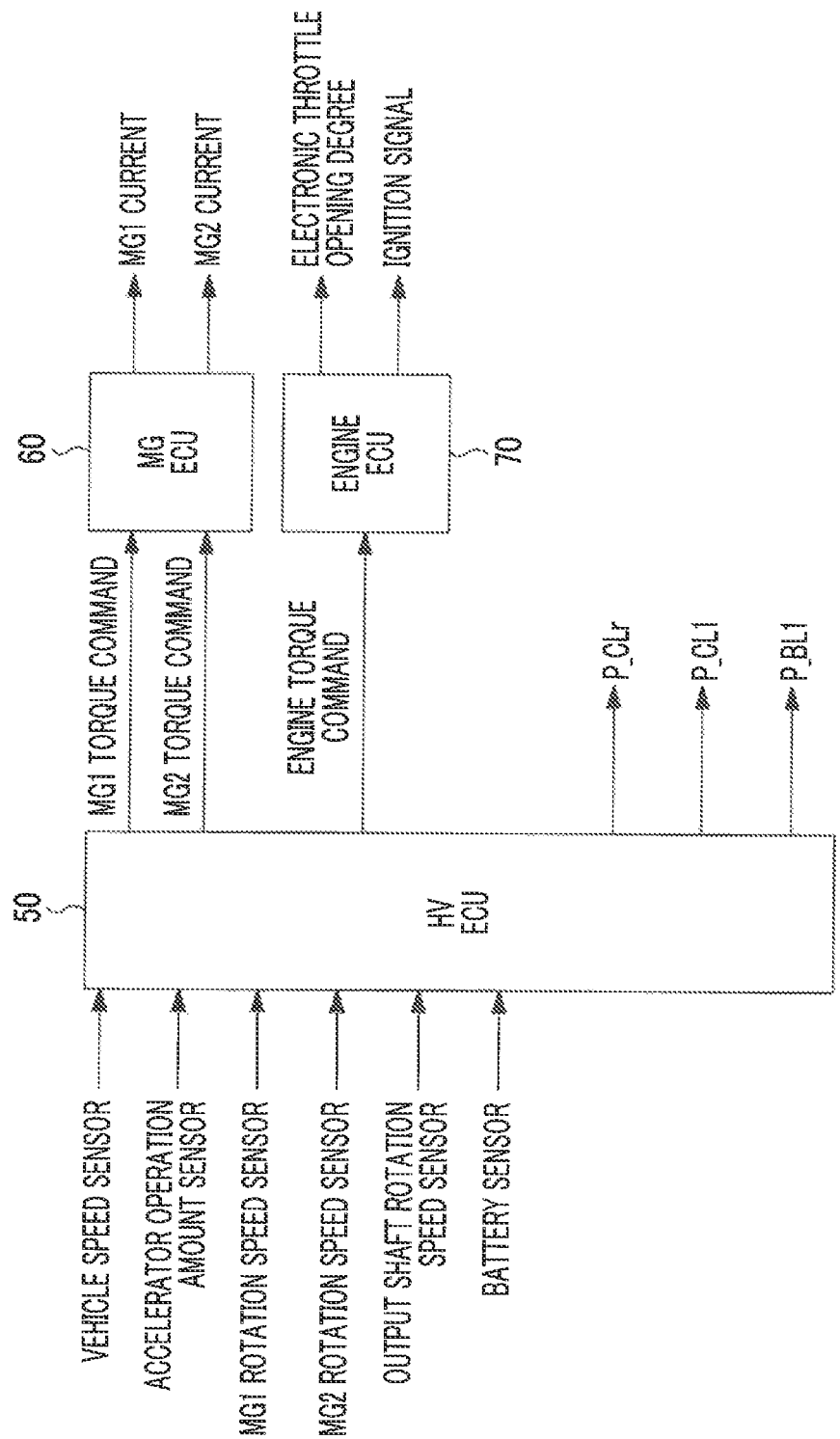

FIG. 3

| | | | CL1 | BL1 | CLr | MG1 | MG2 |
|---|---|---|---|---|---|---|---|
| EV | FORWARD TRAVELING/ BACKWARD TRAVELING | ONE MOTOR DRIVE WITH ENGINE BRAKE | △ | | △ | | M |
| | | TWO MOTORS | ○ | | | M | M |
| HV (ENG) | FIRST MODE (O/D INPUT SPLIT) | FORWARD TRAVELING Lo | | ○ | | G | M |
| | | FORWARD TRAVELING Hi | ○ | ○ | | G | M |
| | | BACKWARD TRAVELING Lo | ○ | | | G | M |
| | SECOND MODE (U/D INPUT SPLIT) | FORWARD TRAVELING | | | ○ | G | M |
| | | BACKWARD TRAVELING | ○ | | ○ | G | M |
| | THIRD MODE (FIXED GEAR) | FORWARD TRAVELING DIRECT COUPLING | | | ○ | G | M |
| | | FORWARD TRAVELING U/D | | ○ | ○ | | |

○ : ENGAGED  △ : EITHER ONE IS ENGAGED WHEN ENGINE BRAKE IS USED
G : MAINLY GENERATOR  M : MAINLY MOTOR; HOWEVER, GENERATOR DURING REGENERATION

FIG. 9

| | | | | CL1 | BL1 | CLr | MG1 | MG2 |
|---|---|---|---|---|---|---|---|---|
| EV | FORWARD TRAVELING/ BACKWARD TRAVELING | ONE MOTOR | DRIVE | △ | | | | M |
| | | | WITH ENGINE BRAKE | △ | | △ | G | M |
| | | TWO MOTORS | | ○ | ○ | | M | M |
| HV (ENG) | FIRST MODE (O/D INPUT SPLIT) | FORWARD TRAVELING | | ○ | | | G | M |
| | | BACKWARD TRAVELING | | | ○ | | G | M |
| | SECOND MODE (U/D INPUT SPLIT) | FORWARD TRAVELING | | | | ○ | G | M |
| | | BACKWARD TRAVELING | | | | ○ | G | M |
| | THIRD MODE (FIXED GEAR) | FORWARD TRAVELING | DIRECT COUPLING | ○ | | ○ | G | M |
| | | | OUTPUT SHAFT FIXING | | ○ | ○ | G | |

○ : ENGAGED  △ : EITHER ONE IS ENGAGED WHEN ENGINE BRAKE IS USED
G : MAINLY GENERATOR   M : MAINLY MOTOR. HOWEVER, GENERATOR DURING REGENERATION

FIG. 12

| | | | | CL1 | BL1 | CLr | MG1 | MG2 |
|---|---|---|---|---|---|---|---|---|
| EV | | FORWARD TRAVELING/ BACKWARD TRAVELING | ONE MOTOR DRIVE | △ | | | | M |
| | | | ONE MOTOR WITH ENGINE BRAKE | ○ | | △ | G | M |
| | | | TWO MOTORS | ○ | | | M | M |
| HV (ENG) | FIRST MODE (U/D INPUT SPLIT) | FORWARD TRAVELING | | | ○ | | G | M |
| | | BACKWARD TRAVELING | | | ○ | | G | M |
| | SECOND MODE (O/D INPUT SPLIT) | FORWARD TRAVELING | | | | ○ | G | M |
| | | BACKWARD TRAVELING | | | | ○ | G | M |
| | THIRD MODE (FIXED GEAR) | FORWARD TRAVELING | DIRECT COUPLING | ○ | | ○ | G | M |
| | | | OUTPUT SHAFT FIXING | | ○ | ○ | G | |

○: ENGAGED   △: EITHER ONE IS ENGAGED WHEN ENGINE BRAKE IS USED
G: MAINLY GENERATOR   M: MAINLY MOTOR; HOWEVER, GENERATOR DURING REGENERATION

FIG. 15

| | | | CL1 | BL1 | CLr | MG1 | MG2 |
|---|---|---|---|---|---|---|---|
| EV | FORWARD TRAVELING/ BACKWARD TRAVELING | ONE MOTOR DRIVE WITH ENGINE BRAKE | △ | | △ | | M |
| | | TWO MOTORS | ○ | ○ | | G | M |
| HV (ENG) | FIRST MODE (U/D INPUT SPLIT) | FORWARD TRAVELING Lo | ○ | | | M | M |
| | | BACKWARD TRAVELING Hi | | ○ | | G | M |
| | SECOND MODE (O/D INPUT SPLIT) | FORWARD TRAVELING Lo | ○ | | | G | M |
| | | BACKWARD TRAVELING | | | ○ | G | M |
| | THIRD MODE (FIXED GEAR) | FORWARD TRAVELING DIRECT COUPLING | ○ | | ○ | G | M |
| | | O/D | | ○ | ○ | G | M |

○ : ENGAGED  △ : EITHER ONE IS ENGAGED WHEN ENGINE BRAKE IS USED
G : MAINLY GENERATOR  M : MAINLY MOTOR; HOWEVER,
GENERATOR DURING REGENERATION

FIG. 19

| DRIVE MODE | | | | C1 | B1 | CR | MG1 | MG2 |
|---|---|---|---|---|---|---|---|---|
| EV DRIVING | FORWARD TRAVELING /BACKWARD TRAVELING | ONE MOTOR | DRIVE | | | | | M |
| | | | WITH ENGINE BRAKE | △ | | △ | G | M |
| | | TWO MOTORS | | O | O | | M | M |
| HV (ENG) DRIVING | O/D INPUT SPLIT | FORWARD TRAVELING | | | | O | G | M |
| | | BACKWARD TRAVELING | ENGINE FORWARD ROTATION INPUT | | | O | G | M |
| | U/D INPUT SPLIT | FORWARD TRAVELING | | O | | | G | M |
| | | BACKWARD TRAVELING | ENGINE REVERSE ROTATION INPUT | | O | | G | M |
| | | | ENGINE FORWARD ROTATION INPUT | O | | | G | M |
| | FIXED GEAR | FORWARD TRAVELING | DIRECT COUPLING | O | | O | | |
| | | | OUTPUT SHAFT FIXING | | O | O | G | |

O : ENGAGED    △ : EITHER ONE OR BOTH ARE ENGAGED WHEN ENGINE BRAKE IS USED

G : MAINLY GENERATOR    M : MAINLY MOTOR; HOWEVER, GENERATOR DURING REGENERATION    BLANK: RELEASED

FIG. 40

| DRIVE MODE | | | | C1 | B1 | CR | MG1 | MG2 |
|---|---|---|---|---|---|---|---|---|
| EV DRIVING | FORWARD TRAVELING /BACKWARD TRAVELING | ONE MOTOR | DRIVE | | | | | M |
| | | | WITH ENGINE BRAKE | △ | | △ | G | M |
| | | TWO MOTORS | | O | O | | M | M |
| HV (ENG) DRIVING | O/D INPUT SPLIT | FORWARD TRAVELING | | | | O | G | M |
| | | BACKWARD TRAVELING | | | | O | G | M |
| | U/D INPUT SPLIT | FORWARD TRAVELING | LOW GEAR | O | | | G | M |
| | | | HIGH GEAR | | O | | G | M |
| | | BACKWARD TRAVELING | LOW GEAR | O | | | G | M |
| | FIXED GEAR | FORWARD TRAVELING | DIRECT COUPLING | O | | O | | |
| | | | O/D | | O | O | | |

O : ENGAGED   △ : EITHER ONE IS ENGAGED WHEN ENGINE BRAKE IS USED

G : MAINLY GENERATOR   M : MAINLY MOTOR; HOWEVER, GENERATOR DURING REGENERATION   BLANK: RELEASED

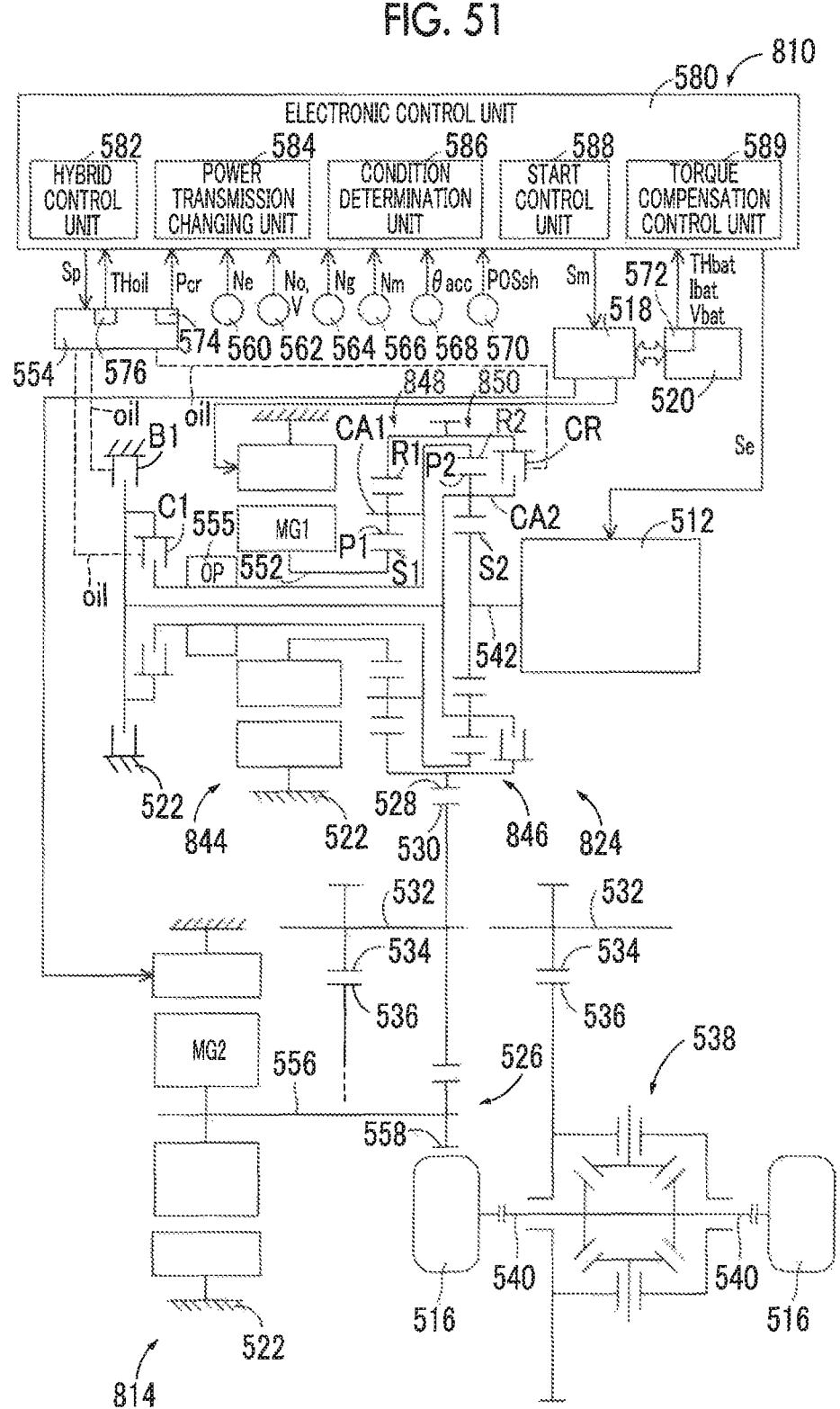

FIG. 52

| DRIVE MODE | | | | C1 | B1 | CR | MG1 | MG2 |
|---|---|---|---|---|---|---|---|---|
| EV DRIVING | FORWARD TRAVELING /BACKWARD TRAVELING | ONE MOTOR | DRIVE | | | | | M |
| | | | WITH ENGINE BRAKE | △ | | △ | G | M |
| | | TWO MOTORS | | O | O | | M | M |
| HV (ENG) DRIVING | O/D INPUT SPLIT | FORWARD TRAVELING | | O | | | G | M |
| | | BACKWARD TRAVELING | ENGINE REVERSE ROTATION INPUT | | O | | G | M |
| | | | ENGINE FORWARD ROTATION INPUT | O | | | G | M |
| | U/D INPUT SPLIT | FORWARD TRAVELING | | | | O | G | M |
| | | BACKWARD TRAVELING | ENGINE FORWARD ROTATION INPUT | | | O | G | M |
| | FIXED GEAR | FORWARD TRAVELING | DIRECT COUPLING | O | | O | | |
| | | | OUTPUT SHAFT FIXING | | O | O | G | |

O: ENGAGED  △: EITHER ONE OR BOTH ARE ENGAGED WHEN ENGINE BRAKE IS USED
G: MAINLY GENERATOR   M: MAINLY MOTOR; HOWEVER, GENERATOR DURING REGENERATION   BLANK: RELEASED

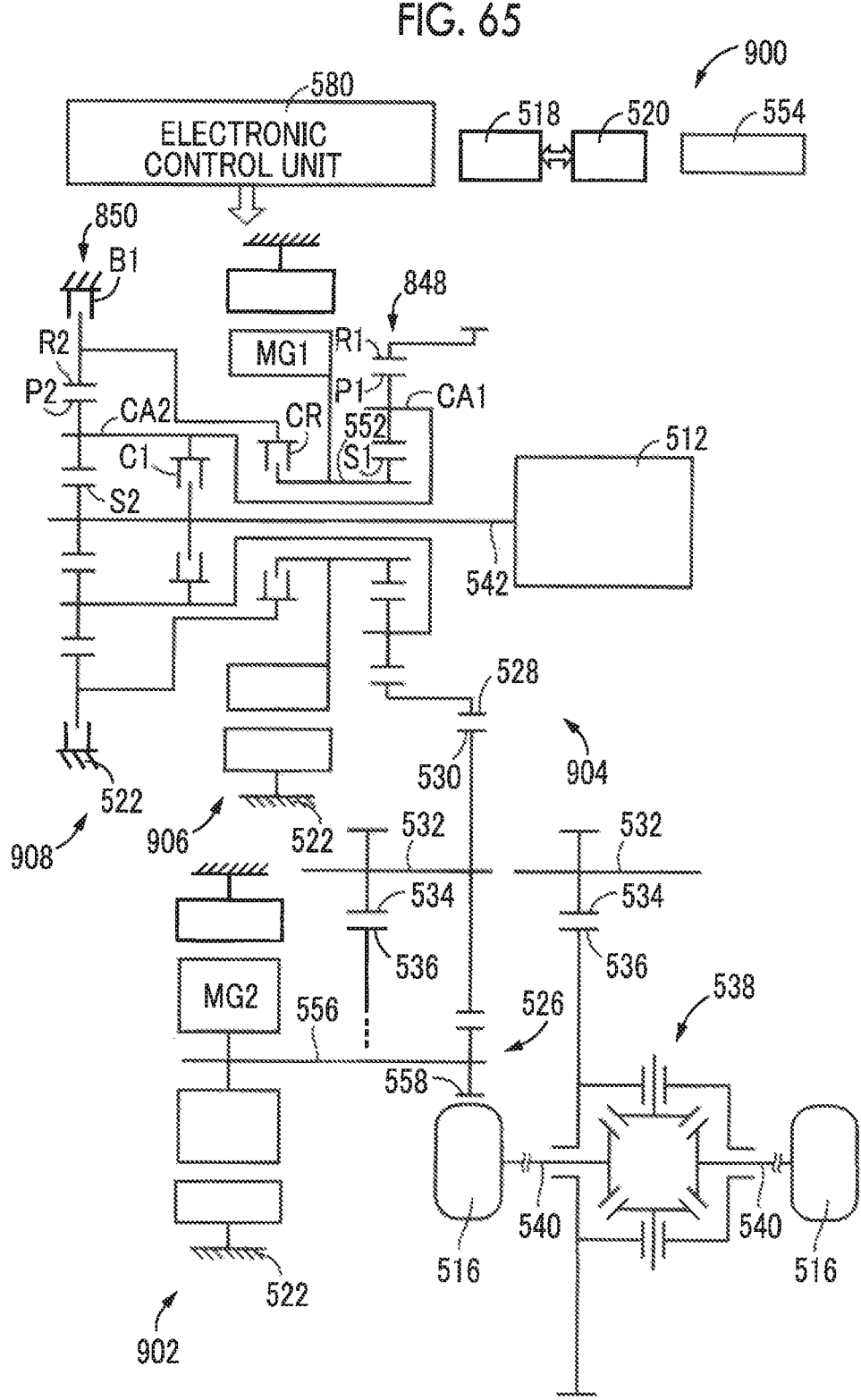

FIG. 66

| DRIVE MODE | | | | C1 | B1 | CR | MG1 | MG2 |
|---|---|---|---|---|---|---|---|---|
| EV DRIVING | FORWARD TRAVELING /BACKWARD TRAVELING | ONE MOTOR | DRIVE | | | | | M |
| | | | WITH ENGINE BRAKE | △ | | △ | G | M |
| | | TWO MOTORS | | ○ | ○ | | M | M |
| HV (ENG) DRIVING | O/D INPUT SPLIT | FORWARD TRAVELING | LOW GEAR | | ○ | | G | M |
| | | | HIGH GEAR | ○ | | | G | M |
| | | BACKWARD TRAVELING | HIGH GEAR | ○ | | | G | M |
| | U/D INPUT SPLIT | FORWARD TRAVELING | | | | ○ | G | M |
| | | BACKWARD TRAVELING | | | | ○ | G | M |
| | FIXED GEAR | FORWARD TRAVELING | DIRECT COUPLING | ○ | | ○ | | |
| | | | U/D | | ○ | ○ | | |

○ : ENGAGED    △ : EITHER ONE OR BOTH ARE ENGAGED WHEN ENGINE BRAKE IS USED
G : MAINLY GENERATOR    M : MAINLY MOTOR; HOWEVER, GENERATOR DURING REGENERATION    BLANK: RELEASED

POWER TRANSMISSION SYSTEM

INCORPORATION BY REFERENCE

The disclosure of Japanese Patent Applications No. 2016-058529 filed on Mar. 23, 2016, No. 2016-184345 filed on Sep. 21, 2016, No. 2016-136445 filed on Jul. 8, 2016 and No. 2016-136446 filed on Jul. 8, 2016, including the specification, drawings and abstract, is incorporated herein by reference in its entirety.

BACKGROUND

1. Technical Field

The disclosure relates to a power transmission system and, more particularly, to a power transmission system including a first differential mechanism connected to an engine and a second differential mechanism connected to the first differential mechanism.

2. Description of Related Art

Various power transmission systems have been suggested for a hybrid vehicle that uses an engine and a rotary machine as power sources. For example, International Application Publication No. 2013/114594 describes a power transmission system for a hybrid vehicle. The power transmission system includes a first planetary gear mechanism (hereinafter, referred to as first differential mechanism), a second planetary gear mechanism (hereinafter, referred to as second differential mechanism), a first electric rotary machine, a second electric rotary machine, and a switching device. The first planetary gear mechanism is connected to an internal combustion engine. The second planetary gear mechanism connects the first differential mechanism to drive wheels. The first electric rotary machine is connected to the second differential mechanism. The second electric rotary machine is arranged so as to be able to transmit power to an output element of the second differential mechanism. The switching device consists of two engaging devices (a clutch and a brake) provided in association with the first differential mechanism. The first electric rotary machine and the second electric rotary machine are separately connected to the second differential mechanism.

SUMMARY

The power transmission system described in the International Application Publication No. 2013/114594 is able to shift the speed of rotation of the internal combustion engine and transmit the rotation to the second differential mechanism by operating the switching device. However, in a drive mode (HV mode) in which the drive wheels are driven by operating both the internal combustion engine and the second electric rotary machine as the power sources, in order for the hybrid vehicle to travel at a high power with the use of the internal combustion engine, it is required to increase the rated rotation speed or rated torque of the first electric rotary machine accordingly; otherwise, it is required to restrict the power of the internal combustion engine. This is because the power ratio of the power of the first electric rotary machine to the power of the engine (Pg/Pe) is uniformly determined due to the constant power split ratio of the second differential mechanism and, as a result, the power of the first electric rotary machine increases with an increase in the power of the engine.

The disclosure relates to a power transmission system that includes a first differential mechanism connected to an engine and a second differential mechanism connected to the first differential mechanism and that makes it possible to travel at a high power with the use of the engine without increasing the rated torque or rated rotation speed of a rotary machine.

A first aspect of the disclosure provides a power transmission system for transmitting power from an engine. The power transmission system includes: a first differential mechanism connected to the engine, the first differential mechanism including a first rotating element, a second rotating element and a third rotating element, the first rotating element being connected to the engine; a second differential mechanism including a fourth rotating element, a fifth rotating element and a sixth rotating element, the fourth rotating element being connected to the second rotating element of the first differential mechanism, the fifth rotating element being connected to a first electric rotary machine, the sixth rotating element being an output element; a first engaging unit that is at least one of an engaging unit configured to releasably couple two of the first rotating element, the second rotating element and the third rotating element to each other and an engaging unit configured to releasably couple the third rotating element to a stationary element; and a second engaging unit configured to releasably couple the third rotating element of the first differential mechanism to one of the fifth rotating element and sixth rotating element of the second differential mechanism.

In the power transmission system, each of the first differential mechanism and the second differential mechanism may be a planetary gear mechanism, the first rotating element may be a sun gear, the second rotating element may be a carrier, the third rotating element may be a ring gear, the fourth rotating element may be a carrier, the fifth rotating element may be a sun gear, the sixth rotating element may be a ring gear, the first engaging unit may include an engaging unit configured to releasably couple the first rotating element to the second rotating element and an engaging unit configured to releasably couple the third rotating element to the stationary element, and the second engaging unit may be configured to releasably couple the third rotating element to the fifth rotating element.

In the power transmission system, each of the first differential mechanism and the second differential mechanism may be a planetary gear mechanism, the first rotating element may be a sun gear, the second rotating element may be a ring gear, the third rotating element may be a carrier, the fourth rotating element may be a carrier, the fifth rotating element may be a sun gear, the sixth rotating element may be a ring gear, the first engaging unit may include an engaging unit configured to releasably couple the first rotating element to the third rotating element and an engaging unit configured to releasably couple the third rotating element to the stationary element, and the second engaging unit may be configured to releasably couple the third rotating element to the sixth rotating element.

In the power transmission system, each of the first differential mechanism and the second differential mechanism may be a planetary gear mechanism, the first rotating element may be a sun gear, the second rotating element may be a ring gear, the third rotating element may be a carrier, the fourth rotating element may be a ring gear, the fifth rotating element may be a sun gear, the sixth rotating element may be a carrier, the first engaging unit may include an engaging unit configured to releasably couple the first rotating element to the third rotating element and an engaging unit configured to releasably couple the third rotating element to the stationary element, and the second engaging unit may be configured to releasably couple the third rotating element to the sixth rotating element.

In the power transmission system, each of the first differential mechanism and the second differential mechanism may be a planetary gear mechanism, the first rotating element may be a carrier, the second rotating element may be a sun gear, the third rotating element may be a ring gear, the fourth rotating element may be a sun gear, the fifth rotating element may be a ring gear, the sixth rotating element may be a carrier, the first engaging unit may include an engaging unit configured to releasably couple the first rotating element to the third rotating element and an engaging unit configured to releasably couple the third rotating element to the stationary element, and the second engaging unit may be configured to releasably couple the third rotating element to the fifth rotating element.

In the power transmission system, each of the first differential mechanism and the second differential mechanism may be a planetary gear mechanism, the first rotating element may be a ring gear, the second rotating element may be a sun gear, the third rotating element may be a carrier, the fourth rotating element may be a sun gear, the fifth rotating element may be a ring gear, the sixth rotating element may be a carrier, the first engaging unit may include an engaging unit configured to releasably couple the first rotating element to the third rotating element and an engaging unit configured to releasably couple the third rotating element to the stationary element, and the second engaging unit may be configured to releasably couple the third rotating element to the fifth rotating element.

In the power transmission system, where a power split ratio at which a power of the engine is distributed between the fifth rotating element and the sixth rotating element in a state where the first engaging unit is engaged and the second engaging unit is not engaged is a first power split ratio and a power split ratio at which the power of the engine is distributed between the fifth rotating element and the sixth rotating element in a state where the second engaging unit is engaged and the first engaging unit is not engaged is a second power split ratio, the first power split ratio may be different from the second power split ratio.

According to the first aspect of the disclosure, since the above-described configuration is provided, the power split ratio at which the power of the engine is distributed between the fifth rotating element and the sixth rotating element in a state where the first engaging unit is engaged and the second engaging unit is not engaged is allowed to be made different from the power split ratio at which the power of the engine is distributed between the fifth rotating element and the sixth rotating element in a state where the second engaging unit is engaged and the first engaging unit is not engaged. Even when a reduction ratio (Ne/No) that is the ratio of an engine rotation speed (Ne) to an output shaft rotation speed (No) of the power transmission system is the same, but when the power split ratio varies, a torque ratio (Tg/Te) of a first electric rotary machine torque (Tg) to an engine torque (Te) and a rotation speed ratio (Ng/Ne) of a first electric rotary machine rotation speed (Ng) to an engine rotation speed (Ne) both vary, with the result that a power ratio (Pg/Pe) of a first electric rotary machine power to an engine power also varies. Therefore, an increase in the rated torque or rated rotation speed of a rotary machine is reduced by selecting a power split ratio having a small power ratio, so an advantageous effect that a vehicle is able to travel at a high power of the engine is obtained.

A second aspect of the disclosure provides a vehicle. The vehicle may include: the power transmission system according to the above-described first aspect; the first electric rotary machine of which an operating status is controlled to control a differential status of the second differential mechanism, a torque increased from a torque of the engine being mechanically transmitted to the sixth rotating element when the differential status of the second differential mechanism is controlled in a state where the first engaging unit is engaged and the second engaging unit is released; the engine coupled to the first rotating element such that power is transmittable; a drive wheel coupled to the sixth rotating element; a second electric rotary machine coupled to the drive wheel such that power is transmittable; and an electronic control unit configured to, when the engine is started, operate the second engaging unit from a released state toward an engaged state in a state where the first engaging unit is engaged.

With the above configuration, when the engine is started by generating a torque with the use of the first electric rotary machine in a state where the first engaging unit is engaged and the second engaging unit is released, a torque increased from an engine pull-in torque is mechanically transmitted to the sixth rotating element coupled to the drive wheel. Since the engine pull-in torque is allowed to directly act on the sixth rotating element by operating the second engaging unit from the released state toward the engaged state in a state where the first engaging unit is engaged when the engine is started, it is possible to reduce a compensating torque as compared to a compensating torque at the time of starting the engine with the use of the first electric rotary machine. Thus, when the engine is started, it is possible to easily compensate for a drop of driving torque.

In the above vehicle, the electronic control unit may be configured to, when the engine is started, output a torque from the first electric rotary machine such that a drop of an output torque from the drive wheel is reduced.

With the above configuration, when the engine is started by operating the second engaging unit from the released state toward the engaged state, not a torque (for example, negative torque) that is used to start the engine is generated by the first electric rotary machine but a torque (for example, positive torque) is output from the first electric rotary machine such that a drop of driving torque is reduced, so it is possible to generate a compensating torque with the use of the first electric rotary machine. Thus, for example, when all the compensating torque is provided by the second electric rotary machine, it is possible to expand a region of motor driving that uses the second electric rotary machine, which is determined in advance such that the compensating torque is reserved.

In the above vehicle, the electronic control unit may be configured to, when the engine is started, output a torque from each of the first electric rotary machine and the second electric rotary machine such that a drop of an output torque from the drive wheel is reduced.

With the above configuration, when the engine is started, a torque is output from each of the first electric rotary machine and the second electric rotary machine such that a drop of driving torque is reduced, so it is possible to generate a compensating torque with the use of both the first electric rotary machine and the second electric rotary machine. Thus, it is easy to reduce a shock at the time of starting the engine.

In the above vehicle, the electronic control unit may be configured to set a torque, which is output from the first electric rotary machine, to a predetermined value or smaller.

With the above configuration, a compensating torque that is generated by the first electric rotary machine acts in a direction to reduce the rotation speed of the second rotating element (that is, each of the rotating elements of the first differential mechanism, which are integrally rotated as a result of engaging the first engaging unit) coupled to the fourth rotating element (that is, the compensating torque acts as a reaction torque on the second engaging unit that is operated from the released state toward the engaged state). Since a torque that is output from the first electric rotary machine is set to the predetermined value or smaller, it is possible to achieve both an increase in the rotation speed of the engine with the use of the second engaging unit and compensation for a drop of driving torque with the use of the first electric rotary machine.

In the above vehicle, the electronic control unit may be configured to reduce a torque that is output from the first electric rotary machine as a traveling load of the vehicle reduces.

With the above configuration, a compensating toque is caused to directly act on the drive wheel in compensating for a drop of driving torque with the use of the second electric rotary machine, so it is relatively easy to control the magnitude of the compensating torque; whereas, a reaction torque is exerted with the use of the second engaging unit that is being operated from the released state toward the engaged state in a slipping state in compensating for a drop of driving torque with the use of the first electric rotary machine, so it is relatively difficult to control the magnitude of the compensating torque that acts on the drive wheel. Since a torque that is output from the first electric rotary machine is reduced as the traveling load of the vehicle reduces, that is, a margin of output torque from the second electric rotary machine relatively increases, the compensating torque that is generated by the second electric rotary machine is increased, with the result that it is possible to stably compensate for a drop of driving torque. Thus, it is easy to reduce a shock at the time of starting the engine.

In the above vehicle, the electronic control unit may be configured to output, from the first electric rotary machine, a torque by which a torque of the second electric rotary machine is insufficient for a torque for reducing a drop of an output torque from the drive wheel.

With the above configuration, it is relatively easy to control the magnitude of a compensating torque in compensating for a drop of driving torque with the use of the second electric rotary machine, whereas it is relatively difficult to control the magnitude of a compensating torque that acts on the drive wheel in compensating for a drop of driving torque with the use of the first electric rotary machine. Since a torque by which the torque of the second electric rotary machine is insufficient for a torque for reducing a drop of driving torque is output from the first electric rotary machine, a compensating torque that is generated by the second electric rotary machine is output in preference to a compensating torque that is generated by the first electric rotary machine, so it is possible to stably compensate for a drop of driving torque. Thus, it is easy to reduce a shock at the time of starting the engine.

In the above vehicle, the electronic control unit may be configured to, when the engine is started, output a torque from the first electric rotary machine under feedback control such that a rotation speed of the engine varies along a target value.

With the above configuration, a variation in the rotation speed of the engine tends to fluctuate in starting the engine by operating the second engaging unit from the released state toward the engaged state, so the combustion stability of the engine can be impaired. Since a torque is output from the first electric rotary machine under feedback control such that the rotation speed of the engine is varied along the target value at the time when the engine is started, it is possible to reduce fluctuations in a variation in the rotation speed of the engine by using the first electric rotary machine that is higher in response than operation of the second engaging unit. Thus, it is easy to ensure the combustion stability of the engine.

In the above vehicle, the electronic control unit may be configured to execute engine start control for operating the second engaging unit from the released state toward the engaged state in a state where the first engaging unit is engaged when controllability at the time of operating the second engaging unit is higher than a predetermined criterion, and execute engine start control for increasing a rotation speed of the engine with the use of the first electric rotary machine in a state where the first engaging unit is engaged and the second engaging unit is released when the controllability at the time of operating the second engaging unit is lower than the predetermined criterion.

With the above configuration, when the controllability at the time of operating the second engaging unit is lower than the predetermined criterion, engine start control for increasing the rotation speed of the engine with the use of the first electric rotary machine in a state where the first engaging unit is engaged and the second engaging unit is released is executed, so it is possible to ensure the response of a start of the engine.

In the above vehicle, the electronic control unit may be configured to narrow a region of motor diving in the case where the controllability at the time of operating the second engaging unit is lower than the predetermined criterion as compared to a region of the motor driving in the case where the controllability at the time of operating the second engaging unit is higher than the predetermined criterion, and the motor driving may be a drive mode in which the vehicle travels by using the second electric rotary machine as a driving force source in a state where an operation of the engine is stopped.

With the above configuration, when the engine is started by generating a torque with the use of the first electric rotary machine in a state where the first engaging unit is engaged and the second engaging unit is released, a required compensating torque increases. Since the region of motor driving in the case where the controllability at the time of operating the second engaging unit is lower than the predetermined criterion is made narrower than the region of motor driving in the case where the controllability at the time of operating the second engaging unit is higher than the predetermined criterion, it is easy to reserve a margin of output torque from the second electric rotary machine (that is, it is easy to reserve a compensating torque that is generated by the second electric rotary machine) at the time of starting the engine.

In the above vehicle, the electronic control unit may be configured to, at least one of when a temperature of working oil for operating the second engaging unit is higher than a predetermined oil temperature and when the temperature of the working oil is lower than a second predetermined oil temperature that is higher than the predetermined oil temperature, determine that the controllability at the time of operating the second engaging unit is higher than the predetermined criterion.

With the above configuration, the response of the second engaging unit can decrease due to a high viscosity of working oil in the case where the temperature of working oil for operating the second engaging unit is low, and the response of the second engaging unit can decrease due to leakage of working oil from the clearances, and the like, of valves associated with supply of hydraulic pressure to the second engaging unit in the case where the temperature of working oil is high. Since it is determined whether the controllability at the time of operating the second engaging unit is higher or lower than the predetermined criterion on the basis of the temperature of working oil for operating the second engaging unit and, when the controllability (which is synonymous with response) of the second engaging unit is lower than the predetermined criterion, engine start control with the use of the first electric rotary machine is executed in order to ensure a smooth start of the engine, it is possible to ensure the response of a start of the engine.

In the above vehicle, the second differential mechanism may include a single-pinion planetary gear mechanism of which one of a sun gear and a ring gear is the fourth rotating element, the other of the sun gear and the ring gear is the fifth rotating element and a carrier is the sixth rotating element.

With the above configuration, the second differential mechanism includes a single-pinion planetary gear mechanism of which one of the sun gear and the ring gear is the fourth rotating element, the other of the sun gear and the ring gear is the fifth rotating element and the carrier is the sixth rotating element, so, when the differential status of the second differential mechanism is controlled in a state where the first engaging unit is engaged and the second engaging unit is released, a torque increased from the torque of the engine is mechanically transmitted to the sixth rotating element.

A third aspect of the disclosure provides a vehicle. The vehicle may include: the power transmission system according to the above-described first aspect; the first electric rotary machine of which an operating status is controlled to control a differential status of the second differential mechanism; the engine coupled to the first rotating element such that power is transmittable; a drive wheel coupled to the sixth rotating element; a second electric rotary machine coupled to the drive wheel such that power is transmittable; and an electronic control unit configured to, when the engine is started, operate the second engaging unit from a released state toward an engaged state in a state where the first engaging unit is engaged, and, when the engine is started, output a torque from the first electric rotary machine such that a drop of an output torque from the drive wheel is reduced.

With the above configuration, when the engine is started, not a torque (for example, positive torque) that is used to start the engine is generated by the first electric rotary machine in a state where the first engaging unit is engaged and the second engaging unit is released but the second engaging unit is operated from the released state toward the engaged state in a state where the first engaging unit is engaged and a torque (for example, negative torque) is output from the first electric rotary machine such that a drop of driving torque is reduced, so it is possible to generate a compensating torque with the use of the first electric rotary machine. Thus, when the engine is started, it is possible to easily compensate for a drop of driving torque.

In the above vehicle, the electronic control unit may be configured to, when the engine is started, output a torque from each of the first electric rotary machine and the second electric rotary machine such that a drop of an output torque from the drive wheel is reduced.

With the above configuration, when the engine is started, a torque is output from each of the first electric rotary machine and the second electric rotary machine such that a drop of driving torque is reduced, so it is possible to generate a compensating torque with the use of both the first electric rotary machine and the second electric rotary machine. Thus, it is easy to reduce a shock at the time of starting the engine.

In the above vehicle, the electronic control unit may be configured to set a torque, which is output from the first electric rotary machine, to a predetermined value or smaller.

With the above configuration, a compensating torque that is generated by the first electric rotary machine acts in a direction to reduce the rotation speed of the second rotating element (that is, the rotating elements of the first differential mechanism, which are integrally rotated as a result of engaging the first engaging unit) coupled to the fourth rotating element (that is, the compensating torque acts as a reaction torque on the second engaging unit that is operated from the released state toward the engaged state). Since the torque that is output from the first electric rotary machine is set to the predetermined value or smaller, it is possible to achieve both an increase in the rotation speed of the engine with the use of the second engaging unit and compensation for a drop of driving torque with the use of the first electric rotary machine.

In the above vehicle, the electronic control unit may be configured to reduce a torque that is output from the first electric rotary machine as a traveling load of the vehicle reduces.

With the above configuration, a compensating toque is caused to directly act on the drive wheel in compensating for a drop of driving torque with the use of the second electric rotary machine, so it is relatively easy to control the magnitude of the compensating torque; whereas, a reaction torque is exerted with the use of the second engaging unit that is being operated from the released state toward the engaged state in a slipping state in compensating for a drop of driving torque with the use of the first electric rotary machine, so it is relatively difficult to control the magnitude of the compensating torque that acts on the drive wheel. Since a torque that is output from the first electric rotary machine is reduced as the traveling load of the vehicle reduces, that is, a margin of output torque from the second electric rotary machine relatively increases, the compensating torque that is generated by the second electric rotary machine is increased, so it is possible to stably compensate for a drop of driving torque. Thus, it is easy to reduce a shock at the time of starting the engine.

In the above vehicle, the electronic control unit may be configured to output, from the first electric rotary machine, a torque by which a torque of the second electric rotary machine is insufficient for a torque for reducing a drop of an output torque from the drive wheel.

With the above configuration, it is relatively easy to control the magnitude of a compensating torque in compensating for a drop of driving torque with the use of the second electric rotary machine, whereas it is relatively difficult to control the magnitude of a compensating torque that acts on the drive wheel in compensating for a drop of driving torque with the use of the first electric rotary machine. Since a torque by which the torque of the second electric rotary machine is insufficient for a torque for reducing a drop of driving torque is output from the first electric rotary machine, a compensating torque that is generated by the second electric rotary machine is output in preference to a compensating torque that is generated by the first electric rotary machine, so it is possible to stably compensate for a drop of driving torque. Thus, it is easy to reduce a shock at the time of starting the engine.

In the above vehicle, the electronic control unit may be configured to, when the engine is started, output a torque from the first electric rotary machine under feedback control such that a rotation speed of the engine varies along a target value.

With the above configuration, a variation in the rotation speed of the engine tends to fluctuate in starting the engine by operating the second engaging unit from the released state toward the engaged state, so the combustion stability of the engine can be impaired. Since a torque is output from the first electric rotary machine under feedback control such that the rotation speed of the engine is varied along the target value at the time when the engine is started, it is possible to reduce fluctuations in a variation in the rotation speed of the engine by using the first electric rotary machine that is higher in response than operation of the second engaging unit. Thus, it is easy to ensure the combustion stability of the engine.

In the above vehicle, the electronic control unit may be configured to execute engine start control for operating the second engaging unit from the released state toward the engaged state in a state where the first engaging unit is engaged when controllability at the time of operating the second engaging unit is higher than a predetermined criterion, and execute engine start control for increasing a rotation speed of the engine with the use of the first electric rotary machine in a state where the first engaging unit is engaged and the second engaging unit is released when the controllability at the time of operating the second engaging unit is lower than the predetermined criterion.

With the above configuration, when the controllability at the time of operating the second engaging unit is lower than the predetermined criterion, engine start control for increasing the rotation speed of the engine with the use of the first electric rotary machine in a state where the first engaging unit is engaged and the second engaging unit is released is executed, so it is possible to ensure the response of a start of the engine.

In the above vehicle, the electronic control unit may be configured to narrow a region of motor diving in the case where the controllability at the time of operating the second engaging unit is lower than the predetermined criterion as compared to a region of the motor driving in the case where the controllability at the time of operating the second engaging unit is higher than the predetermined criterion, and the motor driving may be a drive mode in which the vehicle travels by using the second electric rotary machine as a driving force source in a state where an operation of the engine is stopped.

With the above configuration, when the engine is started by generating a torque with the use of the first electric rotary machine in a state where the first engaging unit is engaged and the second engaging unit is released, a compensating torque is output with the use of only the second electric rotary machine. Since the region of motor driving in the case where the controllability at the time of operating the second engaging unit is lower than the predetermined criterion is made narrower than the region of motor driving in the case where the controllability at the time of operating the second engaging unit is higher than the predetermined criterion, it is easy to reserve a margin of output torque from the second electric rotary machine (that is, it is easy to reserve a compensating torque that is generated by the second electric rotary machine) at the time of starting the engine.

In the above vehicle, the electronic control unit may be configured to, at least one of when a temperature of working oil for operating the second engaging unit is higher than a predetermined oil temperature and when the temperature of the working oil is lower than a second predetermined oil temperature that is higher than the predetermined oil temperature, determine that the controllability at the time of operating the second engaging unit is higher than the predetermined criterion.

With the above configuration, the response of the second engaging unit can decrease due to a high viscosity of working oil in the case where the temperature of working oil for operating the second engaging unit is low, and the response of the second engaging unit can decrease due to leakage of working oil from the clearances, and the like, of valves associated with supply of hydraulic pressure to the second engaging unit in the case where the temperature of working oil is high. Since it is determined whether the controllability at the time of operating the second engaging unit is higher or lower than the predetermined criterion on the basis of the temperature of working oil for operating the second engaging unit and when the controllability (which is synonymous with response) of the second engaging unit is lower than the predetermined criterion, engine start control with the use of the first electric rotary machine is executed in order to ensure a smooth start of the engine, it is possible to ensure the response of a start of the engine.

In the above vehicle, the second differential mechanism may include a single-pinion planetary gear mechanism of which one of a sun gear and a ring gear is the fifth rotating element, the other of the sun gear and the ring gear is the sixth rotating element and a carrier is the fourth rotating element.

With the above configuration, the second differential mechanism includes a single-pinion planetary gear mechanism of which one of the sun gear and the ring gear is the fifth rotating element, the other of the sun gear and the ring gear is the sixth rotating element and the carrier is the fourth rotating element, so, when the differential status of the second differential mechanism is controlled in a state where the first engaging unit is engaged and the second engaging unit is released, a torque reduced from the torque of the engine is mechanically transmitted to the sixth rotating element.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a control block diagram of a main part in the vehicle shown in FIG. 1;

FIG. 3 is an operation engagement chart that shows the relationship between each drive mode and the operation status of each engaging unit in the vehicle shown in FIG. 1;

FIG. 9 is an operation engagement chart that shows the relationship between each drive mode and the operation status of each engaging unit in the vehicle shown in FIG. 8;

FIG. 12 is an operation engagement chart that shows the relationship between each drive mode and the operation status of each engaging unit in the vehicle shown in FIG. 11;

FIG. 15 is an operation engagement chart that shows the relationship between each drive mode and the operation status of each engaging unit in the vehicle shown in FIG. 14;

FIG. 19 is an operation engagement chart that shows the operation status of each engaging unit in each drive mode;

FIG. 40 is an operation engagement chart that shows the operation status of each engaging unit in each drive mode in the vehicle shown in FIG. 39;

FIG. 51 is a view that illustrates the schematic configuration of devices regarding traveling of a vehicle according to a tenth embodiment and that also illustrates a relevant portion of control system for controlling the devices;

FIG. 52 is an operation engagement chart that shows the operation status of each engaging unit in each drive mode;

FIG. 65 is a view that illustrates the schematic configuration of devices regarding traveling of a vehicle according to a twelfth embodiment and that also illustrates a vehicle different from the vehicle shown in FIG. 51;

FIG. 66 is an operation engagement chart that shows the operation status of each engaging unit in each drive mode in the vehicle shown in FIG. 65;

DETAILED DESCRIPTION OF EMBODIMENTS

Figure 1:
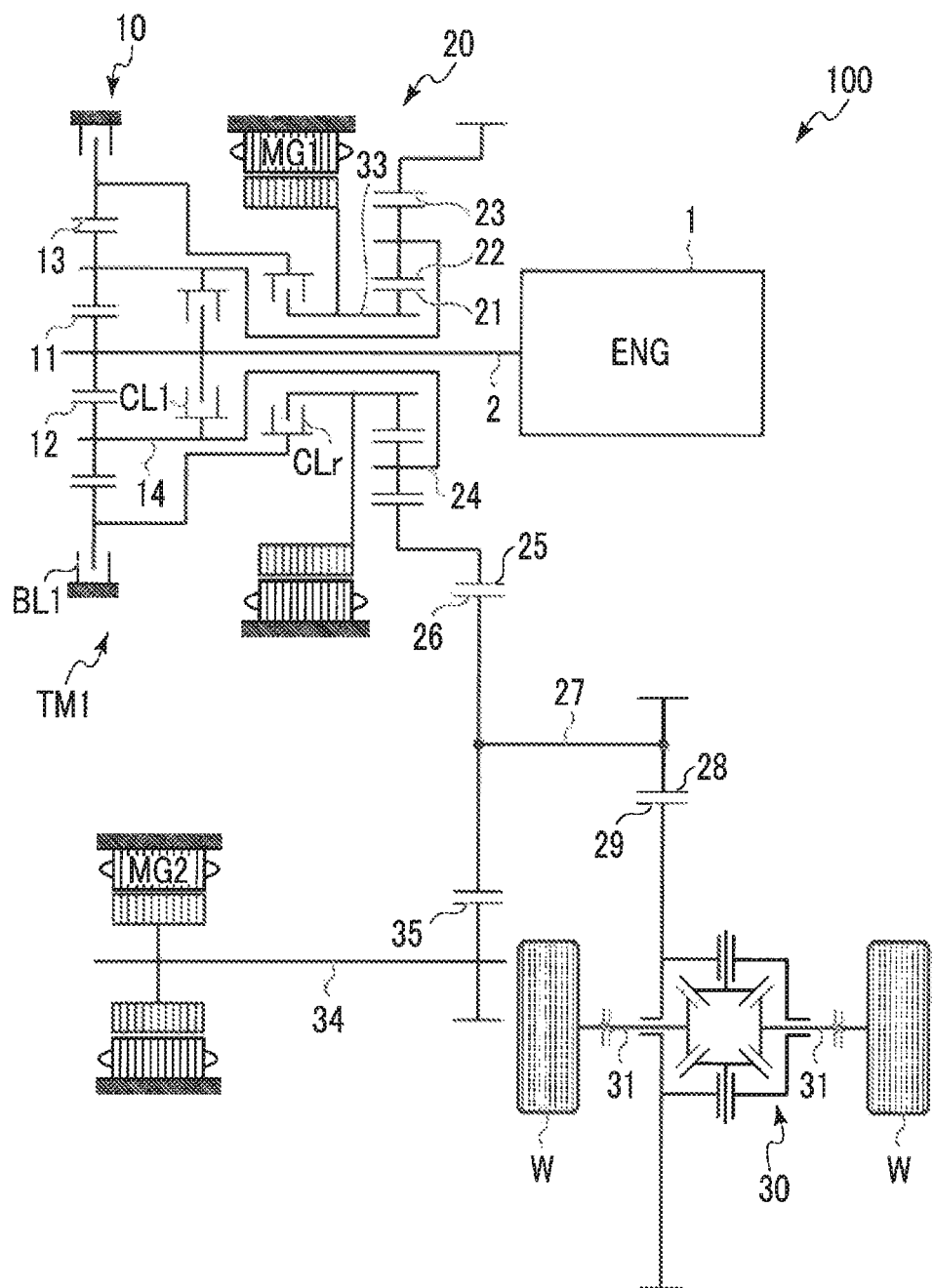
FIG. 1 is a schematic view that shows a gear train of a hybrid vehicle according to a first embodiment.

An embodiment relates to a power transmission system for transmitting power from an engine. The power transmission system includes a first differential mechanism, a second differential mechanism, a first engaging unit and a second engaging unit. The first differential mechanism is connected to the engine. The second differential mechanism is connected to the first differential mechanism. The first engaging unit is provided in association with the first differential mechanism. The second engaging unit is able to releasably couple one of rotating elements of the first differential mechanism to one of rotating elements of the second differential mechanism. The first differential mechanism includes a first rotating element, a second rotating element, and a third rotating element. The first rotating element is connected to the engine. The first differential mechanism is optimally a planetary gear mechanism (first planetary gear mechanism). The second differential mechanism includes a fourth rotating element, a fifth rotating element and a sixth rotating element. The fourth rotating element is connected to the second rotating element of the first differential mechanism. The fifth rotating element is connected to a first electric rotary machine. The sixth rotating element is an output element of the second differential mechanism. In embodiments that will be described below, the sixth rotating element is connected to wheels and a second electric rotary machine. The second differential mechanism is suitably a planetary gear mechanism (second planetary gear mechanism). The first planetary gear mechanism may be a single-pinion planetary gear mechanism or a double-pinion planetary gear mechanism. This also applies to the second planetary gear mechanism.

The first engaging unit is any one of an engaging unit configured to releasably couple two of the first rotating element, the second rotating element and the third rotating element to each other and an engaging unit configured to releasably couple the third rotating element to a stationary element. On the other hand, the second engaging unit is able to releasably couple the third rotating element of the first differential mechanism to any one of the fifth rotating element and sixth rotating element of the second differential mechanism. In the embodiment, each of the first engaging unit and the second engaging unit is able to operate as will be described below (so as to be selectively set to an engaged state or a released state (non-engaged state)) such that a power split ratio of the power of the engine between the fifth rotating element (specifically, the first electric rotary machine) and the sixth rotating element (that is, the output element of the second differential mechanism) via the first and second differential mechanisms, particularly, via the second differential mechanism, is changed.

Hereinafter, embodiments will be described in detail with reference to the accompanying drawings. A first embodiment will be described with reference to FIG. 1 to FIG. 7.

The present embodiment relates to a power transmission system TM1 for transmitting power from an engine, and is applied to a vehicle 100 as will be described below.

As shown in FIG. 1, the vehicle 100 according to the present embodiment is a hybrid vehicle (HV) including an engine 1, a first electric rotary machine MG1 and a second electric rotary machine MG2 as power sources, that is, prime movers. The vehicle 100 may be a plug-in hybrid vehicle (PHV) that is rechargeable from an external power supply. As shown in FIG. 1 and FIG. 2, the vehicle 100 includes the engine 1, a first planetary gear mechanism 10, a second planetary gear mechanism 20, the first electric rotary machine MG1, the second electric rotary machine MG2, a clutch (first clutch) CL1, a clutch (second clutch) CLr, a brake BL1, a differential unit 30, an HV_ECU 50, an MG_ECU 60 and an engine ECU 70. Particularly, the power transmission system TM1 according to the first embodiment is installed between each of the engine 1 and two electric rotary machines MG1, MG2 and a pair of drive wheels W. The power transmission system TM1 includes the first planetary gear mechanism 10, the second planetary gear mechanism 20, the first clutch CL1, the second clutch CLr and the brake BL1.

The engine 1 is an internal combustion engine that converts the combustion energy of fuel to the rotational motion of its output shaft and outputs the rotational motion. The output shaft of the engine 1 is connected to an input shaft 2 of the power transmission system TM1. The input shaft 2 is arranged coaxially with the output shaft of the engine 1 along the extended line of the output shaft. The input shaft 2 is connected to a first sun gear 11 of the first planetary gear mechanism 10.

The first planetary gear mechanism 10 is connected to the engine 1, and is mounted on the vehicle 100 as a first differential mechanism. The first differential mechanism transmits the rotation of the engine 1. The first planetary gear mechanism 10 is an input-side differential mechanism, and is arranged across the second planetary gear mechanism 20 from the engine 1. The first planetary gear mechanism 10 is of a single-pinion type, and includes the first sun gear 11, first pinion gears 12, a first ring gear 13 and a first carrier 14. In the present first embodiment, the first sun gear 11 corresponds to a first rotating element, the first ring gear 13 corresponds to a third rotating element, and the first carrier 14 corresponds to a second rotating element.

The first sun gear 11 is coupled to the input shaft 2, and rotates integrally with the input shaft 2. The first ring gear 13 is arranged coaxially with the first sun gear 11 on the radially outer side of the first sun gear 11. The first pinion gears 12 are arranged between the first sun gear 11 and the first ring gear 13. Each of the first pinion gears 12 is in mesh with the first sun gear 11 and the first ring gear 13. The first pinion gears 12 are rotatably supported by the first carrier 14. Each of the first pinion gears 12 is revolvable around the central axis of the input shaft 2 together with the first carrier 14, and is supported by the first carrier 14 so as to be rotatable around the central axis of the first pinion gear 12.

The first clutch CL1 is an engaging device (engaging unit) configured to releasably couple the first sun gear 11 to the first carrier 14. The first clutch CL1 may be, for example, a friction clutch; however, the first clutch CL1 is not limited to a friction clutch. In the present embodiment, the first clutch CL1 is controlled by hydraulic pressure to be engaged (including a completely engaged state) or released. The completely engaged (hereinafter, may be simply referred to as engaged) first clutch CL1 couples the first sun gear 11 to the first carrier 14, and rotates the first sun gear 11 and the first carrier 14 integrally. The completely engaged first clutch CL1 restricts the differential motion of the first planetary gear mechanism 10. On the other hand, the released (non-engaged) first clutch CL1 disconnects the first sun gear 11 from the first carrier 14, and permits relative rotation between the first sun gear 11 and the first carrier 14. That is, the released first clutch CL1 permits the differential motion of the first planetary gear mechanism 10. The first clutch CL1 is allowed to be controlled to a slipping state that is a half-engaged state. The slipping first clutch CL1 permits the differential motion of the first planetary gear mechanism 10.

The brake BL1 is a brake device as an engaging device (engaging unit) that is able to restrict the rotation of the first ring gear 13. At least one of the brake BL1 and the first clutch CL1 corresponds to the first engaging unit according to the aspect. The brake BL1 includes an engaging element connected to the first ring gear 13 and an engaging element connected to a vehicle body side, such as a case (stationary element) of the power transmission system. The brake BL1 is able to releasably couple the first ring gear 13 to the case. The brake BL1 as well as the first clutch CL1 may be a friction clutch; however, the brake BL1 is not limited to a friction clutch. In the present embodiment, the brake BL1 is controlled by hydraulic pressure to be engaged (including a completely engaged state) or released. The completely engaged (hereinafter, may be simply referred to as engaged) brake BL1 couples the first ring gear 13 to the vehicle body side, that is, the stationary element, and restricts the rotation of the first ring gear 13. On the other hand, the released (non-engaged) brake BL1 disconnects the first ring gear 13 from the stationary element, and permits the rotation of the first ring gear 13. The brake BL1 is allowed to be controlled to a slipping state that is a half-engaged state. The slipping brake BL1 permits the rotation of the first ring gear 13.

The second planetary gear mechanism 20 according to the first embodiment is mounted on the vehicle 100 as a second differential mechanism. The second differential mechanism connects the first planetary gear mechanism 10 to the drive wheels W. The second planetary gear mechanism 20 is arranged coaxially with the first planetary gear mechanism 10 on the engine side with respect to the first planetary gear mechanism 10. The second planetary gear mechanism 20 is an output-side differential mechanism arranged on the drive wheels W side with respect to the first planetary gear mechanism 10. The second planetary gear mechanism 20 is of a single-pinion type, and includes a second sun gear 21, second pinion gears 22, a second ring gear 23 and a second carrier 24. In the first embodiment, the second sun gear 21 corresponds to a fifth rotating element, the second ring gear 23 corresponds to a sixth rotating element, and the second carrier 24 corresponds to a fourth rotating element.

The second ring gear 23 is arranged coaxially with the second sun gear 21 on the radially outer side of the second sun gear 21. The second pinion gears 22 are arranged between the second sun gear 21 and the second ring gear 23. Each of the second pinion gears 22 is in mesh with the second sun gear 21 and the second ring gear 23. Each of the second pinion gears 22 is rotatably supported by the second carrier 24. The second carrier 24 is connected to the first carrier 14 of the first planetary gear mechanism 10, and rotates integrally with the first carrier 14. Each of the second pinion gears 22 is revolvable around the central axis of the input shaft 2 together with the second carrier 24, and is supported by the second carrier 24 so as to be rotatable around the central axis of the second pinion gear 22. The first carrier 14 is an output element of the first planetary gear mechanism 10. The first carrier 14 is able to output rotation, input from the engine 1 to the first planetary gear mechanism 10, to the second carrier 24.

A rotor shaft 33 of the first electric rotary machine MG1 is connected to the second sun gear 21. The rotor shaft 33 of the first electric rotary machine MG1 is arranged coaxially with the input shaft 2, and rotates integrally with the second sun gear 21. A counter drive gear 25 is connected to the second ring gear 23. The counter drive gear rotates integrally with the second ring gear 23. The second ring gear 23 is an output element that is able to output rotation, input from the first electric rotary machine MG1 or the first planetary gear mechanism 10, to the drive wheels W and the second electric rotary machine MG2.

The second clutch CLr is configured to releasably couple the first ring gear 13 to the second sun gear 21. The second clutch CLr corresponds to the second engaging unit according to the aspect. As will be apparent from the following description, the second clutch CLr, or the second engaging unit, serves as a switching device that is able to change a power split ratio in the first planetary gear mechanism 10 and second planetary gear mechanism 20 of the power transmission system TM1. The second clutch CLr may be, for example, a friction clutch; however, the second clutch CLr is not limited to a friction clutch. In the present embodiment, the second clutch CLr is arranged on the radially inner side of the first electric rotary machine MG1. In the present embodiment, the second clutch CLr is controlled by hydraulic pressure to be engaged (including a completely engaged state) or released. The completely engaged (hereinafter, may be simply referred to as engaged) second clutch CLr couples the first ring gear 13 to the second sun gear 21, and rotates the first ring gear 13 and the second sun gear 21 integrally. With this configuration, it is possible to distribute power from the engine 1 between the first electric rotary machine MG1 side and the wheel side in hybrid mode (HV mode) (described later) at a power split ratio different from a power split ratio corresponding to the gear ratio of the second planetary gear mechanism 20. On the other hand, the released (non-engaged) second clutch CLr disconnects the first ring gear 13 from the second sun gear 21, and allows power from the engine 1, input from the first planetary gear mechanism 10 to the second planetary gear mechanism 20, to be distributed at the power split ratio corresponding to the gear ratio of the second planetary gear mechanism 20. The second clutch CLr is allowed to be controlled to a slipping state that is a half-engaged state.

The counter drive gear 25 is in mesh with a counter driven gear 26. The counter driven gear 26 is connected to a drive pinion gear 28 via a counter shaft 27. A reduction gear 35 is in mesh with the counter driven gear 26. The reduction gear 35 is connected to the rotor shaft 33 of the second electric rotary machine MG2. That is, the rotation of the second electric rotary machine MG2 is transmitted to the counter driven gear 26 via the reduction gear 35. The reduction gear 35 has a smaller diameter than the counter driven gear 26. The reduction gear 35 reduces the speed of rotation of the second electric rotary machine MG2, and transmits the rotation to the counter driven gear 26.

The drive pinion gear 28 is in mesh with a differential ring gear 29 of the differential unit 30. The differential unit 30 is connected to the drive wheels W via right and left axles 31.

In this way, the second ring gear 23 is connected to the drive wheels W via the counter drive gear 25, the counter driven gear 26, the counter shaft 27, the drive pinion gear 28, the differential unit 30 and the axles 31. The second electric rotary machine MG2 is connected to the transmission path of driving force between the second ring gear 23 and the drive wheels W. The second electric rotary machine MG2 is able to transmit power (driving force) to the second ring gear 23 and the drive wheels W.

Each of the first electric rotary machine MG1 and the second electric rotary machine MG2 has the function of a motor (electric motor) and the function of a generator. Each of the first electric rotary machine MG1 and the second electric rotary machine MG2 is connected to a battery via an inverter. Each of the first electric rotary machine MG1 and the second electric rotary machine MG2 is able to convert electric power, which is supplied from the battery, to mechanical power and output the mechanical power, and is also able to convert mechanical power to electric power by being driven by input power. Electric power generated by the electric rotary machines MG1, MG2 is allowed to be charged into the battery. Each of the first electric rotary machine MG1 and the second electric rotary machine MG2 may be, for example, a permanent-magnet three-phase alternating-current synchronous motor generator, and may also be a rotary machine of another type, such as a fluid motor.

As shown in FIG. 2, the vehicle 100 includes an HV_ECU 50, an MG_ECU 60 and an engine ECU 70. Each of the ECUs 50, 60, 70 is an electronic control unit including a computer. The HV_ECU 50 has the function of controlling the whole of the vehicle 100. The MG_ECU 60 and the engine ECU 70 each are electrically connected to the HV_ECU 50. The HV_ECU 50, the MG_ECU 60 and the engine ECU 70 may be substantially configured as a single electronic control unit as a whole.

The MG_ECU 60 is able to control the first electric rotary machine MG1 and the second electric rotary machine MG2. For example, the MG_ECU 60 is able to control the rotation speed of the first electric rotary machine MG1 by controlling the frequency of current that is supplied to the first electric rotary machine MG1, and is able to control the rotation speed of the second electric rotary machine MG2 by controlling the frequency of current that is supplied to the second electric rotary machine MG2. The MG_ECU 60 is also able to control the output torque of the first electric rotary machine MG1 by adjusting the value of current supplied, and is able to control the output torque of the second electric rotary machine MG2 by adjusting the value of current supplied.

The engine ECU 70 is able to control the engine 1. For example, the engine ECU 70 is able to control the opening degree of an electronic throttle valve of the engine 1, control ignition of the engine 1 by outputting an ignition signal, and control injection of fuel to the engine 1. The engine ECU 70 is able to control the output torque of the engine 1 through opening degree control over the electronic throttle valve, ignition control, injection control, and the like.

A vehicle speed sensor, an accelerator operation amount sensor, an MG1 rotation speed sensor, an MG2 rotation speed sensor, an output shaft rotation speed sensor, a battery sensor, and the like, are connected to the HV_ECU 50. With these sensors, the HV_ECU 50 is able to acquire a vehicle speed, an accelerator operation amount, the rotation speed of the first electric rotary machine MG1, the rotation speed of the second electric rotary machine MG2, the rotation speed of the output shaft (counter shaft 27) of the power transmission system TM1, a battery state of charge SOC, and the like.

The HV_ECU 50 is able to calculate a required driving force, a required power, a required torque, or the like, of the vehicle 100 on the basis of the acquired pieces of information. The HV_ECU 50 determines the output torque (MG1 torque) of the first electric rotary machine MG1, the output torque (MG2 torque) of the second electric rotary machine MG2 and the output torque (engine torque) of the engine 1 on the basis of the calculated required value, and determines an integrated output torque of those output torques. The HV_ECU 50 outputs a command value of the MG1 torque and a command value of the MG2 torque to the MG_ECU 60. The HV_ECU 50 outputs a command value of the engine torque to the engine ECU 70.

The HV_ECU 50 has the function of a control unit for each of the first clutch CL, the second clutch CLr and the brake BL1. The HV_ECU 50 controls the statuses (that is, supplied hydraulic pressures) of the first clutch CL, second clutch CLr and brake BL1 on the basis of a selected drive mode (described later), and the like. The HV_ECU 50 outputs a command value of a hydraulic pressure (engaging pressure) P_CL1 that is supplied to the first clutch CL1, a command value of a hydraulic pressure (engaging pressure) P_CLr that is supplied to the second clutch CLr, and a command value of a hydraulic pressure (engaging pressure) P_BL1 that is supplied to the brake BL1. A hydraulic controller (not shown) controls the hydraulic pressures that are respectively supplied to the clutches CL1, CLr and the brake BL1 in response to the command values of the engaging pressures P_CL1, P_CLr, P_BL1. Particularly, as for control over the hydraulic pressures that are respectively supplied to the clutches CL1, CLr and the brake BL1, the HV_ECU 50 has programs, data, and the like, determined in advance on the basis of experiment, and executes control over those supplied hydraulic pressures on the basis of these programs, data, and the like. Particularly, these programs, data, and the like, are determined in consideration of the performance of each of the first and second electric rotary machines MG1, MG2 and the operation characteristics in drive modes (described later). The HV_ECU 50 selects an optimal drive mode on the basis of the operating status (for example, accelerator operation amount) of the vehicle, and the like, and controls the hydraulic pressures that are respectively supplied to the clutches CL1, CLr and the brake BL1.

The vehicle 100 is able to selectively perform hybrid (HV) driving or EV driving. The HV driving is a drive mode in which the vehicle 100 is caused to travel while the engine 1 is used as a power source. In HV driving, in addition to the engine 1, the second electric rotary machine MG2 may be further used as a power source. The EV driving is a drive mode in which the vehicle 100 is caused to travel while at least one of the first electric rotary machine MG1 and the second electric rotary machine MG2 is used as a power source. In EV driving, the vehicle 100 is able to travel while the engine 1 is stopped.

In the present embodiment, the vehicle 100 has a one-motor EV mode and a two-motor EV mode as an EV drive mode. The one-motor EV mode is a mode in which the vehicle 100 is caused to travel while the second electric rotary machine MG2 is used as a single power source. The two-motor EV mode is a mode in which the vehicle 100 is caused to travel while the first electric rotary machine MG1 and the second electric rotary machine MG2 are used as power sources. Hereinafter, these EV drive modes will be initially described.

In the operation engagement chart of FIG. 3, a circle mark in the column of the first clutch CL1, the column of the brake BL1 and the column of the second clutch CLr indicates an engaged state, and a blank indicates a released state or a non-engaged state. A triangle mark indicates that any one of the first clutch CL1 and the second clutch CLr is engaged and the other one is released. In the nomographs of FIG. 4A to FIG. 4H, FIG. 10A to FIG. 10G, FIG. 13A to FIG. 13G, and FIG. 16A to FIG. 16H, which will be described below, an open square mark indicates a rotating element to which the first electric rotary machine MG1 is connected, a solid circle mark indicates a rotating element connected to the second electric rotary machine MG2 (that is, the output element of the second planetary gear mechanism 20), an open circle mark indicates a rotating element connected to the engine 1, and an arrow indicates the output torque (power) of the corresponding rotating element. In these nomographs, the outlined clutch CL1 indicates a released state, and the hatched clutch CL1 indicates an engaged state. In those nomographs, a line regarding the first planetary gear mechanism 10 is indicated by continuous line, and a line regarding the second planetary gear mechanism 20 is indicated by dashed line.

Figure 4A:
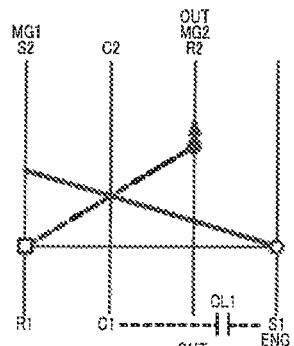
FIG. 4A to FIG. 4H are nomographs regarding the drive modes in the vehicle shown in FIG. 1.

FIG. 4A is a nomograph regarding the one-motor EV mode. In the nomograph, reference signs S1, C1, R1 respectively denote the first sun gear 11, the first carrier 14 and the first ring gear 13, and reference signs S2, C2, R2 respectively indicate the second sun gear 21, the second carrier 24 and the second ring gear 23.

In the one-motor EV mode, the first clutch CL1, the brake BL1 and the second clutch CLr are released. Since the brake BL1 is released, the rotation of the first ring gear 13 is permitted. Since the first clutch CL1 is released, the differential motion of the first planetary gear mechanism 10 is enabled. The HV_ECU 50 causes the vehicle 100 to generate driving force in the forward traveling direction by causing the second electric rotary machine MG2 to output a positive torque via the MG_ECU 60. The second ring gear 23 rotates in the positive direction in synchronization with the rotation of the drive wheels W. Rotation in the positive direction is defined as the rotation of the second ring gear 23 at the time when the vehicle 100 travels forward. The first carrier 14 co-rotates with the second carrier 24 in the positive direction. The first and second planetary gear mechanisms 10, 20 are in a neutral state where each of the first clutch CL1, the second clutch CLr and the brake BL1 is released, so the engine 1 and the first electric rotary machine MG1 do not co-rotate, and the first sun gear 11 and the second sun gear 21 stop rotation.

When the vehicle 100 is traveling in the one-motor EV mode, there can be a case where the state of charge of the battery becomes full and, as a result, regenerative energy cannot be recovered. In this case, it is conceivable to additionally use engine brake. When the first clutch CL1 or the second clutch CLr is engaged, the engine 1 is connected to the drive wheels W, so it is possible to exert engine brake on the drive wheels W. As indicated by the triangular marks in FIG. 3, when the first clutch CL1 or the second clutch CLr is engaged in the one-motor EV mode, the engine 1 is placed in a co-rotation state, and an engine brake state is set by increasing the engine rotation speed with the use of the first electric rotary machine MG1.

Figure 4B:
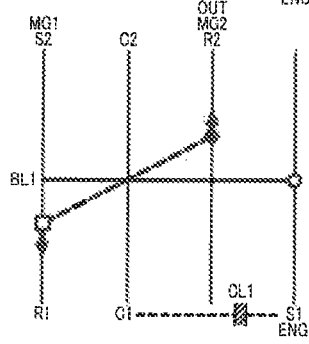

In the two-motor EV mode, the HV_ECU 50 engages the first clutch CL1 and the brake BL1 (the second clutch CLr is released). FIG. 4B is a nomograph regarding the two-motor EV mode. Since the first clutch CL1 is engaged, the differential motion of the first planetary gear mechanism 10 is restricted. Since the brake BL1 is engaged, the rotation of the first ring gear 13 is restricted. Therefore, the rotation of all the rotating elements of the first planetary gear mechanism 10 stops. Since the rotation of the first carrier 14 that is an output element is restricted, the second carrier 24 connected to the first carrier 14 is locked to a rotation speed of zero.

The HV_ECU 50 causes each of the first electric rotary machine MG1 and the second electric rotary machine MG2 to output a torque for propelling the vehicle 100. Since the rotation of the second carrier 24 is restricted, the second carrier 24 exerts a reaction force against the torque of the first electric rotary machine MG1, so it is possible to output the torque of the first electric rotary machine MG1 from the second ring gear 23. The first electric rotary machine MG1 is able to cause a positive torque to output from the second ring gear 23 by outputting a negative torque to rotate in the negative direction at the time when the vehicle 100 travels forward. On the other hand, when the vehicle 100 travels backward, the first electric rotary machine MG1 is able to cause a negative torque to output from the second ring gear 23 by outputting a positive torque to rotate in the positive direction.

The HV drive mode according to the first embodiment includes a first HV mode (overdrive (O/D) input split mode), a second HV mode (underdrive (U/D) input split mode) and a third HV mode (fixed gear mode).

Figure 4C:
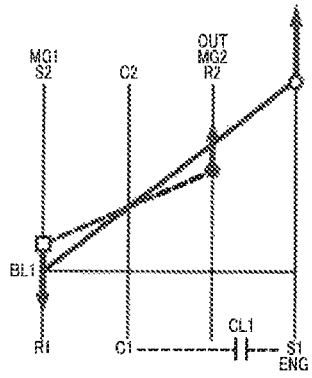
Figure 4D:
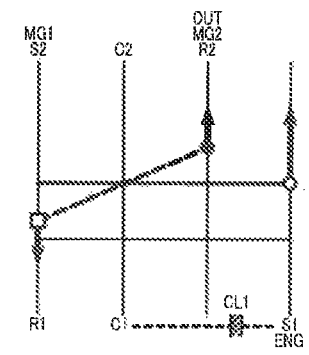

Initially, the first HV mode will be described. In HV driving in the first HV mode, the second planetary gear mechanism 20 is basically placed in a differential state, and the first planetary gear mechanism 10 that serves as a transmission unit is switched between low gear (Lo) and high gear (Hi). FIG. 4C is a nomograph regarding a low-gear drive mode (first OD Lo mode) in HV driving in the first HV mode. FIG. 4D is a nomograph regarding a high-gear drive mode (first OD Hi mode) in HV driving in the first HV mode. In the first HV mode, the second clutch CLr is released (set to a non-engaged state).

In the first OD Lo mode, the HV_ECU 50 releases the first clutch CL and engages the brake BL1 (releases the second clutch CLr). Since the brake BL1 is engaged, the rotation of the first ring gear 13 is restricted. The power of the engine 1 is transmitted from the first carrier 14 to the second carrier 24. The rotation (of the engine 1) input to the second carrier 24 is increased in speed in the second planetary gear mechanism 20, and is output from the second ring gear 23. That is, an overdrive (O/D) state is established.

In the first OD Hi mode, the HV_ECU 50 engages the first clutch CL1 and releases the brake BL1 (releases the second clutch CLr). Since the first clutch CL1 is engaged, the differential motion of the first planetary gear mechanism 10 is restricted, and the first sun gear 11, first ring gear 13 and first carrier 14 of the first planetary gear mechanism 10 rotate integrally. In the first embodiment, the first carrier 14 of the first planetary gear mechanism 10 is connected to the second carrier 24 of the second planetary gear mechanism 20, so the rotation of the engine 1 is increased in speed in the second planetary gear mechanism 20, and is output from the second ring gear 23. That is, an overdrive (O/D) state is established.

Figure 4E:
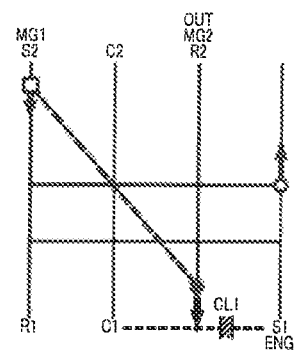

At the time when the vehicle 100 travels backward in the first HV mode, as in the case of the first OD Hi mode, the HV_ECU 50 engages the first clutch CL1 and releases the brake BL1 (releases the second clutch CLr). As shown in the nomograph of FIG. 4E, when the engine 1 is operated, the first electric rotary machine MG1 is caused to regenerate electric power and the second electric rotary machine MG2 is caused to perform motoring so as to rotate in the negative direction with a negative torque, it is possible to rotate the second ring gear 23 in the reverse direction.

Figure 4F:
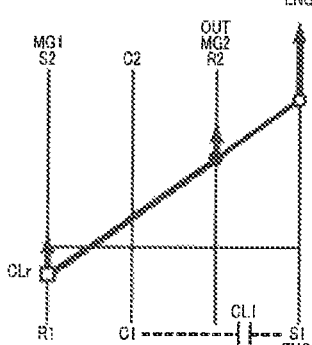

Next, the second HV mode will be described. FIG. 4F is a nomograph regarding the second HV mode. In the second HV mode, the HV_ECU 50 releases both the first clutch CL1 and the brake BL1, and engages the second clutch CLr. When the second clutch CLr is engaged, the first ring gear 13 is coupled to the second sun gear 21 to be placed in a connected state in addition to connection of the first carrier 14 to the second carrier 24 between the first planetary gear mechanism 10 and the second planetary gear mechanism 20. Thus, in the nomograph of FIG. 4F, the line regarding the first planetary gear mechanism 10 (continuous line) and the line regarding the second planetary gear mechanism 20 (dashed line) overlap with each other, with the result that there is a single line. That is, in the nomographs of FIG. 4A to FIG. 4E, there are two lines, that is, the line regarding the first planetary gear mechanism 10 and the line regarding the second planetary gear mechanism 20. Particularly, in the first HV mode shown in FIG. 4C to FIG. 4E, power from the engine 1, input to the second carrier 24 of the second planetary gear mechanism 20 via the first planetary gear mechanism 10, is distributed between the first electric rotary machine MG1 (that is, the second sun gear 21) and the output element (that is, the second ring gear 23) of the second planetary gear mechanism 20 at a first power split ratio (gear ratio) based on the number of gear teeth of each of the rotating elements of the second planetary gear mechanism 20. In contrast, in the second HV mode, as can be understood from FIG. 4F, it is possible to distribute power from the engine 1 between the second sun gear 21 and the second ring gear 23 at a second power split ratio (a power split ratio based on the number of gear teeth of each of the rotating elements of the first planetary gear mechanism 10 and second planetary gear mechanism 20) different from the power split ratio in the first HV mode. In the second HV mode, the rotation of the engine 1 is reduced in speed, and is output from the second ring gear 23. That is, an underdrive (U/D) state is established. Backward traveling is enabled by rotating the first electric rotary machine MG1 in the reverse direction.

Figure 4G:
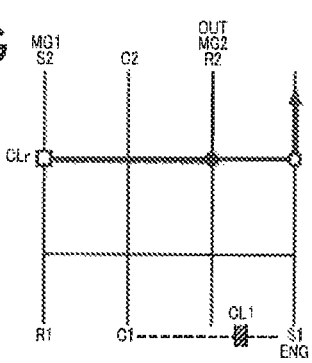
Figure 4H:
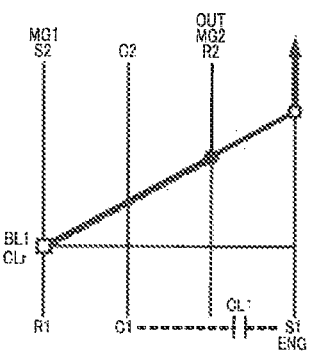

Next, the third HV mode will be described. FIG. 4G is a nomograph regarding a direct-coupling fixed gear mode. FIG. 4H is a nomograph regarding an underdrive (U/D) fixed gear mode. In the direct-coupling fixed gear mode, the HV_ECU 50 engages both the first clutch CL1 and the second clutch CLr, and releases the brake BL1. Since the first and second clutches CL1, CLr are engaged, the differential motion of each of the first planetary gear mechanism 10 and the second planetary gear mechanism 20 is restricted. Thus, it is possible to directly output the power of the engine 1 from the second ring gear 23.

In the underdrive (U/D) fixed gear mode, the HV_ECU 50 releases the first clutch CL1, and engages both the brake BL1 and the second clutch CLr. Since the brake BL1 is engaged, the rotation of the first ring gear 13 is restricted. Since the second clutch CLr is engaged, the first ring gear 13 is coupled to the second sun gear 21 to be placed in a connected state in addition to connection of the first carrier 14 to the second carrier 24 between the first planetary gear mechanism 10 and the second planetary gear mechanism 20. Therefore, the rotation of the engine 1 is reduced in speed, and is output from the second ring gear 23. That is, an underdrive (U/D) state is established. The underdrive (U/D) fixed gear mode is advantageous at the time of hill climbing, towing, or the like. This is because, in the underdrive (U/D) fixed gear mode, the first electric rotary machine MG1 is difficult to overheat. For this reason, the underdrive (U/D) fixed gear mode is advantageous at the time when accelerating force is increased by assisting the second electric rotary machine MG2.

As described above, it is possible to change the power split ratio in the power transmission system TM1 between the first HV mode and the second HV mode. In the first HV mode, the second clutch CLr is not engaged, and the first clutch CL1 or the brake BL1 is engaged. In the second HV mode, the second clutch CLr is engaged, and both the first clutch CL1 and the brake BL1 are not engaged. Thus, by suitably selecting and setting these first and second HV modes, it is possible to control the torque and rotation of the first electric rotary machine MG1 to those appropriate for the characteristics (performance) of the first electric rotary machine MG1.

Figure 5:
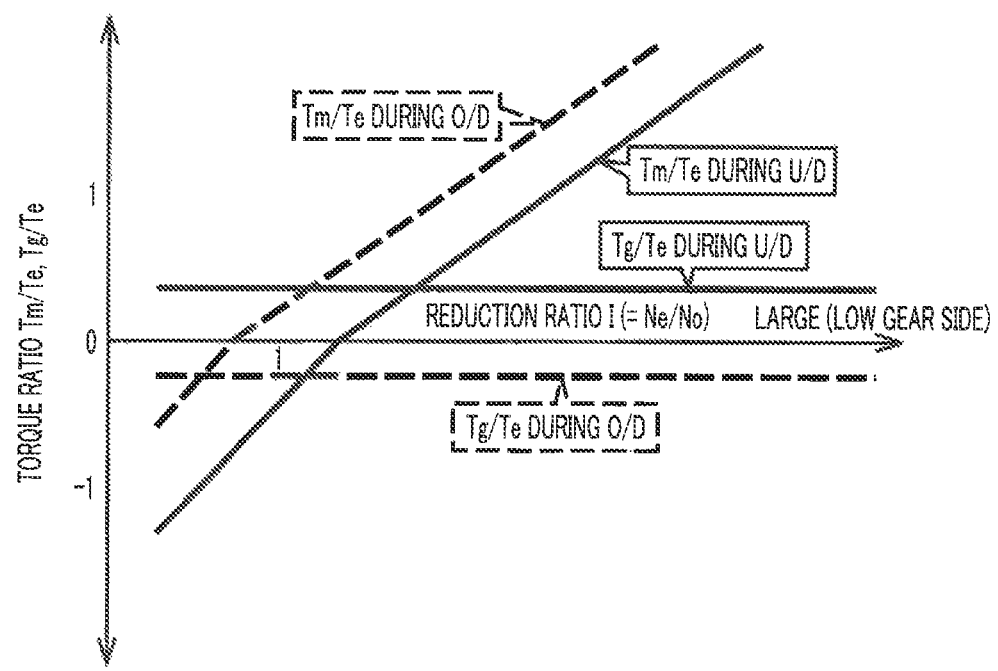
FIG. 5 is a graph that shows the relationship between a reduction ratio and a torque ratio in each of a first HV mode (O/D) and a second HV mode (U/D) in the vehicle shown in FIG. 1.

As shown in FIG. 5, the absolute value of a torque ratio (Tg/Te) in each of the first HV mode (O/D) and the second HV mode (U/D) is constant irrespective of a reduction ratio (Ne/No).

Figure 6:
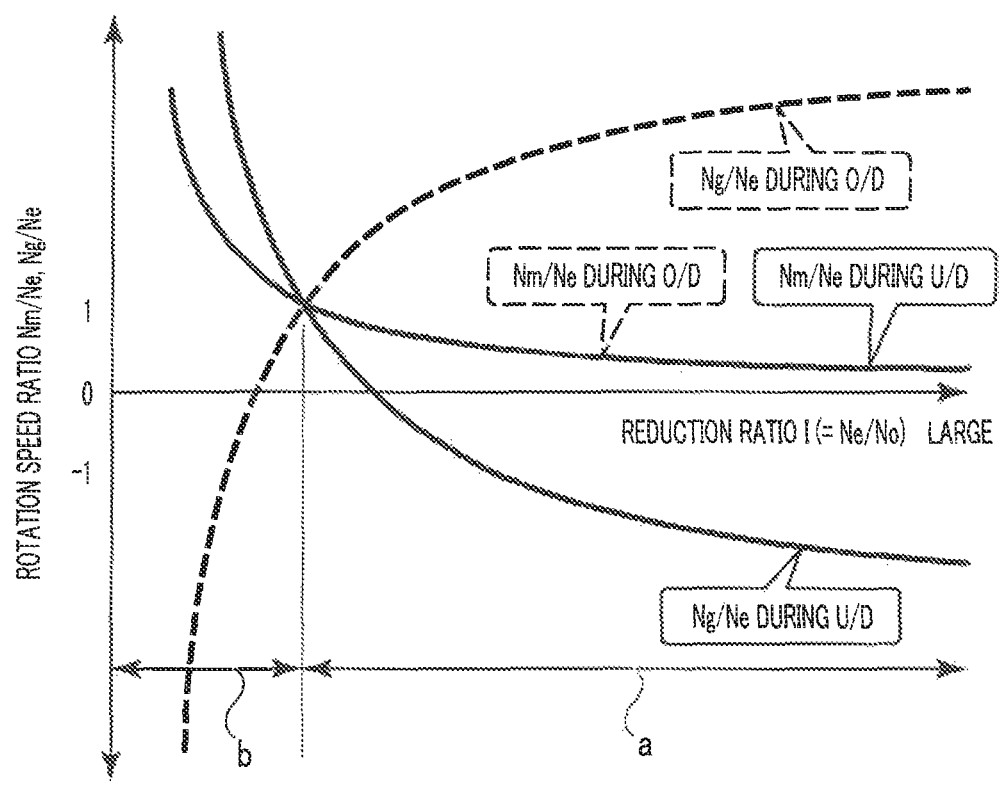
FIG. 6 is a graph that shows the relationship between a reduction ratio and a rotation speed ratio in each of the first HV mode (O/D) and the second HV mode (U/D) in the vehicle shown in FIG. 1.

On the other hand, as shown in FIG. 6, in a region a in which the reduction ratio (Ne/No) of the power transmission system is relatively large, the absolute value of a rotation speed ratio (Ng/Ne) in the second HV mode (U/D) is smaller than the absolute value of a rotation speed ratio (Ng/Ne) in the first HV mode (O/D). Therefore, in the region a in which the reduction ratio is relatively large, it is possible to reduce an increase in MG1 rotation speed Ng by establishing the second HV mode (U/D). On the other hand, in a region b in which the reduction ratio is relatively small, the absolute value of the rotation speed ratio (Ng/Ne) in the first HV mode (O/D) is smaller than the absolute value of the rotation speed ratio ((Ng/Ne) in the second HV mode (U/D). Therefore, in the region b in which the reduction ratio is relatively small, it is possible to reduce an increase in MG1 rotation speed Ng by establishing the first HV mode (O/D).

Figure 7:
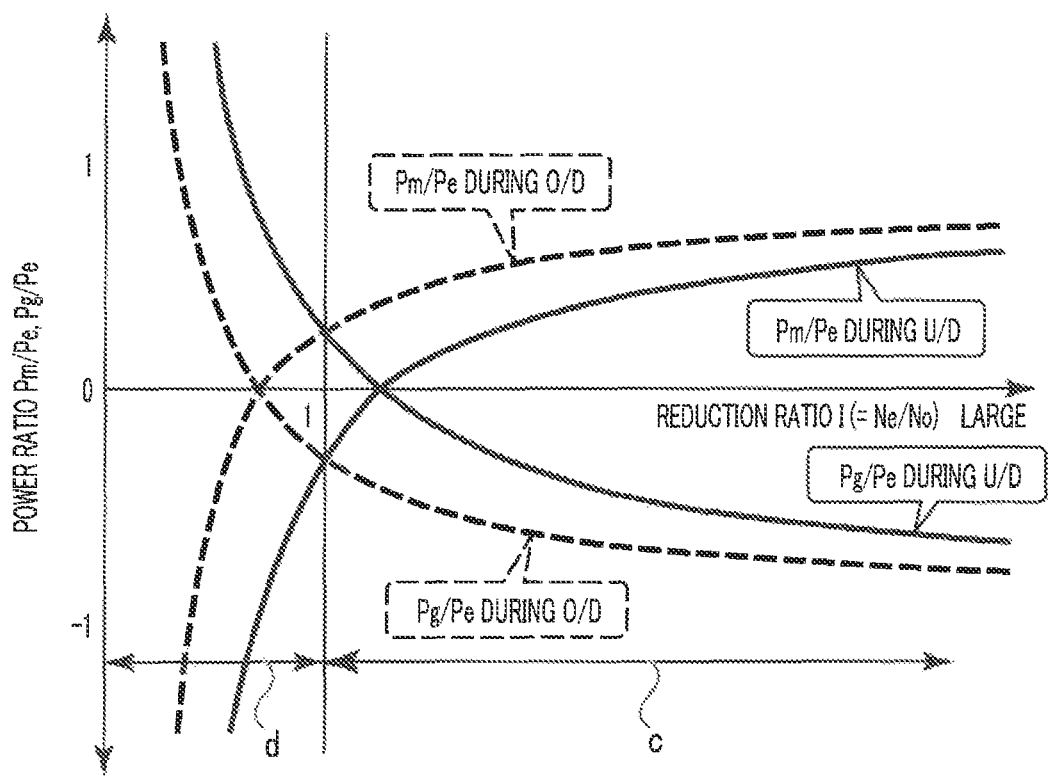
FIG. 7 is a graph that shows the relationship between a reduction ratio and a power ratio in each of the first HV mode (O/D) and the second HV mode (U/D) in the vehicle shown in FIG. 1.

A power ratio (Pg/Pe) is a product of the torque ratio (Tg/Te) and the rotation speed ratio (Ng/Ne). Therefore, as shown in FIG. 7, in a region c in which the reduction ratio is relatively large, the absolute value of the power ratio (Pg/Pe) in the second HV mode (U/D) is smaller than the absolute value of the power ratio (Pg/Pe) in the first HV mode (O/D). Therefore, in the region c in which the reduction ratio is relatively large, it is possible to reduce an increase in MG1 power Pg by establishing the second HV mode (U/D). On the other hand, in a region d in which the reduction ratio is relatively small, the absolute value of the power ratio (Pg/Pe) in the first HV mode (O/D) is smaller than the absolute value of the power ratio (Pg/Pe) in the second HV mode (U/D). Therefore, in the region d in which the reduction ratio is relatively small, it is possible to reduce an increase in MG1 power by establishing the first HV mode (O/D).

For this reason, by selecting and setting the HV mode in which the power ratio (Pg/Pe) is relatively small in response to the reduction ratio, it is possible to reduce an increase in MG1 power, it is possible to reduce an increase in MG1 rotation speed or MG1 torque, and it is possible to reduce an increase in MG1 rated rotation speed or MG1 rated torque.

In the first embodiment, the first planetary gear mechanism 10 and the second planetary gear mechanism 20 are designed or selected such that the power split ratio is changed between the first HV mode and the second HV mode. This can be understood from the fact that the vertical line regarding the first and second carriers 14, 24 deviates from the line regarding the second ring gear 23 in the nomographs and the relative relationship in the size, position, and the like, among the rotating elements in FIG. 1. Design or selection for changing the power split ratio between the first HV mode and the second HV mode is similarly performed in other embodiments that will be described below.

The overdrive state and the underdrive state are switched by changing the drive mode between the first HV mode and the second HV mode, so the power transmission system TM1 allows the range of speed ratio of the transmission to expand.

In the first embodiment, the first HV mode is desirably selected at a low-load or high-speed operation, and the second HV mode is desirably selected at a high-load operation. With this configuration, an increase in the torque or rotation speed of the first electric rotary machine MG1 is reduced. The above-described programs, and the like, of the HV_ECU 50 are desirably constructed on the basis of this relationship.

A second embodiment will be described with reference to FIG. 8 to FIG. 10G. The second embodiment relates to a power transmission system TM2 for transmitting power from the engine 1, and is applied to a vehicle 200 as in the case of the first embodiment. In the following description, like reference numerals denote components having similar functions to those of the components already described in the first embodiment, and the overlap description is omitted. Hereinafter, the description of points that are apparent to persons skilled in the art by referring to the description of the first embodiment is omitted or simplified, and the characteristic configuration and functions of the second embodiment will be mainly described. The modifications and changes described in the first embodiment are also similarly applied to the second embodiment unless there is a contradiction.

Figure 8:
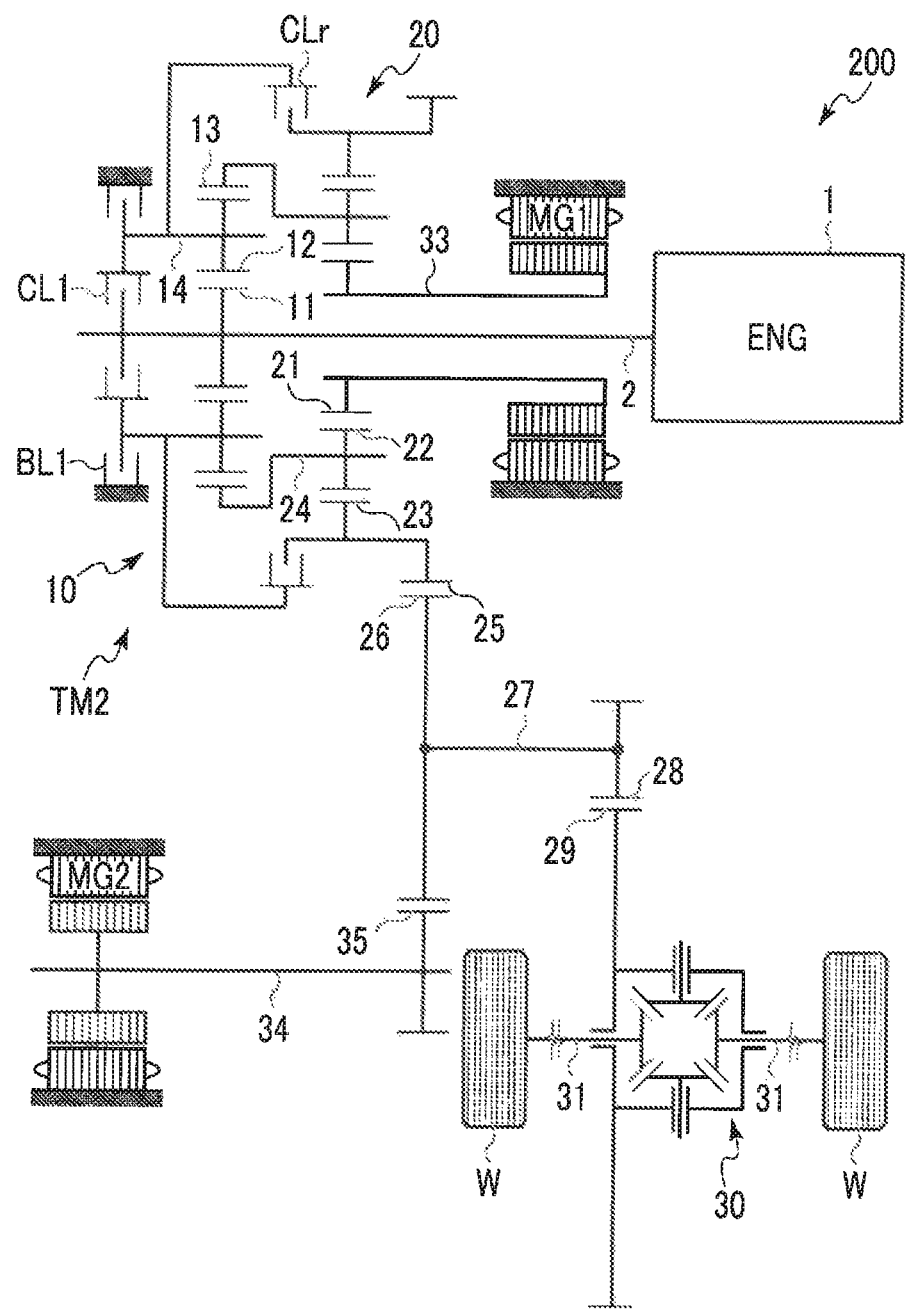
FIG. 8 is a schematic view that shows a gear train of a hybrid vehicle according to a second embodiment.

As shown in FIG. 8, the vehicle 200 according to the second embodiment is a hybrid vehicle (HV) including the engine 1, the first electric rotary machine MG1 and the second electric rotary machine MG2. The vehicle 200 includes the engine 1, the first planetary gear mechanism 10, the second planetary gear mechanism 20, the first electric rotary machine MG1, the second electric rotary machine MG2, the clutch (first clutch) CL1, the clutch (second clutch) CLr, the brake BL1, the differential unit 30, the HV_ECU 50, the MG_ECU 60 and the engine ECU 70. The power transmission system TM2 includes the first planetary gear mechanism 10, the second planetary gear mechanism 20, the first clutch CL1, the second clutch CLr and the brake BL1.

The output shaft of the engine 1 is connected to the input shaft 2 of the power transmission system TM2. The input shaft 2 is arranged coaxially with the output shaft of the engine 1 along the extended line of the output shaft. The input shaft 2 is connected to the first sun gear 11 of the first planetary gear mechanism 10.

The first planetary gear mechanism 10 that serves as a first differential mechanism is of a single-pinion type, and includes the first sun gear 11, the first pinion gears 12, the first ring gear 13 and the first carrier 14. In the second embodiment, the first sun gear 11 corresponds to the first rotating element, the first ring gear 13 corresponds to the second rotating element, and the first carrier 14 corresponds to the third rotating element.

The first clutch CL is a clutch device that is able to releasably couple the first sun gear 11 to the first carrier 14. The brake BL1 is a brake device that is able to releasably couple the first carrier 14 to the stationary element so as to be able to restrict the rotation of the first carrier 14.

The second planetary gear mechanism 20 that serves as the second differential mechanism is arranged coaxially with the first planetary gear mechanism 10 on the engine side with respect to the first planetary gear mechanism 10. The second planetary gear mechanism 20 is of a single-pinion type, and includes the second sun gear 21, the second pinion gears 22, the second ring gear 23 and the second carrier 24. The second carrier 24 is connected to the first ring gear 13, and rotates integrally with the first ring gear 13. In the second embodiment, the second sun gear 21 corresponds to the fifth rotating element, the second ring gear 23 corresponds to the sixth rotating element, and the second carrier 24 corresponds to the fourth rotating element.

The rotor shaft 33 of the first electric rotary machine MG1 is connected to the second sun gear 21. The rotor shaft 33 of the first electric rotary machine MG1 is arranged coaxially with the input shaft 2, and rotates integrally with the second sun gear 21. The counter drive gear 25 is connected to the second ring gear 23. The counter drive gear is an output gear that rotates integrally with the second ring gear 23. The second ring gear 23 is an output element that is able to output rotation, input from the first electric rotary machine MG1 or the first planetary gear mechanism 10, to the drive wheels W and the second electric rotary machine MG2.

The second clutch CLr is a clutch device that is able to releasably couple the first carrier 14 of the first planetary gear mechanism 10 to the second ring gear 23 of the second planetary gear mechanism 20.

The counter drive gear 25 is in mesh with the counter driven gear 26. The configuration between the counter drive gear 25 and each of the drive wheels W and the second electric rotary machine MG2 is the same as the configuration described in the first embodiment.

The vehicle 200 is able to selectively perform HV driving or EV driving. The statuses of the first clutch CL1, brake BL1 and second clutch CLr in each drive mode are shown in the operation engagement chart of FIG. 9.

Figure 10A:
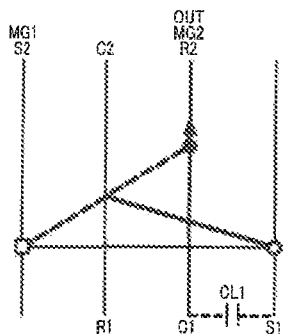
FIG. 10A to FIG. 10G are nomographs regarding the drive modes in the vehicle shown in FIG. 8.

FIG. 10A is a nomograph regarding a one-motor EV mode. In the one-motor EV mode, the first clutch CL1, the brake BL1 and the second clutch CLr are released. The HV_ECU 50 causes the vehicle 200 to generate driving force in the forward traveling direction by causing the second electric rotary machine MG2 to output a positive torque via the MG_ECU 60.

Figure 10B:
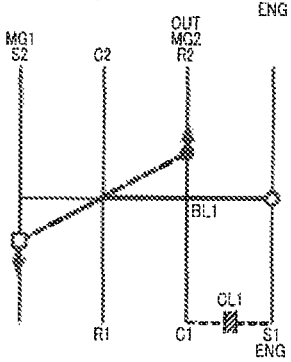

FIG. 10B is a nomograph regarding a two-motor EV mode. In the two-motor EV mode, the HV_ECU 50 engages the first clutch CL1 and the brake BL1 (the second clutch CLr is released). Since the first clutch CL1 and the brake BL1 are engaged, the rotation of all the rotating elements of the first planetary gear mechanism 10 stops. The HV_ECU 50 causes each of the first electric rotary machine MG1 and the second electric rotary machine MG2 to output a torque for propelling the vehicle 200.

The HV drive mode according to the second embodiment includes a first HV mode (overdrive (O/D) input split mode), a second HV mode (underdrive (U/D) input split mode) and a third HV mode (fixed gear mode).

Figure 10C:
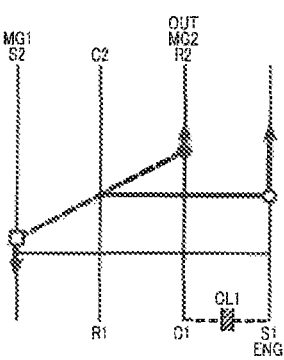
Figure 10D:
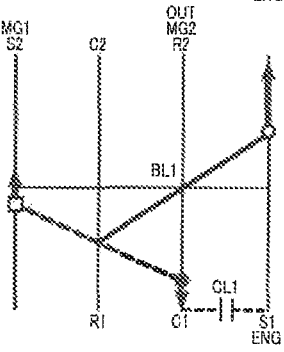

Initially, the first HV mode will be described. In the first HV mode, the second clutch CLr is released (set to a non-engaged state). FIG. 10C is a nomograph at the time when the vehicle travels forward in HV driving in the first HV mode. FIG. 10D is a nomograph at the time when the vehicle 200 travels backward in HV driving in the first HV mode.

In the first HV mode at the time when the vehicle 200 travels forward, the HV_ECU 50 engages the first clutch CL1, and releases the brake BL1. Since the first clutch CL1 is engaged, the differential motion of the first planetary gear mechanism 10 is restricted. In the second embodiment, the first ring gear 13 of the first planetary gear mechanism 10 is connected to the second carrier 24 of the second planetary gear mechanism 20, so the rotation of the engine 1 is increased in speed in the second planetary gear mechanism 20, and is output from the second ring gear 23. That is, an overdrive (O/D) state is established.

In the first HV mode at the time when the vehicle 200 travels backward, the HV_ECU 50 releases the first clutch CL1, and engages the brake BL1. Since the brake BL1 is engaged, the rotation of the first carrier 14 is restricted. The power of the engine 1 is transmitted from the first ring gear 13 to the second carrier 24. The reverse rotation (rotation for backward traveling) (of the engine 1) input to the second carrier 24 is increased in speed (shifted in speed toward the backward traveling side) in the second planetary gear mechanism 20, and is output from the second ring gear 23. That is, an overdrive (O/D) state is established. In this way, in the first HV mode according to the second embodiment, rotation has been already rotation for backward traveling when the rotation is output from the first planetary gear mechanism 10, so the first HV mode is suitable for backward traveling.

Figure 10E:
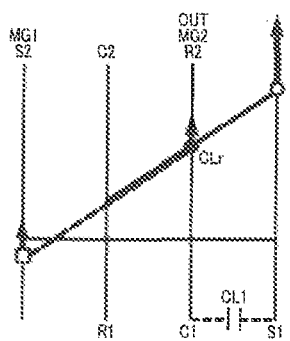

Next, the second HV mode will be described. FIG. 10E is a nomograph regarding the second HV mode. In the second HV mode, the HV_ECU 50 releases both the first clutch CL1 and the brake BL1, and engages the second clutch CLr. Since the second clutch CLr is engaged, the first carrier 14 is connected to the second ring gear 23 in addition to connection of the first ring gear 13 to the second carrier 24 between the first planetary gear mechanism 10 and the second planetary gear mechanism 20. Thus, there is one line in the nomograph of FIG. 10E. That is, it is possible to distribute power from the engine 1 between the second sun gear 21 and the second ring gear 23 in the second HV mode at a gear ratio (power split ratio) different from that of the first HV mode. In the second HV mode, the rotation of the engine 1 is reduced in speed, and is output from the second ring gear 23. That is, an underdrive (U/D) state is established. Backward traveling is enabled by rotating the electric rotary machine in the reverse direction.

Figure 10F:
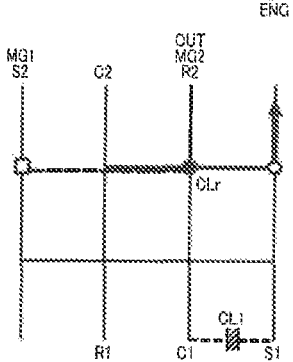
Figure 10G:
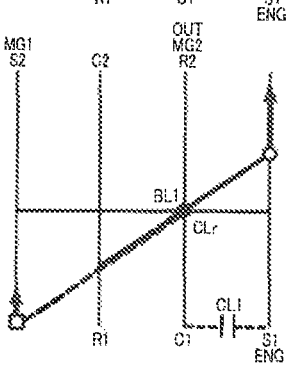

Next, the third HV mode will be described. FIG. 10F is a nomograph regarding a direct-coupling fixed gear mode. FIG. 10G is a nomograph regarding an output shaft fixed gear mode. In the direct-coupling fixed gear mode, the HV_ECU 50 engages both the first clutch CL1 and the second clutch CLr, and releases the brake BL1. Since the first and second clutches CL1, CLr are engaged, the differential motion of each of the first planetary gear mechanism 10 and the second planetary gear mechanism 20 is restricted. Thus, it is possible to directly output the power of the engine 1 from the second ring gear 23.

In the output shaft fixed gear mode, the HV_ECU 50 releases the first clutch CL1, and engages both the brake BL1 and the second clutch CLr. Since the brake BL1 is engaged, the rotation of the first carrier 14 is restricted. Since the second clutch CLr is engaged, the first carrier 14 is connected to the second ring gear 23 in addition to connection of the first ring gear 13 to the second carrier 24 between the first planetary gear mechanism 10 and the second planetary gear mechanism 20. Therefore, the rotation of the second ring gear 23 is restricted, so it is possible to exclusively perform charging in the first electric rotary machine MG1 by using power from the engine 1. Therefore, the output shaft fixed gear mode may be referred to as charging mode. It is also possible to start the engine 1 without any influence on the second ring gear 23 that is an output element.

As described above, it is possible to change the power split ratio in the power transmission system TM2 between the first HV mode and the second HV mode. In the first HV mode, the second clutch CLr is not engaged, and the first clutch CL1 or the brake BL1 is engaged. In the second HV mode, the second clutch CLr is engaged, and both the first clutch CL1 and the brake BL1 are not engaged. In the second embodiment, the first HV mode is desirably selected at a low-load or high-speed operation, and the second HV mode is desirably selected at a high-load operation. With this configuration, an increase in the torque or rotation speed of the first electric rotary machine MG1 is reduced.

A third embodiment will be described with reference to FIG. 11 to FIG. 13G. The third embodiment relates to a power transmission system TM3 for transmitting power from the engine 1, and is applied to a vehicle 300 as in the case of the above-described embodiments. In the following description, like reference numerals denote components having similar functions to those of the components already described in the above-described embodiments, and the overlap description is omitted. Hereinafter, the description of points that are apparent to persons skilled in the art by referring to the description of the above-described embodiments is omitted or simplified, and the characteristic configuration and functions of the third embodiment will be mainly described. The modifications and changes described in the above-described embodiments are also similarly applied to the third embodiment unless there is a contradiction.

Figure 11:
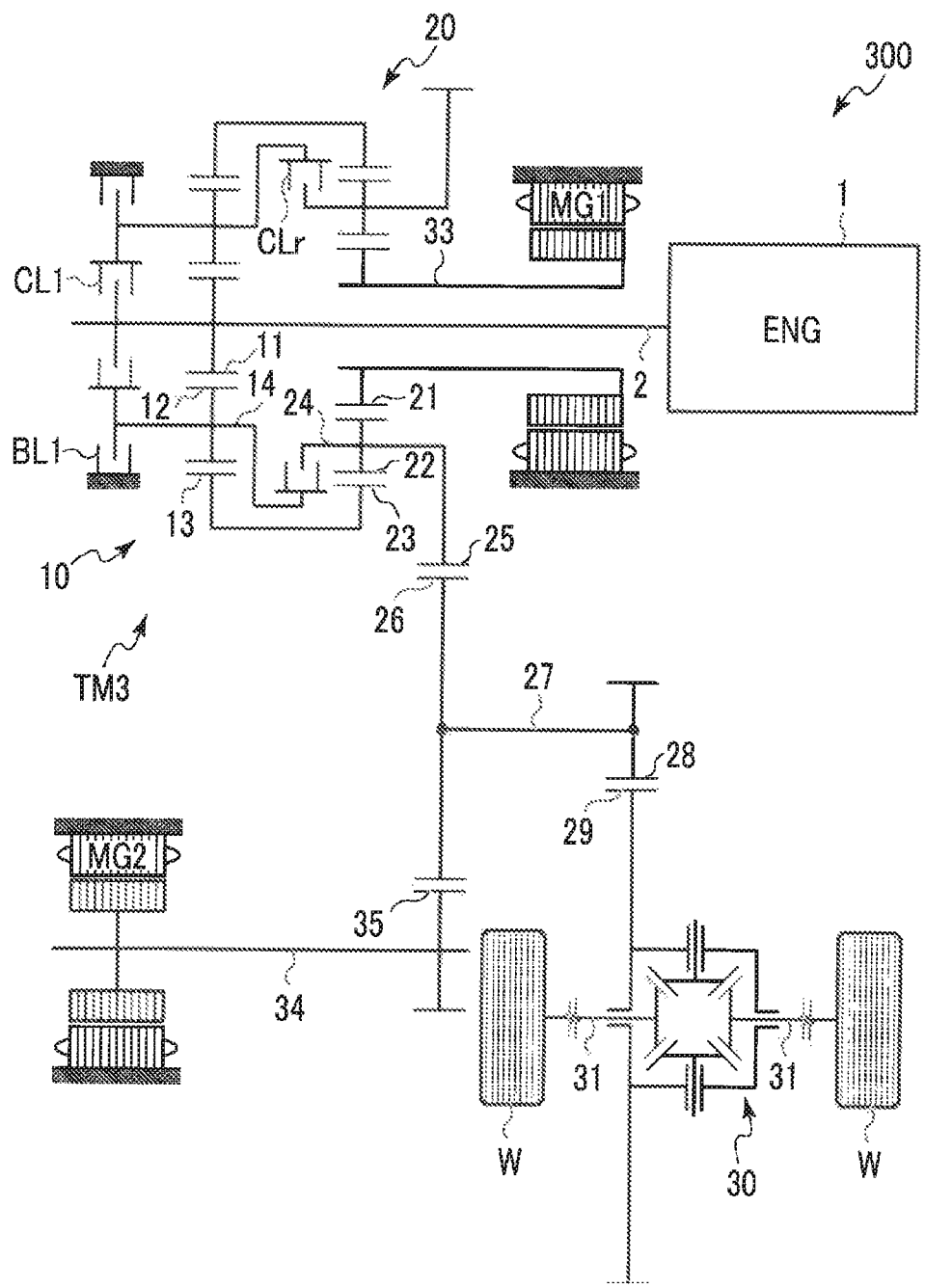
FIG. 11 is a schematic view that shows a gear train of a hybrid vehicle according to a third embodiment.

As shown in FIG. 11, the vehicle 300 according to the third embodiment is a hybrid vehicle (HV) including the engine 1, the first electric rotary machine MG1 and the second electric rotary machine MG2. The vehicle 300 includes the engine 1, the first planetary gear mechanism 10, the second planetary gear mechanism 20, the first electric rotary machine MG1, the second electric rotary machine MG2, the clutch (first clutch) CL1, the clutch (second clutch) CLr, the brake BL1, the differential unit 30, the HV_ECU 50, the MG_ECU 60 and the engine ECU 70. The power transmission system TM3 includes the first planetary gear mechanism 10, the second planetary gear mechanism 20, the first clutch CL1, the second clutch CLr and the brake BL1.

The output shaft of the engine 1 is connected to the input shaft 2 of the power transmission system TM3. The input shaft 2 is arranged coaxially with the output shaft of the engine 1 along the extended line of the output shaft. The input shaft 2 is connected to the first sun gear 11 of the first planetary gear mechanism 10.

The first planetary gear mechanism 10 that serves as a first differential mechanism is of a single-pinion type, and includes the first sun gear 11, the first pinion gears 12, the first ring gear 13 and the first carrier 14. In the third embodiment, the first sun gear 11 corresponds to the first rotating element, the first ring gear 13 corresponds to the second rotating element, and the first carrier 14 corresponds to the third rotating element.

The first clutch CL1 is a clutch device that is able to releasably couple the first sun gear 11 to the first carrier 14. The brake BL1 is a brake device that is able to releasably couple the first carrier 14 to the stationary element so as to be able to restrict the rotation of the first carrier 14.

The second planetary gear mechanism 20 that serves as the second differential mechanism is arranged coaxially with the first planetary gear mechanism 10 on the engine side with respect to the first planetary gear mechanism 10. The second planetary gear mechanism 20 is of a single-pinion type, and includes the second sun gear 21, the second pinion gears 22, the second ring gear 23 and the second carrier 24. The second ring gear 23 is connected to the first ring gear 13, and rotates integrally with the first ring gear 13. In the third embodiment, the second sun gear 21 corresponds to the fifth rotating element, the second ring gear 23 corresponds to the fourth rotating element, and the second carrier 24 corresponds to the sixth rotating element.

The rotor shaft 33 of the first electric rotary machine MG1 is connected to the second sun gear 21. The rotor shaft 33 of the first electric rotary machine MG1 is arranged coaxially with the input shaft 2, and rotates integrally with the second sun gear 21. The counter drive gear 25 is connected to the second carrier 24. The counter drive gear 25 is an output gear that rotates integrally with the second carrier 24. The second carrier 24 is an output element that is able to output rotation, input from the first electric rotary machine MG1 or the first planetary gear mechanism 10, to the drive wheels W and the second electric rotary machine MG2.

The second clutch CLr is a clutch device that is able to releasably couple the first carrier 14 of the first planetary gear mechanism 10 to the second carrier 24 of the second planetary gear mechanism 20.

The counter drive gear 25 is in mesh with the counter driven gear 26. The configuration between the counter drive gear 25 and each of the drive wheels W and the second electric rotary machine MG2 is the same as the configuration described in the first embodiment.

The vehicle 300 is able to selectively perform HV driving or EV driving. The statuses of the first clutch CL1, brake BL1 and second clutch CLr in each drive mode are shown in the operation engagement chart of FIG. 12.

Figure 13A:
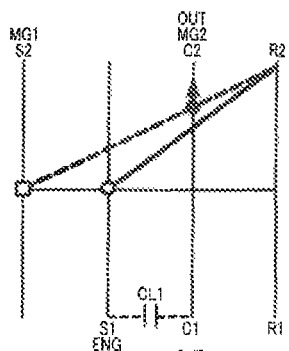
FIG. 13A to FIG. 13G are nomographs regarding the drive modes in the vehicle shown in FIG. 11.

FIG. 13A is a nomograph regarding a one-motor EV mode. In the one-motor EV mode, the first clutch CL1, the brake BL1 and the second clutch CLr are released. The HV_ECU 50 causes the vehicle 300 to generate driving force in the forward traveling direction by causing the second electric rotary machine MG2 to output a positive torque via the MG_ECU 60.

Figure 13B:
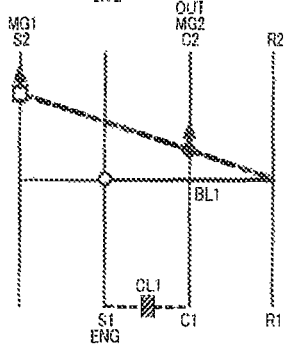

FIG. 13B is a nomograph regarding a two-motor EV mode. In the two-motor EV mode, the HV_ECU 50 engages the first clutch CL1 and the brake BL1 (the second clutch CLr is released). Since the first clutch CL and the brake BL1 are engaged, the rotation of all the rotating elements of the first planetary gear mechanism 10 stops. The HV_ECU 50 causes each of the first electric rotary machine MG1 and the second electric rotary machine MG2 to output a torque for propelling the vehicle 300.

The HV drive mode according to the third embodiment includes a first HV mode (underdrive (U/D) input split mode), a second HV mode (overdrive (O/D) input split mode) and a third HV mode (fixed gear mode).

Figure 13C:
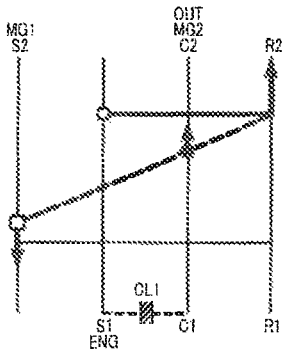
Figure 13D:
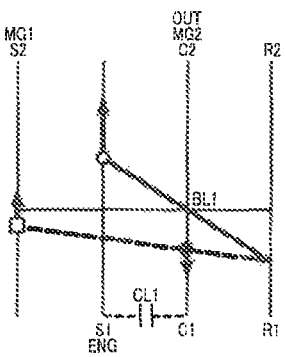

Initially, the first HV mode will be described. In the first HV mode, the second clutch CLr is released (set to a non-engaged state). FIG. 13C is a nomograph at the time when the vehicle 300 travels forward in HV driving in the first HV mode. FIG. 13D is a nomograph at the time when the vehicle 300 travels backward in HV driving in the first HV mode.

In the first HV mode at the time when the vehicle 300 travels forward, the HV_ECU 50 engages the first clutch CL1, and releases the brake BL1. Since the first clutch CL1 is engaged, the differential motion of the first planetary gear mechanism 10 is restricted. In the third embodiment, the first ring gear 13 of the first planetary gear mechanism 10 is connected to the second ring gear 23 of the second planetary gear mechanism 20, so the rotation of the engine 1 is reduced in speed in the second planetary gear mechanism 20, and is output from the second carrier 24. That is, an underdrive (O/D) state is established.

In the first HV mode at the time when the vehicle 300 travels backward, the HV_ECU 50 releases the first clutch CL1, and engages the brake BL1. Since the brake BL1 is engaged, the rotation of the first carrier 14 is restricted. The power of the engine 1 is transmitted from the first ring gear 13 to the second ring gear 23. The reverse rotation (rotation for backward traveling) (of the engine 1) input to the second ring gear 23 is reduced in speed (shifted in speed toward the forward traveling side) in the second planetary gear mechanism 20, and is output from the second carrier 24. That is, an underdrive (U/D) state is established. In this way, in the third embodiment, rotation has been already rotation for backward traveling when the rotation is output from the first planetary gear mechanism 10. Therefore, the first HV mode according to the third embodiment is appropriate for backward traveling.

Figure 13E:
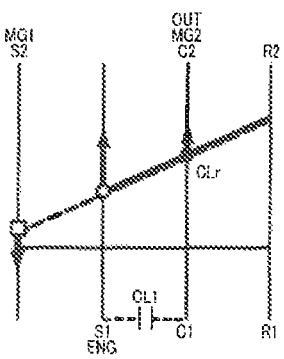

Next, the second HV mode will be described. FIG. 13E is a nomograph regarding the second HV mode. In the second HV mode, the HV_ECU 50 releases both the first clutch CL1 and the brake BL1, and engages the second clutch CLr. Since the second clutch CLr is engaged, the first carrier 14 is connected to the second carrier 24 in addition to connection of the first ring gear 13 to the second ring gear 23 between the first planetary gear mechanism 10 and the second planetary gear mechanism 20. Thus, there is one line in the nomograph of FIG. 13E. That is, it is possible to distribute power from the engine 1 between the second sun gear 21 and the second carrier 24 in the second HV mode at a power split ratio (gear ratio) different from that of the first HV mode. In the second HV mode, the rotation of the engine 1 is increased in speed, and is output from the second carrier 24. That is, an overdrive (O/D) state is established. Backward traveling is enabled by rotating the electric rotary machine in the reverse direction.

Figure 13F:
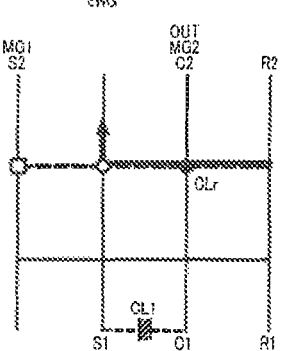
Figure 13G:
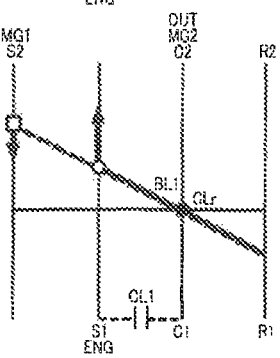

Next, the third HV mode will be described. FIG. 13F is a nomograph regarding a direct-coupling fixed gear mode. FIG. 13G is a nomograph regarding an output shaft fixed gear mode. In the direct-coupling fixed gear mode, the HV_ECU 50 engages both the first clutch CL1 and the second clutch CLr, and releases the brake BL1. Since the first and second clutches CL1, CLr are engaged, the differential motion of each of the first planetary gear mechanism 10 and the second planetary gear mechanism 20 is restricted. Thus, it is possible to directly output the power of the engine 1 from the second carrier 24.

In the output shaft fixed gear mode, the HV_ECU 50 releases the first clutch CL1, and engages both the brake BL1 and the second clutch CLr. Since the brake BL1 is engaged, the rotation of the first carrier 14 is restricted. Since the second clutch CLr is engaged, the first carrier 14 is connected to the second carrier 24 in addition to connection of the first ring gear 13 to the second ring gear 23 between the first planetary gear mechanism 10 and the second planetary gear mechanism 20. Therefore, the rotation of the second carrier 24 is restricted, so it is possible to perform charging in the first electric rotary machine MG1 by using power from the engine 1. Therefore, the output shaft fixed gear mode may be referred to as charging mode.

As described above, it is possible to change the power split ratio in the power transmission system TM3 between the first HV mode and the second HV mode. In the first HV mode, the second clutch CLr is not engaged, and the first clutch CL1 or the brake BL1 is engaged. In the second HV mode, the second clutch CLr is engaged, and both the first clutch CL1 and the brake BL1 are not engaged. In the third embodiment, the first HV mode is desirably selected at a high-load operation, and the second HV mode is desirably selected at a low-load or high-speed operation. With this configuration, an increase in the torque or rotation speed of the first electric rotary machine MG1 is reduced.

A fourth embodiment will be described with reference to FIG. 14 to FIG. 16H. The fourth embodiment relates to a power transmission system TM4 for transmitting power from the engine 1, and is applied to a vehicle 400 as in the case of the above-described embodiments. In the following description, like reference numerals denote components having similar functions to those of the components already described in the above-described embodiments, and the overlap description is omitted. Hereinafter, the description of points that are apparent to persons skilled in the art by referring to the description of the above-described embodiments is omitted or simplified, and the characteristic configuration and functions of the fourth embodiment will be mainly described. The modifications and changes described in the above-described embodiments are also similarly applied to the fourth embodiment unless there is a contradiction.

Figure 14:
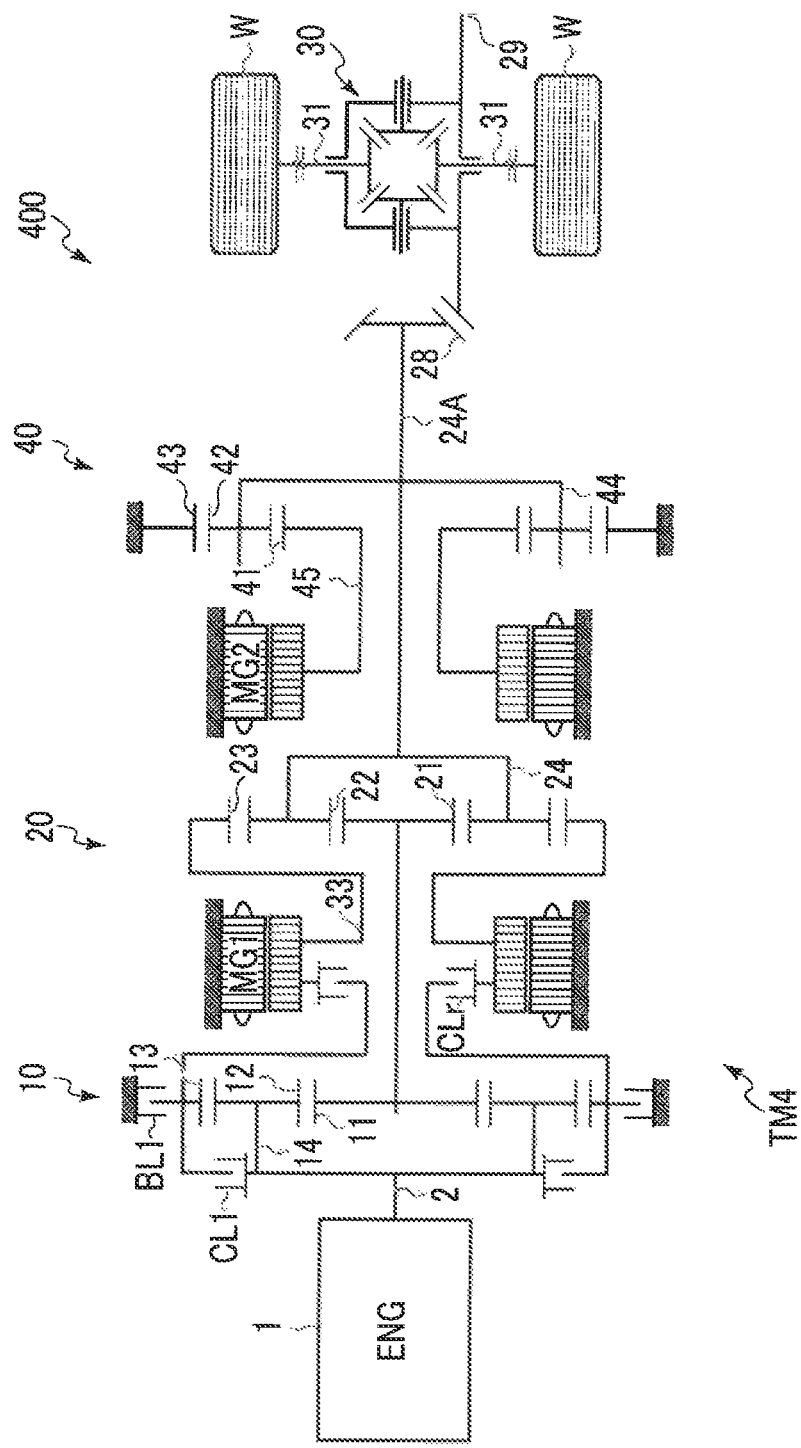
FIG. 14 is a schematic view that shows a gear train of a hybrid vehicle according to a fourth embodiment.

As shown in FIG. 14, the vehicle 400 according to the fourth embodiment is a hybrid vehicle (HV) including the engine 1, the first electric rotary machine MG1 and the second electric rotary machine MG2. The vehicle 400 includes the engine 1, the first planetary gear mechanism 10, the second planetary gear mechanism 20, a third planetary gear mechanism 40, the first electric rotary machine MG1, the second electric rotary machine MG2, the clutch (first clutch) CL1, the clutch (second clutch) CLr, the brake BL1, the differential unit 30, the HV_ECU 50, the MG_ECU 60 and the engine ECU 70. The power transmission system TM4 includes the first planetary gear mechanism 10, the second planetary gear mechanism 20, the first clutch CL1, the second clutch CLr and the brake BL1.

The output shaft of the engine 1 is connected to the input shaft 2 of the power transmission system TM4. The input shaft 2 is arranged coaxially with the output shaft of the engine 1 along the extended line of the output shaft. The input shaft 2 is connected to the first carrier 14 of the first planetary gear mechanism 10.

The first planetary gear mechanism 10 that serves as a first differential mechanism is of a single-pinion type, and includes the first sun gear 11, the first pinion gears 12, the first ring gear 13 and the first carrier 14. In the third embodiment, the first sun gear 11 corresponds to the second rotating element, the first ring gear 13 corresponds to the third rotating element, and the first carrier 14 corresponds to the first rotating element.

The first clutch CL1 is a clutch device that is able to releasably couple the first ring gear 13 to the first carrier 14. The brake BL1 is a brake device that is able to releasably couple the first ring gear 13 to the stationary element so as to be able to restrict the rotation of the first ring gear 13.

The second planetary gear mechanism 20 that serves as the second differential mechanism is arranged coaxially with the first planetary gear mechanism 10 on the engine side with respect to the first planetary gear mechanism 10. The second planetary gear mechanism 20 is of a single-pinion type, and includes the second sun gear 21, the second pinion gears 22, the second ring gear 23 and the second carrier 24. The second sun gear 21 is connected to the first sun gear 11, and rotates integrally with the first sun gear 11. In the fourth embodiment, the second sun gear 21 corresponds to the fourth rotating element, the second ring gear 23 corresponds to the fifth rotating element, and the second carrier 24 corresponds to the sixth rotating element.

The rotor shaft 33 of the first electric rotary machine MG1 is connected to the second ring gear 23. The rotor shaft 33 of the first electric rotary machine MG1 is arranged coaxially with the input shaft 2, and rotates integrally with the second ring gear 23. The second clutch CLr is a clutch device that is able to releasably couple the first carrier 14 of the first planetary gear mechanism 10 to the second ring gear 23 of the second planetary gear mechanism 20, and is able to couple the first ring gear 13 to the second ring gear 23 via the first electric rotary machine MG1, specifically, the rotor shaft 33 of the first electric rotary machine MG1. The second carrier 24 is an output element that is able to output rotation, input from the first electric rotary machine MG1 or the first planetary gear mechanism 10, to the drive wheels W and the second electric rotary machine MG2.

A shaft 24A is connected to the second carrier 24. The third planetary gear mechanism 40 is arranged in the middle of the shaft 24A. The third planetary gear mechanism 40 is arranged coaxially with each of the first and second planetary gear mechanisms 10, 20, and is arranged across the second planetary gear mechanism 20 from the engine 1. The third planetary gear mechanism 40 is of a single-pinion type, and includes a third sun gear 41, third pinion gears 42, a third ring gear 43 and a third carrier 44. The third carrier 44 is connected to the shaft 24A, and rotates integrally with the second carrier 24.

A rotor shaft 45 of the second electric rotary machine MG2 is connected to the third sun gear 41. The rotor shaft 45 of the second electric rotary machine MG2 is arranged coaxially with the input shaft 2, and rotates integrally with the third sun gear 41. The third planetary gear mechanism 40 is arranged in order to amplify the output torque of the second electric rotary machine MG2.

The second carrier 24 is connected to the drive pinion gear 28 via the shaft 24A. The drive pinion gear 28 is in mesh with the differential ring gear 29 of the differential unit 30. The differential unit 30 is connected to the drive wheels W via right and left axles 31.

The vehicle 400 is able to selectively perform HV driving or EV driving. The statuses of the first clutch CL1, brake BL1 and second clutch CLr in each drive mode are shown in the operation engagement chart of FIG. 15.

Figure 16A:
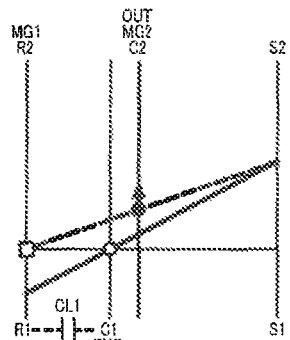
FIG. 16A to FIG. 16H are nomographs regarding the drive modes in the vehicle shown in FIG. 14.

FIG. 16A is a nomograph regarding a one-motor EV mode. In the one-motor EV mode, the first clutch CL1, the brake BL1 and the second clutch CLr are released. The HV_ECU 50 causes the vehicle 400 to generate driving force in the forward traveling direction by causing the second electric rotary machine MG2 to output a positive torque via the MG_ECU 60.

Figure 16B:
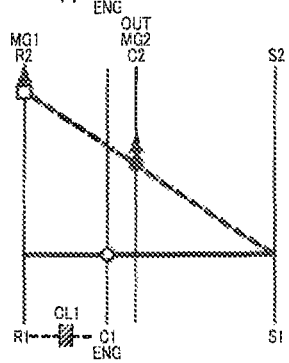

FIG. 16B is a nomograph regarding a two-motor EV mode. In the two-motor EV mode, the HV_ECU 50 engages the first clutch CL and the brake BL1 (the second clutch CLr is released). Since the first clutch CL1 and the brake BL1 are engaged, the rotation of all the rotating elements of the first planetary gear mechanism 10 stops. The HV_ECU 50 causes each of the first electric rotary machine MG1 and the second electric rotary machine MG2 to output a torque for propelling the vehicle 400.

The HV drive mode according to the fourth embodiment includes a first HV mode (underdrive (U/D) input split mode), a second HV mode (overdrive (O/D) input split mode) and a third HV mode (fixed gear mode).

Figure 16C:
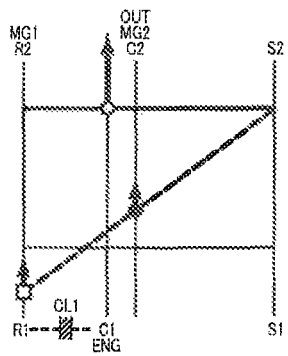
Figure 16D:
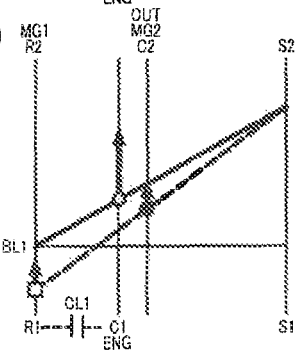

Initially, the first HV mode will be described. In HV driving in the first HV mode, the second planetary gear mechanism 20 is basically placed in a differential state, and the first planetary gear mechanism 10 that serves as a transmission unit is switched between low gear (Lo) and high gear (Hi). FIG. 16C is a nomograph regarding a low-gear drive mode (first UD Lo mode) in HV driving in the first HV mode. FIG. 16D is a nomograph regarding a high-gear drive mode (first UD Hi mode) in HV driving in the first HV mode. In the first HV mode, the second clutch CLr is released (set to a non-engaged state).

In the first UD Lo mode, the HV_ECU 50 engages the first clutch CL1, and releases the brake BL1. Since the first clutch CL1 is engaged, the differential motion of the first planetary gear mechanism 10 is restricted. In the fourth embodiment, the first sun gear 11 of the first planetary gear mechanism 10 is connected to the second sun gear 21 of the second planetary gear mechanism 20, so the rotation of the engine 1 is reduced in speed in the second planetary gear mechanism 20, and is output from the second carrier 24. That is, an underdrive (U/D) state is established.

In the first UD Hi mode, the HV_ECU 50 releases the first clutch CL1, and engages the brake BL1. Since the brake BL1 is engaged, the rotation of the first ring gear 13 is restricted. The power of the engine 1 is transmitted from the first sun gear 11 to the second sun gear 21. The rotation (of the engine 1) input to the second sun gear 21 is reduced in speed in the second planetary gear mechanism 20, and is output from the second carrier 24. That is, an underdrive (U/D) state is established.

Figure 16E:
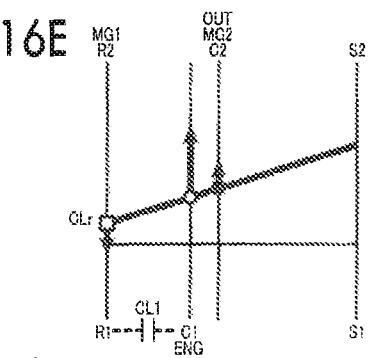
Figure 16F:
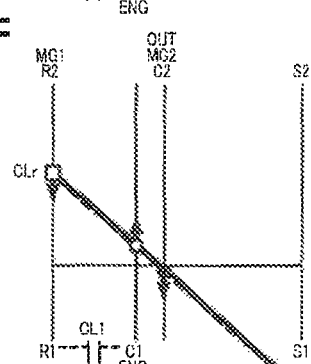

Next, the second HV mode will be described. FIG. 16E is a nomograph at the time when the vehicle 400 travels forward in the second HV mode. FIG. 16F is a nomograph at the time when the vehicle 400 travels backward in the second HV mode.

In the second HV mode, the HV_ECU 50 releases both the first clutch CL1 and the brake BL1, and engages the second clutch CLr. When the second clutch CLr is engaged, the first ring gear 13 is coupled to the second ring gear 23 to be placed in a connected state in addition to connection of the first sun gear 11 to the second sun gear 21 between the first planetary gear mechanism 10 and the second planetary gear mechanism 20. Thus, there is one line in the nomographs of FIG. 16E and FIG. 16F. That is, it is possible to distribute power from the engine 1 between the first ring gear 13 and the second carrier 24 in the second HV mode at a power split ratio (gear ratio) different from that of the first HV mode (the first UD Lo mode and the first UD Hi mode). In the second HV mode, the rotation of the engine 1 is increased in speed, and is output from the second carrier 24. That is, an overdrive (O/D) state is established. When the vehicle 400 travels backward, the rotation of the engine 1 is allowed to be increased in speed toward backward traveling side by rotating the second electric rotary machine MG2 in the reverse direction.

Figure 16G:
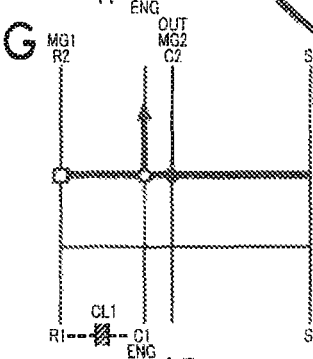
Figure 16H:
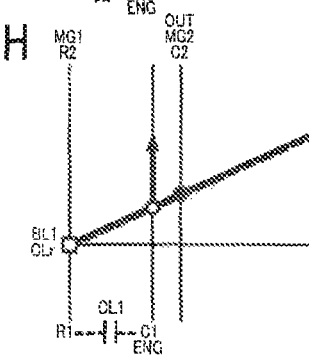

Next, the third HV mode will be described. FIG. 16G is a nomograph regarding a direct-coupling fixed gear mode. FIG. 16H is a nomograph regarding an overdrive (O/D) fixed gear mode. In the direct-coupling fixed gear mode, the HV_ECU 50 engages both the first clutch CL1 and the second clutch CLr, and releases the brake BL1. Since the first and second clutches CL1, CLr are engaged, the differential motion of each of the first planetary gear mechanism 10 and the second planetary gear mechanism 20 is restricted. Thus, it is possible to directly output the power of the engine 1 from the second carrier 24.

In the overdrive (O/D) fixed gear mode, the HV_ECU 50 releases the first clutch CL1, and engages both the brake BL1 and the second clutch CLr. Since the brake BL1 is engaged, the rotation of the first ring gear 13 is restricted. When the second clutch CLr is engaged, the first ring gear 13 is coupled to the second ring gear 23 to be placed in a connected state in addition to connection of the first sun gear 11 to the second sun gear 21 between the first planetary gear mechanism 10 and the second planetary gear mechanism 20. Therefore, the rotation of the second ring gear 23 is restricted, and the rotation of the engine 1 is increased in speed and output from the second carrier 24. That is, an overdrive (O/D) state is established. As can be understood from FIG. 15 and FIG. 16H, the overdrive (O/D) fixed gear mode is effective in improvement of fuel consumption during high-speed traveling.

As described above, it is possible to change the power split ratio in the power transmission system TM4 between the first HV mode and the second HV mode. In the first HV mode, the second clutch CLr is not engaged, and the first clutch CL1 or the brake BL1 is engaged. In the second HV mode, the second clutch CLr is engaged, and both the first clutch CL1 and the brake BL1 are not engaged. In the fourth embodiment, the first HV mode is desirably selected at a high-load operation, and the second HV mode is desirably selected at a low-load or high-speed operation. With this configuration, an increase in the torque or rotation speed of the first electric rotary machine MG1 is reduced.

A fifth embodiment will be described with reference to FIG. 17. The fifth embodiment relates to a power transmission system TM5 for transmitting power from the engine 1, and is applied to a vehicle 500 as in the case of the above-described embodiments. In the following description, like reference numerals denote components having similar functions to those of the components already described in the above-described embodiments, and the overlap description is omitted. Hereinafter, the description of points that are apparent to persons skilled in the art by referring to the description of the above-described embodiments is omitted or simplified, and the characteristic configuration and functions of the fifth embodiment will be mainly described. The modifications and changes described in the above-described embodiments are also similarly applied to the fifth embodiment unless there is a contradiction.

Figure 17:
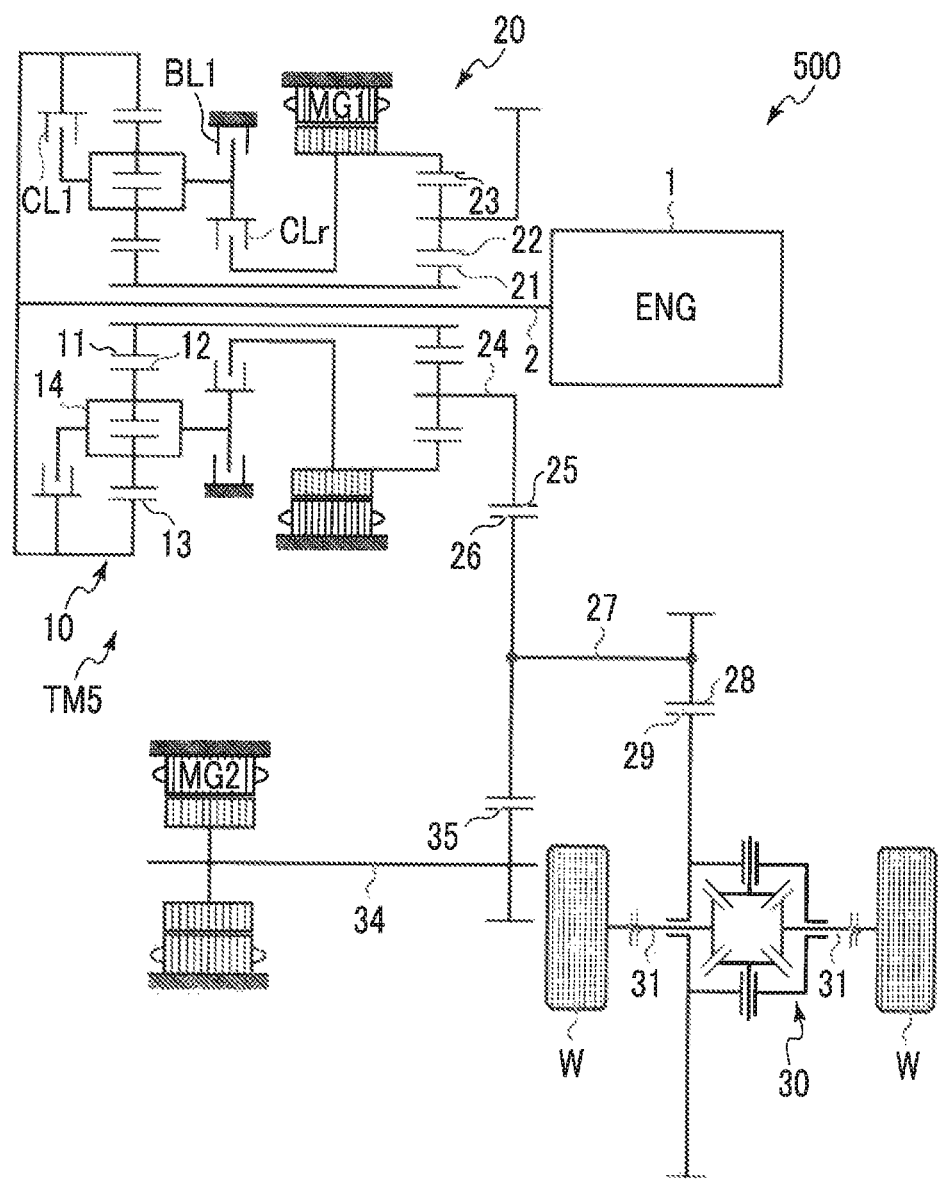
FIG. 17 is a schematic view that shows a gear train of a hybrid vehicle according to a fifth embodiment.

As shown in FIG. 17, the vehicle 500 according to the fifth embodiment is a hybrid vehicle (HV) including the engine 1, the first electric rotary machine MG1 and the second electric rotary machine MG2. The vehicle 500 includes the engine 1, the first planetary gear mechanism 10, the second planetary gear mechanism 20, the first electric rotary machine MG1, the second electric rotary machine MG2, the clutch (first clutch) CL1, the clutch (second clutch) CLr, the brake BL1, the differential unit 30, the HV_ECU 50, the MG_ECU 60 and the engine ECU 70. The power transmission system TM5 includes the first planetary gear mechanism 10, the second planetary gear mechanism 20, the first clutch CL1, the second clutch CLr and the brake BL1.

The output shaft of the engine 1 is connected to the input shaft 2 of the power transmission system TM5. The input shaft 2 is arranged coaxially with the output shaft of the engine 1 along the extended line of the output shaft. The input shaft 2 is connected to the first ring gear 13 of the first planetary gear mechanism 10.

The first planetary gear mechanism 10 that serves as the first differential mechanism is of a double-pinion type, and includes the first sun gear 11, the first pinion gears 12, the first ring gear 13 and the first carrier 14. In the fifth embodiment, the first sun gear 11 corresponds to the second rotating element, the first ring gear 13 corresponds to the first rotating element, and the first carrier 14 corresponds to the third rotating element.

The first clutch CL1 is a clutch device that is able to releasably couple the first ring gear 13 to the first carrier 14. The brake BL1 is a brake device that is able to releasably couple the first carrier 14 to the stationary element so as to be able to restrict the rotation of the first carrier 14.

The second planetary gear mechanism 20 that serves as the second differential mechanism is arranged coaxially with the first planetary gear mechanism 10 on the engine side with respect to the first planetary gear mechanism 10. The second planetary gear mechanism 20 is of a single-pinion type, and includes the second sun gear 21, the second pinion gears 22, the second ring gear 23 and the second carrier 24. The second sun gear 21 is connected to the first sun gear 11, and rotates integrally with the first sun gear 11. In the fifth embodiment, the second sun gear 21 corresponds to the fourth rotating element, the second ring gear 23 corresponds to the fifth rotating element, and the second carrier 24 corresponds to the sixth rotating element.

The rotor of the first electric rotary machine MG1 is connected to the second ring gear 23. The rotor of the first electric rotary machine MG1 is arranged coaxially with the input shaft 2, and rotates integrally with the second ring gear 23. The counter drive gear 25 is connected to the second carrier 24. The counter drive gear 25 is an output gear that rotates integrally with the second carrier 24. The second carrier 24 is an output element that is able to output rotation, input from the first electric rotary machine MG1 or the first planetary gear mechanism 10, to the drive wheels W and the second electric rotary machine MG2.

The second clutch CLr is a clutch device that is able to releasably couple the first carrier 14 of the first planetary gear mechanism 10 to the second ring gear 23 of the second planetary gear mechanism 20. The second clutch CLr is able to couple the first carrier 14 to the second ring gear 23 via the first electric rotary machine MG1.

The counter drive gear 25 is in mesh with the counter driven gear 26. The configuration between the counter drive gear 25 and each of the drive wheels W and the second electric rotary machine MG2 is the same as the configuration described in the first embodiment.

The vehicle 500 is able to selectively perform HV driving or EV driving. The statuses of the first clutch CL1, brake BL1 and second clutch CLr in each drive mode are in conformity with the operation engagement chart of FIG. 15 according to the fourth embodiment. As for a nomograph in each drive mode, since the first planetary gear mechanism 10 is of a double-pinion type in the fifth embodiment, FIG. 16A to FIG. 16H, in which the first ring gear 13 (that is, "R1") and the first carrier 14 ("C1") are interchanged with each other in each drive mode, are used as nomographs according to the fifth embodiment. Thus, a further description of each drive mode in the fifth embodiment is omitted.

Embodiments are not limited to only the above-described embodiments. For example, in each of the above-described embodiments, the first rotating element is releasably coupled to one of the second and third rotating elements by the first clutch CL1. Instead, the first clutch CL may be configured to releasably couple the second rotating element to the third rotating element. According to this embodiment as well, it is possible to set the rotation speeds of the first, second and third rotating elements to the same rotation speed by engaging the first clutch CL1.

The invention encompasses an embodiment in which any one of the first clutch CL1 and the brake BL1 is not provided in each of the above-described embodiments. In this case as well, it is possible to change the power split ratio between the first HV mode and the second HV mode. That is, the first engaging unit according to the aspect just needs to include at least one of an engaging unit that is able to releasably couple two of the first rotating element, the second rotating element and the third rotating element to each other and an engaging unit that is able to releasably couple the third rotating element to the stationary element.

The invention also encompasses modifications of arrangement in gear trains respectively shown by the skeletal views (FIG. 1, FIG. 8, FIG. 11, FIG. 14, FIG. 17) of the embodiments. The number of rotating elements in each planetary gear mechanism is not limited to three, and may be larger than or equal to four. The engine is not limited to an internal combustion engine. The invention encompasses all alternative embodiments, application examples and equivalents contained in the concept of the invention that is defined by the appended claims.

Conventionally, there is well known a vehicle including a second differential unit, a first differential unit and a second electric rotary machine. The second differential unit includes a fourth rotating element, a fifth rotating element to which a first electric rotary machine is coupled such that power is transmittable, and a sixth rotating element coupled to drive wheels. The differential status of the second differential unit is controlled as a result of controlling the operation status of the first electric rotary machine. The first differential unit includes a first rotating element to which an engine is coupled such that power is transmittable, a third rotating element, and a second rotating element coupled to the fourth rotating element. The second electric rotary machine is coupled to the drive wheels such that power is transmittable. This is, for example, the vehicle described in the International Application Publication No. 2013/114594. This International Application Publication No. 2013/114594 describes that a first engaging unit that couples any two of the first rotating element, the second rotating element and the third rotating element is provided, the rotating elements of the first differential unit are integrally rotated by engaging the first engaging unit, the rotation of the engine is transmitted to the second differential unit at a constant speed and the second differential unit is allowed to operate as an electrical continuously variable transmission.

Incidentally, in order to constitute an electrical continuously variable transmission that operates at a power split ratio different from a power split ratio in the second differential unit, it is conceivable to further include a second engaging unit that couples any one of the fifth rotating element and the sixth rotating element to the third rotating element. In the second differential unit and the first differential unit, in addition to the fact that the fourth rotating element is coupled to the second rotating element, any one of the fifth rotating element and the sixth rotating element is coupled to the third rotating element by releasing the first engaging unit and engaging the second engaging unit. As a result, the second differential unit and the first differential unit as a whole are allowed to serve as an electrical continuously variable transmission at a power split ratio different from the power split ratio in the second differential unit. In the vehicle including the first engaging unit and the second engaging unit, when the engine not in operation is started, it is conceivable to increase the engine rotation speed and start the engine by, for example, causing the first electric rotary machine to generate a torque in a state where the first engaging unit is engaged and the second engaging unit is released. In such a start of the engine, since a torque corresponding to a negative torque of the engine (also referred to as engine pull-in torque) resulting from an increase in the rotation of the engine not in operation is transmitted to the sixth rotating element coupled to the drive wheels as a reaction force for increasing the engine rotation speed, a driving torque (that is, an output torque from the drive wheels) decreases (that is, drops). For such an inconvenience, it is conceivable to reduce a shock at the time of starting the engine by causing the second electric rotary machine to output a torque (compensating torque) that compensates for a drop of driving torque. However, at the time of starting the engine with the configuration in which a torque increased in a state where the first engaging unit is engaged is transmitted, a compensating torque that is generated by the second electric rotary machine increases, so, if the engine is started in a state where the second electric rotary machine has been already outputting a large torque, there is a possibility that the second electric rotary machine cannot provide a compensating torque. As a result, the second electric rotary machine cannot sufficiently compensate for a drop of driving torque, and there is a concern that it is not possible to reduce a shock at the time of starting the engine.

Hereinafter, a vehicle that makes it easy to compensate for a drop of driving torque at the time of starting the engine according to embodiments will be described with reference to the accompanying drawings.

Figure 18:
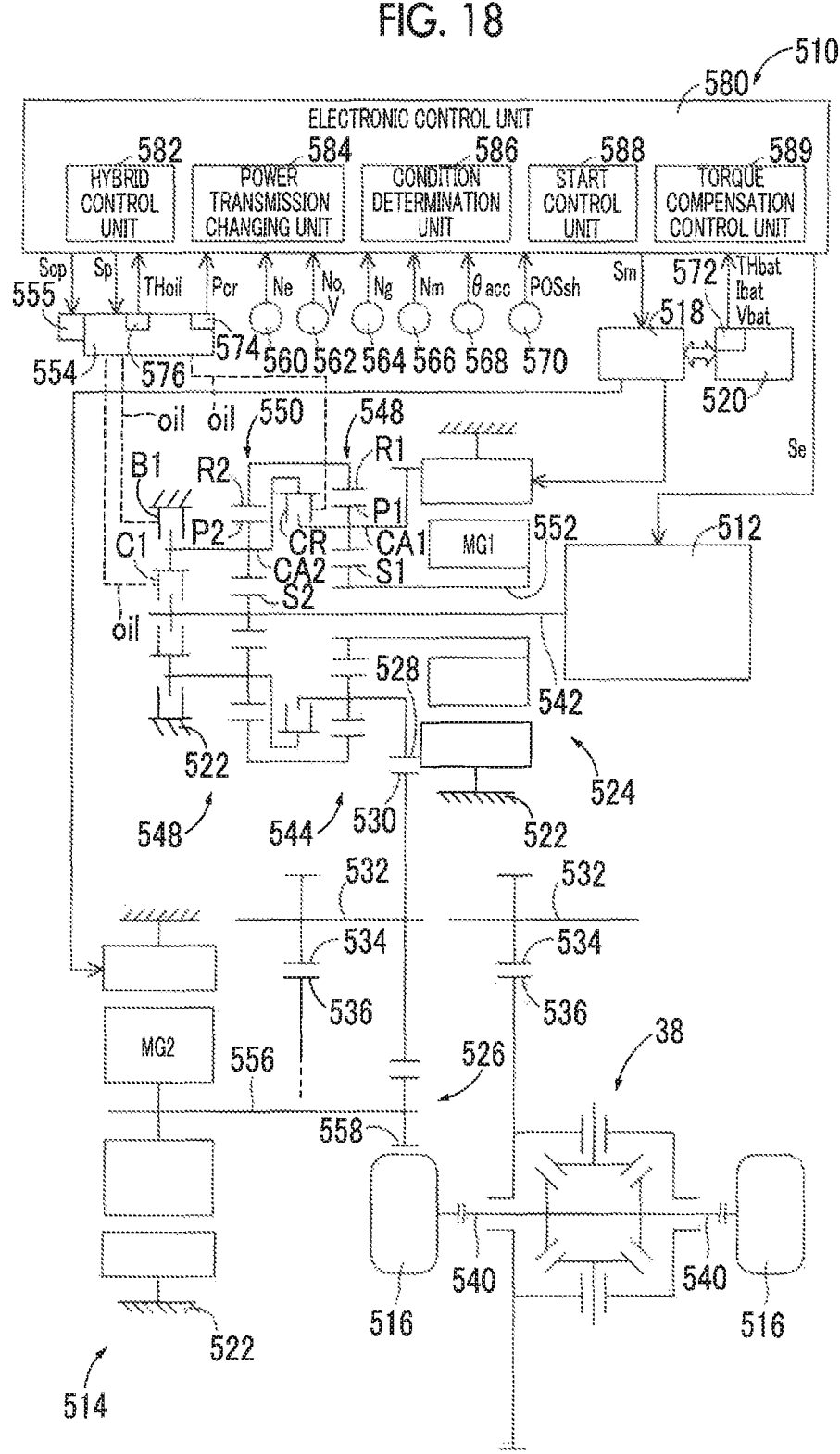
FIG. 18 is a view that illustrates the schematic configuration of devices regarding traveling of a vehicle according to a sixth embodiment and that also illustrates a relevant portion of control system for controlling the devices.

FIG. 18 is a view that illustrates the schematic configuration of devices regarding traveling of a vehicle 510 according to a sixth embodiment and that also illustrates a relevant portion of control system for controlling the devices. In FIG. 18, the vehicle 510 is a hybrid vehicle including an engine (ENG) 512, the first electric rotary machine MG1, the second electric rotary machine MG2, a power transmission system 514 and drive wheels 516. The engine (ENG) 512, the first electric rotary machine MG1 and the second electric rotary machine MG2 can serve as driving force sources for propelling the vehicle 510. The power transmission system 514 includes the first electric rotary machine MG1 and the second electric rotary machine MG2.

The engine 512 is a known internal combustion engine that combusts predetermined fuel to output power, and is, for example, a gasoline engine, a diesel engine, or the like. An engine torque Te of the engine 512 is controlled in accordance with operation statuses, such as a throttle opening degree or intake air amount, a fuel supply amount and ignition timing, that are controlled by an electronic control unit 580 (described later).

Each of the first electric rotary machine MG1 and the second electric rotary machine MG2 is a so-called motor generator having the function of an electric motor (motor) that generates driving torque and the function of a generator. Each of the first electric rotary machine MG1 and the second electric rotary machine MG2 is connected to a battery unit 520 via a power control unit 518. The power control unit 518 includes an inverter, a smoothing capacitor, and the like. The battery unit 520 serves as an electrical storage device that exchanges electric power with each of the first electric rotary machine MG1 and the second electric rotary machine MG2. The power control unit 518 is controlled by the electronic control unit 580 (described later), so the MG1 torque Tg that is the output torque (motoring torque or regenerative torque) of the first electric rotary machine MG1 and the MG2 torque Tm that is the output torque (motoring torque or regenerative torque) of the second electric rotary machine MG2 are controlled.

The power transmission system 514 is provided in the power transmission path between the engine 512 and the drive wheels 516. The power transmission system 514 includes a first power transmission unit 524, a second power transmission unit 526, a driven gear 530, a driven shaft 532, a final gear 534 (which has a smaller diameter than the driven gear 530), a differential gear 538, and the like, inside a case 522. The case 522 is a non-rotating member mounted on a vehicle body. The driven gear 530 is in mesh with a drive gear 528. The drive gear 528 is an output rotating member of the first power transmission unit 524. The driven gear 530 is fixed to the driven shaft 532 so as to be relatively non-rotatable. The final gear 534 is fixed to the driven shaft 532 so as to be relatively non-rotatable. The differential gear 538 is in mesh with the final gear 534 via the differential ring gear 536. The power transmission system 514 includes axles 540, coupled to the differential gear 538, and the like.

The first power transmission unit 524 is arranged coaxially with an input shaft 542 that is an input rotating member of the first power transmission unit 524, and includes a second differential unit 544, a first differential unit 546 and a clutch CR. The second differential unit 544 includes a second planetary gear mechanism 548 (second differential mechanism) and the first electric rotary machine MG. The first differential unit 546 includes a first planetary gear mechanism 550 (first differential mechanism), a clutch C1 and a brake B1.

The second planetary gear mechanism 548 is a known single-pinion planetary gear mechanism. The second planetary gear mechanism 548 includes a first sun gear S1, first pinion gears P1, a first carrier CA1 and a first ring gear R1. The first carrier CA1 supports the first pinion gears P1 such that each first pinion gear P1 is rotatable and revolvable. The first ring gear R1 is in mesh with the first sun gear S1 via the first pinion gears P1. The second planetary gear mechanism 548 serves as a differential mechanism that provides differential action. The first planetary gear mechanism 550 is a known single-pinion planetary gear mechanism. The first planetary gear mechanism 550 includes a second sun gear S2, second pinion gears P2, a second carrier CA2 and a second ring gear R2. The second carrier CA2 supports the second pinion gears P2 such that each second pinion gear P2 is rotatable and revolvable. The second ring gear R2 is in mesh with the second sun gear S2 via the second pinion gears P2. The first planetary gear mechanism 550 serves as a differential mechanism that provides differential action.

The first ring gear R1 is a fourth rotating element RE4 that is an input element coupled to the output rotating member of the first differential unit 546 (that is, the second ring gear R2 of the first planetary gear mechanism 550), and serves as an input rotating member of the second differential unit 544. The first sun gear S1 is integrally coupled to the rotor shaft 552 of the first electric rotary machine MG1, and is a fifth rotating element RE5 that is a reaction element to which the first electric rotary machine MG1 is coupled such that power is transmittable. The first carrier CA1 is integrally coupled to the drive gear 528, and is a sixth rotating element RE6 that is an output element coupled to the drive wheels 516. The first carrier CA1 serves as an output rotating member of the second differential unit 544.

The second sun gear S2 is a first rotating element RE1 that is integrally coupled to the input shaft 542 and to which the engine 512 is coupled via the input shaft 542 such that power is transmittable. The second sun gear S2 serves as an input rotating member of the first differential unit 546. The second carrier CA2 is a third rotating element RE3 selectively coupled to the case 522 via the brake B1. The second ring gear R2 is a second rotating element RE2 coupled to the input rotating member of the second differential unit 544 (that is, the first ring gear R1 of the second planetary gear mechanism 548). The second ring gear R2 serves as an output rotating member of the first differential unit 546. The second sun gear S2 and the second carrier CA2 are selectively coupled to each other via the clutch C1. The first carrier CA1 and the second carrier CA2 are selectively coupled to each other via the clutch CR. Thus, the clutch C1 is a first engaging device that selectively couples the first rotating element RE1 to the third rotating element RE3. The clutch CR is a second engaging device that selectively couples the sixth rotating element RE6 to the third rotating element RE3. The brake B1 is a third engaging device that selectively couples the third rotating element RE3 to the case 522 that is a non-rotating member.

Each of the clutch C1, the brake B1 and the clutch CR is suitably a wet-type friction engaging device, and is a multi-disc hydraulic friction engaging device of which an operation status is controlled by a hydraulic actuator. The operation statuses (such as an engaged state and a released state) of the clutch C1, brake B1 and clutch CR are controlled in response to hydraulic pressures respectively supplied from a hydraulic control circuit 554 (for example, C1 hydraulic pressure Pc1, B1 hydraulic pressure Pb1 and CR hydraulic pressure Pcr) as a result of control over the hydraulic control circuit 554 by the electronic control unit 580 (described later). The hydraulic control circuit 554 is provided in the vehicle 510. The vehicle 510 includes an electric oil pump 555 (also referred to as EOP 555). In the power transmission system 514, working oil (oil) that is used to change the operation statuses of the clutch C1, brake B1 and clutch CR, lubricate the devices and cool the devices is supplied with the use of the EOP 555. In addition to the EOP 555, a mechanical oil pump may be further provided.

The second planetary gear mechanism 548 is able to serve as a power split mechanism that splits (which is synonymous with distributes) the power of the engine 512, input to the first ring gear R1, between the first electric rotary machine MG1 and the first carrier CA1 in a state where differential motion is permitted. Thus, the vehicle 510 is able to perform engine driving by using a direct torque (also referred to as engine direct torque) and an MG2 torque Tm. The engine direct torque is mechanically transmitted to the first carrier CA1 by causing the first electric rotary machine MG1 to provide a reaction force against the engine torque Te that is input to the first ring gear R1. The MG2 torque Tm is generated by the second electric rotary machine MG2. The second electric rotary machine MG2 is driven by using electric power generated by the first electric rotary machine MG1 owing to a power distributed to the first electric rotary machine MG1. Thus, the second differential unit 544 serves as a known electrical differential unit (electrical continuously variable transmission) that controls the gear ratio (speed ratio) through control over the power control unit 518 by the electronic control unit 580 (described later) to control the operation status of the first electric rotary machine MG1. That is, the second differential unit 544 is an electrical transmission mechanism in which the differential status of the second planetary gear mechanism 548 is controlled as a result of control over the operation status of the first electric rotary machine MG1.

The first differential unit 546 is able to establish four states, that is, a direct-coupling state, a reverse rotation speed change state of the engine 512, a neutral state and an internal lock state, by changing the operation statuses of the clutch C1 and brake B1. Specifically, when the clutch C1 is engaged, the first differential unit 546 is placed in the direct-coupling state where the rotating elements of the first planetary gear mechanism 550 rotate integrally. When the brake B1 is engaged, the first differential unit 546 is placed in the reverse rotation speed change state of the engine 512 where the second ring gear R2 (the output rotating member of the first differential unit 546) rotates in the negative direction in response to positive rotation of the engine rotation speed Ne. When the clutch C1 is released and the brake B1 is released, the first differential unit 546 is placed in the neutral state where the differential motion of the first planetary gear mechanism 550 is permitted. When the clutch C1 is engaged and the brake B1 is engaged, the first differential unit 546 is placed in the internal lock state where the rotation of each of the rotating elements of the first planetary gear mechanism 550 stops.

The first power transmission unit 524 is able to constitute an electrical continuously variable transmission that operates at a power split ratio different from a power split ratio in the second differential unit 544. That is, in the first power transmission unit 524, in addition to the fact that the first ring gear R1 (fourth rotating element RE4) is coupled to the second ring gear R2 (second rotating element RE2), the first carrier CA1 (sixth rotating element RE6) is coupled to the second carrier CA2 (third rotating element RE3) by engaging the clutch CR. As a result, the second differential unit 544 and the first differential unit 546 constitute one differential mechanism, the second differential unit 544 and the first differential unit 546 as a whole are allowed to serve as an electrical continuously variable transmission that operates at a power split ratio different from the power split ratio of the second differential unit 544 alone.

In the first power transmission unit 524, the first differential unit 546 and the second differential unit 544 by which the four states are established are coupled to each other, and the vehicle 510 is able to achieve a plurality of drive modes (described later) in synchronization with a change of the operation status of the clutch CR.

In the thus configured first power transmission unit 524, the power of the engine 512 and the power of the first electric rotary machine MG1 are transmitted from the drive gear 528 to the driven gear 530. Therefore, the engine 512 and the first electric rotary machine MG1 are coupled to the drive wheels 516 via the first power transmission unit 524 such that power is transmittable.

The second power transmission unit 526 includes the second electric rotary machine MG2, a rotor shaft 556 of the second electric rotary machine MG2 and a reduction gear 558 (the reduction gear 558 having a smaller diameter than the driven gear 530). The rotor shaft 556 is arranged parallel to the input shaft 542 and is different from the input shaft 542. Thus, in the second power transmission unit 526, the power of the second electric rotary machine MG2 is transmitted to the driven gear 530 without passing through the first power transmission unit 524. Therefore, the second electric rotary machine MG2 is coupled to the drive wheels 516 such that power is transmittable without passing through the first power transmission unit 524. That is, the second electric rotary machine MG2 is an electric rotary machine coupled to the axles 540 that are the output rotating members of the power transmission system 514 such that power is transmittable without passing through the first power transmission unit 524. As for the output rotating members of the power transmission system 514, other than the axles 540, the final gear 534 or the differential ring gear 536 is also synonymous with the output rotating member of the power transmission system 514.

The thus configured power transmission system 514 is suitably used for a front-engine front-drive (FF) vehicle. In the power transmission system 514, the power of the engine 512, the power of the first electric rotary machine MG1 or the power of the second electric rotary machine MG2 is transmitted to the driven gear 530, and is transmitted from the driven gear 530 to the drive wheels 516 via the final gear 534, the differential gear 538, the axles 540, and the like, sequentially. In the vehicle 510, the engine 512, the first power transmission unit 524 and the first electric rotary machine MG1 are arranged along the axis different from the axis along which the second electric rotary machine MG2 is arranged, so the axial length is reduced. In addition, the reduction ratio of the second electric rotary machine MG2 is allowed to be increased by the use of the gear pair of the driven gear 530 and the reduction gear 558.

The vehicle 510 includes the electronic control unit 580 including a controller that controls the devices regarding traveling. The electronic control unit 580 includes a so-called microcomputer including, for example, a CPU, a RAM, a ROM, input/output interfaces, and the like. The CPU executes signal processing in accordance with programs prestored in the ROM while utilizing a temporary storage function of the RAM, thus executing various controls over the vehicle 510. For example, the electronic control unit 580 is configured to execute output control over the engine 512, the first electric rotary machine MG1 and the second electric rotary machine MG2, control for changing the drive mode (described later), and the like. Where necessary, the electronic control unit 580 is divided into an engine control electronic control unit, an electric rotary machine control electronic control unit, a hydraulic control electronic control unit, and the like.

Various signals based on detected values of various sensors, and the like, provided in the vehicle 510 are supplied to the electronic control unit 580. The various sensors include, for example, an engine rotation speed sensor 560, an output rotation speed sensor 562, an MG1 rotation speed sensor 564, such as a resolver, an MG2 rotation speed sensor 566, such as a resolver, an accelerator operation amount sensor 568, a shift position sensor 570, a battery sensor 572, a CR hydraulic pressure sensor 574, an oil temperature sensor 576, and the like. The various signals include, for example, an engine rotation speed Ne, an output rotation speed No that is the rotation speed of the drive gear 528 corresponding to a vehicle speed V, an MG1 rotation speed Ng, an MG2 rotation speed Nm, an accelerator operation amount θacc, a shift lever operating position POSsh, a battery temperature THbat, battery charge/discharge current Ibat and battery voltage Vbat of the battery unit 520, a CR hydraulic pressure Per, a working oil temperature THoil that is the temperature of working oil, and the like. Various command signals are supplied from the electronic control unit 580 to devices provided in the vehicle 510. The devices include, for example, the engine 512, the power control unit 518, the hydraulic control circuit 554, the EOP 555, and the like. The various command signals include, for example, an engine control command signal Se, an electric rotary machine control command signal Sm, a hydraulic control command signal Sp, a pump drive control command signal Sop, and the like. The electronic control unit 580 calculates a state of charge (charged capacity) SOC (hereinafter, referred to as battery capacity SOC) of the battery unit 520 on the basis of, for example, the battery charge/discharge current Ibat, the battery voltage Vbat, and the like.

The electronic control unit 580 includes hybrid control means, that is, a hybrid control unit 582, and power transmission changing means, that is, a power transmission changing unit 584, in order to implement control functions for various controls in the vehicle 510.

The hybrid control unit 582 executes output control over the engine 512 such that a target engine torque Te is obtained by outputting the engine control command signal Se for controlling the open/closed state of an electronic throttle valve, controlling a fuel injection amount and injection timing, and controlling ignition timing. The hybrid control unit 582 executes output control over the first electric rotary machine MG1 or the second electric rotary machine MG2 such that a target MG1 torque Tg or a target MG2 torque Tm is obtained by outputting the electric rotary machine control command signal Sm for controlling the operation of the first electric rotary machine MG1 or the second electric rotary machine MG2 to the power control unit 518.

The hybrid control unit 582 calculates a driving torque (required driving torque), which is required at the vehicle speed V at that time, from the accelerator operation amount θacc, and causes at least one of the engine 512, the first electric rotary machine MG1 and the second electric rotary machine MG2 to generate the required driving torque such that an operation at a low fuel consumption with less exhaust emissions is achieved in consideration of a required charging value (required charging power), and the like.

The hybrid control unit 582 selectively establishes a motor drive mode (EV drive mode) or a hybrid drive mode (HV drive mode) (also referred to as engine drive mode (ENG drive mode)) as the drive mode in response to a traveling status. The EV drive mode is a control mode in which EV driving that uses at least one of the first electric rotary machine MG1 and the second electric rotary machine MG2 as a driving force source for propelling the vehicle 510 in a state where the operation of the engine 512 is stopped is enabled. The HV drive mode is a control mode in which HV driving (engine driving) that uses at least the engine 512 as a driving force source for propelling the vehicle 510 (that is, the vehicle 510 travels by transmitting the power of the engine 512 to the drive wheels 516) is enabled. Like the mode in which the power of the engine 512 is converted to electric power through power generation of the first electric rotary machine MG1 and the generated electric power is exclusively changed into the battery unit 520, even a mode that is not premised on traveling of the vehicle 510 sets the engine 512 in an operating state, so such a mode is included in the HV drive mode.

The power transmission changing unit 584 controls engaging operations (operation statuses) of the clutch C1, brake B1 and clutch CR on the basis of the drive mode established by the hybrid control unit 582. The power transmission changing unit 584 outputs the hydraulic control command signal Sp for engaging and/or releasing each of the clutch C1, the brake B1 and the clutch CR to the hydraulic control circuit 554 in order to allow transmission of power for traveling in the drive mode established by the hybrid control unit 582.

The drive modes that are allowed to be performed by the vehicle 510 will be described with reference to FIG. 19, and FIG. 20 to FIG. 27. FIG. 19 is an operation engagement chart that shows the operation status of each of the clutch C1, the brake B1 and the clutch CR in each drive mode. In the operation engagement chart of FIG. 19, a circle mark indicates an engaged state of the corresponding engaging device (C1, B1, CR), a blank indicates a released state, and a triangle mark indicates that any one or both are engaged at the time when engine brake that places the engine 512 not in operation in a co-rotation state is also used. In addition, "G" indicates that the electric rotary machine (MG1, MG2) is mainly caused to serve as a generator, and "M" indicates that the electric rotary machine (MG1, MG2) is caused to mainly serve as a motor when the electric rotary machine (MG1, MG2) is driven and is mainly caused to serve as a generator when the electric rotary machine (MG1, MG2) performs regeneration. As shown in FIG. 19, the vehicle 510 is able to selectively execute an EV drive mode and an HV drive mode as a drive mode. The EV drive mode includes two modes, that is, a one-motor EV mode and a two-motor EV mode. The one-motor EV mode is a control mode in which EV driving that uses the second electric rotary machine MG2 as a single driving force source is enabled. The two-motor EV mode is a control mode in which EV driving that uses the first electric rotary machine MG1 and the second electric rotary machine MG2 as driving force sources is enabled. The HV drive mode includes three modes, that is, an overdrive (O/D) input split mode (hereinafter, referred to as O/D HV mode), an underdrive (U/D) input split mode (hereinafter, referred to as U/D HV mode), and a fixed gear mode.

FIG. 20 to FIG. 27 are nomographs that relatively show the rotation speeds of rotating elements RE1 to RE6 in the second planetary gear mechanism 548 and the first planetary gear mechanism 550. In these nomographs, vertical lines Y1 to Y4 represent the rotation speeds of the rotating elements. In order from the left side when facing toward the sheet, the vertical line Y1 represents the rotation speed of the first sun gear S1 that is the fifth rotating element RE5 coupled to the first electric rotary machine MG1, the vertical line Y2 represents the rotation speed of the second sun gear S2 that is the first rotating element RE1 coupled to the engine 512, the vertical line Y3 represents the rotation speed of the first carrier CA1 that is the sixth rotating element RE6 coupled to the drive gear 528 and the rotation speed of the second carrier CA2 that is the third rotating element RE3 that is selectively coupled to the case 522 via the brake B1, and the vertical line Y4 represents the rotation speed of the first ring gear R1 that is the fourth rotating element RE4 and the rotation speed of the second ring gear R2 that is the second rotating element RE2, the first ring gear R1 and the second ring gear R2 being coupled to each other. An arrow connected to an open square mark indicates an MG1 torque Tg, an arrow connected to an open circle mark indicates an engine torque Te, and an arrow connected to a solid circle mark indicates an MG2 torque Tm. The outlined clutch C1 that selectively couples the second sun gear S2 to the second carrier CA2 indicates a released state of the clutch C1, and the hatched (shaded) clutch C1 indicates an engaged state of the clutch C1. An open rhombus mark on the brake B1 that selectively couples the second carrier CA2 to the case 522 indicates a released state of the brake B1, and a solid rhombus mark indicates an engaged state of the brake B1. An open rhombus mark on the clutch CR that selectively couples the first carrier CA1 to the second carrier CA2 indicates a released state of the clutch CR, and a solid rhombus mark indicates an engaged state of the clutch CR. A straight line that relatively expresses the rotation speeds regarding the second planetary gear mechanism 548 is indicated by continuous line, and a straight line that relatively expresses the rotation speeds regarding the first planetary gear mechanism 550 is indicated by dashed line. An arrow connected to a solid circle mark indicates an MG2 torque Tm generated by the second electric rotary machine MG2 that is driven by using electric power generated by the first electric rotary machine MG1 with the use of the power of the engine 512, distributed to the first electric rotary machine MG1, and does not include an engine direct torque.

A solid rhombus mark on the clutch CR overlaps with a solid circle mark, so the solid rhombus mark on the clutch CR is not shown in the drawings.

Figure 20:
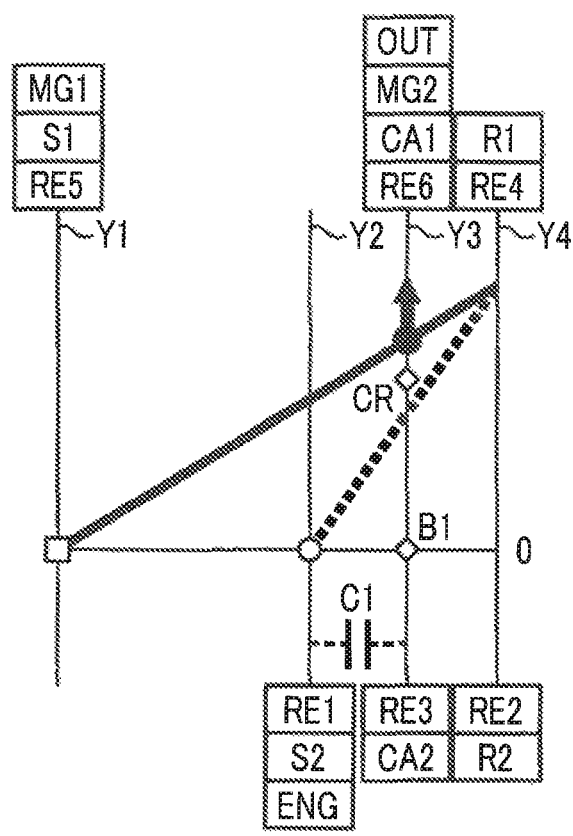
FIG. 20 is a nomograph in one-motor EV mode.

FIG. 20 is a nomograph in one-motor EV mode. As shown in FIG. 19, the one-motor EV mode is achieved in a state where all the clutch C1, the brake B1 and the clutch CR are released. In the one-motor EV mode, the clutch C1 and the brake B1 are released, the differential motion of the first planetary gear mechanism 550 is permitted, and the first differential unit 546 is placed in the neutral state. The hybrid control unit 582 stops the operation of the engine 512, and outputs the MG2 torque Tm for propelling the vehicle 510 from the second electric rotary machine MG2. FIG. 20 shows a case at the time when the vehicle 510 travels forward in a state where the second electric rotary machine MG2 rotates in the positive direction (that is, the rotation direction of the first carrier CA1 at the time when the vehicle 510 travels forward) to output a positive torque. At the time when the vehicle 510 travels backward, the second electric rotary machine MG2 is rotated in the reverse direction in contrast to the operation at the time when the vehicle 510 travels forward. While the vehicle 510 is traveling, the first carrier CA1 coupled to the drive gear 528 is rotated in synchronization with the rotation of the second electric rotary machine MG2 (which is synonymous with the rotation of the drive wheels 516). In the one-motor EV mode, the clutch CR is further released, so the engine 512 and the first electric rotary machine MG1 are not co-rotated, so the engine rotation speed Ne and the MG1 rotation speed Ng are allowed to be set to zero. With this configuration, it is possible to improve electric power efficiency (that is, reduce electric power consumption) by reducing a drag loss of each of the engine 512 and the first electric rotary machine MG1. The hybrid control unit 582 keeps the MG1 rotation speed Ng at zero under feedback control. Alternatively, the hybrid control unit 582 keeps the MG1 rotation speed Ng at zero by executing control (d-axis control) for passing current to the first electric rotary machine MG1 such that the rotation of the first electric rotary machine MG1 is fixed. Alternatively, when the MG1 rotation speed Ng is kept at zero by the cogging torque of the first electric rotary machine MG1 even when the MG1 torque Tg is set to zero, it is not required to add the MG1 torque Tg. Even when control for keeping the MG1 rotation speed Ng at zero has been executed, since the first power transmission unit 524 is in the neutral state where a reaction force against the MG1 torque Tg cannot be provided, a driving torque is not influenced. In the one-motor EV mode, the first electric rotary machine MG1 may be placed in a no-load state to idle.

In the one-motor EV mode, the engine 512 not in operation is not co-rotated and is placed in a stopped state at zero rotation, so, when regenerative control is executed over the second electric rotary machine MG2 while the vehicle 510 is traveling in the one-motor EV mode, a large amount of regenerative electric power is allowed to be acquired. When the battery unit 520 becomes a full charge state and cannot store regenerative energy while the vehicle 510 is traveling in the one-motor EV mode, it is conceivable to additionally use engine brake. When engine brake is additionally used, the clutch C1 or the clutch CR is engaged (see engine brake is additionally used in the one-motor EV mode) as shown in FIG. 19. As the clutch C1 or the clutch CR is engaged, the engine 512 is placed in a co-rotation state. When the engine rotation speed Ne is increased by the first electric rotary machine MG1 in this state, it is possible to cause engine brake to function. The engine rotation speed Ne is allowed to be set to zero even in the co-rotation state of the engine 512. In this case, EV driving is performed without causing engine brake to function. Engine brake is allowed to function by engaging the brake B1.

Figure 21:
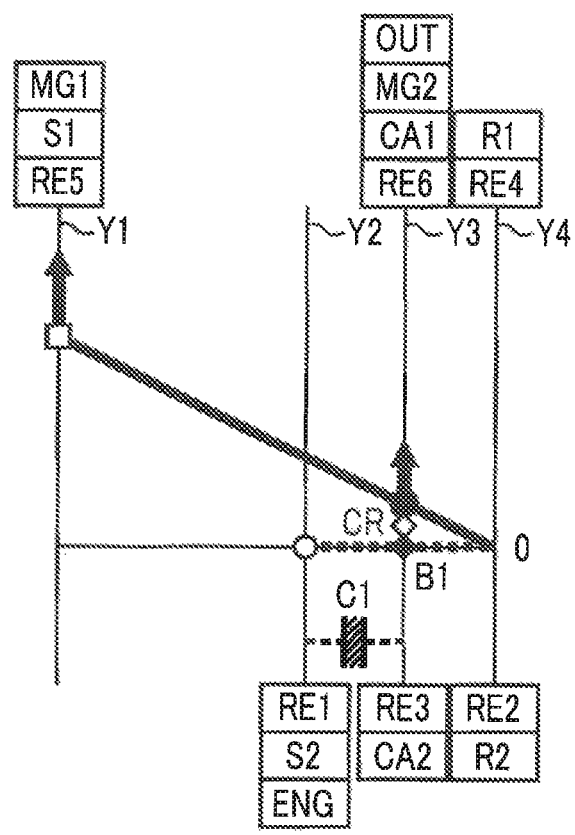
FIG. 21 is a nomograph in two-motor EV mode.

FIG. 21 is a nomograph in two-motor EV mode. As shown in FIG. 19, the two-motor EV mode is achieved in a state where the clutch C1 and the brake B1 are engaged and the clutch CR is released. In the two-motor EV mode, the clutch C1 and the brake B1 are engaged, and the differential motion of the first planetary gear mechanism 550 is restricted, so the rotation of the second carrier CA2 is stopped. For this reason, the rotation of all the rotating elements of the first planetary gear mechanism 550 is stopped, so the first differential unit 546 is set to an internal lock state. Thus, the engine 512 is placed in a stopped state at zero rotation, and the first ring gear R1 coupled to the second ring gear R2 is also fixed at zero rotation. When the first ring gear R1 is fixed so as to be non-rotatable, a reaction torque against the MG1 torque Tg is provided by the first ring gear R1, so it is possible to cause a torque based on the MG1 torque Tg to be mechanically output from the first carrier CA1 and transmitted to the drive wheels 516. The hybrid control unit 582 stops the operation of the engine 512, and causes the first electric rotary machine MG1 and the second electric rotary machine MG2 to output the MG1 torque Tg and the MG2 torque Tm for propelling the vehicle 510. FIG. 21 shows a case at the time when the vehicle 510 travels forward in a state where both the first electric rotary machine MG1 and the second electric rotary machine MG2 rotate in the positive direction to output a positive torque. At the time when the vehicle 510 travels backward, the first electric rotary machine MG1 and the second electric rotary machine MG2 are rotated in the reverse direction in contrast to the operation at the time when the vehicle 510 travels forward.

As described with reference to FIG. 20 and FIG. 21, it is possible to drive the vehicle 510 with the use of only the second electric rotary machine MG2 in the one-motor EV mode, and it is possible to drive the vehicle 510 with the use of the first electric rotary machine MG1 and the second electric rotary machine MG2 in the two-motor EV mode. Therefore, when the vehicle 510 performs EV driving, the one-motor EV mode is established and the vehicle 510 is driven by only the second electric rotary machine MG2 at a low load, and the two-motor EV mode is established and the vehicle 510 is driven by both the first electric rotary machine MG1 and the second electric rotary machine MG2 at a high load. Including HV driving, regeneration during deceleration of the vehicle 510 is mainly performed by the second electric rotary machine MG2.

Figure 22:
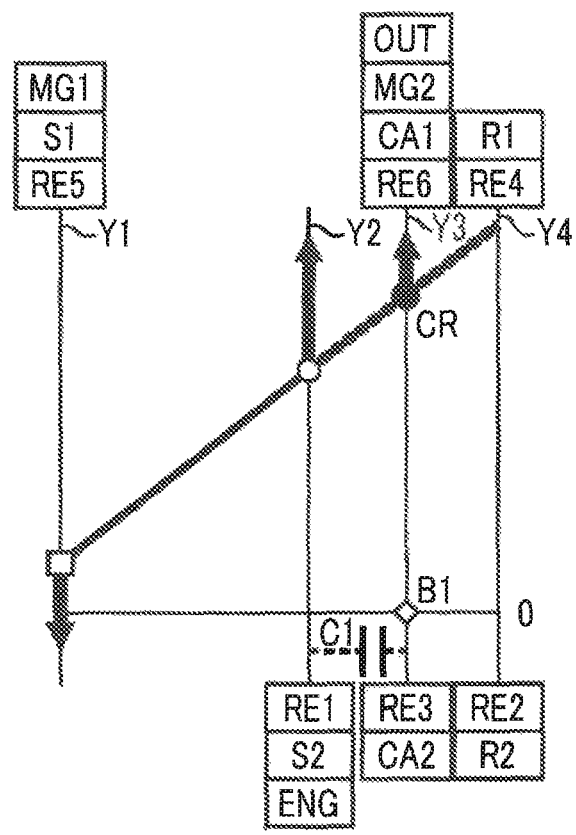
FIG. 22 is a nomograph in O/D HV mode in HV drive mode.

FIG. 22 is a nomograph in O/D HV mode in the HV drive mode. As shown in FIG. 19, the O/D HV mode is achieved in a state where the clutch C1 and the brake B1 are released and the clutch CR is engaged. In the O/D HV mode, the clutch CR is engaged, so the second differential unit 544 and the first differential unit 546 constitute a single differential mechanism. In addition, in the O/D HV mode, the clutch C1 and the brake B1 are released, so the second differential unit 544 and the first differential unit 546 as a whole constitute an electrical continuously variable transmission that operates at a power split ratio different from the power split ratio of the second differential unit 544 alone. Thus, in the first power transmission unit 524, the power of the engine 512, input to the second sun gear S2, is allowed to be distributed between the first sun gear S and the first carrier CA1. That is, in the first power transmission unit 524, the engine direct torque is mechanically transmitted to the first carrier CA1 by causing the first electric rotary machine MG1 to provide a reaction force against the engine torque Te that is input to the second sun gear S2, and electric power generated by the first electric rotary machine MG1 by using the power of the engine 512, distributed to the first electric rotary machine MG1, is transmitted to the second electric rotary machine MG2 via a predetermined electrical path. The hybrid control unit 582 causes the engine 512 to operate, causes the MG1 torque Tg that is a reaction torque against the engine torque Te to be output through power generation of the first electric rotary machine MG1, and causes the MG2 torque Tm to be output from the second electric rotary machine MG2 by using electric power generated by the first electric rotary machine MG1. FIG. 22 shows a case at the time when the vehicle 510 travels forward in a state where the second electric rotary machine MG2 rotates in the positive direction to output a positive torque. At the time when the vehicle 510 travels backward, the second electric rotary machine MG2 is rotated in the reverse direction in contrast to the operation at the time when the vehicle 510 travels forward. When the vehicle 510 travels backward, the positive rotation and torque of the engine 512 are directly input to the components that constitute the function of the electrical continuously variable transmission, that is, engine forward rotation input is achieved.

Figure 23:
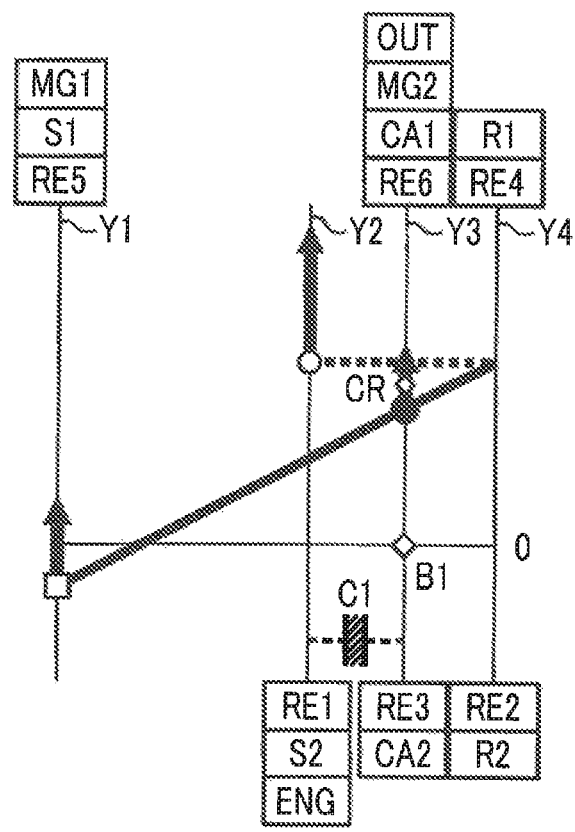
FIG. 23 is a nomograph at the time when the vehicle travels forward in U/D HV mode in the HV drive mode.

FIG. 23 is a nomograph at the time when the vehicle 510 travels forward in U/D HV mode in the HV drive mode. As shown in FIG. 19, forward traveling in the U/D HV mode (hereinafter, referred to as U/D HV mode (forward traveling)) is achieved in a state where the clutch C1 is engaged and the brake B1 and the clutch CR are released. In the U/D HV mode (forward traveling), the clutch C1 is engaged, the brake B1 is released, and the first differential unit 546 is placed in the direct-coupling state, so the power of the engine 512 is directly transmitted to the first ring gear R1 coupled to the second ring gear R2. In addition, in the U/D HV mode (forward traveling), the clutch CR is released, and the second differential unit 544 alone constitutes an electrical continuously variable transmission. Thus, the first power transmission unit 524 is able to distribute the power of the engine 512, input to the first ring gear R1, between the first sun gear S1 and the first carrier CA1. That is, in the first power transmission unit 524, the engine direct torque is mechanically transmitted to the first carrier CA1 by providing a reaction force against the engine torque Te, which is input to the first ring gear R1, with the use of the first electric rotary machine MG1, and electric power generated by the first electric rotary machine MG1 by using the power of the engine 512, distributed to the first electric rotary machine MG1, is transmitted to the second electric rotary machine MG2 via a predetermined electrical path. The hybrid control unit 582 causes the engine 512 to operate, causes the MG1 torque Tg against the engine torque Te to be output through power generation of the first electric rotary machine MG1, and causes the MG2 torque Tm to be output from the second electric rotary machine MG2 by using electric power generated by the first electric rotary machine MG1. FIG. 23 shows a case at the time when the vehicle 510 travels forward in a state where the second electric rotary machine MG2 rotates in the positive direction to output a positive torque.

Figure 24:
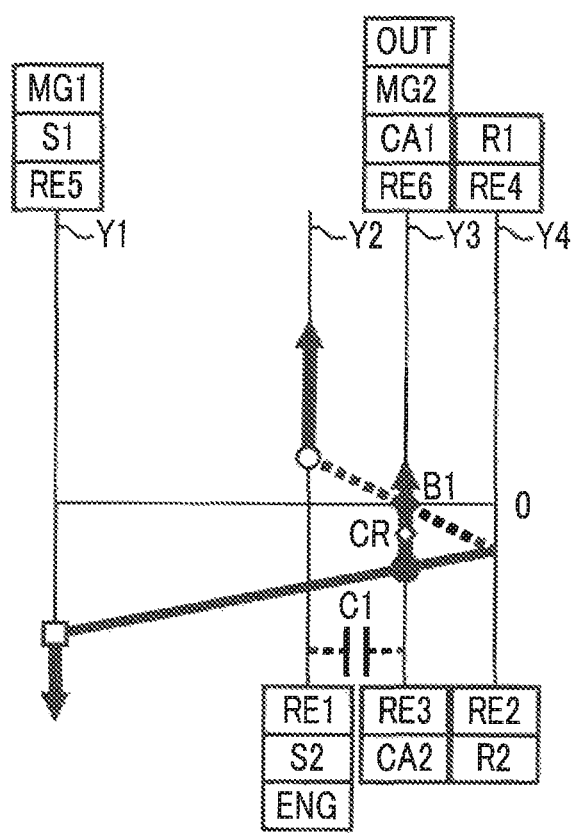
FIG. 24 is a nomograph at the time when the vehicle travels backward in the U/D HV mode in the HV drive mode in the case of engine reverse input.

FIG. 24 is a nomograph at the time when the vehicle 510 travels backward in U/D HV mode in the HV drive mode, and shows a case of engine reverse rotation input where the rotation and torque of the engine 512 are inverted to negative values and are then input to the components that achieve the function of the electrical continuously variable transmission. As shown in FIG. 19, backward traveling in engine reverse rotation input in the U/D HV mode (hereinafter, referred to as U/D HV mode reverse rotation input (backward traveling)) is achieved in a state where the brake B1 is engaged and the clutch C1 and the clutch CR are released. In the U/D HV mode reverse rotation input (backward traveling), the clutch C1 is released and the brake B1 is engaged, and the first differential unit 546 is placed in the reverse rotation speed change state of the engine 512, so the power of the engine 512 is transmitted in negative rotation and negative torque to the first ring gear R1 coupled to the second ring gear R2. In addition, in the U/D HV mode reverse rotation input (backward traveling), the clutch CR is released, so the second differential unit 544 alone constitutes an electrical continuously variable transmission. With this configuration, in the first power transmission unit 524, it is possible to distribute the power of the engine 512, which is input to the first ring gear R1 in reverse rotation, between the first sun gear S1 and the first carrier CA1. The hybrid control unit 582 operates the engine 512 and causes the MG1 torque Tg, which is a reaction torque against the engine torque Te, to be output through power generation of the first electric rotary machine MG1, and the MG2 torque Tm is output from the second electric rotary machine MG2 with the use of electric power generated by the first electric rotary machine MG1. In the example shown in FIG. 24, since the first electric rotary machine MG1 that outputs a negative torque is placed in a negative rotation region, the second electric rotary machine MG2 outputs a positive torque in negative rotation in order to generate electric power that is used for motoring of the first electric rotary machine MG1. However, backward traveling is possible because the engine direct torque (not shown) that is a negative torque is larger in absolute value than the MG2 torque Tm.

Figure 25:
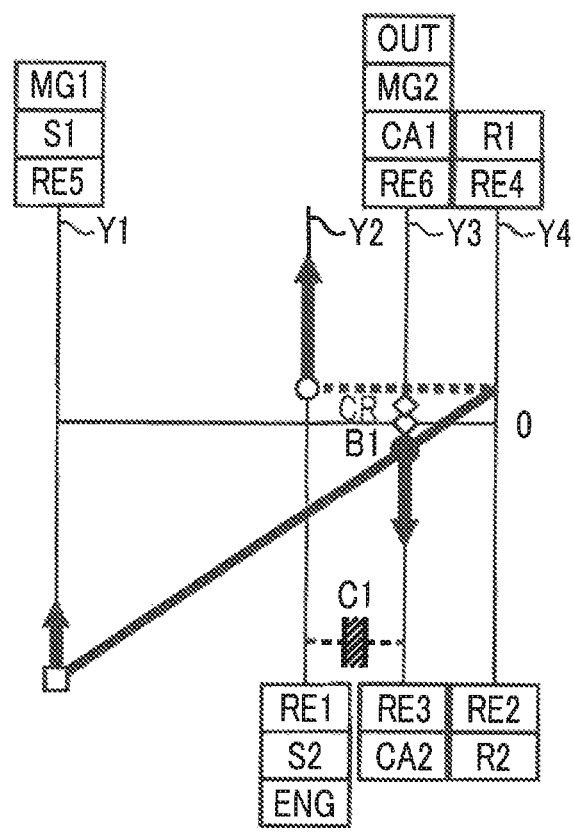
FIG. 25 is a nomograph at the time when the vehicle travels backward in the U/D HV mode in the HV drive mode in the case of engine forward input.

FIG. 25 is a nomograph at the time when the vehicle 510 travels backward in the U/D HV mode in the HV drive mode, and shows a case of engine forward rotation input. As shown in FIG. 19, backward traveling with engine forward rotation input in the U/D HV mode (hereinafter, referred to as U/D HV mode forward rotation input (backward traveling)) is achieved in a state where the clutch C1 is engaged and the brake B1 and the clutch CR are released. In the U/D HV mode forward rotation input (backward traveling), the clutch C1 is engaged and the brake B1 is released, so the first differential unit 546 is placed in the direct-coupling state, with the result that the power of the engine 512 is directly transmitted to the first ring gear R1 coupled to the second ring gear R2. In addition, in the U/D HV mode forward rotation input (backward traveling), the clutch CR is released, so the second differential unit 544 alone constitutes an electrical continuously variable transmission. Thus, the first power transmission unit 524 is able to distribute the power of the engine 512, which is input to the first ring gear R1, between the first sun gear S1 and the first carrier CA1. The hybrid control unit 582 operates the engine 512 and causes the MG1 torque Tg, which is a reaction torque against the engine torque Te, to be output through power generation of the first electric rotary machine MG1, and the MG2 torque Tm is output from the second electric rotary machine MG2 with the use of electric power generated by the first electric rotary machine MG1. FIG. 25 shows a case at the time when the vehicle 510 travels backward in a state where the second electric rotary machine MG2 rotates in the negative direction to output a negative torque.

As described with reference to FIG. 22 to FIG. 25, the O/D HV mode and the U/D HV mode differ from each other in the rotating element, to which the power of the engine 512 is input, in the components that achieve the function of the electrical continuously variable transmission, so the O/D HV mode and the U/D HV mode differ from each other in the power split ratio at the time when the first power transmission unit 524 is caused to serve as the electrical continuously variable transmission. That is, the ratio between the output torques of the electric rotary machines MG1, MG2 and the ratio between the rotation speeds of the electric rotary machines MG1, MG2 with respect to the engine 512 are allowed to be changed between the O/D HV mode and the U/D HV mode. The operation status of the clutch CR is changed in order to change the ratio of the output torque or rotation speed of each of the electric rotary machines MG1, MG2 with respect to the output torque or rotation speed of the engine 512 during engine driving.

The engine direct torque in the O/D HV mode is reduced from the engine torque Te. On the other hand, the engine direct torque in the U/D HV mode (forward traveling) is increased from the engine torque Te. In the present embodiment, the second differential unit 544 alone constitutes the electrical continuously variable transmission in the U/D HV mode (see FIG. 23). Thus, when the differential status of the second differential unit 544 is controlled as a result of control over the operation status of the first electric rotary machine MG1 in a state where the clutch C1 is engaged and the clutch CR is released, a torque increased from the engine torque Te is mechanically transmitted to the first carrier CA1.

In a state of a so-called mechanical point at which the MG1 rotation speed Ng is set to zero and the power of the engine 512 is entirely mechanically transmitted to the first carrier CA1 without passing through an electrical path (an electrical power transmission path that is an electrical path related to an exchange of electric power to or from the first electric rotary machine MG1 or the second electric rotary machine MG2), the case of an overdrive state where the rotation of the engine 512 is increased and is output from the first carrier CA1 is the O/D HV mode, and the case of an underdrive state where the rotation of the engine 512 is reduced and is output from the first carrier CA1 is the U/D HV mode.

Figure 26:
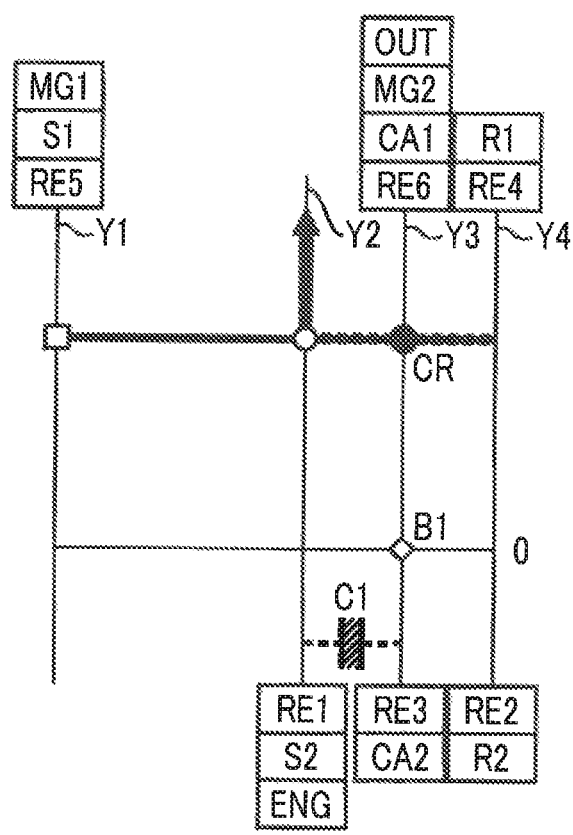
FIG. 26 is a nomograph in fixed gear mode in the HV drive mode in the case of direct coupling.

FIG. 26 is a nomograph in fixed gear mode in the HV drive mode, and shows a case of direct coupling where the rotating elements of the second differential unit 544 and first differential unit 546 are integrally rotated. As shown in FIG. 19, direct coupling in the fixed gear mode (hereinafter, referred to as direct-coupling fixed gear mode) is achieved in a state where the clutch C1 and the clutch CR are engaged and the brake B1 is released. In the direct-coupling fixed gear mode, the clutch C1 is engaged and the brake B1 is released, so the first differential unit 546 is placed in the direct-coupling state. In addition, in the direct-coupling fixed gear mode, the clutch CR is engaged, so the rotating elements of the second differential unit 544 and first differential unit 546 are integrally rotated. Thus, the first power transmission unit 524 is able to directly output the power of the engine 512 from the first carrier CA1. The hybrid control unit 582 causes the engine 512 to output the engine torque Te for propelling the vehicle 510. In the direct-coupling fixed gear mode, it is also possible to directly output the power of the first electric rotary machine MG1 from the first carrier CA1 by driving the first electric rotary machine MG1 with the use of electric power from the battery unit 520. In the direct-coupling fixed gear mode, it is also possible to transmit the power of the second electric rotary machine MG2 to the drive wheels 516 by driving the second electric rotary machine MG2 with the use of electric power from the battery unit 520. Thus, the hybrid control unit 582 is allowed to not only cause the engine torque Te to be output but also cause at least one of the first electric rotary machine MG1 and the second electric rotary machine MG2 to output a torque for propelling the vehicle 510. That is, in the direct-coupling fixed gear mode, the vehicle 510 may be driven by only the engine 512 or may be assisted with a torque that is generated by the first electric rotary machine MG1 and/or the second electric rotary machine MG2.

Figure 27:
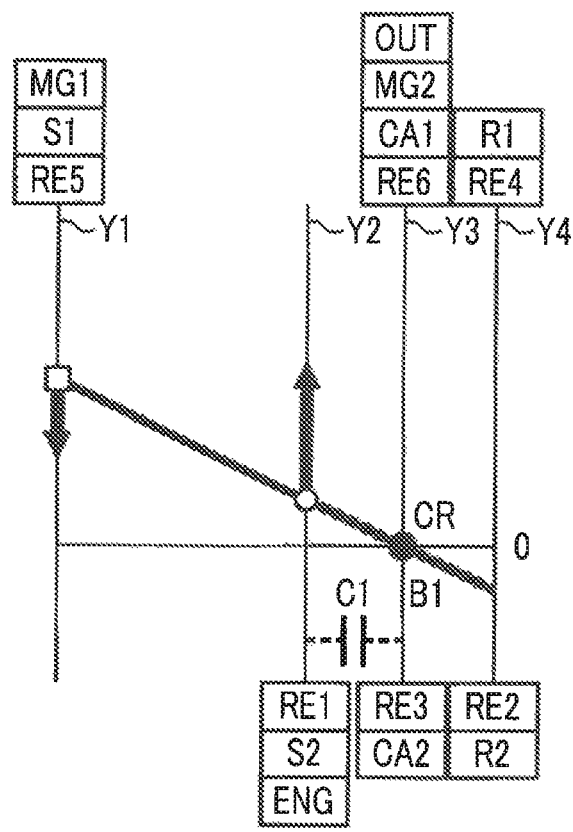
FIG. 27 is a nomograph in the fixed gear mode in the HV drive mode in the case of output shaft fixing.

FIG. 27 is a nomograph in the fixed gear mode in the HV drive mode, and shows a case of output shaft fixing where the first carrier CA1 is fixed so as to be non-rotatable. As shown in FIG. 19, the output shaft fixing in the fixed gear mode (hereinafter, referred to as output shaft fixed gear mode) is achieved in a state where the brake B1 and the clutch CR are engaged and the clutch C1 is released. In the output shaft fixed gear mode, the clutch CR is engaged, so the second differential unit 544 and the first differential unit 546 constitute one differential mechanism. In addition, in the output shaft fixed gear mode, the brake B1 is engaged and the clutch C1 is released, so the first carrier CA1 is fixed so as to be non-rotatable. Thus, the first power transmission unit 524 is able to provide a reaction force against the power of the engine 512, which is input to the second sun gear S2, with the use of the first electric rotary machine MG1. Therefore, in the output shaft fixed gear mode, it is possible to charge the battery unit 520 with electric power generated by the first electric rotary machine MG1 with the use of the power of the engine 512. The hybrid control unit 582 operates the engine 512, provides a reaction force against the power of the engine 512 through power generation of the first electric rotary machine MG1, and charges the battery unit 520 with electric power generated by the first electric rotary machine MG1 via the power control unit 518. Since the first carrier CA1 is fixed so as to be non-rotatable in the output shaft fixed gear mode, the output shaft fixed gear mode is a mode in which the battery unit 520 is exclusively charged during a stop of the vehicle 510. As described with reference to FIG. 26 and FIG. 27, in the direct-coupling fixed gear mode or output shaft fixed gear mode in the HV drive mode, the clutch CR is engaged.

FIG. 5 is a graph that shows an example of the torque ratio (Tg/Te) of an MG1 torque Tg to an engine torque Te and the torque ratio (Tm/Te) of an MG2 torque Tm to an engine torque Te during engine driving in forward traveling. The MG2 torque Tm is generated by the second electric rotary machine MG2 that is driven with electric power generated by the first electric rotary machine MG1 with the use of the power of the engine 512. In FIG. 5, in a region in which the reduction ratio I (=Ne/No) of the first power transmission unit 524 is relatively large, the torque ratio (Tm/Te) in the U/D HV mode is smaller than the torque ratio (Tm/Te) in the O/D HV mode. Therefore, in the region in which the reduction ratio I is relatively large, when the U/D HV mode is established, it is possible to reduce a load on the second electric rotary machine MG2 with respect to the engine torque Te. For example, when the U/D HV mode is established at a high load of the engine 512 where the relatively large reduction ratio I is used, the MG2 torque Tm is reduced. This means that the U/D HV mode is suitable up to a large reduction ratio I at the maximum value of the MG2 torque Tm than the O/D HV mode, and means that the region of the HV drive mode is allowed to be expanded. On the other hand, in a region in which the reduction ratio I is relatively small and is smaller than "1", the absolute value of the torque ratio (Tm/Te) in the U/D HV mode is larger than the absolute value of the torque ratio (Tm/Te) in the O/D HV mode. A state where the torque ratio (Tm/Te) is a negative value is a power circulating state where the second electric rotary machine MG2 generates electric power and the generated electric power is supplied to the first electric rotary machine MG1. It is desirable to avoid or reduce the power circulating state as much as possible. For this reason, in the region in which the reduction ratio I is relatively small, it is possible to reduce a circulating power by establishing the O/D HV mode. By changing the control mode between the U/D HV mode and the O/D HV mode in response to the reduction ratio I, it is possible to transmit engine power with the use of the second electric rotary machine MG2 having a lower torque.

Figure 28:
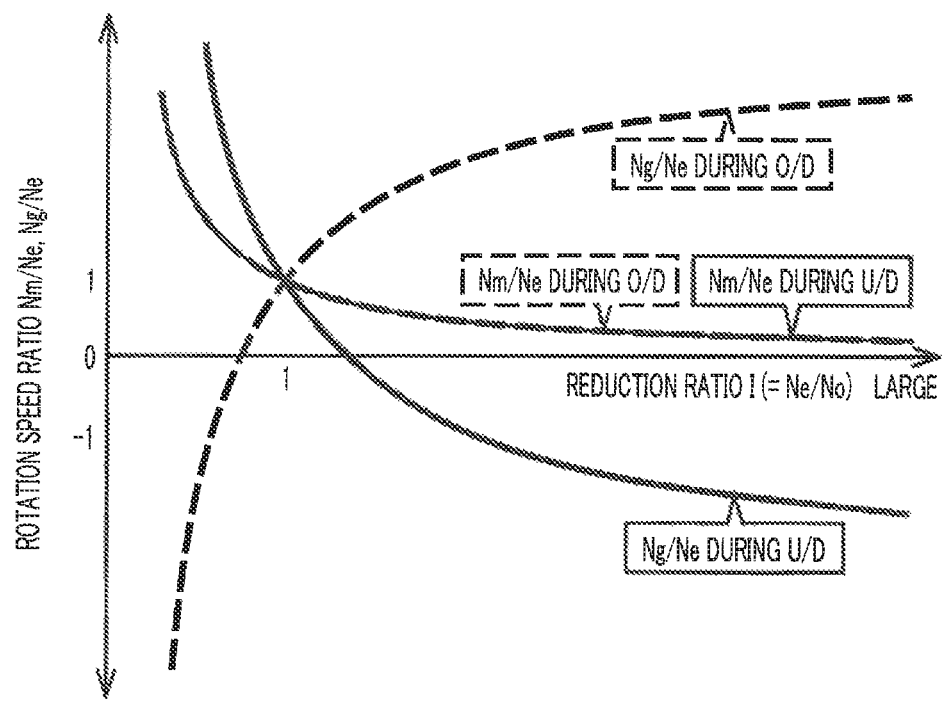
FIG. 28 is a graph that shows an example of a rotation speed ratio of an MG1 rotation speed to an engine rotation speed and an example of a rotation speed ratio of an MG2 rotation speed to an engine rotation speed.

FIG. 28 is a graph that shows an example of the rotation speed ratio (Ng/Ne) of an MG1 rotation speed Ng to an engine rotation speed Ne and the rotation speed ratio (Nm/Ne) of an MG2 rotation speed Nm to an engine rotation speed Ne during engine driving in forward traveling. In FIG. 28, in a region in which the reduction ratio I of the first power transmission unit 524 is relatively large and larger than "1", the absolute value of the rotation speed ratio (Ng/Ne) in the U/D HV mode is smaller than the absolute value of the rotation speed ratio (Ng/Ne) in the O/D HV mode. Therefore, in the region in which the reduction ratio I is relatively large, it is possible to reduce an increase in the MG1 rotation speed Ng by establishing the U/D HV mode. For example, when the U/D HV mode is established at the time when the vehicle 510 starts moving, that is, when the relatively large reduction ratio I is used, the MG1 rotation speed Ng is reduced. On the other hand, in a region in which the reduction ratio I is relatively small and is smaller than "1", the absolute value of the rotation speed ratio (Ng/Ne) in the U/D HV mode is larger than the absolute value of the rotation speed ratio (Ng/Ne) in the O/D HV mode. For this reason, in the region in which the reduction ratio I is relatively small, it is possible to reduce an increase in the MG1 rotation speed Ng by establishing the O/D HV mode. By changing the control mode between the U/D HV mode and the O/D HV mode in response to the reduction ratio I, it is possible to transmit engine power with the use of the first electric rotary machine MG1 having a lower rotation speed.

Figure 29:
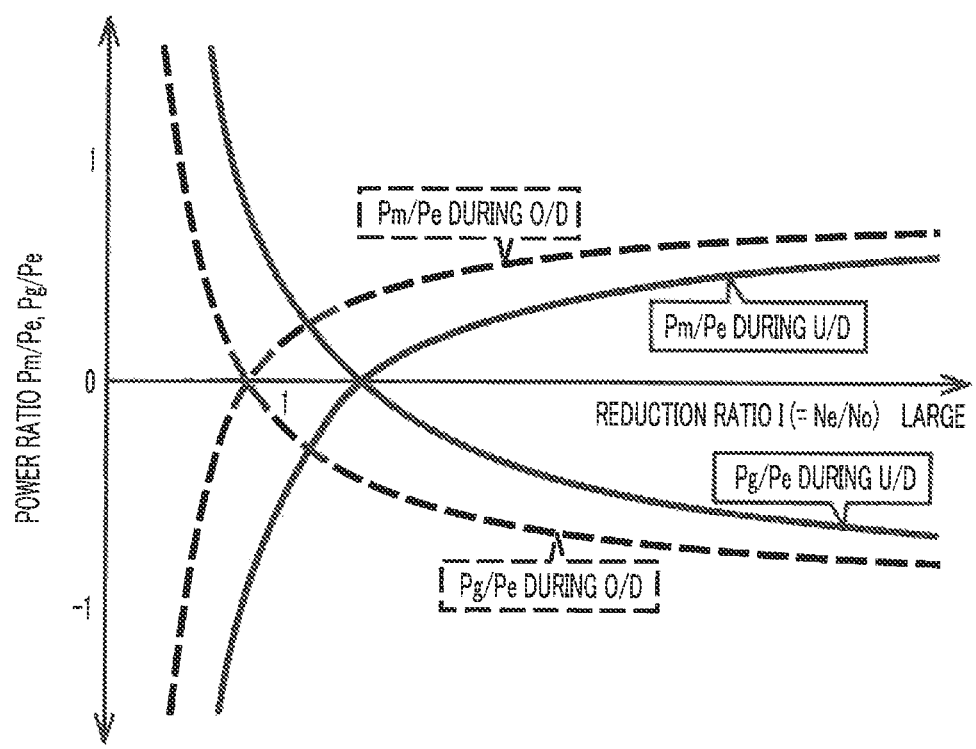
FIG. 29 is a graph that shows an example of a power ratio of an MG1 power to an engine power and an example of a power ratio of an MG2 power to an engine power.

FIG. 29 is a graph that shows an example of the power ratio (Pg/Pe) of an MG1 power Pg to an engine power Pe and the power ratio (Pm/Pe) of an MG2 power Pm to an engine power Pe during engine driving in forward traveling. In FIG. 29, in a region in which the reduction ratio I of the first power transmission unit 524 is relatively large, the absolute value of each of the power ratio (Pg/Pe) and the power ratio (Pm/Pe) in the U/D HV mode is smaller than the absolute value of each of the power ratio (Pg/Pe) and the power ratio (Pm/Pe) in the O/D HV mode. Therefore, in the region in which the reduction ratio I is relatively large, it is possible to reduce an increase in the MG1 power Pg and an increase in the MG2 power Pm by establishing the U/D HV mode. On the other hand, in a region in which the reduction ratio I is relatively small and is smaller than "1", the absolute value of each of the power ratio (Pg/Pe) and the power ratio (Pm/Pe) in the U/D HV mode is larger than the absolute value of each of the power ratio (Pg/Pe) and the power ratio (Pm/Pe) in the O/D HV mode. A state where the power ratio (Pm/Pe) is a negative value (that is, a state where the power ratio (Pg/Pe) is a positive value) is a power circulating state. For this reason, in the region in which the reduction ratio I is relatively small, it is possible to reduce a circulating power by establishing the O/D HV mode. By changing the control mode between the U/D HV mode and the O/D HV mode in response to the reduction ratio I, it is possible to transmit engine power with the use of the electric rotary machines MG1, MG2 having a lower output (lower power).

As described with reference to FIG. 5, and FIG. 28 to FIG. 29, the U/D HV mode is established at a high load of the engine 512 where the relatively large reduction ratio I is used, and the O/D HV mode is established at a low load or high vehicle speed of the engine 512 where the relatively small reduction ratio I is used. Thus, the U/D HV mode or the O/D HV mode is selectively used. As a result, an increase in the torque or rotation speed of each of the electric rotary machines MG1, MG2 is prevented or reduced, and a circulating power is reduced at a high vehicle speed. This leads to a reduction in energy conversion loss in the electrical path and improvement in fuel consumption. Alternatively, this leads to a reduction in the size of each of the electric rotary machines MG1, MG2.

In each of the U/D HV mode and the O/D HV mode, the first power transmission unit 524 is caused to serve as the electrical continuously variable transmission. A state where the reduction ratio I of the first power transmission unit 524 is "1" is a state equivalent to the state of the direct-coupling fixed gear mode in which the clutch C1 and the clutch CR both are engaged (see FIG. 26). Therefore, suitably, the hybrid control unit 582 changes the control mode between the U/D HV mode (forward traveling) in which the clutch C1 is engaged and the O/D HV mode in which the clutch CR is engaged by changing the operation statuses of the clutch C1 and clutch CR at the time of a synchronization state where the reduction ratio I is "1".

Figure 30:
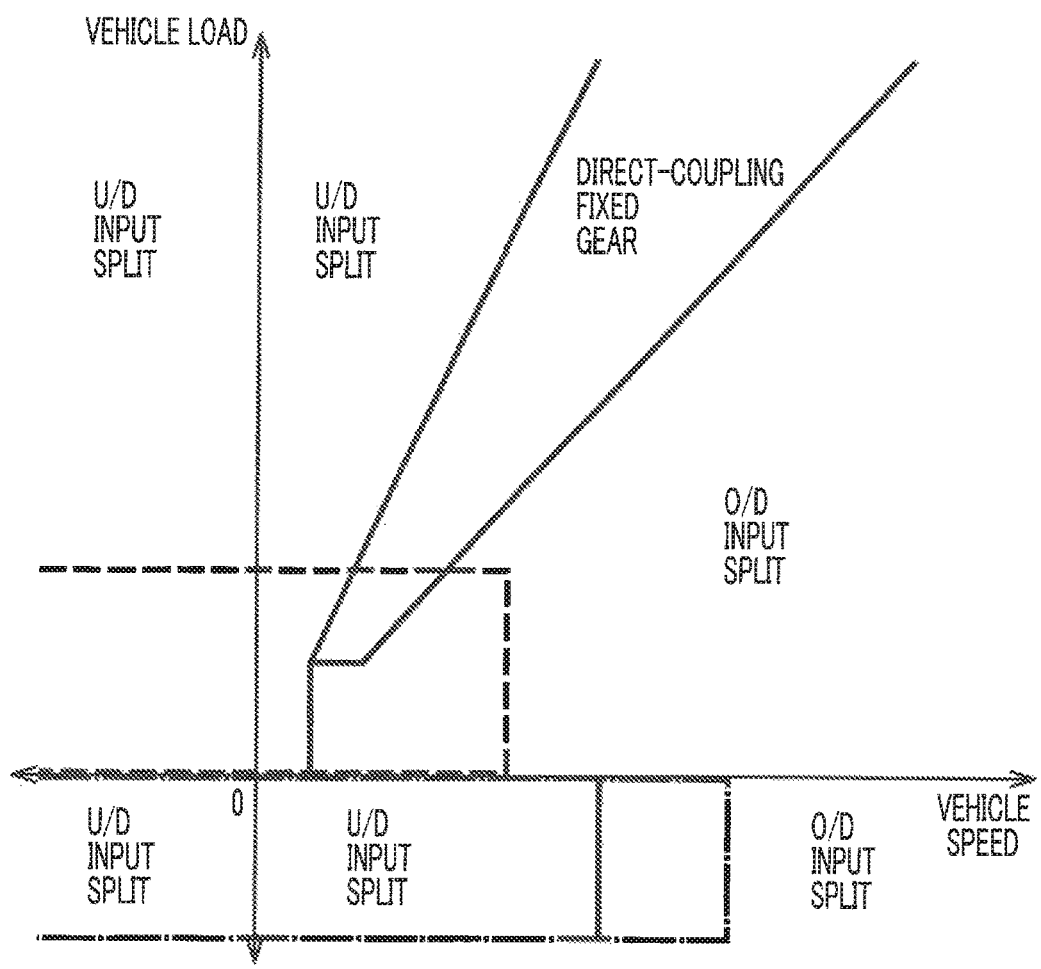
FIG. 30 is a view that shows an example of a drive mode change map that is used in control for changing the drive mode between engine driving and motor driving in the case where the vehicle travels while sustaining a state of charge.
Figure 31:
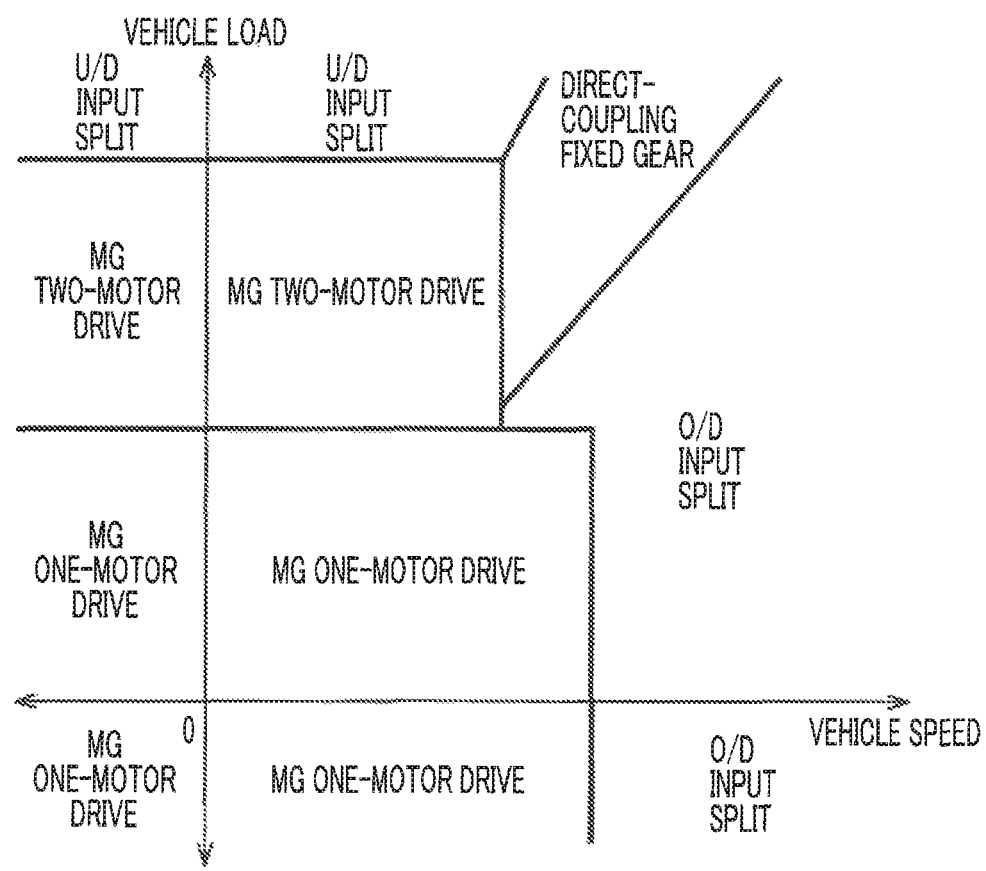
FIG. 31 is a view that shows an example of a drive mode change map that is used in control for changing the drive mode between engine driving and motor driving in the case where the vehicle travels while consuming the state of charge.

FIG. 30 and FIG. 31 are views that show examples of a drive mode change map that is used in control for changing the drive mode between engine driving and motor driving. These drive mode change maps each are a relationship that has boundary lines between an engine driving region and a motor driving region with a vehicle speed V and a traveling load of the vehicle 510 (hereinafter, referred to as vehicle load) (for example, required driving torque) as variables and that are obtained empirically or by design and stored in advance (that is, determined in advance). FIG. 30 shows a state transition of the power transmission system 514 (that is, a change of the drive mode of the vehicle 510) in charge sustaining (CS) driving where the vehicle 510 travels in a state where the battery capacity SOC is sustained. FIG. 30 is used in the case where the vehicle 510 is, for example, a hybrid vehicle, or the like, of which the battery capacity SOC is originally set to a small capacity. FIG. 30 is used in the case where the mode for sustaining the battery capacity SOC is established in the case where the vehicle 510 is, for example, a plug-in hybrid vehicle, a range extended vehicle, or the like, of which the battery capacity SOC is originally set to a relatively large capacity. On the other hand, FIG. 31 shows a state transition of the power transmission system 514 (that is, a change of the drive mode of the vehicle 510) in charge depleting (CD) driving where the vehicle 510 travels while consuming the battery capacity SOC. FIG. 31 is used in the case where the mode in which the battery capacity SOC is consumed is established in the case where the vehicle 510 is, for example, a plug-in hybrid vehicle, a range extended vehicle, or the like, of which the battery capacity SOC is originally set to a relatively large capacity. When the vehicle 510 is, for example, a hybrid vehicle, or the like, of which the battery capacity SOC is originally set to a relatively small capacity, it is desirable not to use FIG. 31.

In FIG. 30, the region of each drive mode is set in response to the traveling status, such as the vehicle speed V and the vehicle load, such that the U/D HV mode tends to be established at a high load and the O/D HV mode tends to be established at a low load or a high vehicle speed. In the direct-coupling fixed gear mode, there is no transmission of power via the electric rotary machines MG1, MG2, so a thermal loss resulting from conversion between mechanical energy and electric energy disappears. Thus, the direct-coupling fixed gear mode is advantageous in improvement of fuel consumption and avoidance of heat generation. For this reason, at a high load, such as towing, or at a high vehicle speed, the region of the direct-coupling fixed gear mode is set such that the direct-coupling fixed gear mode is actively established. When the battery unit 520 is able to output electric power (or when a warm-up of the engine 512 and a warm-up of the devices through the operation of the engine 512 have completed), motoring of the second electric rotary machine MG2 is performed in the EV drive mode in a region in which the operation efficiency of the engine 512 deteriorates. For this reason, in a low vehicle speed and low load region indicated by dashed line, the region of the one-motor EV mode is set. When the vehicle load is negative, the vehicle 510 decelerates by causing engine brake to function using the negative torque of the engine 512 in the U/D HV mode or in the O/D HV mode. When the battery unit 520 is able to receive electric power, the second electric rotary machine MG2 regenerates electric power in the EV drive mode. For this reason, in a negative vehicle load region indicated by alternate long and short dashed line, the region of the one-motor EV mode is set. In the thus set drive mode change map in CS driving, for example, at the time when the vehicle 510 starts moving, the U/D HV mode is established together with forward or backward traveling. Thus, the engine power Pe is more effectively used, so accelerating ability from standstill improves. With an increase in the vehicle speed V in forward traveling, the reduction ratio I of the first power transmission unit 524 gets close to "1". In this state, the control mode is shifted into the direct-coupling fixed gear mode. In low vehicle speed traveling, the engine rotation speed Ne becomes extremely low, so the control mode is directly shifted from the U/D HV mode to the O/D HV mode. When a switch for selecting the EV drive mode is operated by a driver and the EV drive mode is selected, the one-motor EV mode is established in the region indicated by dashed line.

In FIG. 31, the region of each drive mode is set in response to the traveling status, such as the vehicle speed V and the vehicle load, such that the one-motor EV mode is established in a low vehicle load region and the two-motor EV mode is established in a high vehicle load region. In the two-motor EV mode, a power share ratio between the first electric rotary machine MG1 and the second electric rotary machine MG2 is determined on the basis of the operation efficiency of each of the first electric rotary machine MG1 and the second electric rotary machine MG2 (for the purpose of, for example, improvement of electric power efficiency, a decrease in the temperature of each of the electric rotary machines MG1, MG2, a decrease in the temperature of the power control unit 518, and the like). Depending on the maximum output of each of the electric rotary machines MG1, MG2 or when an increase in the rotation speed of any one of the rotating elements of the power transmission system 514 due to an increase in the vehicle speed V in EV driving is reduced by operating the engine 512, the state may be shifted into a state where the engine 512 is used as a driving force source for propelling the vehicle 510 by setting the region of the HV drive mode in a high-load region or a high-vehicle speed region as shown in FIG. 31. In a negative vehicle load region, the region of the one-motor EV mode is set such that the second electric rotary machine MG2 regenerates electric power in EV driving. In the one-motor EV mode, the first electric rotary machine MG1 is disconnected from the engine 512 (that is, transmission of power between the first electric rotary machine MG1 and the engine 512 is interrupted), so the high vehicle speed-side region in the one-motor EV mode may be expanded to a higher vehicle speed side than that of the two-motor EV mode, as shown in FIG. 31. In the thus set drive mode change map in CD driving, for example, as the vehicle speed V increases, the rotation speeds of the elements, such as the electric rotary machines MG1, MG2 and the planetary gear mechanisms 548, 550, increase, so the control mode is shifted into the HV drive mode as set in the drive mode change map in CS driving such that the rotation speeds of the elements fall within limits. Regeneration in the negative vehicle load region may be performed in the two-motor EV mode instead of the one-motor EV mode. An upper limit may be set for the driving torque or the vehicle speed V, and fuel consumption may be cut by not starting the engine 512.

The hybrid control unit 582 determines which drive mode should be established by applying the vehicle speed V and the vehicle load (for example, required driving torque) to the drive mode change map as shown in FIG. 30 or FIG. 31. When the determined drive mode is the current drive mode, the hybrid control unit 582 maintains the current drive mode. When the determined drive mode is different from the current drive mode, the hybrid control unit 582 establishes the determined drive mode instead of the current drive mode.

When the one-motor EV mode is established, the hybrid control unit 582 enables EV driving that uses only the second electric rotary machine MG2 as a driving force source for propelling the vehicle 510. When the two-motor EV mode is established, the hybrid control unit 582 enables EV driving that uses both the first electric rotary machine MG1 and the second electric rotary machine MG2 as driving force sources for propelling the vehicle 510.

When the O/D HV mode or the U/D HV mode is established, the hybrid control unit 582 enables engine driving where the engine direct torque is transmitted to the first carrier CA1 by providing a reaction force against the power of the engine 512 through power generation of the first electric rotary machine MG1 and a torque is transmitted to the drive wheels 516 by driving the second electric rotary machine MG2 with electric power generated by the first electric rotary machine MG1. In the O/D HV mode or the U/D HV mode, the hybrid control unit 582 operates the engine 512 at an engine operating point (that is, an engine operating point expressed by the engine rotation speed Ne and the engine torque Te) in consideration of the known optimal fuel consumption line of the engine 512. In the O/D HV mode or the U/D HV mode, it is also allowed to drive the second electric rotary machine MG2 with electric power from the battery unit 520 in addition to electric power generated by the first electric rotary machine MG1.

When the direct-coupling fixed gear mode is established, the hybrid control unit 582 enables engine driving where the vehicle 510 travels by directly outputting the power of the engine 512 from the first carrier CA1. In the direct-coupling fixed gear mode, the hybrid control unit 582 is allowed to cause the vehicle 510 to travel by directly outputting the power of the first electric rotary machine MG1 from the first carrier CA1 by driving the first electric rotary machine MG1 with electric power from the battery unit 520 in addition to the power of the engine 512 or transmitting the power of the second electric rotary machine MG2 to the drive wheels 516 by driving the second electric rotary machine MG2 with electric power from the battery unit 520.

During a stop of the vehicle 510, when the battery capacity SOC is lower than or equal to a predetermined capacity at which it is determined that charging is required, the hybrid control unit 582 establishes the output shaft fixed gear mode. When the output shaft fixed gear mode is established, the hybrid control unit 582 provides a reaction force against the power of the engine 512 through power generation of the first electric rotary machine MG1, and charges the battery unit 520 with electric power generated by the first electric rotary machine MG1 via the power control unit 518.

As described above, in the one-motor EV mode, the engine 512 is placed in a co-rotation state by engaging the clutch C1, the clutch CR or the brake B1, and, in this state, it is possible to increase the engine rotation speed Ne with the use of the first electric rotary machine MG1. Thus, when the engine 512 is started in the one-motor EV mode, the electronic control unit 580 sets the clutch C1, the clutch CR or the brake B1 to an engaged state, and, in this state, ignites fuel while increasing the engine rotation speed Ne with the use of the first electric rotary machine MG1 as needed.

Figure 32:
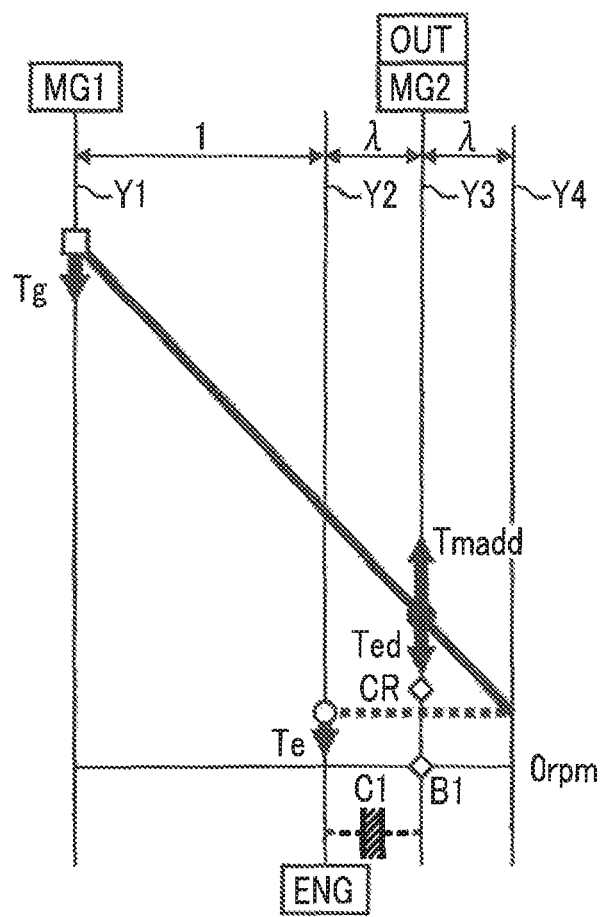
FIG. 32 is a view that illustrates an example of the case where an engine rotation speed is increased to start an engine by generating an MG1 torque in a state where a clutch C1 is engaged in the one-motor EV mode.

FIG. 32 is a view that illustrates an example of a case where the engine rotation speed Ne is increased to start the engine 512 by generating the MG1 torque Tg in a state where the clutch C1 is engaged in the one-motor EV mode with reference to a nomograph similar to the nomographs of FIG. 20 to FIG. 27. In FIG. 32, in such a start of the engine, a torque Ted corresponding to the negative torque Te of the engine 512 (also referred to as engine pull-in torque) resulting from an increase in the rotation of the engine 512 not in operation as a reaction force for increasing the engine rotation speed Ne is transmitted to the first carrier CA1 ("OUT") coupled to the drive wheels 516, so a drop of driving torque occurs. In contrast, a shock at the time of starting the engine is reduced by outputting a torque Tmadd that compensates for a drop of driving torque (also referred to as compensating torque) with the use of the second electric rotary machine MG2. That is, in such a start of the engine, the electronic control unit 580 additionally causes the second electric rotary machine MG2 to output the compensating torque Tmadd as a reaction force cancellation torque. The state shown in FIG. 32 is during the transition of a start of the engine, that is, when the engine rotation speed Ne is being increased. During EV driving, the rotation of each of the rotating elements of the first planetary gear mechanism 550, which are integrally rotated as a result of the engaged clutch C1 and indicated by dashed line, is set to zero. When engine brake is caused to function, the engine rotation speed Ne is increased as in the case of the state shown in FIG. 32.

However, because the compensating torque Tmadd is the amount of increase in the torque of the second electric rotary machine MG2, if the engine 512 is started in a state where the second electric rotary machine MG2 has been already outputting the large MG2 torque Tm, there is a possibility that it is not possible to provide the required compensating torque Tmadd. Then, there is a concern that the second electric rotary machine MG2 cannot sufficiently compensate for a drop of driving torque and, as a result, it is not possible to reduce a shock at the time of starting the engine.

When the engine 512 is started in the one-motor EV mode, the electronic control unit 580 operates the clutch CR from a released state toward an engaged state in a state where the clutch C1 is engaged. In addition to the engaged state of the clutch C1, when a torque capacity (hereinafter, referred to as CR torque Tcr) is generated in the clutch CR, the state shifts into a state of the direct-coupling fixed gear mode where the clutch C1 and the clutch CR both are engaged (see FIG. 26), so it is possible to increase the engine rotation speed Ne without generating the MG1 torque Tg. A start of the engine by generating the CR torque Tcr in the clutch CR may cause the compensating torque Tmadd to reduce in comparison with a start of the engine by generating the MG1 torque Tg. Thus, when the engine 512 is started, it is possible to easily compensate for a drop of driving torque. Hereinafter, the fact that a start of the engine by generating the CR torque Tcr in the clutch CR is able to further reduce the compensating torque Tmadd will be described in detail.

In FIG. 32, the ratio of spacing between adjacent lines among the vertical lines Y1 to Y4 is $1:\lambda:\lambda$ as shown in the drawing. Each "$\lambda$" in the second term and the third term is calculated on the basis of the gear ratio (=Number of teeth of the sun gear/Number of teeth of the ring gear) of each of the planetary gear mechanisms 548, 550, and is not always the same value. In the present embodiment, each "$\lambda$" in the second term and the third term is assumed as the same value for the sake of convenience. In starting the engine as shown in FIG. 32, since the clutch C1 is engaged, the rotating elements of the first planetary gear mechanism 550, indicated by dashed line, are integrally rotated. In this state, when a negative torque Tg is output from the first electric rotary machine MG1, the rotation of the engine 512 coupled to the second sun gear S2 of the first planetary gear mechanism 550 is increased. In starting the engine, the torque Ted transmitted to the first carrier CA1 ("OUT") is $(1+2\times\lambda)/(1+\lambda)\times Te$. For this reason, the compensating torque Tmadd that compensates for a drop of driving torque in the first carrier CA1 ("OUT") is $-(1+2\times\lambda)/(1+\lambda)\times Te$. In this way, the compensating torque Tmadd is larger than the absolute value of the engine pull-in torque Te. This is due to the same principle as the fact that the engine direct torque in the U/D HV mode (forward traveling) is increased from the engine torque Te as described above. In calculations here, inertial terms are omitted.

Figure 33:
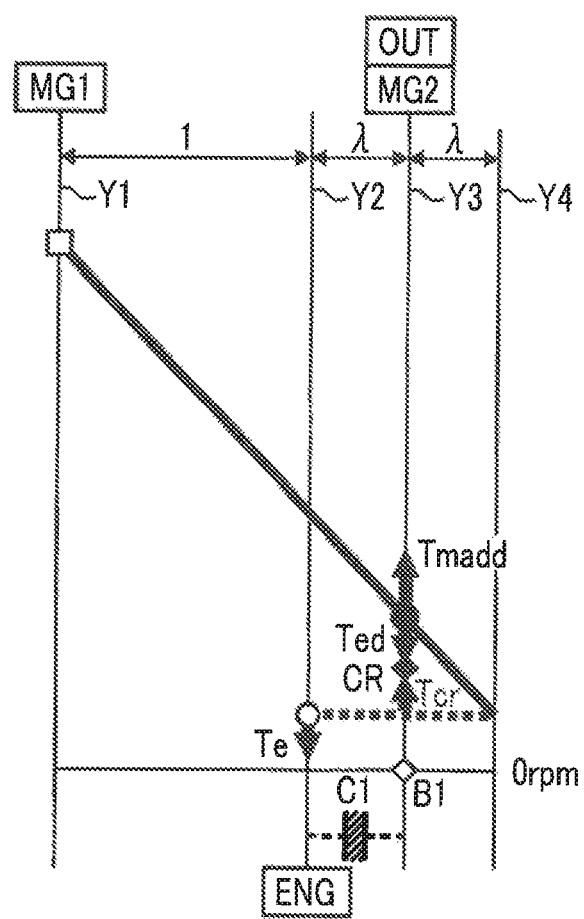
FIG. 33 is a view that illustrates an example of the case where the engine rotation speed is increased to start the engine by operating a clutch CR from a released state to an engaged state in a state where the clutch C1 is engaged in the one-motor EV mode.

FIG. 33 is a view that illustrates an example of the case where the engine rotation speed Ne is increased to start the engine 512 by operating the clutch CR from the released state toward the engaged state in a state where the clutch C1 is engaged in the one-motor EV mode with reference to the same nomograph as FIG. 32. In starting the engine as shown in FIG. 33 as well, since the clutch C1 is engaged, the rotating elements of the first planetary gear mechanism 550, indicated by dashed line, are integrally rotated. In this state, in starting the engine as shown in FIG. 33, the rotation of the engine 512 coupled to the second sun gear S2 of the first planetary gear mechanism 550 is increased by generating the CR torque Tcr in the clutch CR as a result of operating the clutch CR from the released state toward the engaged state. In starting the engine, the clutch CR is in a slipping state; however, the CR torque Tcr is generated to increase the engine rotation speed Ne, so the torque Ted transmitted to the first carrier CA1 ("OUT") becomes the engine pull-in torque Te. For this reason, the compensating torque Tmadd that compensates for a drop of driving torque in the first carrier CA1 ("OUT") is $-Te$. In this way, the compensating torque Tmadd is the same value as the absolute value of the engine pull-in torque Te. Therefore, a start of the engine by operating the clutch CR from the released state toward the engaged state is able to further reduce the compensating torque Tmadd as compared to a start of the engine by generating the MG1 torque Tg. In calculations here, inertial terms are omitted.

Even when the compensating torque Tmadd is reduced through a start of the engine by generating the CR torque Tcr, there is a possibility that it is not possible to provide a compensating torque Tmadd that is required of the second electric rotary machine MG2. In starting the engine, since the MG1 torque Tg (negative torque) is not used, the MG1 torque Tg (positive torque) is allowed to be used for providing the compensating torque Tmadd. When the electronic control unit 580 starts the engine 512 in the one-motor EV mode, the electronic control unit 580 operates the clutch CR from the released state toward the engaged state in a state where the clutch C1 is engaged, and causes the first electric rotary machine MG1 to output the compensating torque Tmadd. Thus, the second electric rotary machine MG2 does not need to leave the compensating torque Tmadd without using for EV driving since the first electric rotary machine MG1 is able to output the compensating torque Tmadd, so the region in which EV driving is performed with the use of the second electric rotary machine MG2 (that is, the region of the one-motor EV mode) expands.

Figure 34:
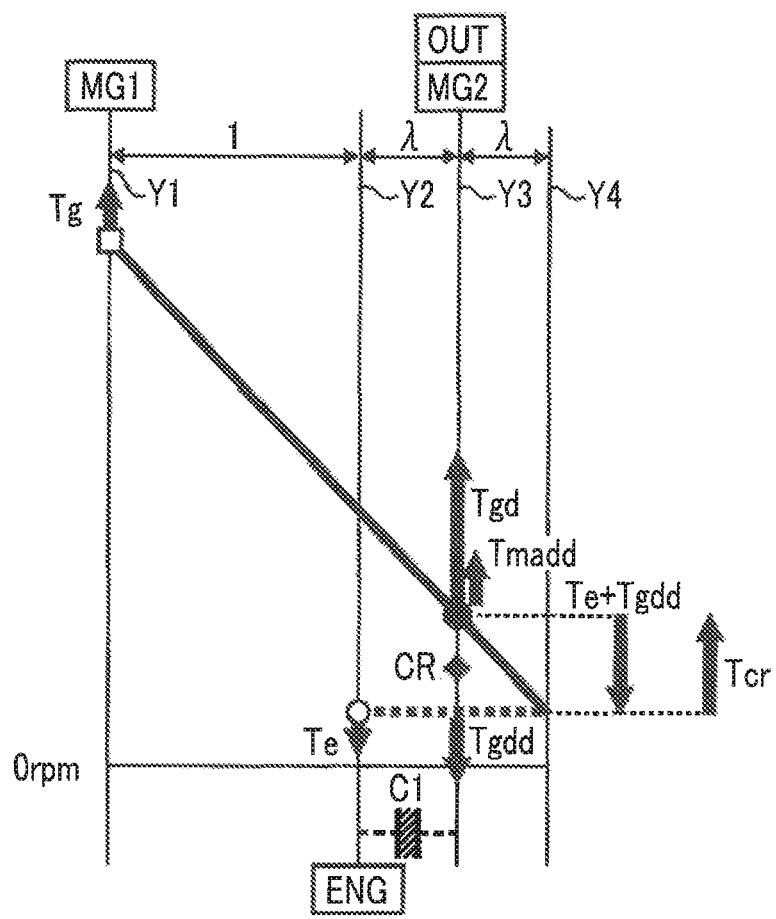
FIG. 34 is a view that illustrates an example of the case where a first electric rotary machine is caused to output a compensating torque at the time when the engine is started by operating the clutch CR from the released state toward the engaged state in a state where the clutch C1 is engaged in the one-motor EV mode.
Figure 35:
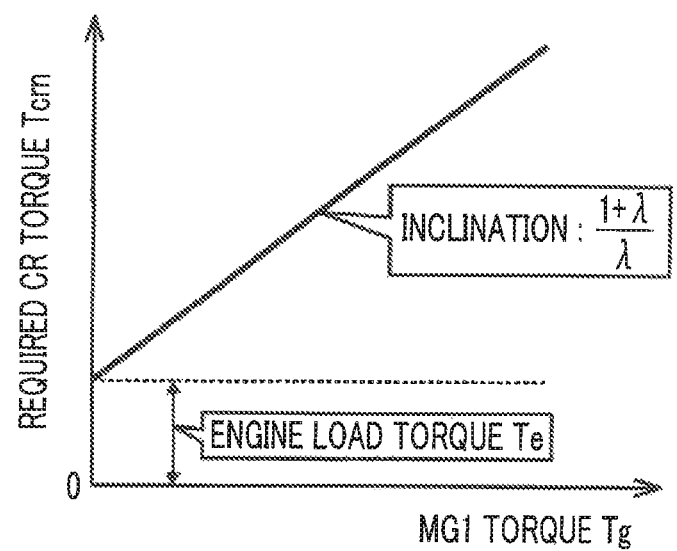
FIG. 35 is a graph that illustrates a CR torque that is required to be generated in the clutch CR in the case where the first electric rotary machine outputs a compensating torque.

FIG. 34 is a view that illustrates an example of the case where the first electric rotary machine MG1 is caused to output the compensating torque Tmadd at the time when the engine 512 is started by operating the clutch CR from the released state toward the engaged state in a state where the clutch C1 is engaged in the one-motor EV mode with reference to the same nomograph as FIG. 33. FIG. 35 is a graph that illustrates CR torque Tcr that is required to generate in the clutch CR (hereinafter, required CR torque Tcrn) in the case where the first electric rotary machine MG1 outputs the compensating torque Tmadd.

In FIG. 34, in starting the engine by generating the CR torque Tcr in the clutch CR, the compensating torque Tmadd is generated by using the MG1 torque Tg (positive torque). The MG1 torque Tg (positive torque) adds a torque (this torque is denoted by Tgd) that compensates for a drop of driving torque to the first carrier CA1 ("OUT"). On the other hand, the MG1 torque Tg (positive torque) adds a torque (this torque is denoted by Tgdd) in the direction to reduce the engine rotation speed Ne to the first planetary gear mechanism 550 that is integrally rotated as a result of the engaged clutch C1 and that is indicated by dashed line. Therefore, a torque that acts on the first carrier CA1 ("OUT") at the time when the CR torque Tcr is generated to increase the engine rotation speed Ne is Tgd−|Te+Tgdd|. When it is assumed that the state where the CR torque Tcr is generated in addition to the engaged state of the clutch C1 is equivalent to the state of the direct-coupling fixed gear mode (see FIG. 26) in which both the clutch C1 and the clutch CR are engaged, the MG1 torque Tg (positive torque) is Tgd−|Tgdd|. For this reason, a torque that acts on the first carrier CA1 ("OUT") is Tg−|Te|. Thus, when the first electric rotary machine MG1 outputs at least a torque corresponding to the absolute value of the engine pull-in torque Te as the MG1 torque Tg (positive torque), it is possible to compensate for a drop of driving torque. In calculations here, inertial terms are omitted.

As a condition that it is possible to increase the engine rotation speed Ne by generating the CR torque Tcr, at least the CR torque Tcr corresponding to the torque Tgdd that is added to the first planetary gear mechanism 550 by the MG1 torque Tg (positive torque) is required in addition to the engine pull-in torque Te. Thus, the required CR torque Tcrn is a torque that exceeds |Te+Tgdd|. The torque Tgdd is $(1+\lambda)/\lambda \times Tg$, so the required CR torque Tcrn with which the engine rotation speed Ne is increased is a torque that exceeds a torque $(=|Te+(1+\lambda)/\lambda \times Tg|)$ as indicated by continuous line in FIG. 35. In calculations here, inertial terms are omitted.

As described with reference to FIG. 34 and FIG. 35, even when the second electric rotary machine MG2 is not outputting part of the compensating torque Tmadd, but when the first electric rotary machine MG1 outputs a torque corresponding to the absolute value of the engine pull-in torque Te, it is possible to provide the compensating torque Tmadd. Therefore, the region of the one-motor EV mode is allowed to be set on the basis of the maximum torque of the second electric rotary machine MG2, so it is possible to expand the region of EV driving beyond the region of the one-motor EV mode, which is set on the basis of a torque obtained by subtracting the compensating torque Tmadd from the maximum torque of the second electric rotary machine MG2.

As the MG1 torque Tg (positive torque) increases, the required CR torque Tcrn is also increased. In addition, in starting the engine by generating the CR torque Tcr, the clutch CR is in a slipping state, so there is a possibility that a thermal inconvenience occurs. For this reason, it is desirable to set the upper limit value of the MG1 torque Tg (positive torque) in consideration of a possible value as the CR torque Tcr.

When the first electric rotary machine MG1 outputs the MG1 torque Tg (positive torque) that exceeds the compensating torque Tmadd, it is possible to accelerate while starting the engine by increasing driving torque.

In order to implement the above-described engine start control, the electronic control unit 580 further includes condition determination means, that is, a condition determination unit 586, start control means, that is, a start control unit 588, and torque compensation control means, that is, a torque compensation control unit 589.

When the engine is started by generating the MG1 torque Tg (negative torque) (see FIG. 32), the condition determination unit 586 determines whether the second electric rotary machine MG2 is able to provide a required compensating torque Tmadd. For example, the condition determination unit 586 determines whether a torque obtained by subtracting the MG2 torque Tm, which corresponds to the required driving torque and which is currently being output from the second electric rotary machine MG2, from the MG2 torque Tm that is currently outputtable from the second electric rotary machine MG2 is insufficient for the compensating torque Tmadd during EV driving in the one-motor EV mode. The compensating torque Tmadd is $-(1+2\times\lambda)/(1+\lambda)\times Te$ as described above. The engine pull-in torque Te is, for example, calculated on the basis of a rotation increasing acceleration at the time of starting the engine based on purification requirements of exhaust gas, or the like.

At the time of starting the engine 512, when the condition determination unit 586 determines that the compensating torque Tmadd in starting the engine by generating the MG1 torque Tg (negative torque) is not insufficient, the start control unit 588, for example, starts the engine 512 by causing the first electric rotary machine MG1 to output the MG1 torque Tg (negative torque) in a state where the clutch C1 is engaged and igniting fuel while increasing the engine rotation speed Ne (see FIG. 32).

At the time of starting the engine 512, when the condition determination unit 586 determines that the compensating torque Tmadd in starting the engine by generating the MG1 torque Tg (negative torque) is insufficient, the start control unit 588 starts the engine 512 by operating the clutch CR from a released state to an engaged state in a state where the clutch C1 is engaged and igniting fuel while increasing the engine rotation speed Ne (see FIG. 33).

In starting the engine by operating the clutch CR from the released state toward the engaged state, each of the first electric rotary machine MG1 and the second electric rotary machine MG2 is able to generate the compensating torque Tmadd. That is, when the engine 512 is started, the torque compensation control unit 589 is able to output a torque from each of the first electric rotary machine MG1 and the second electric rotary machine MG2 such that a drop of driving torque is reduced. In compensating for a drop of driving torque with the use of the second electric rotary machine MG2, the compensating torque Tmadd is allowed to directly act on the drive wheels 516, so it is relatively easy to control the magnitude of the compensating torque Tmadd. On the other hand, in compensating for a drop of driving torque with the use of the first electric rotary machine MG1, a reaction torque is provided by the clutch CR being operated from the released state toward the engaged state in a slipping state, so it is relatively difficult to control the magnitude of the compensating torque Tmadd that acts on the drive wheels 516. For this reason, the torque compensation control unit 589 causes the first electric rotary machine MG1 to output a torque by which the MG2 torque Tm is insufficient for a torque for reducing a drop of driving torque such that the compensating torque Tmadd that is generated by the second electric rotary machine MG2 is output in preference to the compensating torque Tmadd that is generated by the first electric rotary machine MG1.

More specifically, in starting the engine by operating the clutch CR from the released state toward the engaged state, the compensating torque Tmadd is −Te, so it is possible to reduce the compensating torque Tmadd in comparison with a start of the engine by generating the MG1 torque Tg (negative torque). However, when the MG2 torque Tm that is currently being output from the second electric rotary machine MG2 is large because of a large required driving torque, the second electric rotary machine MG2 is not able to provide the reduced compensating torque Tmadd. In this case, the first electric rotary machine MG1 needs to provide an insufficient amount of the compensating torque Tmadd by outputting the MG1 torque Tg (positive torque). For this reason, the condition determination unit 586 determines whether a torque obtained by subtracting the MG2 torque Tm, which corresponds to the required driving torque and which is currently being output from the second electric rotary machine MG2, from the MG2 torque Tm that is currently outputtable from the second electric rotary machine MG2 is insufficient for the compensating torque Tmadd (=−Te). That is, the condition determination unit 586 determines whether MG1 assist that the first electric rotary machine MG1 outputs the MG1 torque Tg (positive torque) is required.

At the time of starting the engine 512, when the condition determination unit 586 determines that MG1 assist is not required, the torque compensation control unit 589 does not execute MG1 assist, and causes only the second electric rotary machine MG2 to additionally output the compensating torque Tmadd. On the other hand, at the time of starting the engine 512, when the condition determination unit 586 determines that MG1 assist is required, the torque compensation control unit 589 executes MG1 assist. In MG1 assist, the torque compensation control unit 589 outputs the MG1 torque Tg (positive torque) from the first electric rotary machine MG1 such that a drop of driving torque is reduced. The MG1 torque Tg (positive torque) is a torque by which the MG2 torque Tm is insufficient for the compensating torque Tmadd (=−Te). When the second electric rotary machine MG2 is not able to output part of the compensating torque Tmadd or when an embodiment in which the second electric rotary machine MG2 originally does not output the compensating torque Tmadd is employed, the torque compensation control unit 589 outputs the MG1 torque Tg (positive torque) from the first electric rotary machine MG1 such that a drop of driving torque is reduced with the use of only the first electric rotary machine MG1.

As the vehicle load (for example, required driving torque) reduces, the MG2 torque Tm that is used to drive the vehicle 510 reduces, so a margin of the MG2 torque Tm, which is allowed to be used for the compensating torque Tmadd, relatively increases. As described above, it is desirable to use the MG2 torque Tm for the compensating torque Tmadd in preference to the MG1 torque Tg (positive torque). Therefore, the torque compensation control unit 589 decreases the MG1 torque Tg (positive torque) that is output from the first electric rotary machine MG1 as the vehicle load reduces.

The compensating torque Tmadd that is generated by the first electric rotary machine MG1 acts in the direction to reduce the rotation speed of the second ring gear R2 (that is, the rotating elements of the first differential unit 546, which are integrally rotated because of the engaged clutch C1) coupled to the first ring gear R1 (that is, acts as a reaction torque on the clutch CR from the released state toward the engaged state). For this reason, the torque compensation control unit 589 sets the MG1 torque Tg (positive torque) that is output from the first electric rotary machine MG1 to a predetermined value or smaller. The predetermined value is set on the basis of the CR torque Tcr that can be generated on the basis of, for example, a thermal load, or the like, and the torque ($=|Te+(1+\lambda)/\lambda \times Tg|$) indicated by continuous line in FIG. 35.

In starting the engine by operating the clutch CR from the released state toward the engaged state, a variation in the engine rotation speed Ne tends to fluctuate with respect to a target value, so there is a possibility that the combustion stability of the engine 512 is impaired. The engine rotation speed Ne is subjected to feedback control with the use of the MG1 torque Tg of which the time constant is smaller than the CR hydraulic pressure Pcr for operating the clutch CR. That is, when the engine 512 is started, the torque compensation control unit 589 outputs the MG1 torque Tg from the first electric rotary machine MG1 under feedback control such that the engine rotation speed Ne is varied along the target value.

When the working oil temperature THoil for operating the clutch CR is low, there is a possibility that the response (which is synonymous with controllability) of the clutch CR decreases due to a high viscosity of working oil. When the working oil temperature THoil is high, there is a possibility that the response of the clutch CR decreases due to leakage of working oil from the clearances, and the like, of valves (a solenoid valve, a pressure regulating valve, and the like, provided in the hydraulic control circuit 554) associated with supply of hydraulic pressure to the clutch CR. When the response of the clutch CR is low, the response of engine start can decrease. In such a case, although the compensating torque Tmadd is insufficient, it is more desirable to start the engine by generating the MG1 torque Tg (negative torque) than to start the engine by operating the clutch CR from the released state toward the engaged state. That is, even when it is not possible to reduce a drop of driving torque, ensuring the response of engine start is given a higher priority.

More specifically, at the time of starting the engine 512, when the condition determination unit 586 determines that the compensating torque Tmadd in starting the engine by generating the MG1 torque Tg (negative torque) is insufficient, the condition determination unit 586 determines that the response (controllability) at the time of operating the clutch CR is high or low on the basis of the working oil temperature THoil of working oil for operating the clutch CR. The condition determination unit 586 determines whether the response at the time of operating the clutch CR is high or low on the basis of whether the working oil temperature THoil is higher than a predetermined oil temperature. The predetermined oil temperature is, for example, a threshold determined in advance for determining that the viscosity of working oil is low to such an extent that the response of the clutch CR is ensured. In other words, the condition determination unit 586 determines whether the response at the time of operating the clutch CR is high or low on the basis of whether the working oil temperature THoil is lower than a second predetermined oil temperature. The second predetermined oil temperature is, for example, a value higher than the predetermined oil temperature and is a threshold determined in advance for determining that leakage of working oil from the valves is reduced to such an extent that the response of the clutch CR is ensured.

When the condition determination unit 586 determines that the response for operating the clutch CR is high, the start control unit 588 executes engine start control (also referred to as CR clutch engaging engine start) for operating the clutch CR from the released state toward the engaged state in a state where the clutch C1 is engaged. On the other hand, when the condition determination unit 586 determines that the response at the time of operating the clutch CR is low, the start control unit 588 executes engine start control (also referred to as normal engine start) for increasing the engine rotation speed Ne with the use of the first electric rotary machine MG1 in a state where the clutch C1 is engaged and the clutch CR is released.

Figure 36:
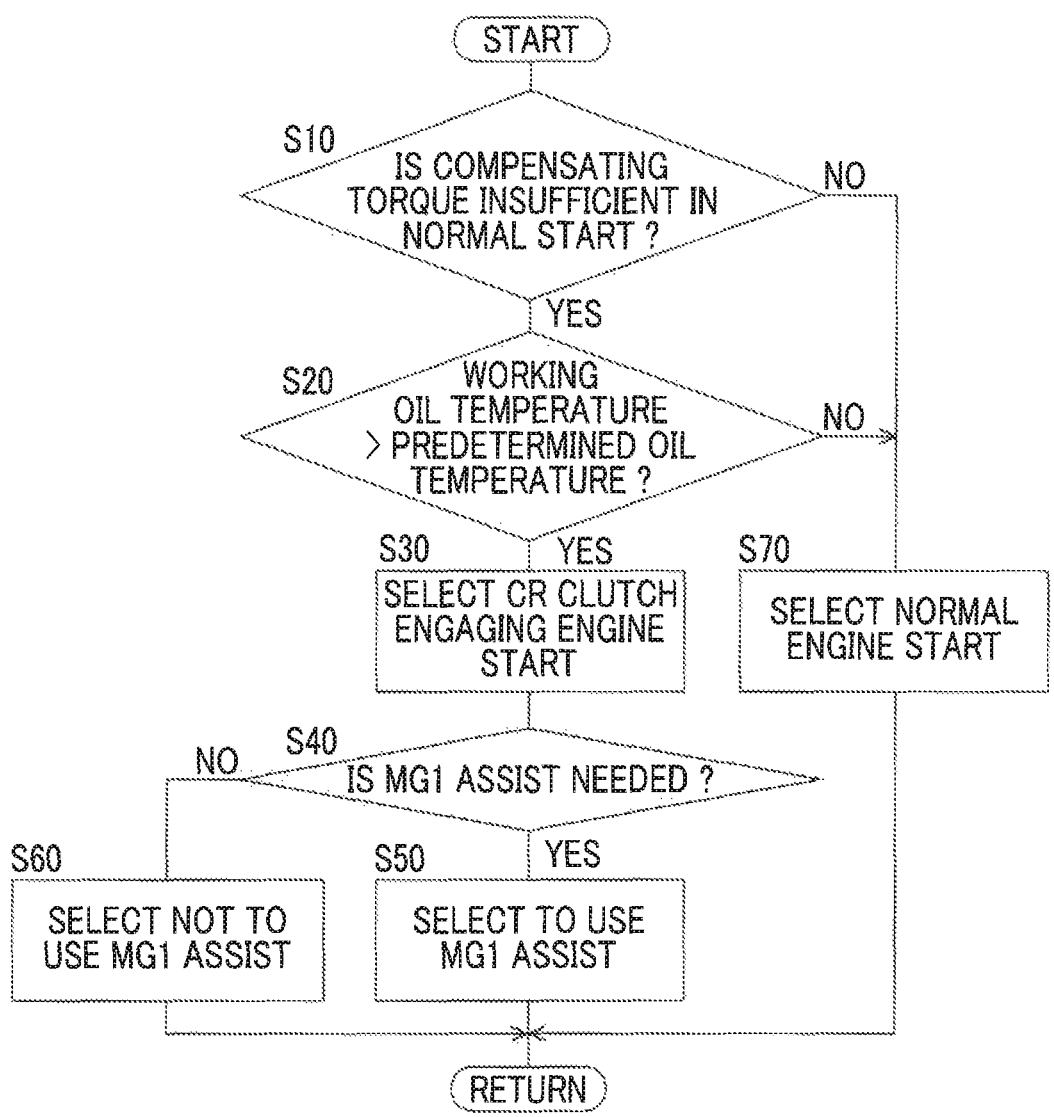
FIG. 36 is a flowchart that illustrates a relevant portion of control operations of an electronic control unit, that is, control operations for making it easy to compensate for a drop of driving torque at the time when the engine is started.
Figure 37:
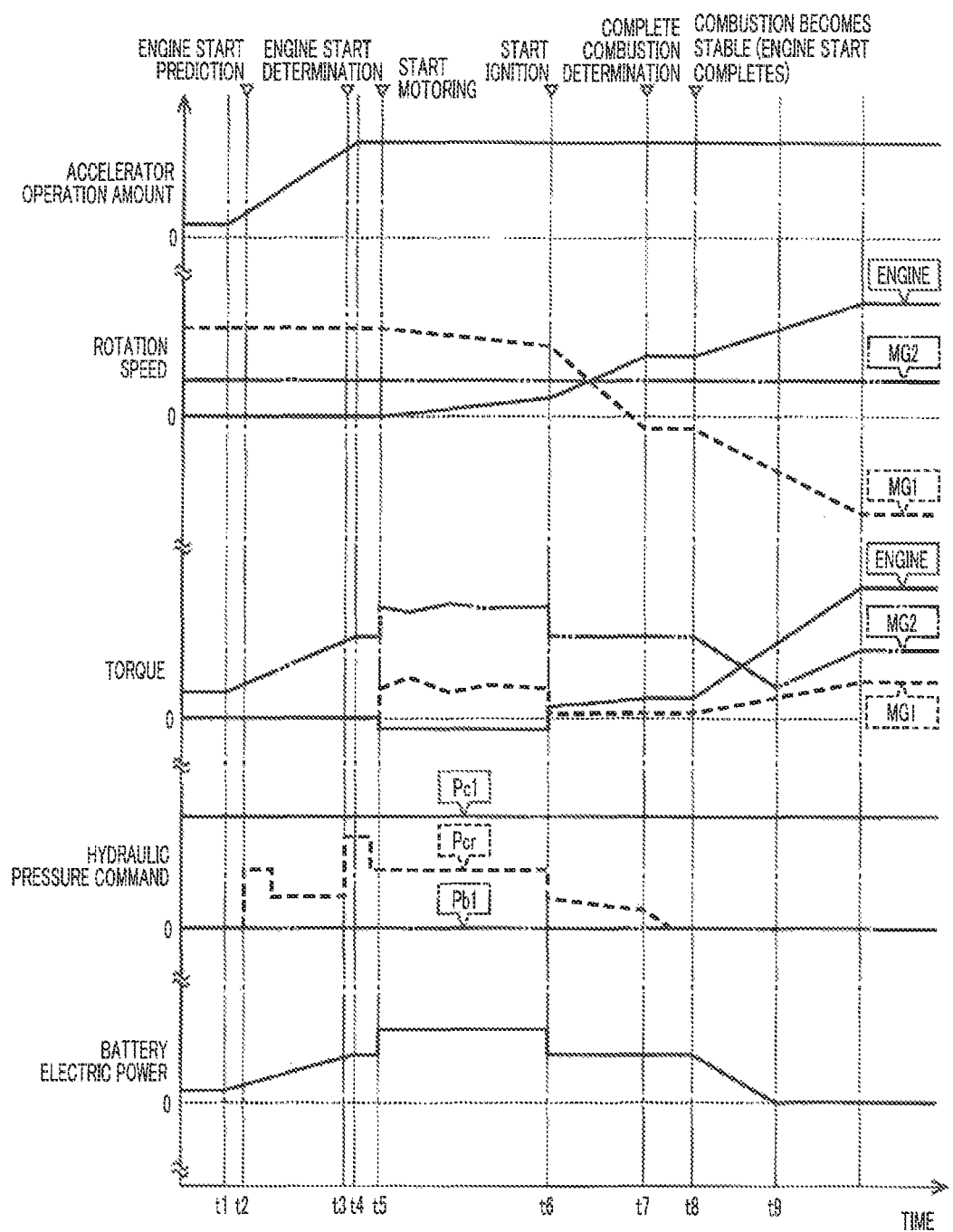
FIG. 37 is a view that shows an example of a timing chart in the case where the control operations shown in the flowchart of FIG. 36 are executed.

FIG. 36 is a flowchart that illustrates a relevant portion of control operations of the electronic control unit 580, that is, control operations for easily compensating for a drop of driving torque at the time of starting the engine 512. This flowchart is, for example, executed when it is determined to start the engine during EV driving. FIG. 37 is a view that shows an example of a timing chart in the case where the control operations shown in the flowchart of FIG. 36 are executed.

In FIG. 36, initially, in step (hereinafter, step is omitted) S10 corresponding to the function of the condition determination unit 586, it is determined whether the compensating torque Tmadd that is generated by the second electric rotary machine MG2 is insufficient in the case where normal engine start is executed. When affirmative determination is made in S10, it is determined in S20 corresponding to the function of the condition determination unit 586 whether the response for operating the clutch CR is high on the basis of whether the working oil temperature THoil is higher than the predetermined oil temperature. For example, whether the response for operating the clutch CR is high may be determined on the basis of whether the working oil temperature THoil is lower than the second predetermined oil temperature (> the predetermined oil temperature). When affirmative determination is made in S20, CR clutch engaging engine start is selected in S30 corresponding to the function of the start control unit 588. Subsequently, in S40 corresponding to the function of the condition determination unit 586, it is determined whether MG1 assist is required. When affirmative determination is made in S40, executing MG1 assist (that is, with MG1 assist) is selected in S50 corresponding to the function of the torque compensation control unit 589. Subsequent to S50, the engine 512 is started by operating the clutch CR from the released state toward the engaged state in a state where the clutch C1 is engaged and igniting fuel while increasing the engine rotation speed Ne (see FIG. 33). In starting the engine, the compensating torque Tmadd is output from the first electric rotary machine MG1 and the second electric rotary machine MG2. The MG1 torque Tg (positive torque) is output with MG1 assist as a torque by which the MG2 torque Tm is insufficient for the required compensating torque Tmadd (see FIG. 34). On the other hand, when negative determination is made in S40, not executing MG1 assist (that is, without MG1 assist) is selected in S60 corresponding to the function of the torque compensation control unit 589. Subsequent to S60, the engine 512 is started by operating the clutch CR from the released state toward the engaged state in a state where the clutch C1 is engaged and igniting fuel while increasing the engine rotation speed Ne (see FIG. 33). In starting the engine, the compensating torque Tmadd is output from only the second electric rotary machine MG2. On the other hand, when negative determination is made in S10 or when negative determination is made in S20, normal engine start is selected in S70 corresponding to the function of the start control unit 588. Subsequent to S70, the engine 512 is started by outputting the MG1 torque Tg (negative torque) from the first electric rotary machine MG1 in a state where the clutch C1 is engaged and igniting fuel while increasing the engine rotation speed Ne (see FIG. 32).

FIG. 37 shows the case where CR clutch engaging engine start from a state where the vehicle 510 is performing EV driving at a constant accelerator operation amount. In FIG. 37, during EV driving where the operation of the engine 512 is stopped in a state where the one-motor EV mode in which the clutch C1 is engaged (see engine brake is additionally used in FIG. 19) or the U/D HV mode (forward traveling) is established, the accelerator operation amount θacc begins to increase (see time t1). Accordingly, the required driving torque increases, so the MG2 torque Tm also increases, a positive electric power (that is, battery discharge electric power) of electric power (also referred to as battery electric power) of the battery unit 520 also increases in proportion (see time t1 to time t4). After that, as a result of the fact that the accelerator operation amount θacc has increased, it is determined to start the engine (see time t3). Thus, the CR torque Tcr is generated in the clutch CR. A hydraulic pressure command value for supplying the CR hydraulic pressure Pcr may be output from the time at which it is determined to start the engine or in order to improve the response for engaging the clutch CR, as shown in the example of FIG. 37, it may be predicted to start the engine and then start preparation for generating the CR torque Tcr from the time at which it is predicted to start the engine. For example, a threshold at which it is predicted to start the engine is set to the accelerator operation amount θacc lower than a threshold at which it is determined to start the engine. Time t2 indicates that preparation for generating the CR torque Tcr is started since the accelerator operation amount θacc has reached the threshold at which it is predicted to start the engine. In preparation for generating the CR torque Tcr, initially, a temporary high hydraulic pressure for moving the pressure regulating valve that supplies the CR hydraulic pressure Pcr is output as a hydraulic pressure command value of the CR hydraulic pressure Pcr, and, after that, a constant standby pressure for moving a piston of the clutch CR is output (see time t2 to time t3). The constant standby pressure is not the one for moving the piston until completion of a so-called packing for packing the clearance between friction materials of the clutch CR. In the example of FIG. 37, after it is predicted to start the engine, the accelerator operation amount θacc has increased, so it is determined to start the engine, and the hydraulic pressure command value of the CR hydraulic pressure Per for generating the CR torque Tcr begins to be output (see time t3). In outputting the hydraulic pressure command value, initially, a temporary high hydraulic pressure for packing the clutch CR is output, and, after that, the constant standby pressure is output (see time t3 to time t6). As the CR torque Tcr actually begins to be generated as a result of outputting the hydraulic pressure command value of the CR hydraulic pressure Per for generating the CR torque Tcr, the engine rotation speed Ne begins to increase (see time t5). As an increase in the engine rotation speed Ne is detected, the MG2 torque Tm is increased and the MG1 torque Tg (positive torque) is output in order to output the compensating torque Tmadd (see time t5 to time t6). Since each of the electric rotary machines MG1, MG2 includes a resolver, the beginning of an increase in the engine rotation speed Ne can be accurately detected on the basis of the MG1 rotation speed Ng and the MG2 rotation speed Nm. By utilizing detection of the beginning of such an increase in the engine rotation speed Ne, the relationship between a CR torque Tcr and a hydraulic pressure command value of the CR hydraulic pressure Per for generating the CR torque Tcr may be learned, and the hydraulic pressure command value of the CR hydraulic pressure Per, which is used at the time of starting the engine next time may be corrected. Alternatively, the hydraulic pressure command value of the CR hydraulic pressure Per may be corrected by using the CR hydraulic pressure Per detected by a CR hydraulic pressure sensor 574 or a piston stroke detected by a piston stroke sensor in the clutch CR. As the engine rotation speed Ne begins to increase, feedback control is executed with the use of the first electric rotary machine MG1 such that a desired trajectory of increase in the engine rotation speed Ne is obtained. Since the response of the first electric rotary machine MG1 is higher than the CR hydraulic pressure Per, followability to a target improves. Since a driving torque fluctuates due to fluctuations of the MG1 torque Tg (positive torque) in feedback control, the fluctuations are cancelled by the MG2 torque Tm (see time t5 to time t6). As the engine rotation speed Ne reaches a predetermined rotation speed, the engine 512 is ignited (see time t6). With an increase in the engine torque Te after ignition, the hydraulic pressure command value for decreasing the CR hydraulic pressure Per is output in preparation for engine driving thereafter (see time t6 to time t8). After ignition, it is determined whether the engine 512 has performed complete combustion (see time t7), and, when combustion becomes stable, the engine torque Te is increased (see time t8 and later). Since the drive mode is changed to engine driving that uses the engine power Pe as a main power source, battery electric power that is used for propelling the vehicle 510 is reduced (see time t8 to time t9).

As described above, according to the present embodiment, when the engine 512 is started by generating the MG1 torque Tg (negative torque) in a state where the clutch C1 is engaged and the clutch CR is released, a torque increased from the engine pull-in torque Te is mechanically output to the first carrier CA1 coupled to the drive wheels 516. Since the engine pull-in torque Te is allowed to directly act on the first carrier CA1 by operating the clutch CR from the released state toward the engaged state in a state where the clutch C1 is engaged when the engine 512 is started, it is possible to reduce the compensating torque Tmadd as compared to the compensating torque Tmadd at the time of starting the engine with the use of the first electric rotary machine MG1. Thus, at the time of starting the engine 512, it is possible to easily compensate for a drop of driving torque.

According to the present embodiment, when the engine 512 is started by operating the clutch CR from the released state toward the engaged state, the MG1 torque Tg (positive torque) is output such that not the MG1 torque Tg (negative torque) that is used to start the engine 512 is generated but a drop of driving torque is reduced, so it is possible to generate the compensating torque Tmadd with the use of the first electric rotary machine MG1. Thus, for example, when all the compensating torque Tmadd is provided by the second electric rotary machine MG2, it is possible to expand a motor driving region of the second electric rotary machine MG2, which is determined in advance such that the compensating torque Tmadd is reserved.

According to the present embodiment, when the engine 512 is started, a torque is output from each of the first electric rotary machine MG1 and the second electric rotary machine MG2 such that a drop of driving torque is reduced, so it is possible to generate the compensating torque Tmadd with the use of both the first electric rotary machine MG1 and the second electric rotary machine MG2. Thus, it is easy to reduce a shock at the time of starting the engine.

According to the present embodiment, since the MG1 torque Tg (positive torque) is set to the predetermined value or smaller, it is possible to achieve both an increase in the engine rotation speed Ne with the use of the clutch CR and compensation for a drop of driving torque with the use of the first electric rotary machine MG1.

According to the present embodiment, since the MG1 torque Tg (positive torque) is reduced as the vehicle load reduces, that is, a margin of the MG2 torque Tm relatively increases, the compensating torque Tmadd that is generated by the second electric rotary machine MG2 is increased, so it is possible to stably compensate for a drop of driving torque. Thus, it is easy to reduce a shock at the time of starting the engine.

According to the present embodiment, since a torque by which the MG2 torque Tm is insufficient for a torque for reducing a drop of driving torque is output from the first electric rotary machine MG1, the compensating torque Tmadd that is generated by the second electric rotary machine MG2 is output in preference to the compensating torque Tmadd that is generated by the first electric rotary machine MG1, so it is possible to stably compensate for a drop of driving torque. Thus, it is easy to reduce a shock at the time of starting the engine.

According to the present embodiment, when the engine 512 is started, the MG1 torque Tg is output under feedback control such that the engine rotation speed Ne varies along the target value, so it is possible to reduce variations in the engine rotation speed Ne with the use of the first electric rotary machine MG1 having a higher response than operation of the clutch CR. Thus, it is easy to ensure the combustion stability of the engine 512.

According to the present embodiment, when the response at the time of operating the clutch CR is low, engine start control for increasing the engine rotation speed Ne with the use of the first electric rotary machine MG1 in a state where the clutch C1 is engaged and the clutch CR is released is executed, so it is possible to ensure the response at the time of starting the engine 512.

According to the present embodiment, whether the response at the time of operating the clutch CR is high or low is determined on the basis of the working oil temperature THoil of working oil for operating the clutch CR, and, when the response of the clutch CR is low, the response at the time of starting the engine 512 is ensured by executing engine start control with the use of the first electric rotary machine MG1 in order to ensure a smooth start of the engine 512.

According to the present embodiment, the second differential unit 544 includes a single-pinion planetary gear mechanism in which the first ring gear R1 is the fourth rotating element RE4, the first sun gear S1 is the fifth rotating element RE5 and the first carrier CA1 is the sixth rotating element RE6, so, when the differential status of the second differential unit 544 is controlled in a state where the clutch C1 is engaged and the clutch CR is released, a torque increased from the engine torque Te is mechanically transmitted to the first carrier CA1.

Next, a seventh embodiment will be described. In the following description, like reference numerals denote portions common to the embodiments, and the description is omitted.

In the above-described sixth embodiment, CR clutch engaging engine start is executed when the response at the time of operating the clutch CR is high; whereas normal engine start using the MG1 torque Tg (negative torque) is executed when the response at the time of operating the clutch CR is low. Therefore, when the response at the time of operating the clutch CR is high, it is possible to reduce the MG2 torque Tm that is required to be reserved (that is, the MG2 torque Tm that is left without being used in EV driving) in order to be used as the compensating torque Tmadd at the time of starting the engine. In an extreme case, in an embodiment in which the compensating torque Tmadd is provided by using the MG1 torque Tg (positive torque), it is not required to reserve the MG2 torque Tm in order to be used as the compensating torque Tmadd. On the other hand, when the response at the time of operating the clutch CR is low, combustion stability at the time of starting the engine improves through normal engine start using the MG1 torque Tg (negative torque), but the required compensating torque Tmadd increases. Therefore, the electronic control unit 580 narrows the region of EV driving where the vehicle 510 travels by using the second electric rotary machine MG2 as a driving force source in a state where the operation of the engine 512 is stopped in the case where the response at the time of operating the clutch CR is low as compared to the case where the response at the time of operating the clutch CR is high.

Specifically, when the condition determination unit 586 determines that the response at the time of operating the clutch CR is high, the hybrid control unit 582 selects (sets) a first EV region as the region of the one-motor EV mode. On the other hand, when the condition determination unit 586 determines that the response at the time of operating the clutch CR is low, the hybrid control unit 582 selects (sets) a second EV region as the region of the one-motor EV mode. The first EV region is set such that, for example, a high load-side vehicle load region is wide (that is, a required driving torque is expanded to a higher torque region) as compared to the second EV region.

Figure 38:
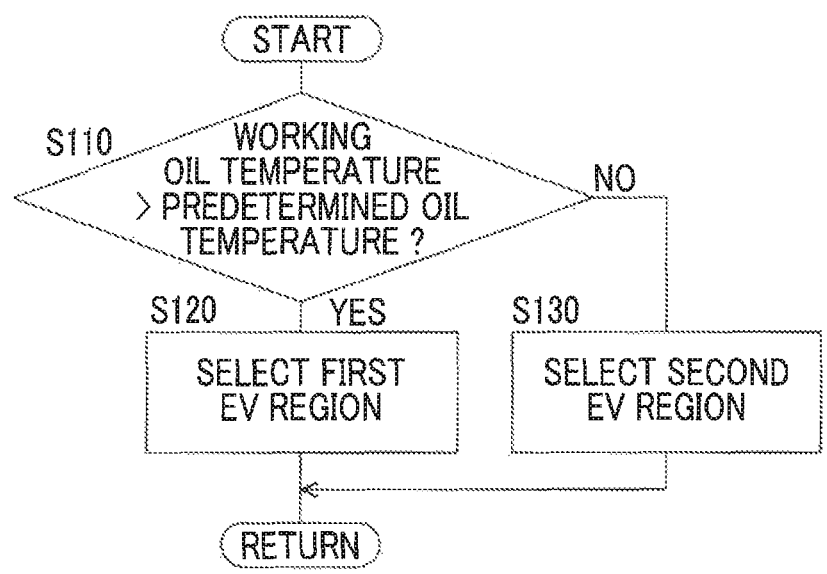
FIG. 38 is a flowchart that illustrates a relevant portion of control operations of the electronic control unit, that is, control operations for changing an EV region on the basis of a response at the time when the clutch CR is operated according to seventh and eleventh embodiments.

FIG. 38 is a flowchart that illustrates a relevant portion of control operations of the electronic control unit 580, that is, control operations for changing the EV region on the basis of a response at the time of operating the clutch CR. The flowchart is, for example, repeatedly executed during traveling.

In FIG. 38, initially, in S110 corresponding to the function of the condition determination unit 586, it is determined whether the response at the time of operating the clutch CR is high on the basis of whether the working oil temperature THoil is higher than the predetermined oil temperature. For example, whether the response at the time of operating the clutch CR may be determined on the basis of whether the working oil temperature THoil is lower than the second predetermined oil temperature (> the predetermined oil temperature). When affirmative determination is made in S110, the first EV region is selected (set) as the region of the one-motor EV mode in S120 corresponding to the function of the hybrid control unit 582. On the other hand, when negative determination is made in S110, the second EV region narrower than the first EV region is selected (set) as the region of the one-motor EV mode in S130 corresponding to the function of the hybrid control unit 582.

As described above, according to the present embodiment, the region of EV driving in the case where the response at the time of operating the clutch CR is low is narrower than the region of EV driving in the case where the response at the time of operating the clutch CR is high, so, at the time of starting the engine 512, a margin of the MG2 torque Tm tends to be reserved (that is, the compensating torque Tmadd that is generated by the second electric rotary machine MG2 tends to be reserved).

Figure 39:
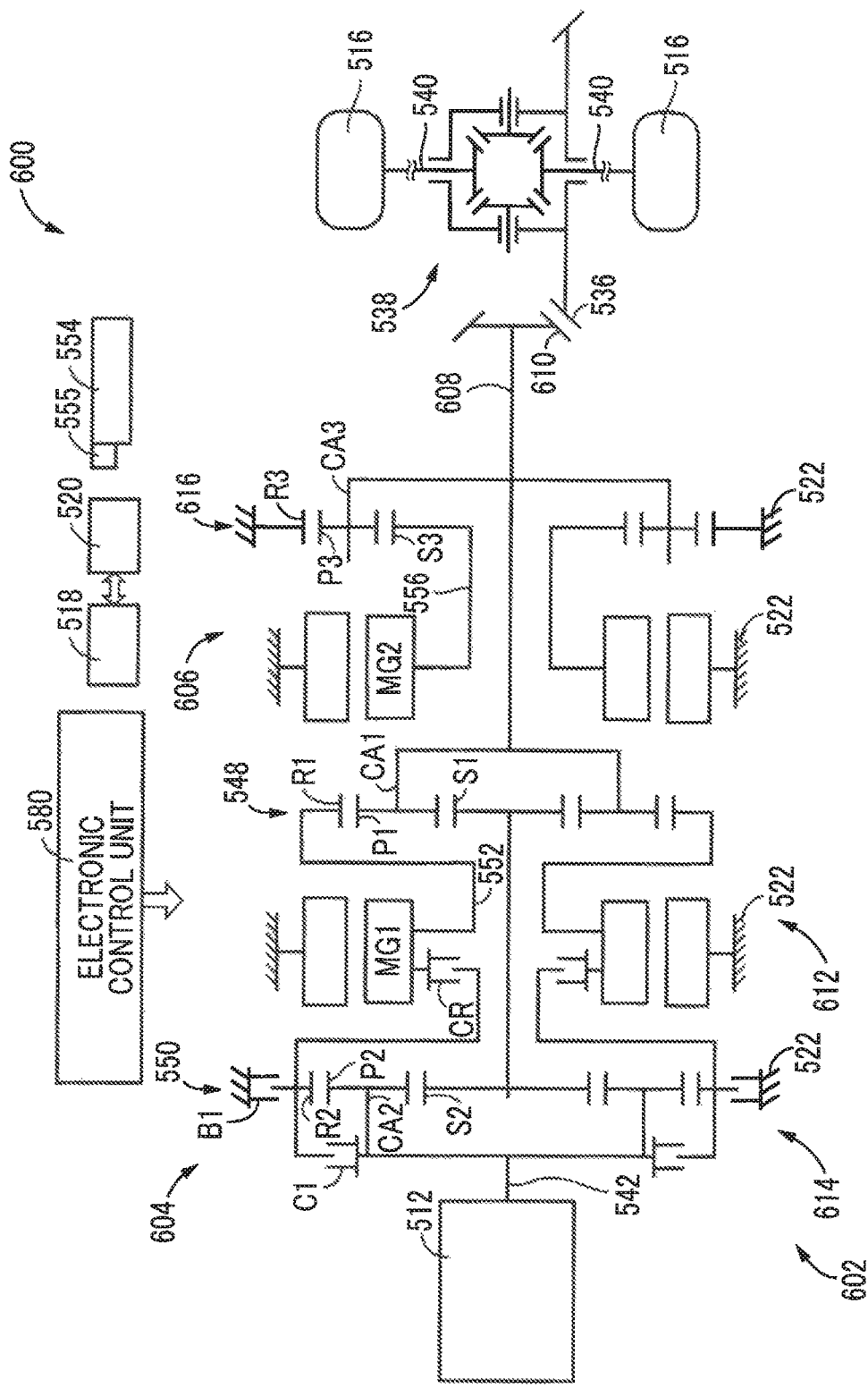
FIG. 39 is a view that illustrates the schematic configuration of devices regarding traveling of a vehicle according to an eighth embodiment and that also illustrates a vehicle different from the vehicle shown in FIG. 18.

FIG. 39 is a view that illustrates the schematic configuration of devices regarding traveling of a vehicle 600 according to an eighth embodiment. In FIG. 39, the vehicle 600 is a hybrid vehicle including the engine 512, the first electric rotary machine MG1, the second electric rotary machine MG2, a power transmission system 602 and the drive wheels 516. The power transmission system 602 includes the first electric rotary machine MG1 and the second electric rotary machine MG2.

The power transmission system 602 is provided in the power transmission path between the engine 512 and the drive wheels 516. The power transmission system 602 includes a first power transmission unit 604, a second power transmission unit 606, a drive pinion 610, the differential gear 538, and the like, inside the case 522. The drive pinion 610 is coupled to a drive shaft 608 that is the output rotating member of the first power transmission unit 604. The differential ring gear 536 is in mesh with the drive pinion 610 via the differential ring gear 536. The power transmission system 602 includes the axles 540 coupled to the differential gear 538, and the like.

The first power transmission unit 604 is arranged coaxially with the input shaft 542 that is an input rotating member of the first power transmission unit 604, and includes a second differential unit 612, a first differential unit 614 and the clutch CR. The second differential unit 612 includes the second planetary gear mechanism 548 (second differential mechanism) and the first electric rotary machine MG1. The first differential unit 614 includes the first planetary gear mechanism 550 (first differential mechanism), the clutch C1 and the brake B1.

In the second differential unit 612, the first sun gear S1 is the fourth rotating element RE4 as the input element coupled to the output rotating member (that is, the second sun gear S2 of the first planetary gear mechanism 550) of the first differential unit 614, and serves as the input rotating member of the second differential unit 612. The first ring gear R1 is coupled to the rotor shaft 552 of the first electric rotary machine MG1, and is the fifth rotating element RE5 that is a reaction element to which the first electric rotary machine MG1 is coupled such that power is transmittable. The first carrier CA1 is coupled to the drive shaft 608, and is the sixth rotating element RE6 that is an output element coupled to the drive wheels 516. The first carrier CA1 serves as an output rotating member of the second differential unit 612.

In the first differential unit 614, the second carrier CA2 is coupled to the input shaft 542, and is the first rotating element RE1 to which the engine 512 is coupled via the input shaft 542 such that power is transmittable. The second carrier CA2 serves as the input rotating member of the first differential unit 614. The second ring gear R2 is the third rotating element RE3 selectively coupled to the case 522 via the brake B1. The second sun gear S2 is the second rotating element RE2 coupled to the input rotating member (that is, the first sun gear S1 of the second planetary gear mechanism 548) of the second differential unit 612. The second sun gear S2 serves as an output rotating member of the first differential unit 614. The second carrier CA2 and the second ring gear R2 are selectively coupled to each other via the clutch C1. The first ring gear R1 and the second ring gear R2 are selectively coupled to each other via the clutch CR. Thus, the clutch C1 is the first engaging device that selectively couples the first rotating element RE1 to the third rotating element RE3. The clutch CR is the second engaging device that selectively couples the fifth rotating element RE5 to the third rotating element RE3. The brake B1 is the third engaging device that selectively couples the third rotating element RE3 to the case 522 that is the non-rotating member.

The second planetary gear mechanism 548 of the second differential unit 612 is able to serve as a power split mechanism that distributes the power of the engine 512, which is input to the first sun gear S1, between the first electric rotary machine MG1 and the first carrier CA1 in a state where differential motion is permitted. Thus, the vehicle 600 is able to perform engine driving by using a direct torque (also referred to as engine direct torque) and an MG2 torque Tm. The engine direct torque is mechanically transmitted to the first carrier CA1 by causing the first electric rotary machine MG1 to provide a reaction force against the engine torque Te that is input to the first sun gear S1. The MG2 torque Tm is generated by the second electric rotary machine MG2. The second electric rotary machine MG2 is driven by using electric power generated by the first electric rotary machine MG1 owing to a power distributed to the first electric rotary machine MG1. Thus, the second differential unit 612 serves as a known electrical differential unit (electrical continuously variable transmission). That is, the second differential unit 612 is an electrical transmission mechanism in which the differential status of the second planetary gear mechanism 548 is controlled as a result of control over the operation status of the first electric rotary machine MG1.

The first differential unit 614 is able to establish four states, that is, a direct-coupling state, an overdrive state, a neutral state and an internal lock state, by changing the operation statuses of the clutch C1 and brake B1. Specifically, when the clutch C1 is engaged, the first differential unit 614 is placed in the direct-coupling state where the rotating elements of the first planetary gear mechanism 550 rotate integrally. When the brake B1 is engaged, the first differential unit 614 is placed in the overdrive state where the rotation speed of the second sun gear S2 is increased from the engine rotation speed Ne. When the clutch C1 is released and the brake B1 is released, the first differential unit 614 is placed in the neutral state where the differential motion of the first planetary gear mechanism 550 is permitted. When the clutch C1 is engaged and the brake B1 is engaged, the first differential unit 614 is placed in the internal lock state where the rotation of each of the rotating elements of the first planetary gear mechanism 550 stops.

The first power transmission unit 604 is able to constitute an electrical continuously variable transmission that operates at a power split ratio different from a power split ratio in the second differential unit 612. That is, in the first power transmission unit 604, in addition to the fact that the first sun gear S1 (fourth rotating element RE4) is coupled to the second sun gear S2 (second rotating element RE2), the first ring gear R1 (fifth rotating element RE5) is coupled to the second ring gear R2 (third rotating element RE3) by engaging the clutch CR. As a result, the second differential unit 612 and the first differential unit 614 constitute one differential mechanism, the second differential unit 612 and the first differential unit 614 as a whole are allowed to serve as an electrical continuously variable transmission that operates at a power split ratio different from the power split ratio of the second differential unit 612 alone.

In the first power transmission unit 604, the first differential unit 614 and the second differential unit 612 by which the four states are established are coupled to each other, and the vehicle 600 is able to achieve a plurality of drive modes (described later) in synchronization with a change of the operation status of the clutch CR.

In the thus configured first power transmission unit 604, the power of the engine 512 and the power of the first electric rotary machine MG1 are transmitted to the drive shaft 608. Therefore, the engine 512 and the first electric rotary machine MG1 are coupled to the drive wheels 516 via the first power transmission unit 604 such that power is transmittable.

The second power transmission unit 606 is arranged coaxially with the input shaft 542 (or the drive shaft 608), and includes the second electric rotary machine MG2 and the third planetary gear mechanism 616 coupled to the drive shaft 608. The third planetary gear mechanism 616 is a known single-pinion planetary gear mechanism. The third planetary gear mechanism 616 includes the third sun gear S3, third pinion gears P3, a third carrier CA3, and a third ring gear R3. The third carrier CA3 supports the third pinion gears P3 such that each third pinion gear P3 is rotatable and revolvable. The third ring gear R3 is in mesh with the third sun gear S3 via the third pinion gears P3. The third sun gear S3 is an input element coupled to the rotor shaft 556 of the second electric rotary machine MG2. The third ring gear R3 is a reaction element coupled to the case 522. The third carrier CA3 is an output element coupled to the drive shaft 608. The thus configured third planetary gear mechanism 616 serves as a reduction mechanism that reduces the MG2 rotation speed Nm and transmits the MG2 rotation speed Nm to the drive shaft 608. Thus, in the second power transmission unit 606, the power of the second electric rotary machine MG2 is transmitted to the drive shaft 608 without passing through the first power transmission unit 604. Therefore, the second electric rotary machine MG2 is coupled to the drive wheels 516 such that power is transmittable without passing through the first power transmission unit 604.

The thus configured power transmission system 602 is suitably used for a front-engine rear-drive (FF) vehicle. In the power transmission system 602, the power of the engine 512, the power of the first electric rotary machine MG1 or the power of the second electric rotary machine MG2 is transmitted to the drive shaft 608, and is transmitted from the drive shaft 608 to the drive wheels 516 via the differential gear 538, the axles 540, and the like, sequentially.

The vehicle 600 includes the electronic control unit 580 including a controller that controls the devices regarding traveling. The vehicle 600 further includes the power control unit 518, the battery unit 520, the hydraulic control circuit 554, the EOP 555, and the like.

The drive modes that are allowed to be performed by the vehicle 600 will be described with reference to FIG. 40, and FIG. 41 to FIG. 48. FIG. 40 is an operation engagement chart that shows the operation status of each of the clutch C1, the brake B1 and the clutch CR in each drive mode. A circle mark, a blank, a triangle mark, "G" and "M" in the chart of FIG. 40 are the same as those of FIG. 19 according to the above-described sixth embodiment, so the description is omitted. As shown in FIG. 40, the vehicle 600 is able to selectively execute an EV drive mode and an HV drive mode as a drive mode.

FIG. 41 to FIG. 48 are nomographs that relatively show the rotation speeds of rotating elements RE1 to RE6 in the second planetary gear mechanism 548 and the first planetary gear mechanism 550. In these nomographs, vertical lines Y1 to Y4 represent the rotation speeds of the rotating elements. In order from the left side when facing toward the sheet, the vertical line Y1 represents the rotation speed of the first ring gear R1 that is the fifth rotating element RE5 coupled to the first electric rotary machine MG1 and the rotation speed of the second ring gear R2 that is the third rotating element RE3 that is selectively coupled to the case 522 via the brake B, the vertical line Y2 represents the rotation speed of the second carrier CA2 that is the first rotating element RE1 coupled to the engine 512, the vertical line Y3 represents the rotation speed of the first carrier CA1 that is the sixth rotating element RE6 coupled to the drive shaft 608, and the vertical line Y4 represents the rotation speed of the first sun gear S1 that is the fourth rotating element RE4 and the rotation speed of the second sun gear S2 that is the second rotating element RE2, the first sun gear S1 and the second sun gear S2 being coupled to each other. Various marks, that is, an open square mark, an open circle mark, an open rhombus mark, a solid circle mark, a solid rhombus mark, an arrow, clutch C1, continuous line and dashed line, are the same as those of FIG. 20 to FIG. 27 of the above-described sixth embodiment, so the description is omitted.

Figure 41:
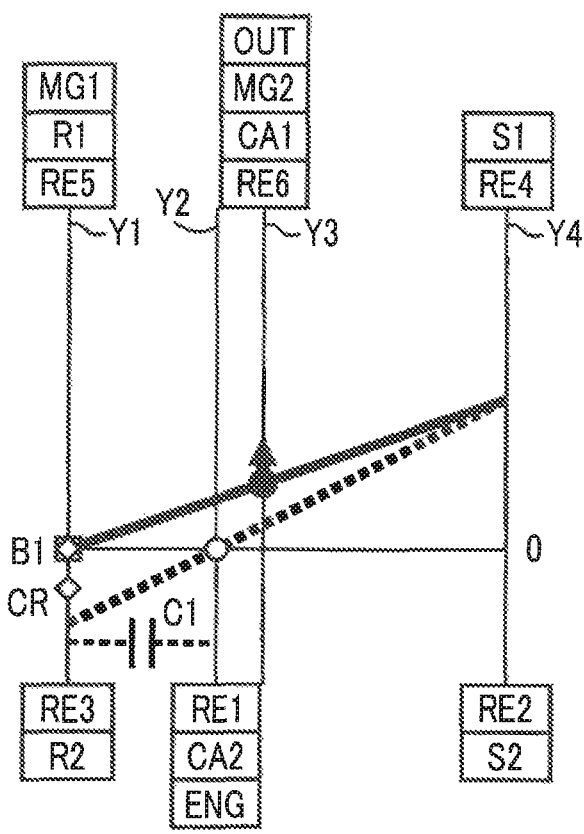
FIG. 41 is a nomograph in one-motor EV mode in the vehicle shown in FIG. 39.

FIG. 41 is a nomograph in one-motor EV mode. As shown in FIG. 40, the one-motor EV mode is achieved in a state where all the clutch C1, the brake B1 and the clutch CR are released. The hybrid control unit 582 stops the operation of the engine 512, and outputs the MG2 torque Tm for propelling the vehicle 600 from the second electric rotary machine MG2. FIG. 41 shows a case at the time when the vehicle 600 travels forward in a state where the second electric rotary machine MG2 rotates in the positive direction (that is, the rotation direction of the first carrier CA1 at the time when the vehicle 600 travels forward) to output a positive torque. At the time when the vehicle 600 travels backward, the second electric rotary machine MG2 is rotated in the reverse direction in contrast to the operation at the time when the vehicle 600 travels forward. When engine brake is additionally used, the clutch C1 or the clutch CR is engaged (see engine brake is additionally used in the one-motor EV mode) as shown in FIG. 40. Engine brake is allowed to function by engaging the brake B1.

Figure 42:
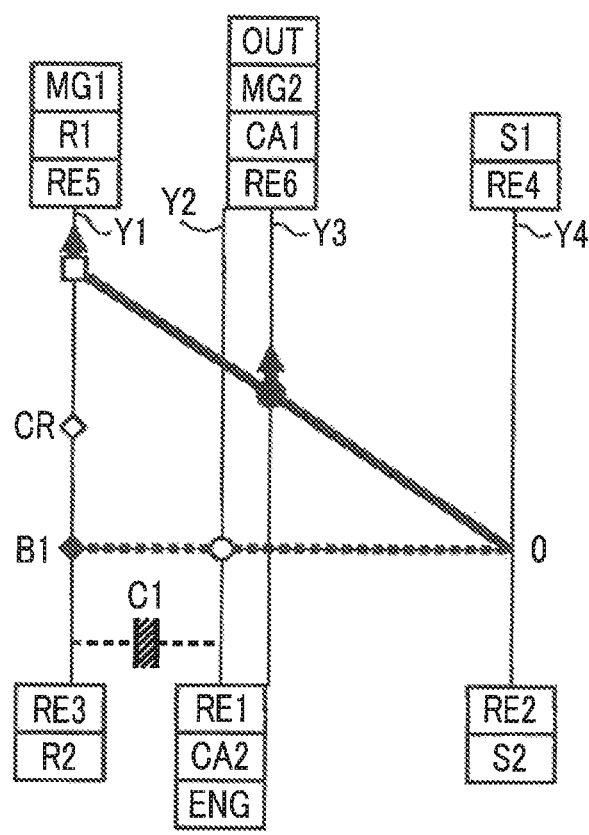
FIG. 42 is a nomograph in two-motor EV mode in the vehicle shown in FIG. 39.

FIG. 42 is a nomograph in two-motor EV mode. As shown in FIG. 40, the two-motor EV mode is achieved in a state where the clutch C1 and the brake B1 are engaged and the clutch CR is released. The hybrid control unit 582 stops the operation of the engine 512, and causes the first electric rotary machine MG1 and the second electric rotary machine MG2 to output the MG1 torque Tg and the MG2 torque Tm for propelling the vehicle 600. FIG. 42 shows a case at the time when the vehicle 600 travels forward in a state where both the first electric rotary machine MG1 and the second electric rotary machine MG2 rotate in the positive direction to output a positive torque. At the time when the vehicle 600 travels backward, the first electric rotary machine MG1 and the second electric rotary machine MG2 are rotated in the reverse direction in contrast to the operation at the time when the vehicle 600 travels forward.

Figure 43:
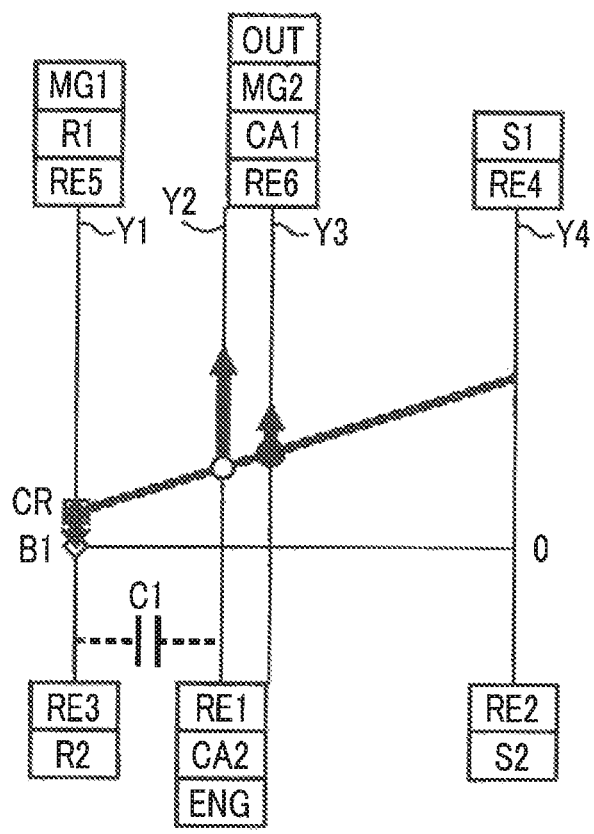
FIG. 43 is a nomograph at the time when the vehicle travels forward in O/D HV mode in HV drive mode in the vehicle shown in FIG. 39.
Figure 44:
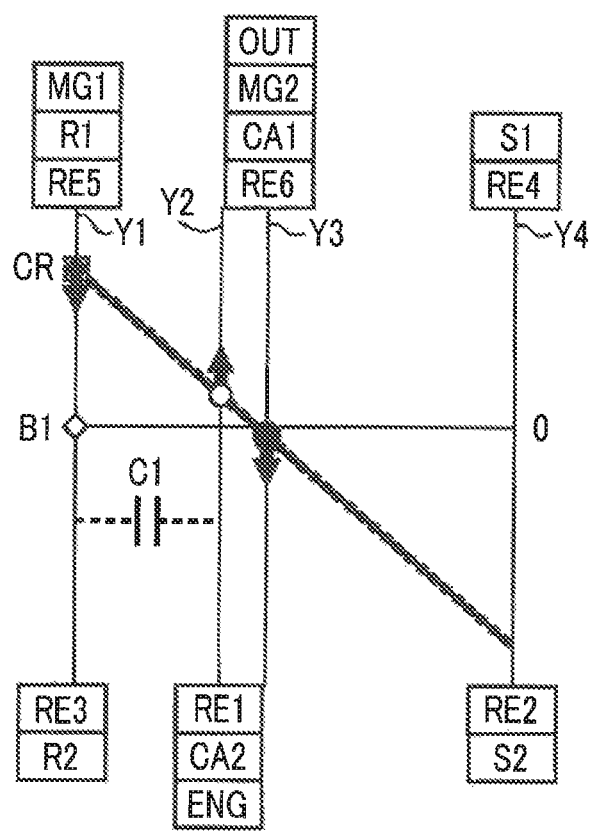
FIG. 44 is a nomograph at the time when the vehicle travels backward in the O/D HV mode in the HV drive mode in the vehicle shown in FIG. 39.

FIG. 43 is a nomograph at the time when the vehicle 600 travels forward in O/D HV mode in the HV drive mode. FIG. 44 is a nomograph at the time when the vehicle 600 travels backward in the O/D HV mode in the HV drive mode. As shown in FIG. 40, forward traveling in the O/D HV mode and backward traveling in the O/D HV mode each are achieved in a state where the clutch C1 and the brake B1 are released and the clutch CR is engaged. In the O/D HV mode, the second differential unit 612 and the first differential unit 614 as a whole constitute an electrical continuously variable transmission that operates at a power split ratio different from the power split ratio of the second differential unit 612 alone. Thus, the first power transmission unit 604 is able to distribute the power of the engine 512, which is input to the second carrier CA2, between the first ring gear R1 and the first carrier CA1. That is, in the first power transmission unit 604, the engine direct torque is mechanically transmitted to the first carrier CA1 by causing the first electric rotary machine MG1 to provide a reaction force against the engine torque Te that is input to the second carrier CA2, and electric power generated by the first electric rotary machine MG1 by using the power of the engine 512, distributed to the first electric rotary machine MG1, is transmitted to the second electric rotary machine MG2 via a predetermined electrical path. The hybrid control unit 582 causes the engine 512 to operate, causes the MG1 torque Tg, which is a reaction torque against the engine torque Te, to be output through power generation of the first electric rotary machine MG1, and causes the MG2 torque Tm to be output from the second electric rotary machine MG2 by using electric power generated by the first electric rotary machine MG1. FIG. 43 shows a case at the time when the vehicle 600 travels forward in a state where the second electric rotary machine MG2 rotates in the positive direction to output a positive torque. FIG. 44 shows a case at the time when the vehicle 600 travels backward in a state where the second electric rotary machine MG2 rotates in the negative direction to output a negative torque.

Figure 45:
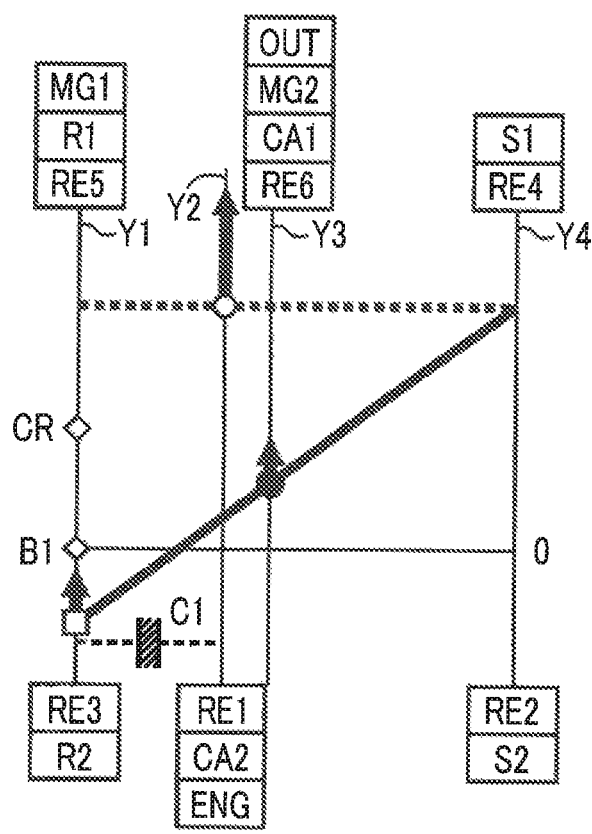
FIG. 45 is a nomograph at the time when the vehicle travels forward in U/D HV mode in the HV drive mode in the vehicle shown in FIG. 39 in the case of low gear input.
Figure 46:
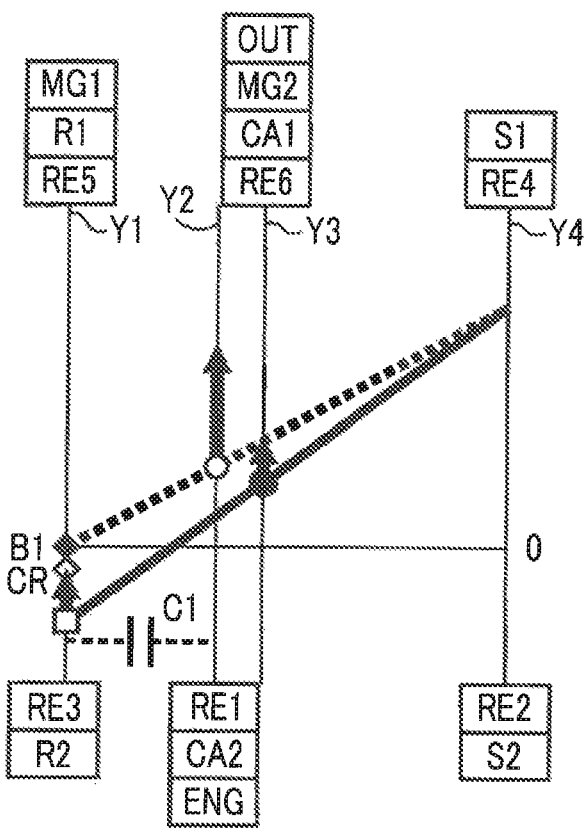
FIG. 46 is a nomograph at the time when the vehicle travels forward in the U/D HV mode in the HV drive mode in the vehicle shown in FIG. 39 in the case of high gear input.

FIG. 45 is a nomograph at the time when the vehicle 600 travels forward in U/D HV mode in the HV drive mode, and shows a case of low gear input where the engine rotation speed Ne is input at a constant speed to the components that achieve the function of the electrical continuously variable transmission. FIG. 46 is a nomograph at the time when the vehicle 600 travels forward in U/D HV mode in the HV drive mode, and shows a case of high gear input where the engine rotation speed Ne is increased in speed and input to the components that achieve the function of the electrical continuously variable transmission. As shown in FIG. 40, low gear input in the U/D HV mode (hereinafter, referred to as U/D HV mode Lo) is achieved in a state where the clutch C1 is engaged and the brake B1 and the clutch CR are released. As shown in FIG. 40, high gear input in the U/D HV mode (hereinafter, referred to as U/D HV mode Hi) is achieved in a state where the brake B1 is engaged and the clutch C1 and the clutch CR are released. In the U/D HV mode Lo, the clutch C1 is engaged and the brake B1 is released, and the first differential unit 614 is placed in the direct-coupling state, so the power of the engine 512 is transmitted to the first sun gear S1 coupled to the second sun gear S2 in a state where the engine rotation speed Ne remains unchanged. On the other hand, in the U/D HV mode Hi, the clutch C1 is released and the brake B1 is engaged, and the first differential unit 614 is placed in the overdrive state, so the power of the engine 512 is transmitted to the first sun gear S1 coupled to the second sun gear S2 in a state where the engine rotation speed Ne is increased. In addition, in the U/D HV mode, the clutch CR is released, so the second differential unit 612 alone constitutes the electrical continuously variable transmission. Thus, the first power transmission unit 604 is able to distribute the power of the engine 512, which is input to the first sun gear S1, between the first ring gear R1 and the first carrier CA1. That is, in the first power transmission unit 604, the engine direct torque is mechanically transmitted to the first carrier CA1 by causing the first electric rotary machine MG1 to provide a reaction force against the engine torque Te that is input to the first sun gear S1, and electric power generated by the first electric rotary machine MG1 by using the power of the engine 512, distributed to the first electric rotary machine MG1, is transmitted to the second electric rotary machine MG2 via a predetermined electrical path. The hybrid control unit 582 causes the engine 512 to operate, causes the MG1 torque Tg that is a reaction torque against the engine torque Te to be output through power generation of the first electric rotary machine MG1, and causes the MG2 torque Tm to be output from the second electric rotary machine MG2 by using electric power generated by the first electric rotary machine MG1. FIG. 45 and FIG. 46 each show a case at the time when the vehicle 600 travels forward in a state where the second electric rotary machine MG2 is outputting a positive torque in the positive direction. At the time when the vehicle 600 travels backward, the second electric rotary machine MG2 is rotated in the reverse direction in contrast to the operation at the time when the vehicle 600 travels forward.

As described with reference to FIG. 43 to FIG. 46, the O/D HV mode and the U/D HV mode differ from each other in the rotating element, to which the power of the engine 512 is input, in the components that achieve the function of the electrical continuously variable transmission, so the O/D HV mode and the U/D HV mode differ from each other in the power split ratio at the time when the first power transmission unit 604 is caused to serve as the electrical continuously variable transmission. The engine direct torque in the O/D HV mode is reduced from the engine torque Te. On the other hand, the engine direct torque in the U/D HV mode Lo is increased from the engine torque Te. In the present embodiment, the second differential unit 612 alone constitutes the electrical continuously variable transmission in the U/D HV mode (see FIG. 45 and FIG. 46). Thus, when the differential status of the second differential unit 612 is controlled as a result of control over the operation status of the first electric rotary machine MG1 in a state where the clutch C1 is engaged and the clutch CR is released, a torque increased from the engine torque Te is mechanically transmitted to the first carrier CA1.

Figure 47:
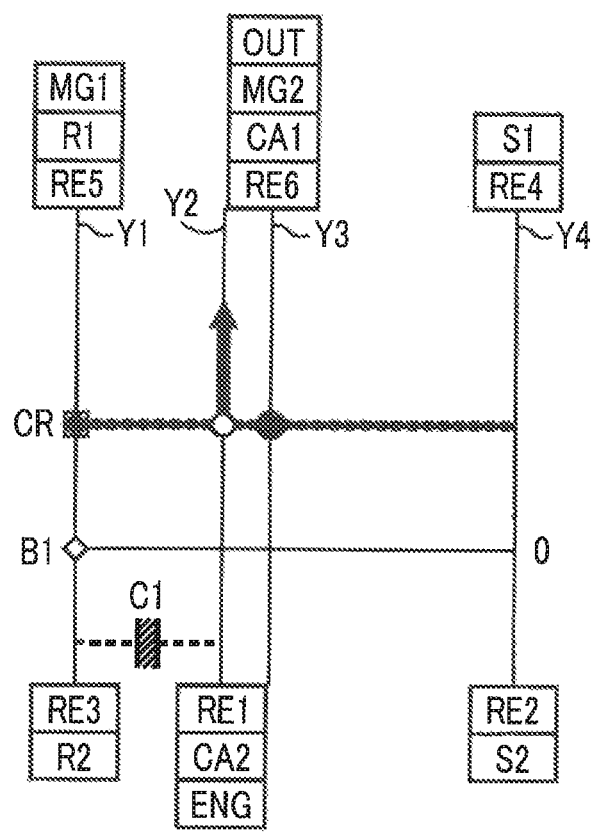
FIG. 47 is a nomograph in fixed gear mode in the HV drive mode in the vehicle shown in FIG. 39 in the case of direct coupling.

FIG. 47 is a nomograph in fixed gear mode in the HV drive mode, and shows a case of direct coupling where the rotating elements of the second differential unit 612 and first differential unit 614 are integrally rotated. As shown in FIG. 40, the direct-coupling fixed gear mode is achieved in a state where the clutch C1 and the clutch CR are engaged and the brake B1 is released. Thus, the first power transmission unit 604 is able to directly output the power of the engine 512 from the first carrier CA1. The hybrid control unit 582 causes the engine 512 to output the engine torque Te for propelling the vehicle 600. Thus, the hybrid control unit 582 is allowed to not only cause the engine torque Te to be output but also cause at least one of the first electric rotary machine MG1 and the second electric rotary machine MG2 to output a torque for propelling the vehicle 600.

Figure 48:
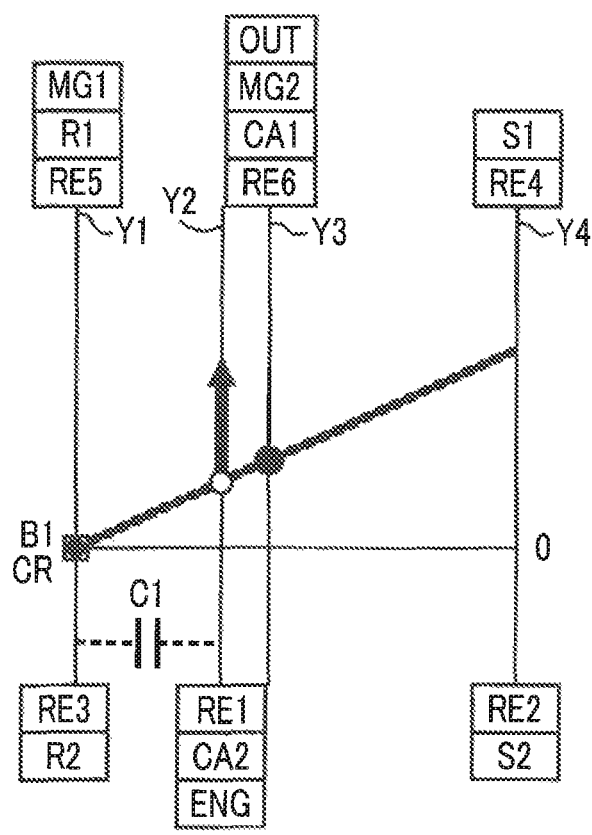
FIG. 48 is a nomograph in the fixed gear mode in the HV drive mode in the vehicle shown in FIG. 39 in the case of O/D.

FIG. 48 is a nomograph in the fixed gear mode in the HV drive mode, and shows a case of overdrive (O/D) where the rotation of the engine 512 is increased in speed and output from the first carrier CA1. As shown in FIG. 40, the O/D in the fixed gear mode (hereinafter, referred to as O/D fixed gear mode) is achieved in a state where the brake B1 and the clutch CR are engaged and the clutch C1 is released. In the O/D fixed gear mode, the clutch CR is engaged, so the second differential unit 612 and the first differential unit 614 constitute one differential mechanism. In addition, in the O/D fixed gear mode, the brake B1 is engaged and the clutch C1 is released, so the first differential unit 614 is placed in the overdrive state. Thus, in the first power transmission unit 604, the rotation of the engine 512, which is input to the second carrier CA2, is increased in speed and output from the first carrier CA1. The hybrid control unit 582 causes the engine 512 to output the engine torque Te for propelling the vehicle 600. Thus, the hybrid control unit 582 is allowed to not only cause the engine torque Te to be output but also cause the second electric rotary machine MG2 to output a torque for propelling the vehicle 600. The O/D fixed gear mode is effective in, for example, improvement of fuel consumption during high-speed traveling.

The hybrid control unit 582 determines which drive mode should be established by applying the vehicle speed V and the vehicle load (for example, required driving torque) to the drive mode change map as shown in FIG. 30 or FIG. 31 of the above-described sixth embodiment. When the determined drive mode is the current drive mode, the hybrid control unit 582 maintains the current drive mode. When the determined drive mode is different from the current drive mode, the hybrid control unit 582 establishes the determined drive mode instead of the current drive mode. In the present embodiment, in the region of each of the direct-coupling fixed gear modes shown in FIG. 30 and FIG. 31, a high vehicle speed-side region may be set for the region of the O/D fixed gear mode.

The power transmission changing unit 584 controls engaging operations (operation statuses) of the clutch C1, brake B1 and clutch CR on the basis of the drive mode established by the hybrid control unit 582. The power transmission changing unit 584 outputs the hydraulic control command signal Sp for engaging and/or releasing each of the clutch C1, the brake B1 and the clutch CR to the hydraulic control circuit 554 in order to allow transmission of power for traveling in the drive mode established by the hybrid control unit 582.

Thus, when the engine 512 is started in the one-motor EV mode, the electronic control unit 580 sets the clutch C1, the clutch CR or the brake B1 to an engaged state, and, in this state, ignites fuel while increasing the engine rotation speed Ne with the use of the first electric rotary machine MG1 as needed. In such a start of the engine, the electronic control unit 580 additionally causes the second electric rotary machine MG2 to output the compensating torque Tmadd as a reaction force cancellation torque.

In the vehicle 600 according to the present embodiment, as in the case of the vehicle 510 of the above-described sixth and seventh embodiments, there is a concern that the second electric rotary machine MG2 cannot sufficiently compensate for a drop of driving torque and, as a result, it is not possible to reduce a shock at the time of starting the engine. In contrast, in the vehicle 600 according to the present embodiment, as in the case of the vehicle 510 of the above-described sixth and seventh embodiments, CR clutch engaging engine start is executed. That is, the control operations of the electronic control unit 580, shown in the above-described sixth and seventh embodiments, are allowed to be applied to the vehicle 600 according to the present embodiment. Thus, according to the present embodiment, similar advantageous effects to those of the above-described sixth and seventh embodiments are obtained.

Figure 49:
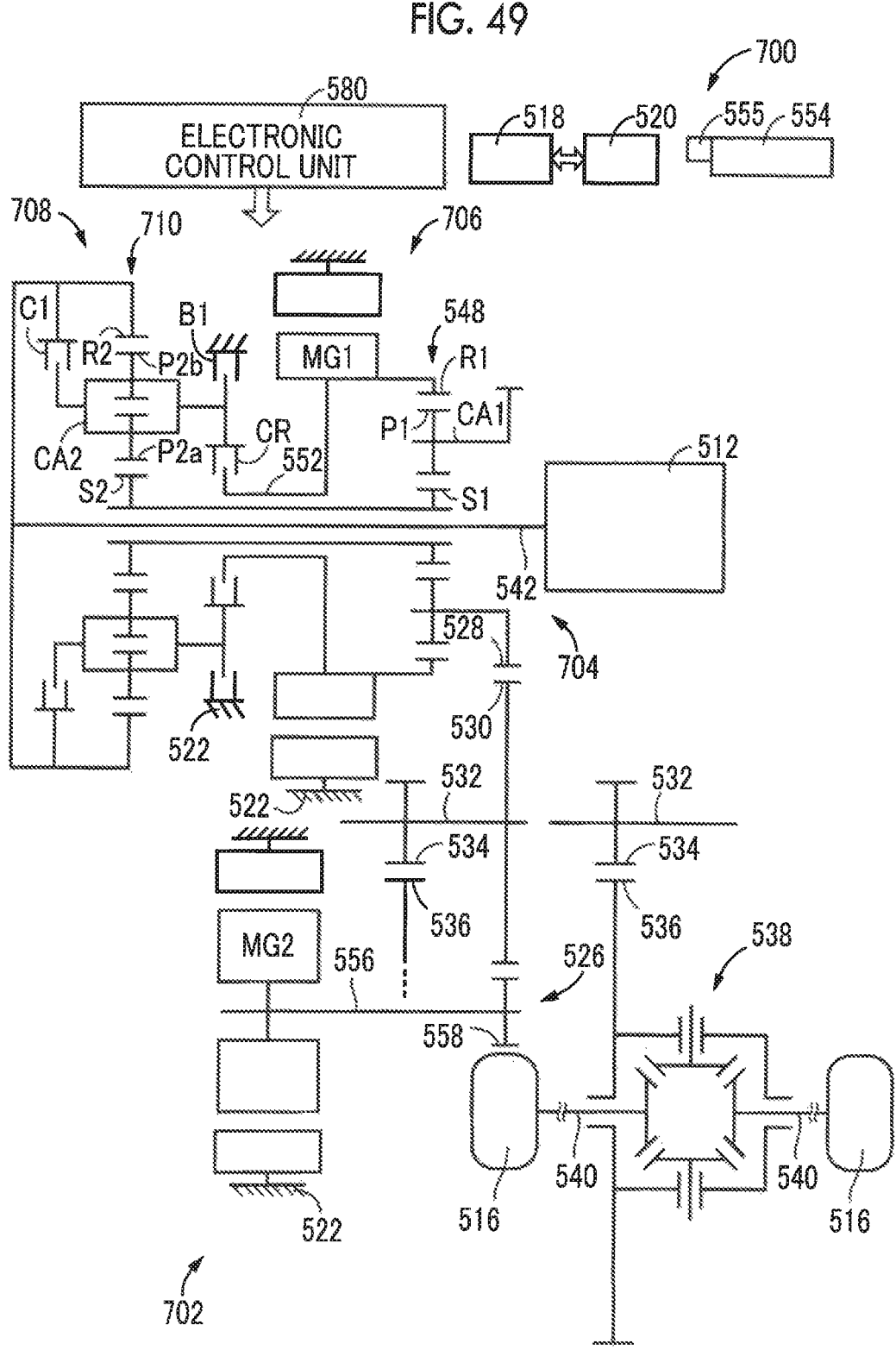
FIG. 49 is a view that illustrates the schematic configuration of devices regarding traveling of a vehicle according to a ninth embodiment and that also illustrates a vehicle different from the vehicle shown in FIG. 18 or the vehicle shown in FIG. 39.

FIG. 49 is a view that illustrates the schematic configuration of devices regarding traveling of a vehicle 700 according to a ninth embodiment. In FIG. 49, the vehicle 700 is a hybrid vehicle including the engine 512, the first electric rotary machine MG1, the second electric rotary machine MG2, a power transmission system 702 and the drive wheels 516. The power transmission system 702 includes the first electric rotary machine MG1 and the second electric rotary machine MG2.

The power transmission system 702 is provided in the power transmission path between the engine 512 and the drive wheels 516. The power transmission system 702 includes a first power transmission unit 704, the second power transmission unit 526, the driven gear 530, the driven shaft 532, the final gear 534 (which has a smaller diameter than the driven gear 530), the differential gear 538, and the like, inside the case 522. The driven gear 530 is in mesh with the drive gear 528. The drive gear 528 is an output rotating member of the first power transmission unit 704. The driven gear 530 is fixed to the driven shaft 532 so as to be relatively non-rotatable. The final gear 534 is fixed to the driven shaft 532 so as to be relatively non-rotatable. The differential gear 538 is in mesh with the final gear 534 via the differential ring gear 536. The power transmission system 702 includes the axles 540, coupled to the differential gear 538, and the like.

The first power transmission unit 704 is arranged coaxially with the input shaft 542 that is an input rotating member of the first power transmission unit 704, and includes a second differential unit 706, a first differential unit 708 and the clutch CR. The second differential unit 706 includes the second planetary gear mechanism 548 (second differential mechanism) and the first electric rotary machine MG1. The first differential unit 708 includes a first planetary gear mechanism 710 (first differential mechanism), the clutch C1 and the brake B1. The first planetary gear mechanism 710 is a known double-pinion planetary gear mechanism. The first planetary gear mechanism 710 includes the second sun gear S2, a plurality of pairs of mutually meshing second pinion gears P2a, P2b, the second carrier CA2, and the second ring gear R2. The second carrier CA2 supports the second pinion gears P2a, P2b such that each of the second pinion gears P2a, P2b is rotatable and revolvable. The second ring gear R2 is in mesh with the second sun gear S2 via the second pinion gears P2a, P2b. The first planetary gear mechanism 710 serves as a differential mechanism that provides differential action In the second differential unit 706, the first sun gear S1 is the fourth rotating element RE4 as the input element coupled to the output rotating member (that is, the second sun gear S2 of the first planetary gear mechanism 710) of the first differential unit 708, and serves as the input rotating member of the second differential unit 706. The first ring gear R1 is coupled to the rotor shaft 552 of the first electric rotary machine MG1, and is the fifth rotating element RE5 that is a reaction element to which the first electric rotary machine MG1 is coupled such that power is transmittable. The first carrier CA1 is integrally coupled to the drive gear 528, and is the fifth rotating element RE5 that is an output element coupled to the drive wheels 516. The first carrier CA1 serves as an output rotating member of the second differential unit 706.

In the first differential unit 708, the second ring gear R2 is coupled to the input shaft 542, and is the first rotating element RE1 to which the engine 512 is coupled via the input shaft 542 such that power is transmittable. The second ring gear R2 serves as the input rotating member of the first differential unit 708. The second carrier CA2 is the third rotating element RE3 selectively coupled to the case 522 via the brake B1. The second sun gear S2 is the second rotating element RE2 coupled to the input rotating member (that is, the first sun gear S1 of the second planetary gear mechanism 548) of the second differential unit 706. The second sun gear S2 serves as an output rotating member of the first differential unit 708. The second carrier CA2 and the second ring gear R2 are selectively coupled to each other via the clutch C1. The first ring gear R1 and the second carrier CA2 are selectively coupled to each other via the clutch CR. Thus, the clutch C1 is the first engaging device that selectively couples the first rotating element RE1 to the third rotating element RE3. The clutch CR is the second engaging device that selectively couples the fifth rotating element RE5 to the third rotating element RE3. The brake B1 is the third engaging device that selectively couples the third rotating element RE3 to the case 522 that is the non-rotating member.

The second planetary gear mechanism 548 of the second differential unit 612 is able to serve as a power split mechanism that distributes the power of the engine 512, which is input to the first sun gear S1, between the first electric rotary machine MG1 and the first carrier CA1 in a state where differential motion is permitted. Thus, the vehicle 700 is able to perform engine driving by using a direct torque (also referred to as engine direct torque) and an MG2 torque Tm. The engine direct torque is mechanically transmitted to the first carrier CA1 by causing the first electric rotary machine MG1 to provide a reaction force against the engine torque Te that is input to the first sun gear S1. The MG2 torque Tm is generated by the second electric rotary machine MG2. The second electric rotary machine MG2 is driven by using electric power generated by the first electric rotary machine MG1 owing to a power distributed to the first electric rotary machine MG1. Thus, the second differential unit 706 serves as a known electrical differential unit (electrical continuously variable transmission). That is, the second differential unit 706 is an electrical transmission mechanism in which the differential status of the second planetary gear mechanism 548 is controlled as a result of control over the operation status of the first electric rotary machine MG1.

The first differential unit 708 is able to establish four states, that is, a direct-coupling state, an overdrive state, a neutral state and an internal lock state, by changing the operation statuses of the clutch C1 and brake B1. Specifically, when the clutch C1 is engaged, the first differential unit 708 is placed in the direct-coupling state where the rotating elements of the first planetary gear mechanism 710 rotate integrally. When the brake B1 is engaged, the first differential unit 708 is placed in the overdrive state where the rotation speed of the second sun gear S2 is increased from the engine rotation speed Ne. When the clutch C1 is released and the brake B1 is released, the first differential unit 708 is placed in the neutral state where the differential motion of the first planetary gear mechanism 710 is permitted. When the clutch C1 is engaged and the brake B1 is engaged, the first differential unit 708 is placed in the internal lock state where the rotation of each of the rotating elements of the first planetary gear mechanism 710 stops.

The first power transmission unit 704 is able to constitute an electrical continuously variable transmission that operates at a power split ratio different from a power split ratio in the second differential unit 706. That is, in the first power transmission unit 704, in addition to the fact that the first sun gear S1 (fourth rotating element RE4) is coupled to the second sun gear S2 (second rotating element RE2), the first ring gear R1 (fifth rotating element RE5) is coupled to the second carrier CA2 (third rotating element RE3) by engaging the clutch CR. As a result, the second differential unit 706 and the first differential unit 708 constitute one differential mechanism, the second differential unit 706 and the first differential unit 708 as a whole are allowed to serve as an electrical continuously variable transmission that operates at a power split ratio different from the power split ratio of the second differential unit 706 alone.

In the first power transmission unit 704, the first differential unit 708 and the second differential unit 706 by which the four states are established are coupled to each other, and the vehicle 700 is able to achieve a plurality of drive modes in synchronization with a change of the operation status of the clutch CR.

In the thus configured first power transmission unit 704, the power of the engine 512 and the power of the first electric rotary machine MG1 are transmitted from the drive gear 528 to the driven gear 530. Therefore, the engine 512 and the first electric rotary machine MG1 are coupled to the drive wheels 516 via the first power transmission unit 704 such that power is transmittable.

In the second power transmission unit 526, the power of the second electric rotary machine MG2 is transmitted to the driven gear 530 without passing through the first power transmission unit 704. Therefore, the second electric rotary machine MG2 is coupled to the drive wheels 516 such that power is transmittable without passing through the first power transmission unit 704. That is, the second electric rotary machine MG2 is an electric rotary machine coupled to the axles 540 that are the output rotating member of the power transmission system 702 such that power is transmittable without passing through the first power transmission unit 704.

The thus configured power transmission system 702 is suitably used for an FF vehicle. In the power transmission system 702, the power of the engine 512, the power of the first electric rotary machine MG1 or the power of the second electric rotary machine MG2 is transmitted to the driven gear 530, and is transmitted from the driven gear 530 to the drive wheels 516 via the final gear 534, the differential gear 538, the axles 540, and the like, sequentially. In the vehicle 700, the engine 512, the first power transmission unit 704 and the first electric rotary machine MG1 are arranged along the axis different from the axis along which the second electric rotary machine MG2 is arranged, so the axial length is reduced.

The vehicle 700 includes the electronic control unit 580 including a controller that controls the devices regarding traveling. The vehicle 700 further includes the power control unit 518, the battery unit 520, the hydraulic control circuit 554, the EOP 555, and the like.

Figure 50:
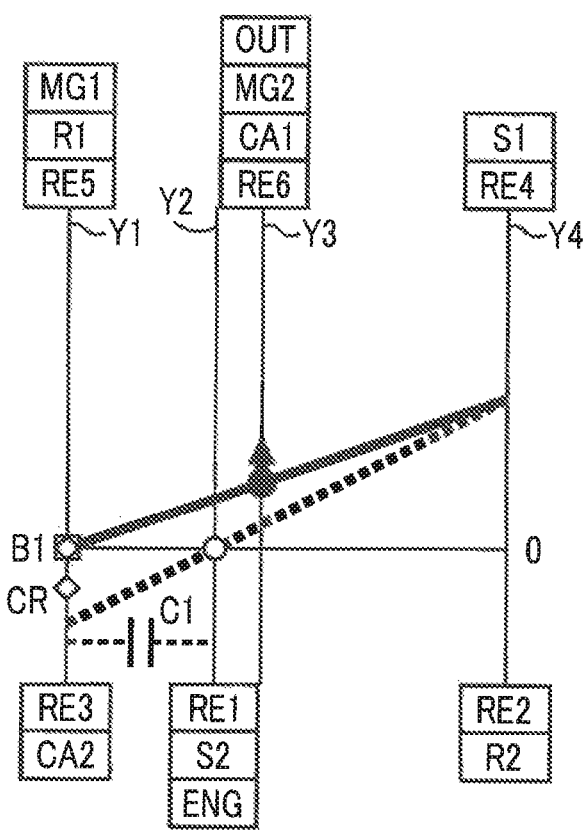
FIG. 50 is a nomograph in one-motor EV mode in the vehicle shown in FIG. 49.

The vehicle 700 is able to selectively execute an EV drive mode and an HV drive mode as a drive mode. Each drive mode that is allowed to be executed in the vehicle 700 and the operation statuses of the engaging devices in each drive mode are the same as each drive mode and the operation statuses of the engaging devices, shown in the chart of FIG. 40 of the above-described eighth embodiment. Since the first planetary gear mechanism 710 is a double-pinion planetary gear mechanism in the present embodiment, nomographs corresponding to the drive modes are the same as nomographs obtained by interchanging the second carrier CA2 and the second ring gear R2 with each other in the nomographs of FIG. 41 to FIG. 48 of the above-described sixth embodiment. Therefore, description with reference to the nomographs is omitted. FIG. 50 is a nomograph that is obtained by interchanging the second carrier CA2 and the second ring gear R2 with each other in FIG. 41. Nomographs that are obtained by interchanging the second carrier CA2 and the second ring gear R2 with each other in FIG. 42 to FIG. 48 are not shown.

As in the case of the above-described eighth embodiment, the control operations of the electronic control unit 580, shown in the above-described sixth and seventh embodiments, are allowed to be applied to the vehicle 700 according to the present embodiment. Thus, according to the present embodiment, similar advantageous effects to those of the above-described seventh and eighth embodiments are obtained.

The sixth to ninth embodiments are described in detail with reference to the accompanying drawings; however, the disclosed technical feature is applicable to other embodiments.

For example, in the above-described embodiments, as shown in the flowchart of FIG. 36, CR clutch engaging engine start or normal engine start is selected and executed on the basis of whether the compensating torque Tmadd that is generated by the second electric rotary machine MG2 is insufficient and the working oil temperature THoil; however, the invention is not limited to this configuration. For example, an embodiment in which the engine start method is changed on the basis of whether the compensating torque Tmadd is insufficient or the working oil temperature THoil may be employed or an embodiment in which the engine is constantly started through CR clutch engaging engine start may be employed. In these embodiments, S10, S20, 870 in the flowchart of FIG. 36 are omitted as needed. An embodiment in which MG1 assist is not performed at the time of starting the engine through CR clutch engaging engine start may also be employed. In this embodiment, S40, 550, S60 in the flowchart of FIG. 36 are omitted. When the clutch CR is configured to change its operation status depending on electrical power, whether to execute CR clutch engaging engine start may be determined on the basis of the status of an electrical power supply source. In this way, the steps of the flowchart of FIG. 36 can be changed as needed.

In the above-described embodiments, the first engaging device is the clutch C1 that selectively couples the first rotating element RE1 to the third rotating element RE3; however, the invention is not limited to this configuration. For example, the first engaging device may be a clutch that selectively couples the first rotating element RE1 to the second rotating element RE2 or may be a clutch that selectively couples the third rotating element RE3 to the second rotating element RE2. In short, the first engaging device just needs to be a clutch that is configured to couple any two of the first rotating element RE1, the second rotating element RE2 and the third rotating element RE3.

In the above-described embodiments, each of the second differential units 544, 612, 706 includes the single-pinion second planetary gear mechanism 548. Instead, each of the second differential units 544, 612, 706 may include a double-pinion planetary gear mechanism. In the case of a double-pinion planetary gear mechanism, one of the sun gear and the carrier is the fourth rotating element, the other is the sixth rotating element, and the ring gear is the fifth rotating element.

In the above-described embodiments, each of the vehicles 510, 600, 700 includes the brake B1. Instead, the brake B1 does not always need to be provided. Even when each of the vehicles 510, 600, 700 does not include the brake B1, each of the vehicles 510, 600, 700 is able to selectively establish the one-motor EV mode or the HV drive mode, and is able to change the control mode between the O/D HV mode and the U/D HV mode in the HV drive mode. In short, as long as a vehicle includes the engine 512, the second differential unit 544, 612, 706, the first differential unit 546, 614, 708, and the second electric rotary machine MG2 coupled to the drive wheels 516 such that power is transmittable, the invention is allowed to be applied to the vehicle. Drive wheels W2 to which the second electric rotary machine MG2 is coupled such that power is transmittable do not always need to be the same as the drive wheels 516 to which the sixth rotating element of the second differential unit 544, 612, 706 is coupled such that power is transmittable. For example, one of the pair of front wheels and the pair of rear wheels may be the drive wheels 516, and the other may be the drive wheels W2. In such a case, the drive wheels 516 and the drive wheel W2 are the drive wheels, and the sixth rotating element and the second electric rotary machine MG2 are coupled to the drive wheels together such that power is transmittable.

FIG. 51 is a view that illustrates the schematic configuration of devices regarding traveling of a vehicle 810 according to a tenth embodiment and that also illustrates a relevant portion of control system for controlling the devices. In FIG. 51, the vehicle 810 is a hybrid vehicle including the engine (ENG) 512, the first electric rotary machine MG1, the second electric rotary machine MG2, a power transmission system 814 and the drive wheels 516. The engine (ENG) 512, the first electric rotary machine MG1 and the second electric rotary machine MG2 can serve as a driving force source for propelling the vehicle 810. The power transmission system 814 includes the first electric rotary machine MG1 and the second electric rotary machine MG2.

The engine 512 is a known internal combustion engine that combusts predetermined fuel to output power, and is, for example, a gasoline engine, a diesel engine, or the like. An engine torque Te of the engine 512 is controlled in accordance with operation statuses, such as a throttle opening degree or intake air amount, a fuel supply amount and ignition timing, that are controlled by the electronic control unit 580 (described later).

Each of the first electric rotary machine MG1 and the second electric rotary machine MG2 is a so-called motor generator having the function of an electric motor (motor) that generates driving torque and the function of a generator. Each of the first electric rotary machine MG1 and the second electric rotary machine MG2 is connected to the battery unit 520 via the power control unit 518. The power control unit 518 includes an inverter, a smoothing capacitor, and the like. The battery unit 520 serves as an electrical storage device that exchanges electric power with each of the first electric rotary machine MG1 and the second electric rotary machine MG2. The power control unit 518 is controlled by the electronic control unit 580 (described later), so the MG1 torque Tg that is the output torque (motoring torque or regenerative torque) of the first electric rotary machine MG1 and the MG2 torque Tm that is the output torque (motoring torque or regenerative torque) of the second electric rotary machine MG2 are controlled.

The power transmission system 814 is provided in the power transmission path between the engine 512 and the drive wheels 516. The power transmission system 814 includes the first power transmission unit 824, the second power transmission unit 526, the driven gear 530, the driven shaft 532, the final gear 534 (which has a smaller diameter than the driven gear 530), the differential gear 538, and the like, inside the case 522. The case 522 is a non-rotating member mounted on a vehicle body. The driven gear 530 is in mesh with the drive gear 528. The drive gear 528 is an output rotating member of the first power transmission unit 824. The driven gear 530 is fixed to the driven shaft 532 so as to be relatively non-rotatable. The final gear 534 is fixed to the driven shaft 532 so as to be relatively non-rotatable. The differential gear 538 is in mesh with the final gear 534 via the differential ring gear 536. The power transmission system 814 includes the axles 540 coupled to the differential gear 538, and the like.

The first power transmission unit 824 is arranged coaxially with the input shaft 542 that is an input rotating member of the first power transmission unit 824, and includes a second differential unit 844, a first differential unit 846 and the clutch CR. The second differential unit 844 includes the second planetary gear mechanism 848 (second differential mechanism) and the first electric rotary machine MG1. The first differential unit 846 includes a first planetary gear mechanism 850 (first differential mechanism), the clutch C1 and the brake B1.

The second planetary gear mechanism 848 is a known single-pinion planetary gear mechanism. The second planetary gear mechanism 848 includes the first sun gear S1, the first pinion gears P1, the first carrier CA1 and the first ring gear R1. The first carrier CA1 supports the first pinion gears P1 such that each first pinion gear P1 is rotatable and revolvable. The first ring gear R1 is in mesh with the first sun gear S1 via the first pinion gears P1. The second planetary gear mechanism 848 serves as a differential mechanism that provides differential action. The first planetary gear mechanism 850 is a known single-pinion planetary gear mechanism. The first planetary gear mechanism 850 includes the second sun gear S2, the second pinion gears P2, the second carrier CA2 and the second ring gear R2. The second carrier CA2 supports the second pinion gears P2 such that each second pinion gear P2 is rotatable and revolvable. The second ring gear R2 is in mesh with the second sun gear S2 via the second pinion gears P2. The first planetary gear mechanism 550 serves as a differential mechanism that provides differential action.

The first carrier CA1 is the fourth rotating element RE4 that is an input element coupled to the output rotating member of the first differential unit 846 (that is, the second ring gear R2 of the first planetary gear mechanism 850), and serves as an input rotating member of the second differential unit 844. The first sun gear S1 is integrally coupled to the rotor shaft 552 of the first electric rotary machine MG1, and is the fifth rotating element RE5 that is a reaction element to which the first electric rotary machine MG1 is coupled such that power is transmittable. The first ring gear R1 is integrally coupled to the drive gear 528, and is the sixth rotating element RE6 that is an output element coupled to the drive wheels 516. The first ring gear R1 serves as an output rotating member of the second differential unit 844.

The second sun gear S2 is the first rotating element RE1 that is integrally coupled to the input shaft 542 and to which the engine 512 is coupled via the input shaft 542 such that power is transmittable. The second sun gear S2 serves as an input rotating member of the first differential unit 846. The second carrier CA2 is the third rotating element RE3 selectively coupled to the case 522 via the brake B1. The second ring gear R2 is the second rotating element RE2 coupled to the input rotating member of the second differential unit 844 (that is, the first carrier CA1 of the second planetary gear mechanism 848). The second ring gear R2 serves as an output rotating member of the first differential unit 846. The second carrier CA2 and the second ring gear R2 are selectively coupled to each other via the clutch C1. The first ring gear R1 and the second carrier CA2 are selectively coupled to each other via the clutch CR. Thus, the clutch C1 is the first engaging device that selectively couples the second rotating element RE2 to the third rotating element RE3. The clutch CR is the second engaging device that selectively couples the sixth rotating element RE6 to the third rotating element RE3. The brake B1 is the third engaging device that selectively couples the third rotating element RE3 to the case 522 that is the non-rotating member.

Each of the clutch C1, the brake B1 and the clutch CR is suitably a wet-type friction engaging device, and is a multi-disc hydraulic friction engaging device of which an operation status is controlled by a hydraulic actuator. The operation statuses (such as an engaged state and a released state) of the clutch C1, brake B1 and clutch CR are controlled in response to hydraulic pressures respectively supplied from the hydraulic control circuit 554 (for example, C1 hydraulic pressure Pc1, B1 hydraulic pressure Pb1 and CR hydraulic pressure Pcr) as a result of control over the hydraulic control circuit 554 by the electronic control unit 580 (described later). The hydraulic control circuit 554 is provided in the vehicle 810. The vehicle 810 includes a mechanical oil pump 555 (also referred to as OP 555). In the power transmission system 814, working oil (oil) that is used to change the operation statuses of the clutch C1, brake B1 and clutch CR, lubricate the devices and cool the devices is supplied with the use of the OP 555. The OP 555 is coupled to any one of the rotating members (which are synonymous with rotating elements) of the power transmission system 814, and is driven with the rotation of the associated rotating member. In the present embodiment, the OP 555 is coupled to the fourth rotating element RE4 (which is synonymous with the second rotating element RE2). When supply of working oil is required during a stop of rotation of the rotating member to which the OP 555 is coupled, an electric oil pump is, for example, provided in addition to the OP 555. Alternatively, instead of the OP 555, an electric oil pump may be provided.

The second planetary gear mechanism 848 is able to serve as a power split mechanism that splits (which is synonymous with distributes) the power of the engine 512, input to the first carrier CA1, between the first electric rotary machine MG1 and the first ring gear R1 in a state where differential motion is permitted. Thus, the vehicle 810 is able to perform engine driving by using a direct torque (also referred to as engine direct torque) and an MG2 torque Tm. The engine direct torque is mechanically transmitted to the first ring gear R1 by causing the first electric rotary machine MG1 to provide a reaction force against the engine torque Te that is input to the first carrier CA1. The MG2 torque Tm is generated by the second electric rotary machine MG2. The second electric rotary machine MG2 is driven by using electric power generated by the first electric rotary machine MG1 owing to a power distributed to the first electric rotary machine MG1. Thus, the second differential unit 844 serves as a known electrical differential unit (electrical continuously variable transmission) that controls the gear ratio (speed ratio) through control over the power control unit 518 by the electronic control unit 580 (described later) to control the operation status of the first electric rotary machine MG1. That is, the second differential unit 844 is an electrical transmission mechanism in which the differential status of the second planetary gear mechanism 848 is controlled as a result of control over the operation status of the first electric rotary machine MG1.

The first differential unit 846 is able to establish four states, that is, a direct-coupling state, a reverse rotation speed change state of the engine 512, a neutral state and an internal lock state, by changing the operation statuses of the clutch C1 and brake B1. Specifically, when the clutch C1 is engaged, the first differential unit 846 is placed in the direct-coupling state where the rotating elements of the first planetary gear mechanism 850 rotate integrally. When the brake B1 is engaged, the first differential unit 846 is placed in the reverse rotation speed change state of the engine 512 where the second ring gear R2 (the output rotating member of the first differential unit 846) rotates in the negative direction in response to positive rotation of the engine rotation speed Ne. When the clutch C1 is released and the brake B1 is released, the first differential unit 846 is placed in the neutral state where the differential motion of the first planetary gear mechanism 850 is permitted. When the clutch C1 is engaged and the brake B1 is engaged, the first differential unit 846 is placed in the internal lock state where the rotation of each of the rotating elements of the first planetary gear mechanism 850 stops.

The first power transmission unit 824 is able to constitute an electrical continuously variable transmission that operates at a power split ratio different from a power split ratio in the second differential unit 844. That is, in the first power transmission unit 824, in addition to the fact that the first carrier CA1 (fourth rotating element RE4) is coupled to the second ring gear R2 (second rotating element RE2), the first ring gear R1 (sixth rotating element RE6) is coupled to the second carrier CA2 (third rotating element RE3) by engaging the clutch CR. As a result, the second differential unit 844 and the first differential unit 846 constitute one differential mechanism, the second differential unit 844 and the first differential unit 846 as a whole are allowed to serve as an electrical continuously variable transmission that operates at a power split ratio different from the power split ratio of the second differential unit 844 alone.

In the first power transmission unit 824, the first differential unit 846 and the second differential unit 844 by which the four states are established are coupled to each other, and the vehicle 810 is able to achieve a plurality of drive modes (described later) in synchronization with a change of the operation status of the clutch CR.

In the thus configured first power transmission unit 824, the power of the engine 512 and the power of the first electric rotary machine MG1 are transmitted from the drive gear 528 to the driven gear 530. Therefore, the engine 512 and the first electric rotary machine MG1 are coupled to the drive wheels 516 via the first power transmission unit 824 such that power is transmittable.

The second power transmission unit 526 is configured as described in the above-described sixth embodiment, so the description thereof is omitted.

The thus configured power transmission system 814 is suitably used for a front-engine front-drive (FF) vehicle. In the power transmission system 814, the power of the engine 512, the power of the first electric rotary machine MG1 or the power of the second electric rotary machine MG2 is transmitted to the driven gear 530, and is transmitted from the driven gear 530 to the drive wheels 516 via the final gear 534, the differential gear 538, the axles 540, and the like, sequentially. In the vehicle 810, the engine 512, the first power transmission unit 824 and the first electric rotary machine MG1 are arranged along the axis different from the axis along which the second electric rotary machine MG2 is arranged, so the axial length is reduced. In addition, the reduction ratio of the second electric rotary machine MG2 is allowed to be increased by the use of the gear pair of the driven gear 530 and the reduction gear 558.

The vehicle 810 includes the electronic control unit 580 having the same configuration as that of the above-described sixth embodiment.

Various signals based on detected values of various sensors, and the like, provided in the vehicle 810 are supplied to the electronic control unit 580. The various sensors include, for example, the engine rotation speed sensor 560, the output rotation speed sensor 562, the MG1 rotation speed sensor 564, such as a resolver, the MG2 rotation speed sensor 566, such as a resolver, the accelerator operation amount sensor 568, the shift position sensor 570, the battery sensor 572, the CR hydraulic pressure sensor 574, the oil temperature sensor 576, and the like. The various signals include, for example, the engine rotation speed Ne, the output rotation speed No that is the rotation speed of the drive gear 528 corresponding to the vehicle speed V, the MG1 rotation speed Ng, the MG2 rotation speed Nm, the accelerator operation amount θacc, the shift lever operating position POSsh, the battery temperature THbat, battery charge/discharge current Ibat and battery voltage Vbat of the battery unit 520, the CR hydraulic pressure Pcr, the working oil temperature THoil that is the temperature of working oil, and the like. Various command signals are supplied from the electronic control unit 580 to devices provided in the vehicle 810. The devices include, for example, the engine 512, the power control unit 518, the hydraulic control circuit 554, and the like. The various command signals include, for example, the engine control command signal Se, the electric rotary machine control command signal Sm, the hydraulic control command signal Sp, and the like. The electronic control unit 580 calculates a state of charge (charged capacity) SOC (hereinafter, referred to as battery capacity SOC) of the battery unit 520 on the basis of, for example, the battery charge/discharge current Ibat, the battery voltage Vbat, and the like.

The electronic control unit 580 includes hybrid control means, that is, the hybrid control unit 582, and power transmission changing means, that is, the power transmission changing unit 584, in order to implement control functions for various controls in the vehicle 810, as in the case of the above-described sixth embodiment. The hybrid control unit 582 and the power transmission changing unit 584 are already described, so the description is omitted here.

The drive modes that are allowed to be performed by the vehicle 810 will be described with reference to FIG. 52, and FIG. 53 to FIG. 60. FIG. 52 is an operation engagement chart that shows the operation status of each of the clutch C1, the brake B1 and the clutch CR in each drive mode. In the operation engagement chart of FIG. 52, a circle mark indicates an engaged state of the corresponding engaging device (C1, B1, CR), a blank indicates a released state, and a triangle mark indicates that any one or both are engaged at the time when engine brake that sets the engine 512 not in operation in a co-rotation state is also used. In addition, "G" indicates that the electric rotary machine (MG1, MG2) is mainly caused to serve as a generator, and "M" indicates that the electric rotary machine (MG1, MG2) is caused to mainly serve as a motor when the electric rotary machine (MG1, MG2) is driven and is mainly caused to serve as a generator when the electric rotary machine (MG1, MG2) performs regeneration. As shown in FIG. 52, the vehicle 810 is able to selectively execute an EV drive mode and an HV drive mode as a drive mode. The EV drive mode includes two modes, that is, a one-motor EV mode and a two-motor EV mode. The one-motor EV mode is a control mode in which EV driving that uses the second electric rotary machine MG2 as a single driving force source is enabled. The two-motor EV mode is a control mode in which EV driving that uses the first electric rotary machine MG1 and the second electric rotary machine MG2 as driving force sources is enabled. The HV drive mode includes three modes, that is, an overdrive (O/D) input split mode (hereinafter, referred to as O/D HV mode), an underdrive (U/D) input split mode (hereinafter, referred to as U/D HV mode), and a fixed gear mode.

FIG. 53 to FIG. 60 are nomographs that relatively show the rotation speeds of rotating elements RE1 to RE6 in the second planetary gear mechanism 848 and the first planetary gear mechanism 850. In these nomographs, vertical lines Y1 to Y4 represent the rotation speeds of the rotating elements. In order from the left side when facing toward the sheet, the vertical line Y1 represents the rotation speed of the first sun gear S1 that is the fifth rotating element RE5 coupled to the first electric rotary machine MG1, the vertical line Y2 represents the rotation speed of the first carrier CA1 that is the fourth rotating element RE4 and the rotation speed of the second ring gear R2 that is the second rotating element RE2, the first carrier CA1 and the second ring gear R2 being coupled to each other, the vertical line Y3 represents the rotation speed of the first ring gear R1 that is the sixth rotating element RE6 coupled to the drive gear 528 and the rotation speed of the second carrier CA2 that is the third rotating element RE3 that is selectively coupled to the case 522 via the brake B1, and the vertical line Y4 represents the rotation speed of the second sun gear S2 that is the first rotating element RE1 coupled to the engine 512. An arrow connected to an open square mark indicates an MG1 torque Tg, an arrow connected to an open circle mark indicates an engine torque Te, and an arrow connected to a solid circle mark indicates an MG2 torque Tm. The outlined clutch C1 that selectively couples the second carrier CA2 to the second ring gear R2 indicates a released state of the clutch C1, and the hatched (shaded) clutch C1 indicates an engaged state of the clutch C1. An open rhombus mark on the brake B1 that selectively couples the second carrier CA2 to the case 522 indicates a released state of the brake B1, and a solid rhombus mark indicates an engaged state of the brake B1. An open rhombus mark on the clutch CR that selectively couples the first ring gear R1 to the second carrier CA2 indicates a released state of the clutch CR, and a solid rhombus mark indicates an engaged state of the clutch CR. A straight line that relatively expresses the rotation speeds regarding the second planetary gear mechanism 848 is indicated by continuous line, and a straight line that relatively expresses the rotation speeds regarding the first planetary gear mechanism 850 is indicated by dashed line. An arrow connected to a solid circle mark indicates an MG2 torque Tm generated by the second electric rotary machine MG2 that is driven by using electric power generated by the first electric rotary machine MG1 with the use of the power of the engine 512, distributed to the first electric rotary machine MG1, and does not include an engine direct torque.

A solid rhombus mark on the clutch CR overlaps with a solid circle mark, so the solid rhombus mark on the clutch CR is not shown in the drawings.

Figure 53:
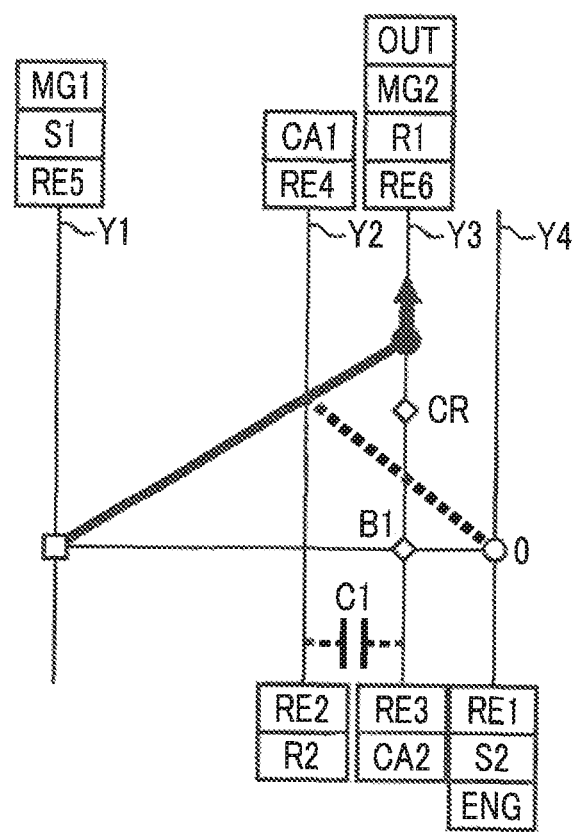
FIG. 53 is a nomograph in one-motor EV mode.

FIG. 53 is a nomograph in one-motor EV mode. As shown in FIG. 52, the one-motor EV mode is achieved in a state where all the clutch C1, the brake B1 and the clutch CR are released. In the one-motor EV mode, the clutch C1 and the brake B1 are released, the differential motion of the first planetary gear mechanism 850 is permitted, and the first differential unit 846 is placed in the neutral state. The hybrid control unit 582 stops the operation of the engine 512, and outputs the MG2 torque Tm for propelling the vehicle 810 from the second electric rotary machine MG2. FIG. 53 shows a case at the time when the vehicle 810 travels forward in a state where the second electric rotary machine MG2 rotates in the positive direction (that is, the rotation direction of the first ring gear R1 at the time when the vehicle 810 travels forward) to output a positive torque. At the time when the vehicle 810 travels backward, the second electric rotary machine MG2 is rotated in the reverse direction in contrast to the operation at the time when the vehicle 810 travels forward. While the vehicle 810 is traveling, the first ring gear R1 coupled to the drive gear 528 is rotated in synchronization with the rotation of the second electric rotary machine MG2 (which is synonymous with the rotation of the drive wheels 516). In the one-motor EV mode, the clutch CR is further released, so the engine 512 and the first electric rotary machine MG1 are not co-rotated, so the engine rotation speed Ne and the MG1 rotation speed Ng are allowed to be set to zero. With this configuration, it is possible to improve electric power efficiency (that is, reduce electric power consumption) by reducing a drag loss of each of the engine 512 and the first electric rotary machine MG1. The hybrid control unit 582 keeps the MG1 rotation speed Ng at zero under feedback control. Alternatively, the hybrid control unit 582 keeps the MG1 rotation speed Ng at zero by executing control (d-axis control) for passing current to the first electric rotary machine MG1 such that the rotation of the first electric rotary machine MG1 is fixed. Alternatively, when the MG1 rotation speed Ng is kept at zero by the cogging torque of the first electric rotary machine MG1 even when the MG1 torque Tg is set to zero, it is not required to add the MG1 torque Tg. Even when control for keeping the MG1 rotation speed Ng at zero has been executed, since the first power transmission unit 524 is in the neutral state where a reaction force against the MG1 torque Tg cannot be provided, a driving torque is not influenced. In the one-motor EV mode, the first electric rotary machine MG1 may be placed in a no-load state to idle.

In the one-motor EV mode, the engine 512 not in operation is not co-rotated and is placed in a stopped state at zero rotation, so, when regenerative control is executed over the second electric rotary machine MG2 while the vehicle 810 is traveling in the one-motor EV mode, a large amount of regenerative electric power is allowed to be acquired. When the battery unit 520 becomes a full charge state and cannot store regenerative energy while the vehicle 810 is traveling in the one-motor EV mode, it is conceivable to additionally use engine brake. When engine brake is additionally used, the clutch C1 or the clutch CR is engaged (see engine brake is additionally used in the one-motor EV mode) as shown in FIG. 52. As the clutch C1 or the clutch CR is engaged, the engine 512 is placed in a co-rotation state. When the engine rotation speed Ne is increased by the first electric rotary machine MG1 in this state, it is possible to cause engine brake to function. The engine rotation speed Ne is allowed to be set to zero even in the co-rotation state of the engine 512. In this case, EV driving is performed without causing engine brake to function. Engine brake is allowed to function by engaging the brake B1.

Figure 54:
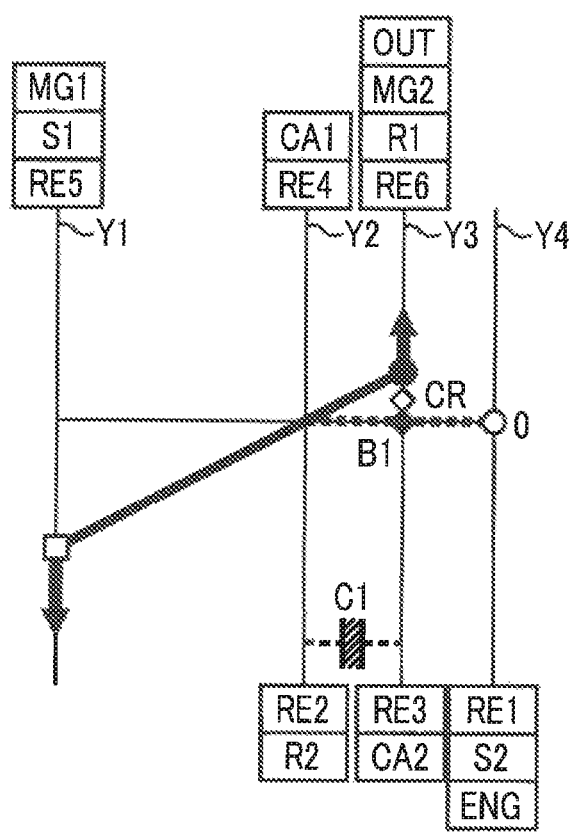
FIG. 54 is a nomograph in two-motor EV mode.

FIG. 54 is a nomograph in two-motor EV mode. As shown in FIG. 52, the two-motor EV mode is achieved in a state where the clutch C1 and the brake B1 are engaged and the clutch CR is released. In the two-motor EV mode, the clutch C1 and the brake B1 are engaged, and the differential motion of the first planetary gear mechanism 850 is restricted, so the rotation of the second carrier CA2 is stopped. For this reason, the rotation of all the rotating elements of the first planetary gear mechanism 850 is stopped, so the first differential unit 846 is placed in the internal lock state. Thus, the engine 512 is placed in a stopped state at zero rotation, and the first carrier CA1 coupled to the second ring gear R2 is also fixed at zero rotation. When the first carrier CA1 is fixed so as to be non-rotatable, a reaction torque against the MG1 torque Tg is provided by the first carrier CA1, so it is possible to cause a torque based on the MG1 torque Tg to be mechanically output from the first ring gear R1 and transmitted to the drive wheels 516. The hybrid control unit 582 stops the operation of the engine 512, and causes the first electric rotary machine MG1 and the second electric rotary machine MG2 to output the MG1 torque Tg and the MG2 torque Tm for propelling the vehicle 810. FIG. 54 shows a case at the time when the vehicle 810 travels forward in a state where the second electric rotary machine MG2 rotates in the positive direction to output a positive torque and the first electric rotary machine MG1 rotates in the negative direction to output a negative torque. At the time when the vehicle 810 travels backward, the first electric rotary machine MG1 and the second electric rotary machine MG2 are rotated in the reverse direction in contrast to the operation at the time when the vehicle 810 travels forward.

As described with reference to FIG. 53 and FIG. 54, it is possible to drive the vehicle 810 with the use of only the second electric rotary machine MG2 in the one-motor EV mode, and it is possible to drive the vehicle 810 with the use of the first electric rotary machine MG1 and the second electric rotary machine MG2 in the two-motor EV mode. Therefore, when the vehicle 810 performs EV driving, the one-motor EV mode is established and the vehicle 810 is driven by only the second electric rotary machine MG2 at a low load, and the two-motor EV mode is established and the vehicle 810 is driven by both the first electric rotary machine MG1 and the second electric rotary machine MG2 at a high load. Including HV driving, regeneration during deceleration of the vehicle 810 is mainly performed by the second electric rotary machine MG2.

Figure 55:
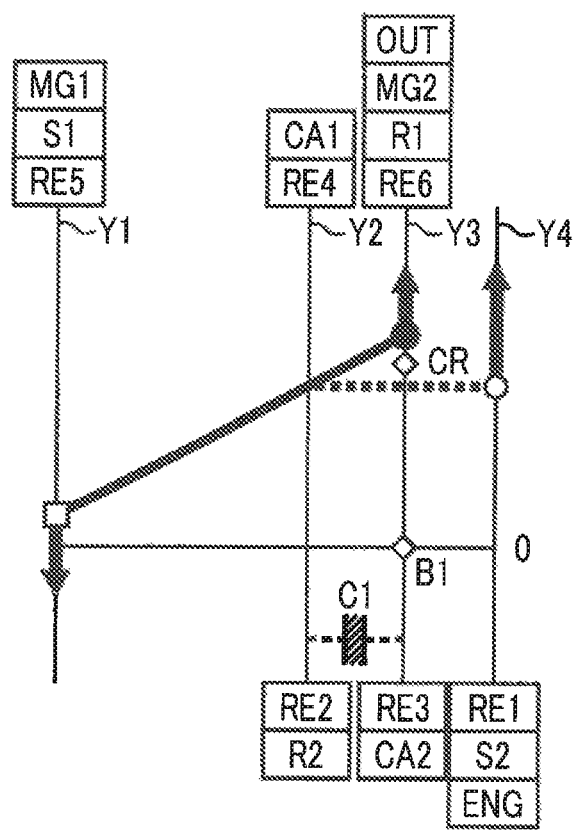
FIG. 55 is a nomograph at the time when the vehicle travels forward in O/D HV mode in HV drive mode.

FIG. 55 is a nomograph at the time when the vehicle 810 travels forward in O/D HV mode in the HV drive mode. As shown in FIG. 52, forward traveling in the O/D HV mode (hereinafter, referred to as O/D HV mode (forward traveling)) is achieved in a state where the clutch C1 is engaged and the brake B1 and the clutch CR are released. In the O/D HV mode (forward traveling), the clutch C1 is engaged, the brake B1 is released, and the first differential unit 846 is placed in the direct-coupling state, so the power of the engine 512 is directly transmitted to the first carrier CA1 coupled to the second ring gear R2. In addition, in the O/D HV mode (forward traveling), the clutch CR is released, so the second differential unit 844 alone constitutes an electrical continuously variable transmission. Thus, the first power transmission unit 824 is able to distribute the power of the engine 512, which is input to the first carrier CA1, between the first sun gear S1 and the first ring gear R1. That is, in the first power transmission unit 824, the engine direct torque is mechanically transmitted to the first ring gear R1 by providing a reaction force against the engine torque Te, which is input to the first carrier CA1, with the use of the first electric rotary machine MG1, and electric power generated by the first electric rotary machine MG1 by using the power of the engine 512, distributed to the first electric rotary machine MG1, is transmitted to the second electric rotary machine MG2 via a predetermined electrical path. The hybrid control unit 582 causes the engine 512 to operate, causes the MG1 torque Tg that is a reaction torque against the engine torque Te to be output through power generation of the first electric rotary machine MG1, and causes the MG2 torque Tm to be output from the second electric rotary machine MG2 by using electric power generated by the first electric rotary machine MG1. FIG. 55 shows a case at the time when the vehicle 810 travels forward in a state where the second electric rotary machine MG2 rotates in the positive direction to output a positive torque.

Figure 56:
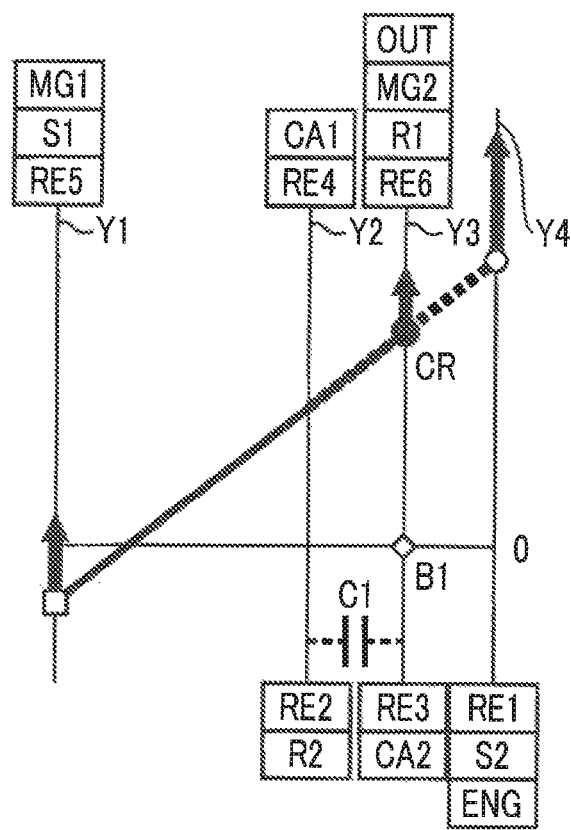
FIG. 56 is a nomograph in U/D HV mode in the HV drive mode.

FIG. 56 is a nomograph in U/D HV mode in the HV drive mode. As shown in FIG. 52, the U/D HV mode is achieved in a state where the clutch C1 and the brake B1 are released and the clutch CR is engaged. In the U/D HV mode, the clutch CR is engaged, so the second differential unit 844 and the first differential unit 846 constitute one differential mechanism. In addition, in the U/D HV mode, the clutch C1 and the brake B1 are released, so the second differential unit 844 and the first differential unit 846 as a whole constitute an electrical continuously variable transmission that operates at a power split ratio different from the power split ratio of the second differential unit 844 alone. Thus, the first power transmission unit 824 is able to distribute the power of the engine 512, which is input to the second sun gear S2, between the first sun gear S1 and the first ring gear R1. That is, in the first power transmission unit 824, the engine direct torque is mechanically transmitted to the first ring gear R1 by providing a reaction force against the engine torque Te, which is input to the second sun gear SS, with the use of the first electric rotary machine MG1, and electric power generated by the first electric rotary machine MG1 by using the power of the engine 512, distributed to the first electric rotary machine MG1, is transmitted to the second electric rotary machine MG2 via a predetermined electrical path. The hybrid control unit 582 causes the engine 512 to operate, causes the MG1 torque Tg that is a reaction torque against the engine torque Te to be output through power generation of the first electric rotary machine MG1, and causes the MG2 torque Tm to be output from the second electric rotary machine MG2 by using electric power generated by the first electric rotary machine MG1. FIG. 55 shows a case at the time when the vehicle 810 travels forward in a state where the second electric rotary machine MG2 rotates in the positive direction to output a positive torque. At the time when the vehicle 810 travels backward, the second electric rotary machine MG2 is rotated in the reverse direction in contrast to the operation at the time when the vehicle 810 travels forward. During backward traveling, the positive rotation and torque of the engine 512 are directly input to the components that constitute the function of the electrical continuously variable transmission, that is, engine forward rotation input is achieved.

Figure 57:
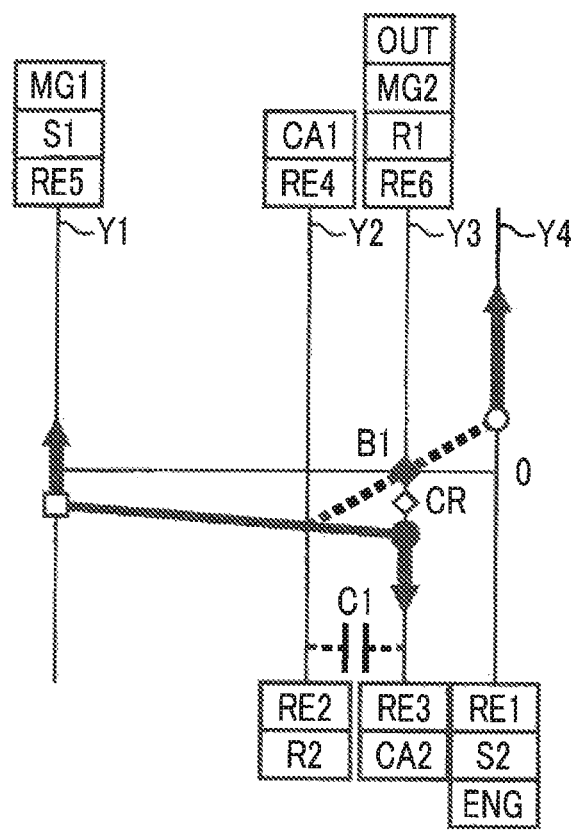
FIG. 57 is a nomograph at the time when the vehicle travels backward in the O/D HV mode in the HV drive mode in the case of engine reverse input.

FIG. 57 is a nomograph at the time when the vehicle 810 travels backward in O/D HV mode in the HV drive mode, and shows a case of engine reverse rotation input where the rotation and torque of the engine 512 are inverted to negative values and are input to the components that achieve the function of the electrical continuously variable transmission. As shown in FIG. 52, backward traveling in engine reverse rotation input in the O/D HV mode (hereinafter, referred to as O/D HV mode reverse rotation input (backward traveling)) is achieved in a state where the brake B1 is engaged and the clutch C1 and the clutch CR are released. In the O/D HV mode reverse rotation input (backward traveling), the clutch C1 is released and the brake B1 is engaged, and the first differential unit 546 is placed in the reverse rotation speed change state of the engine 512, so the power of the engine 512 is transmitted in negative rotation and negative torque to the first carrier CA1 coupled to the second ring gear R2. In addition, in the O/D HV mode reverse rotation input (backward traveling), the clutch CR is released, so the second differential unit 844 alone constitutes an electrical continuously variable transmission. Thus, the first power transmission unit 824 is able to distribute the power of the engine 512, which is input to the first carrier CA1 in the reverse direction, between the first sun gear S1 and the first ring gear R1. The hybrid control unit 582 causes the engine 512 to operate, causes the MG1 torque Tg that is a reaction torque against the engine torque Te to be output through power generation of the first electric rotary machine MG1, and causes the MG2 torque Tm to be output from the second electric rotary machine MG2 by using electric power generated by the first electric rotary machine MG1. FIG. 57 shows a case at the time when the vehicle 810 travels backward in a state where the second electric rotary machine MG2 rotates in the negative direction to output a negative torque.

Figure 58:
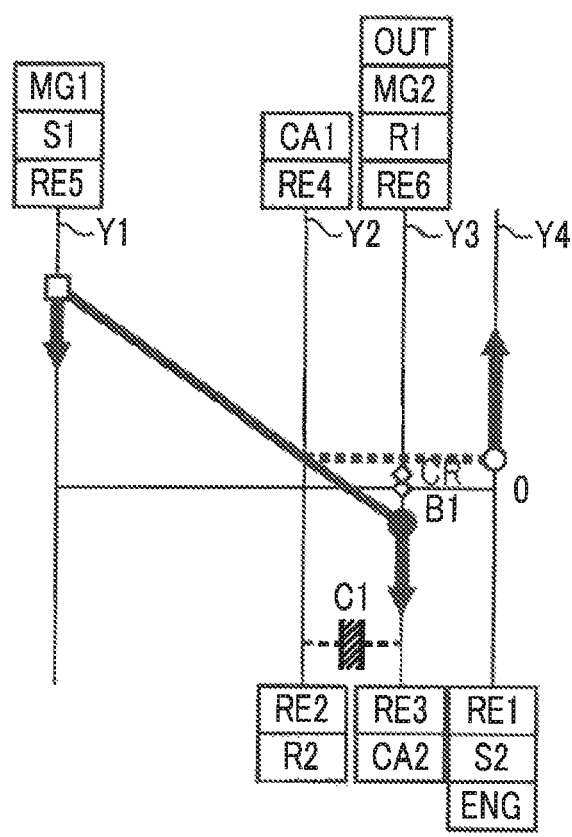
FIG. 58 is a nomograph at the time when the vehicle travels backward in the O/D HV mode in the HV drive mode in the case of engine forward input.

FIG. 58 is a nomograph at the time when the vehicle 810 travels backward in the O/D HV mode in the HV drive mode, and shows a case of engine forward rotation input. As shown in FIG. 52, backward traveling with engine forward rotation input in the O/D HV mode (hereinafter, referred to as O/D HV mode forward rotation input (backward traveling)) is achieved in a state the clutch C1 is engaged and the brake B1 and the clutch CR are released. In the O/D HV mode forward rotation input (backward traveling), the clutch C1 is engaged and the brake B1 is released, so the first differential unit 546 is placed in the direct-coupling state, with the result that the power of the engine 512 is directly transmitted to the first carrier CA1 coupled to the second ring gear R2. In addition, in the O/D HV mode forward rotation input (backward traveling), the clutch CR is released, so the second differential unit 844 alone constitutes an electrical continuously variable transmission. Thus, the first power transmission unit 824 is able to distribute the power of the engine 512, which is input to the first carrier CA1, between the first sun gear S1 and the first ring gear R1. The hybrid control unit 582 causes the engine 512 to operate, causes the MG1 torque Tg that is a reaction torque against the engine torque Te to be output through power generation of the first electric rotary machine MG1, and causes the MG2 torque Tm to be output from the second electric rotary machine MG2 by using electric power generated by the first electric rotary machine MG1. FIG. 58 shows a case at the time when the vehicle 810 travels backward in a state where the second electric rotary machine MG2 rotates in the negative direction to output a negative torque.

As described with reference to FIG. 55 to FIG. 58, the O/D HV mode and the U/D HV mode differ from each other in the rotating element, to which the power of the engine 512 is input, in the components that achieve the function of the electrical continuously variable transmission, so the O/D HV mode and the U/D HV mode differ from each other in the power split ratio at the time when the first power transmission unit 824 is caused to serve as the electrical continuously variable transmission. That is, the ratio between the output torques of the electric rotary machines MG1, MG2 and the ratio between the rotation speeds of the electric rotary machines MG1, MG2 with respect to the engine 512 are allowed to be changed between the O/D HV mode and the U/D HV mode. The operation status of the clutch CR is changed in order to change the ratio of the output torque or rotation speed of each of the electric rotary machines MG1, MG2 with respect to the output torque or rotation speed of the engine 512 during engine driving.

The engine direct torque in the O/D HV mode (forward traveling) is reduced from the engine torque Te. On the other hand, the engine direct torque in the U/D HV mode is increased from the engine torque Te. In the present embodiment, the second differential unit 844 alone constitutes the electrical continuously variable transmission in the O/D HV mode (see FIG. 55). Thus, when the differential status of the second differential unit 844 is controlled as a result of control over the operation status of the first electric rotary machine MG1 in a state where the clutch C1 is engaged and the clutch CR is released, a torque reduced from the engine torque Te is mechanically transmitted to the first ring gear R1.

In a state of a so-called mechanical point at which the MG1 rotation speed Ng is set to zero and the power of the engine 512 is entirely mechanically transmitted to the first ring gear R1 without passing through an electrical path (an electrical power transmission path that is an electrical path related to an exchange of electric power to or from the first electric rotary machine MG1 or the second electric rotary machine MG2), the case of an overdrive state where the rotation of the engine 512 is increased and is output from the first ring gear R1 is the O/D HV mode, and the case of an underdrive state where the rotation of the engine 512 is reduced and is output from the first ring gear R1 is the U/D HV mode.

Figure 59:
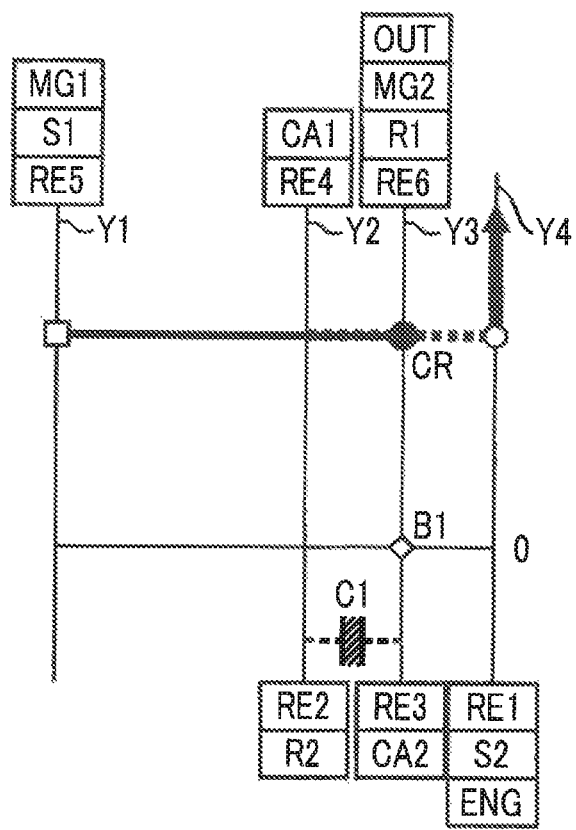
FIG. 59 is a nomograph in fixed gear mode in the HV drive mode in the case of direct coupling.

FIG. 59 is a nomograph in fixed gear mode in the HV drive mode, and shows a case of direct coupling where the rotating elements of the second differential unit 844 and first differential unit 846 are integrally rotated. As shown in FIG. 52, direct coupling in the fixed gear mode (hereinafter, referred to as direct-coupling fixed gear mode) is achieved in a state where the clutch C1 and the clutch CR are engaged and the brake B1 is released. In the direct-coupling fixed gear mode, the clutch C1 is engaged and the brake B1 is released, so the first differential unit 846 is placed in the direct-coupling state. In addition, in the direct-coupling fixed gear mode, the clutch CR is engaged, so the rotating elements of the second differential unit 844 and first differential unit 846 are integrally rotated. Thus, the first power transmission unit 824 is able to directly output the power of the engine 512 from the first ring gear R1. The hybrid control unit 582 causes the engine 512 to output the engine torque Te for propelling the vehicle 810. In the direct-coupling fixed gear mode, it is also possible to directly output the power of the first electric rotary machine MG1 from the first ring gear R1 by driving the first electric rotary machine MG1 with the use of electric power from the battery unit 520. In the direct-coupling fixed gear mode, it is also possible to transmit the power of the second electric rotary machine MG2 to the drive wheels 516 by driving the second electric rotary machine MG2 with the use of electric power from the battery unit 520. Thus, the hybrid control unit 582 is allowed to not only cause the engine torque Te to be output but also cause at least one of the first electric rotary machine MG1 and the second electric rotary machine MG2 to output a torque for propelling the vehicle 810. That is, in the direct-coupling fixed gear mode, the vehicle 810 may be driven by only the engine 512 or may be assisted with a torque that is generated by the first electric rotary machine MG1 and/or the second electric rotary machine MG2.

Figure 60:
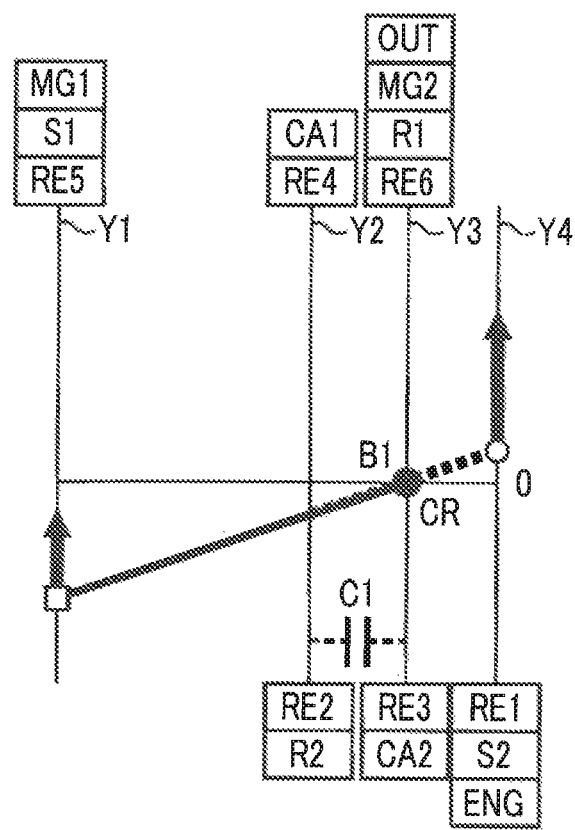
FIG. 60 is a nomograph in the fixed gear mode in the HV drive mode in the case of output shaft fixing.

FIG. 60 is a nomograph in the fixed gear mode in the HV drive mode, and shows a case of output shaft fixing where the first ring gear R1 is fixed so as to be non-rotatable. As shown in FIG. 52, the output shaft fixing in the fixed gear mode (hereinafter, referred to as output shaft fixed gear mode) is achieved in a state where the brake B1 and the clutch CR are engaged and the clutch C1 is released. In the output shaft fixed gear mode, the clutch CR is engaged, so the second differential unit 844 and the first differential unit 846 constitute one differential mechanism. In addition, in the output shaft fixed gear mode, the brake B1 is engaged and the clutch C1 is released, so the first ring gear R1 is fixed so as to be non-rotatable. Thus, the first power transmission unit 824 is able to provide a reaction force against the power of the engine 512, which is input to the second sun gear S2, with the use of the first electric rotary machine MG1. Therefore, in the output shaft fixed gear mode, it is possible to charge the battery unit 520 with electric power generated by the first electric rotary machine MG1 with the use of the power of the engine 512. The hybrid control unit 582 operates the engine 512, provides a reaction force against the power of the engine 512 through power generation of the first electric rotary machine MG1, and charges the battery unit 520 with electric power generated by the first electric rotary machine MG1 via the power control unit 518. Since the first ring gear R1 is fixed so as to be non-rotatable in the output shaft fixed gear mode, the output shaft fixed gear mode is a mode in which the battery unit 520 is exclusively charged during a stop of the vehicle 810. As described with reference to FIG. 59 and FIG. 60, in the direct-coupling fixed gear mode or output shaft fixed gear mode in the HV drive mode, the clutch CR is engaged.

As described in the above sixth embodiment with reference to FIG. 5, and FIG. 28 to FIG. 29, the U/D HV mode is established at a high load of the engine 512 where the relatively large reduction ratio I is used, and the O/D HV mode is established at a low load or high vehicle speed of the engine 512 where the relatively small reduction ratio I is used. Thus, the U/D HV mode or the O/D HV mode is selectively used. As a result, an increase in the torque or rotation speed of each of the electric rotary machines MG1, MG2 is prevented or reduced, and a circulating power is reduced at a high vehicle speed. This leads to a reduction in energy conversion loss in the electrical path and improvement in fuel consumption. Alternatively, this leads to a reduction in the size of each of the electric rotary machines MG1, MG2.

In each of the U/D HV mode and the O/D HV mode, the first power transmission unit 824 is caused to serve as the electrical continuously variable transmission. A state where the reduction ratio I of the first power transmission unit 824 is "1" is a state equivalent to the state of the direct-coupling fixed gear mode in which the clutch C1 and the clutch CR both are engaged (see FIG. 59). Therefore, suitably, the hybrid control unit 582 changes the control mode between the O/D HV mode (forward traveling) in which the clutch C1 is engaged and the U/D HV mode in which the clutch CR is engaged by changing the operation statuses of the clutch C1 and clutch CR at the time of a synchronization state where the reduction ratio I is "1".

The hybrid control unit 582 determines which drive mode should be established by applying the vehicle speed V and the vehicle load (for example, required driving torque) to the drive mode change map as shown in FIG. 30 or FIG. 31 of the above-described sixth embodiment. When the determined drive mode is the current drive mode, the hybrid control unit 582 maintains the current drive mode. When the determined drive mode is different from the current drive mode, the hybrid control unit 582 establishes the determined drive mode instead of the current drive mode.

When the one-motor EV mode is established, the hybrid control unit 582 enables EV driving that uses only the second electric rotary machine MG2 as a driving force source for propelling the vehicle 810. When the two-motor EV mode is established, the hybrid control unit 582 enables EV driving that uses both the first electric rotary machine MG1 and the second electric rotary machine MG2 as driving force sources for propelling the vehicle 810.

When the O/D HV mode or the U/D HV mode is established, the hybrid control unit 582 enables engine driving where the engine direct torque is transmitted to the first ring gear R1 by providing a reaction force against the power of the engine 512 through power generation of the first electric rotary machine MG1 and a torque is transmitted to the drive wheels 516 by driving the second electric rotary machine MG2 with electric power generated by the first electric rotary machine MG1. In the O/D HV mode or the U/D HV mode, the hybrid control unit 582 operates the engine 512 at an engine operating point (that is, an engine operating point expressed by the engine rotation speed Ne and the engine torque Te) in consideration of the known optimal fuel consumption line of the engine 512. In the O/D HV mode or the U/D HV mode, it is also allowed to drive the second electric rotary machine MG2 with electric power from the battery unit 520 in addition to electric power generated by the first electric rotary machine MG1.

When the direct-coupling fixed gear mode is established, the hybrid control unit 582 enables engine driving where the vehicle 810 travels by directly outputting the power of the engine 512 from the first ring gear R1. In the direct-coupling fixed gear mode, the hybrid control unit 582 is allowed to cause the vehicle 810 to travel by directly outputting the power of the first electric rotary machine MG1 from the first ring gear R1 by driving the first electric rotary machine MG1 with electric power from the battery unit 520 in addition to the power of the engine 512 or transmitting the power of the second electric rotary machine MG2 to the drive wheels 516 by driving the second electric rotary machine MG2 with electric power from the battery unit 520.

During a stop of the vehicle 810, when the battery capacity SOC is lower than or equal to a predetermined capacity at which it is determined that charging is required, the hybrid control unit 582 establishes the output shaft fixed gear mode. When the output shaft fixed gear mode is established, the hybrid control unit 582 provides a reaction force against the power of the engine 512 through power generation of the first electric rotary machine MG1, and charges the battery unit 520 with electric power generated by the first electric rotary machine MG1 via the power control unit 518.

As described above, in the one-motor EV mode, the engine 512 is placed in a co-rotation state by engaging the clutch C1, the clutch CR or the brake B1, and, in this state, it is possible to increase the engine rotation speed Ne with the use of the first electric rotary machine MG1. Thus, when the engine 512 is started in the one-motor EV mode, the electronic control unit 580 sets the clutch C1, the clutch CR or the brake B1 to an engaged state, and, in this state, ignites fuel while increasing the engine rotation speed Ne with the use of the first electric rotary machine MG1 as needed.

Figure 61:
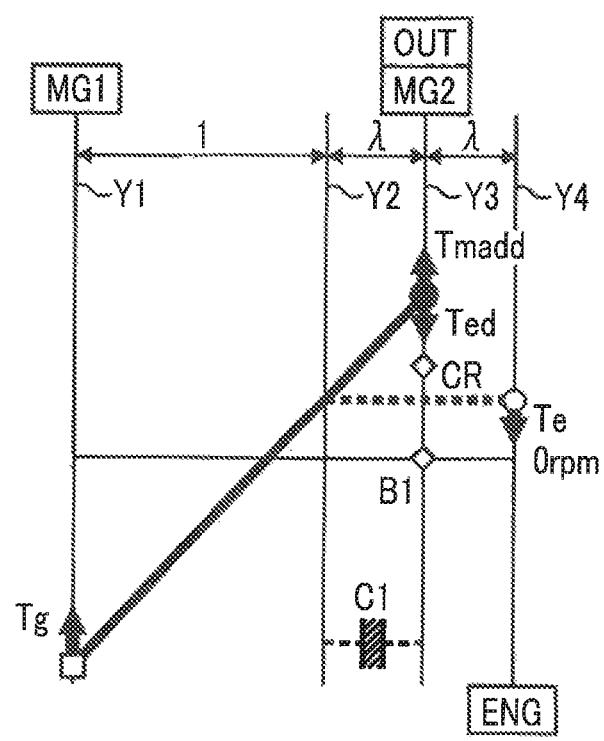
FIG. 61 is a view that illustrates an example of the case where an engine rotation speed is increased to start an engine by generating an MG1 torque in a state where a clutch C1 is engaged in the one-motor EV mode.

FIG. 61 is a view that illustrates an example of a case where the engine rotation speed Ne is increased to start the engine 512 by generating the MG1 torque Tg in a state where the clutch C1 is engaged in the one-motor EV mode with reference to a nomograph similar to the nomographs of FIG. 53 to FIG. 60. In FIG. 61, in such a start of the engine, torque Ted corresponding to the negative torque Te of the engine 512 (also referred to as engine pull-in torque) resulting from an increase in the rotation of the engine 512 not in operation as a reaction force for increasing the engine rotation speed Ne is transmitted to the first ring gear R1 ("OUT") coupled to the drive wheels 516, so a drop of driving torque occurs. In contrast, a shock at the time of starting the engine is reduced by outputting a torque Tmadd that compensates for a drop of driving torque (also referred to as compensating torque) with the use of the second electric rotary machine MG2. That is, in such a start of the engine, the electronic control unit 580 additionally causes the second electric rotary machine MG2 to output the compensating torque Tmadd as a reaction force cancellation torque. The state shown in FIG. 61 is during the transition of a start of the engine, that is, the engine rotation speed Ne is being increased. During EV driving, the rotation of each of the rotating elements of the first planetary gear mechanism 850, which are integrally rotated as a result of the engaged clutch C1 and indicated by dashed line, is set to zero. When engine brake is acting, the engine rotation speed Ne is increased as in the case of the state shown in FIG. 61.

In FIG. 61, the ratio of spacing between adjacent lines among the vertical lines Y1 to Y4 is $1:\lambda:\lambda$ as shown in the drawing. Each "$\lambda$" in the second term and the third term is calculated on the basis of the gear ratio (=Number of teeth of the sun gear/Number of teeth of the ring gear) of each of the planetary gear mechanisms 848, 850, and is not always the same value. In the present embodiment, each "$\lambda$" in the second term and the third term is assumed as the same value for the sake of convenience. In starting the engine as shown in FIG. 61 as well, since the clutch C1 is engaged, the rotating elements of the first planetary gear mechanism 850, indicated by dashed line, are integrally rotated. In this state, when a positive torque Tg is output from the first electric rotary machine MG1, the rotation of the engine 512 coupled to the second sun gear S2 of the first planetary gear mechanism 850 is increased. In starting the engine, the torque Ted transmitted to the first ring gear R1 ("OUT") is $1/(1+\lambda) \times Te$. For this reason, the compensating torque Tmadd that compensates for a drop of driving torque in the first ring gear R1 ("OUT") is $1/(1+\lambda) \times Te$. This is due to the same principle as the fact that the engine direct torque in the O/D HV mode (forward traveling) is reduced from the engine torque Te as described above. In calculations here, inertial terms are omitted.

Incidentally, because the compensating torque Tmadd is the amount of increase in the torque of the second electric rotary machine MG2, if the engine 512 is started in a state where the second electric rotary machine MG2 has been already outputting the large MG2 torque Tm, there is a possibility that it is not possible to provide the required compensating torque Tmadd. Then, there is a concern that the second electric rotary machine MG2 cannot sufficiently compensate for a drop of driving torque and, as a result, it is not possible to reduce a shock at the time of starting the engine.

When the electronic control unit 580 starts the engine 512 in the one-motor EV mode, the electronic control unit 580 operates the clutch CR from the released state toward the engaged state in a state where the clutch C1 is engaged, and causes the first electric rotary machine MG1 to output the compensating torque Tmadd. In addition to the engaged state of the clutch C1, when a torque capacity (hereinafter, referred to as CR torque Tcr) is generated in the clutch CR, the state shifts into a state of the direct-coupling fixed gear mode where the clutch C1 and the clutch CR both are engaged (see FIG. 59), so it is possible to increase the engine rotation speed Ne without generating the MG1 torque Tg (positive torque). Such a start of the engine by generating the CR torque Tcr in the clutch CR does not use the MG1 torque Tg (positive torque), so it is possible to use the MG1 torque Tg (negative torque) in order to provide the compensating torque Tmadd. Thus, when the engine 512 is started, it is possible to easily compensate for a drop of driving torque. Because the second electric rotary machine MG2 does not need to leave the compensating torque Tmadd without using for EV driving since the first electric rotary machine MG1 is able to output the compensating torque Tmadd, the region in which EV driving is performed with the use of the second electric rotary machine MG2 (that is, the region of the one-motor EV mode) expands.

Figure 62:
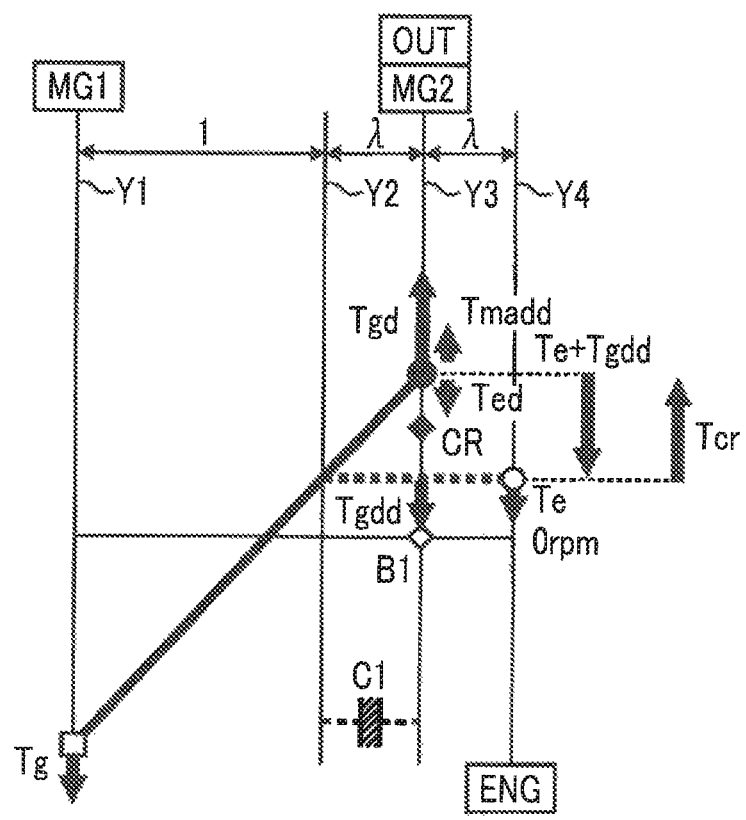
FIG. 62 is a view that illustrates an example of the case where the engine rotation speed is increased and the engine is started by operating the clutch CR from the released state toward the engaged state in a state where the clutch C1 is engaged in the one-motor EV mode and a first electric rotary machine is caused to output a compensating torque.

FIG. 62 is a view that illustrates an example of the case where the engine 512 is started by increasing the engine rotation speed Ne through operation of the clutch CR from the released state toward the engaged state in a state where the clutch C1 is engaged in the one-motor EV mode and the first electric rotary machine MG1 is caused to output the compensating torque Tmadd with reference to the same nomograph as FIG. 61. FIG. 35 is a graph that illustrates CR torque Tcr that is required to generate in the clutch CR (hereinafter, required CR torque Tcrn) in the case where the first electric rotary machine MG1 outputs the compensating torque Tmadd.

In FIG. 62, since the clutch C1 is engaged, the rotating elements of the first planetary gear mechanism 850, indicated by dashed line, are integrally rotated. In this state, the rotation of the engine 512 coupled to the second sun gear S2 of the first planetary gear mechanism 850 is increased by generating the CR torque Tcr in the clutch CR as a result of operating the clutch CR from the released state toward the engaged state. In starting the engine, the clutch CR is in a slipping state; however, the CR torque Tcr is generated to increase the engine rotation speed Ne, so the torque Ted transmitted to the first ring gear R1 ("OUT") is the engine pull-in torque Te.

In addition, in starting the engine by generating the CR torque Tcr in the clutch CR, the compensating torque Tmadd is generated by using the MG1 torque Tg (negative torque). The MG1 torque Tg (negative torque) adds a torque (this torque is denoted by Tgd) for compensating for a drop of driving torque to the first ring gear R1 ("OUT"). On the other hand, the MG1 torque Tg (negative torque) adds a torque (this torque is denoted by Tgdd) in the direction to reduce the engine rotation speed Ne to the first planetary gear mechanism 850 that is indicated by dashed line and integrally rotated since the clutch C1 is engaged. Therefore, a torque that acts on the first ring gear R1 ("OUT") at the time when the CR torque Tcr is generated to increase the engine rotation speed Ne is Tgd−|Te+Tgdd|. When it is assumed that the state where the CR torque Tcr is generated in addition to the engaged state of the clutch C1 is equivalent to the state of the direct-coupling fixed gear mode (see FIG. 59) in which both the clutch C1 and the clutch CR are engaged, the absolute value of the MG1 torque Tg (negative torque) is Tgd−|Tgdd|. For this reason, a torque that acts on the first ring gear R1 ("OUT") is |Tg|−|Te|. Thus, when the first electric rotary machine MG outputs at least a torque corresponding to the engine pull-in torque Te as the MG1 torque Tg (negative torque), it is possible to compensate for a drop of driving torque. In calculations here, inertial terms are omitted.

As a condition that it is possible to increase the engine rotation speed Ne by generating the CR torque Tcr, at least the CR torque Tcr corresponding to the torque Tgdd that is added to the first planetary gear mechanism 850 by the MG1 torque Tg (negative torque) is required in addition to the engine pull-in torque Te. Thus, the required CR torque Tcrn is a torque that exceeds |Te+Tgdd|. The torque Tgdd is $(1+\lambda)/\lambda \times Tg$, so the required CR torque Tcrn with which the engine rotation speed Ne is increased is a torque that exceeds a torque $(=|Te+(1+\lambda)/\lambda \times Tg|)$ as indicated by continuous line in FIG. 35. In calculations here, inertial terms are omitted.

As described with reference to FIG. 62 and FIG. 35, even when the second electric rotary machine MG2 is not outputting part of the compensating torque Tmadd, but when the first electric rotary machine MG1 outputs the MG1 torque Tg (negative torque) corresponding to the engine pull-in torque Te, it is possible to provide the compensating torque Tmadd. Therefore, the region of the one-motor EV mode is allowed to be set on the basis of the maximum torque of the second electric rotary machine MG2, so it is possible to expand the region of EV driving beyond the region of the one-motor EV mode, which is set on the basis of a torque obtained by subtracting the compensating torque Tmadd from the maximum torque of the second electric rotary machine MG2.

As the absolute value of the MG1 torque Tg (negative torque) increases, the required CR torque Tcrn is also increased. In addition, in starting the engine by generating the CR torque Tcr, the clutch CR is in a slipping state, so there is a possibility that a thermal inconvenience occurs. For this reason, it is desirable to set the upper limit value of the absolute value of the MG1 torque Tg (negative torque) in consideration of a possible value as the CR torque Tcr.

When the first electric rotary machine MG1 outputs the MG1 torque Tg (negative torque) that exceeds the compensating torque Tmadd, it is possible to accelerate while starting the engine by increasing driving torque.

In order to implement the above-described engine start control, the electronic control unit 580 further includes condition determination means, that is, the condition determination unit 586, start control means, that is, the start control unit 588, and torque compensation control means, that is, the torque compensation control unit 589.

When the engine is started by generating the MG1 torque Tg (positive torque) (see FIG. 61), the condition determination unit 586 determines whether the second electric rotary machine MG2 is able to provide a required compensating torque Tmadd. For example, the condition determination unit 586 determines whether a torque obtained by subtracting the MG2 torque Tm, which corresponds to the required driving torque and which is currently being output from the second electric rotary machine MG2, from the MG2 torque Tm that is currently outputtable from the second electric rotary machine MG2 is insufficient for the compensating torque Tmadd during EV driving in the one-motor EV mode. The compensating torque Tmadd is $1/(1+\lambda) \times Te$ as described above. The engine pull-in torque Te is, for example, calculated on the basis of a rotation increasing acceleration at the time of starting the engine based on purification requirements of exhaust gas, or the like.

At the time of starting the engine 512, when the condition determination unit 586 determines that the compensating torque Tmadd in starting the engine by generating the MG1 torque Tg (positive torque) is not insufficient, the start control unit 588, for example, starts the engine 512 by causing the first electric rotary machine MG1 to output the MG1 torque Tg (positive torque) in a state where the clutch C1 is engaged and igniting fuel while increasing the engine rotation speed Ne (see FIG. 61).

At the time of starting the engine 512, when the condition determination unit 586 determines that the compensating torque Tmadd in starting the engine by generating the MG1 torque Tg (positive torque) is insufficient, the start control unit 588 starts the engine 512 by operating the clutch CR from the released state to the engaged state in a state where the clutch C1 is engaged and igniting fuel while increasing the engine rotation speed Ne (see FIG. 62).

In starting the engine by operating the clutch CR from the released state toward the engaged state, any one of the first electric rotary machine MG1 and the second electric rotary machine MG2 is able to generate the compensating torque Tmadd. That is, when the engine 512 is started, the torque compensation control unit 589 is able to output a torque from each of the first electric rotary machine MG1 and the second electric rotary machine MG2 such that a drop of driving torque is reduced. In compensating for a drop of driving torque with the use of the second electric rotary machine MG2, the compensating torque Tmadd is allowed to directly act on the drive wheels 516, so it is relatively easy to control the magnitude of the compensating torque Tmadd. On the other hand, in compensating for a drop of driving torque with the use of the first electric rotary machine MG1, a reaction torque is provided by the clutch CR being operated from the released state toward the engaged state in a slipping state, so it is relatively difficult to control the magnitude of the compensating torque Tmadd that acts on the drive wheels 516. For this reason, the torque compensation control unit 589 causes the first electric rotary machine MG1 to output a torque by which the MG2 torque Tm is insufficient for a torque for reducing a drop of driving torque such that the compensating torque Tmadd that is generated by the second electric rotary machine MG2 is output in preference to the compensating torque Tmadd that is generated by the first electric rotary machine MG1. That is, the first electric rotary machine MG1 provides an insufficient amount of the compensating torque Tmadd by outputting the MG1 torque Tg (negative torque).

More specifically, when the start control unit 588 stars the engine 512 by operating the clutch CR from the released state toward the engaged state, the torque compensation control unit 589 executes MG1 assist for causing the first electric rotary machine MG1 to generate the compensating torque Tmadd. In MG1 assist, the torque compensation control unit 589 outputs the MG1 torque Tg (negative torque) from the first electric rotary machine MG1 such that a drop of driving torque is reduced.

In starting the engine by operating the clutch CR from the released state toward the engaged state, the torque Ted that is transmitted to the first ring gear R1 ("OUT") is the engine pull-in torque Te, as described above. Therefore, in such a start of the engine, when the compensating torque Tmadd is not provided by using the MG1 torque Tg (negative torque), the compensating torque Tmadd that is generated by the second electric rotary machine MG2 is −Te. Therefore, the MG1 torque Tg (negative torque) in MG1 assist is a torque by which the MG2 torque Tm is insufficient for the compensating torque Tmadd (=−Te). That is, the MG1 torque Tg (negative torque) is a torque by which a torque obtained by subtracting the MG2 torque Tm, which corresponds to the required driving torque and which is currently being output from the second electric rotary machine MG2, from the MG2 torque Tm that is currently outputtable from the second electric rotary machine MG2 is insufficient for the compensating torque Tmadd (=−Te). When the second electric rotary machine MG2 is not able to output part of the compensating torque Tmadd or when an embodiment in which the second electric rotary machine MG2 originally does not output the compensating torque Tmadd is employed, the torque compensation control unit 589 outputs the MG1 torque Tg (negative torque) from the first electric rotary machine MG1 such that a drop of driving torque is reduced with the use of only the first electric rotary machine MG1.

As the vehicle load (for example, required driving torque) reduces, the MG2 torque Tm that is used to drive the vehicle 810 reduces, so a margin of the MG2 torque Tm, which is allowed to be used for the compensating torque Tmadd, relatively increases. As described above, it is desirable to use the MG2 torque Tm for the compensating torque Tmadd in preference to the MG1 torque Tg (negative torque). Therefore, the torque compensation control unit 589 decreases the absolute value of the MG1 torque Tg (negative torque) that is output from the first electric rotary machine MG1 as the vehicle load reduces.

The compensating torque Tmadd that is generated by the first electric rotary machine MG1 acts in the direction to reduce the rotation speed of the second ring gear R2 (that is, the rotating elements of the first differential unit 846, which are integrally rotated because of the engaged clutch C1) coupled to the first carrier CA1 (that is, acts as a reaction torque on the clutch CR from the released state toward the engaged state). For this reason, the torque compensation control unit 589 sets the absolute value of the MG1 torque Tg (negative torque) that is output from the first electric rotary machine MG1 to a predetermined value or smaller. The predetermined value is set on the basis of the CR torque Tcr that can be generated on the basis of for example, a thermal load, or the like, and the torque ($=|Te+(1+\lambda)/\lambda \times Tg|$) indicated by continuous line in FIG. 35.

In starting the engine by operating the clutch CR from the released state toward the engaged state, a change in the engine rotation speed Ne tends to fluctuate with respect to a target value, so there is a possibility that the combustion stability of the engine 512 is impaired. The engine rotation speed Ne is subjected to feedback control with the use of the MG1 torque Tg of which the time constant is smaller than the CR hydraulic pressure Pcr for operating the clutch CR. That is, when the engine 512 is started, the torque compensation control unit 589 outputs the MG1 torque Tg from the first electric rotary machine MG1 under feedback control such that the engine rotation speed Ne varies along the target value.

When the working oil temperature THoil for operating the clutch CR is low, there is a possibility that the response (which is synonymous with controllability) of the clutch CR decreases due to a high viscosity of working oil. When the working oil temperature THoil is high, there is a possibility that the response of the clutch CR decreases due to leakage of working oil from the clearances, and the like, of valves (a solenoid valve, a pressure regulating valve, and the like, provided in the hydraulic control circuit 554) associated with supply of hydraulic pressure to the clutch CR. When the response of the clutch CR is low, the response of engine start can decrease. In such a case, although the compensating torque Tmadd is insufficient, it is more desirable to start the engine by generating the MG1 torque Tg (positive torque) than to start the engine by operating the clutch CR from a released state toward an engaged state. That is, even when it is not possible to reduce a drop of driving torque, ensuring the response of engine start is given a higher priority.

More specifically, at the time of starting the engine 512, when the condition determination unit 586 determines that the compensating torque Tmadd in starting the engine by generating the MG1 torque Tg (positive torque) is insufficient, the condition determination unit 586 determines that the response (controllability) at the time of operating the clutch CR is high or low on the basis of the working oil temperature THoil of working oil for operating the clutch CR. The condition determination unit 586 determines whether the response at the time of operating the clutch CR is high or low on the basis of whether the working oil temperature THoil is higher than a predetermined oil temperature. The predetermined oil temperature is, for example, a threshold determined in advance for determining that the viscosity of working oil is low to such an extent that the response of the clutch CR is ensured. In other words, the condition determination unit 586 determines whether the response for operating the clutch CR is high or low on the basis of whether the working oil temperature THoil is lower than a second predetermined oil temperature. The second predetermined oil temperature is, for example, a value higher than the predetermined oil temperature and is a threshold determined in advance for determining that leakage of working oil from the valves is reduced to such an extent that the response of the clutch CR is ensured.

When the condition determination unit 586 determines that the response for operating the clutch CR is high, the start control unit 588 executes engine start control (also referred to as CR clutch engaging engine start) for operating the clutch CR from the released state toward the engaged state in a state where the clutch C1 is engaged. On the other hand, when the condition determination unit 586 determines that the response for operating the clutch CR is low, the start control unit 588 executes engine start control (also referred to as normal engine start) for increasing the engine rotation speed Ne with the use of the first electric rotary machine MG1 in a state where the clutch C1 is engaged and the clutch CR is released.

Figure 63:
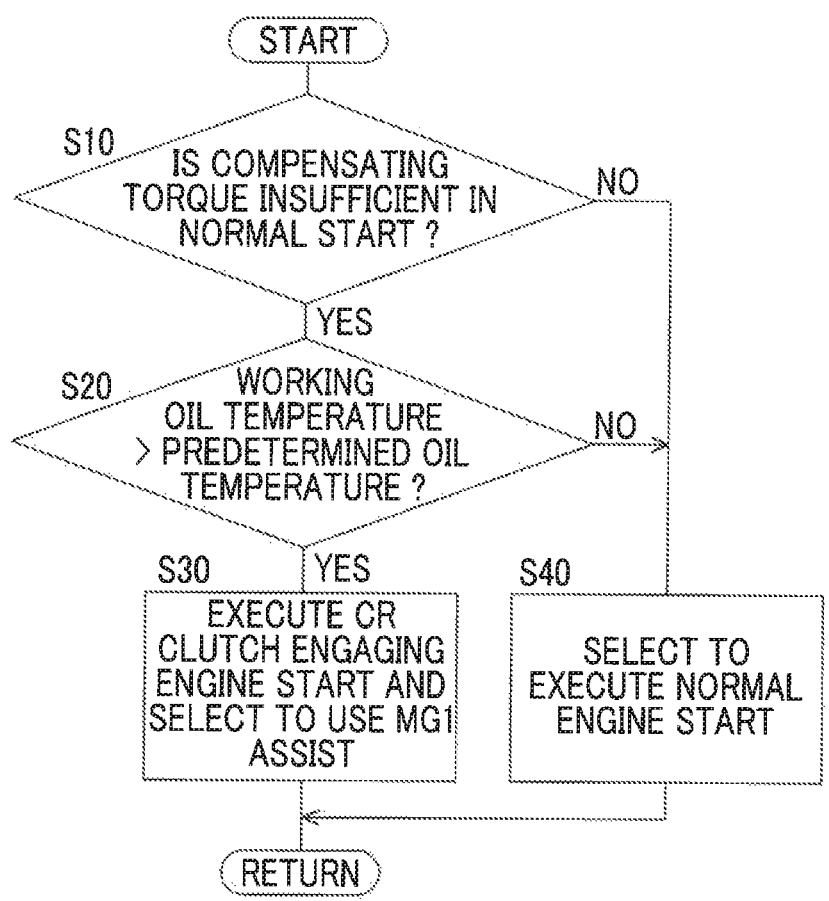
FIG. 63 is a flowchart that illustrates a relevant portion of control operations of an electronic control unit, that is, control operations for making it easy to compensate for a drop of driving torque at the time when the engine is started.
Figure 64:
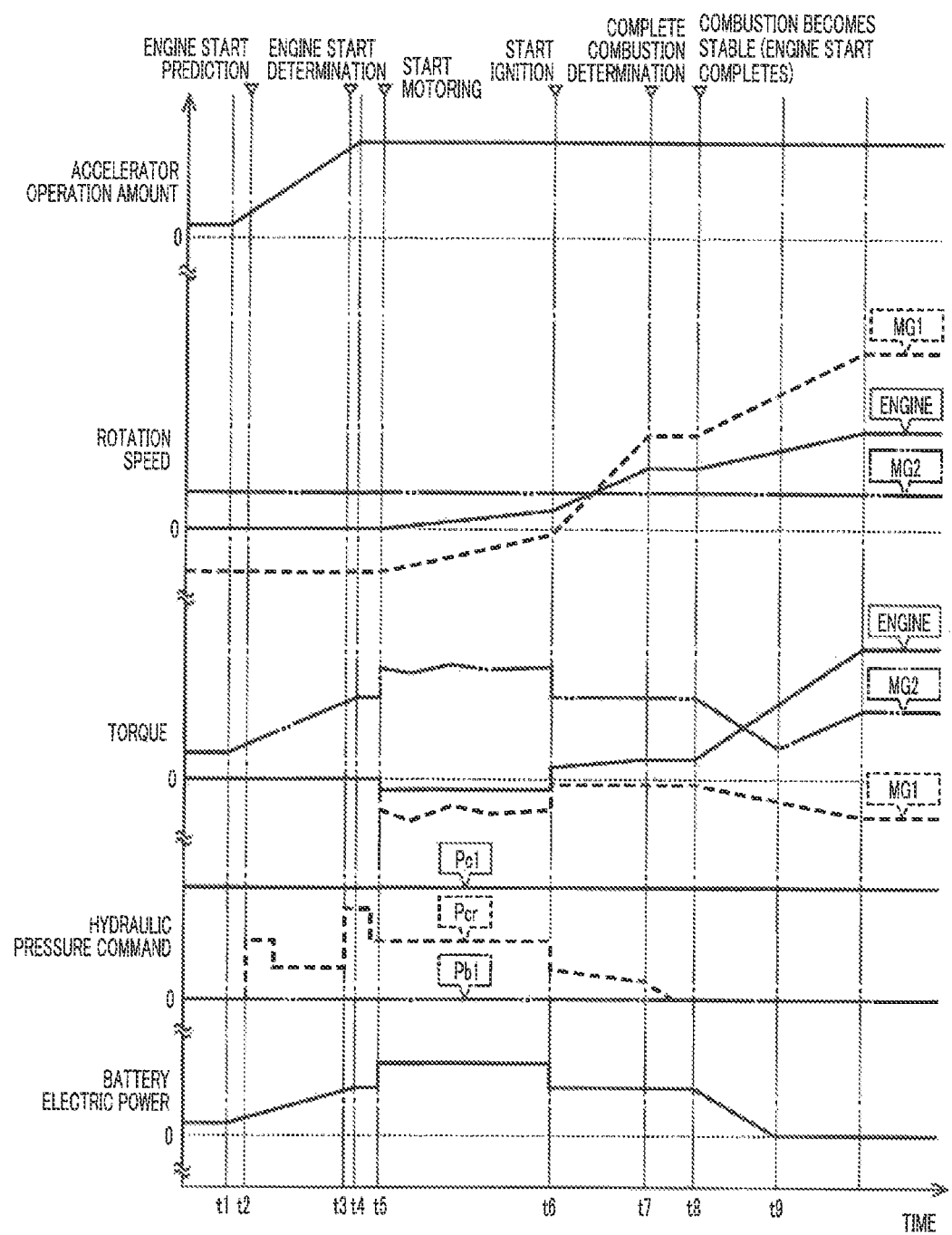
FIG. 64 is a view that shows an example of a timing chart in the case where the control operations shown in the flowchart of FIG. 63 are executed.

FIG. 63 is a flowchart that illustrates a relevant portion of control operations of the electronic control unit 580, that is, control operations for easily compensating for a drop of driving torque at the time of starting the engine 512. This flowchart is, for example, executed when it is determined to start the engine during EV driving. FIG. 64 is a view that shows an example of a timing chart in the case where the control operations shown in the flowchart of FIG. 63 are executed.

In FIG. 63, initially, in step (hereinafter, step is omitted) S10 corresponding to the function of the condition determination unit 586, it is determined whether the compensating torque Tmadd that is generated by the second electric rotary machine MG2 is insufficient in the case where normal engine start is executed. When affirmative determination is made in S10, it is determined in S20 corresponding to the function of the condition determination unit 586 whether the response for operating the clutch CR is high on the basis of whether the working oil temperature THoil is higher than the predetermined oil temperature. For example, whether the response for operating the clutch CR is high may be determined on the basis of whether the working oil temperature THoil is lower than the second predetermined oil temperature (> the predetermined oil temperature). When affirmative determination is made in S20, CR clutch engaging engine start is selected and executing MG1 assist (that is, with MG1 assist) is selected in S30 corresponding to the functions of the start control unit 588 and torque compensation control unit 589. Subsequent to S30, the engine 512 is started by operating the clutch CR from the released state toward the engaged state in a state where the clutch C1 is engaged and igniting fuel while increasing the engine rotation speed Ne. In starting the engine, the compensating torque Tmadd is output from the first electric rotary machine MG1 and the second electric rotary machine MG2. The MG1 torque Tg (negative torque) is output with MG1 assist as a torque by which the MG2 torque Tm is insufficient for the required compensating torque Tmadd (see FIG. 62). On the other hand, when negative determination is made in S10 or when negative determination is made in S20, normal engine start is selected in S40 corresponding to the function of the start control unit 588. Subsequent to S40, the engine 512 is started by outputting the MG1 torque Tg (positive torque) from the first electric rotary machine MG1 in a state where the clutch C1 is engaged and igniting fuel while increasing the engine rotation speed Ne (see FIG. 61).

FIG. 64 shows the case where CR clutch engaging engine start from a state where the vehicle 810 is performing EV driving at a constant accelerator operation amount. In FIG. 64, during EV driving where the operation of the engine 512 is stopped in a state where the one-motor EV mode in which the clutch C1 is engaged (see engine brake is additionally used in FIG. 52) or the O/D HV mode (forward traveling) is established, the accelerator operation amount θacc begins to increase (see time t1). Accordingly, the required driving torque increases, so the MG2 torque Tm also increases, a positive electric power (that is, battery discharge electric power) of electric power (also referred to as battery electric power) of the battery unit 520 also increases in proportion (see time t1 to time t4). After that, as a result of the fact that the accelerator operation amount θacc has increased, it is determined to start the engine (see time t3). Thus, the CR torque Tcr is generated in the clutch CR. A hydraulic pressure command value for supplying the CR hydraulic pressure Pcr may be output from the time at which it is determined to start the engine or in order to improve the response for engaging the clutch CR, as shown in the example of FIG. 64, it may be predicted to start the engine and then start preparation for generating the CR torque Tcr from the time at which it is predicted to start the engine. For example, a threshold at which it is predicted to start the engine is set to the accelerator operation amount θacc lower than a threshold at which it is determined to start the engine. Time t2 indicates that preparation for generating the CR torque Tcr is started since the accelerator operation amount θacc has reached the threshold at which it is predicted to start the engine. In preparation for generating the CR torque Tcr, initially, a temporary high hydraulic pressure for moving the pressure regulating valve that supplies the CR hydraulic pressure Pcr is output as a hydraulic pressure command value of the CR hydraulic pressure Pcr, and, after that, a constant standby pressure for moving a piston of the clutch CR is output (see time t2 to time t3). The constant standby pressure is not the one for moving the piston until completion of a so-called packing for packing the clearance between friction materials of the clutch CR. In the example of FIG. 64, after it is predicted to start the engine, the accelerator operation amount θacc has increased, so it is determined to start the engine, and the hydraulic pressure command value of the CR hydraulic pressure Pcr for generating the CR torque Tcr begins to be output (see time t3). In outputting the hydraulic pressure command value, initially, a temporary high hydraulic pressure for packing the clutch CR is output, and, after that, the constant standby pressure is output (see time t3 to time t6). As the CR torque Tcr actually begins to be generated as a result of outputting the hydraulic pressure command value of the CR hydraulic pressure Pcr for generating the CR torque Tcr, the engine rotation speed Ne begins to increase (see time t5). As an increase in the engine rotation speed Ne is detected, the MG2 torque Tm is increased and the MG1 torque Tg (negative torque) is output in order to output the compensating torque Tmadd (see time t5 to time t6). Since each of the electric rotary machines MG1, MG2 includes a resolver, the beginning of an increase in the engine rotation speed Ne can be accurately detected on the basis of the MG1 rotation speed Ng and the MG2 rotation speed Nm. By utilizing detection of the beginning of such an increase in the engine rotation speed Ne, the relationship between a CR torque Tcr and a hydraulic pressure command value of the CR hydraulic pressure Per for generating the CR torque Tcr may be learned, and the hydraulic pressure command value of the CR hydraulic pressure Per, which is used at the time of starting the engine next time may be corrected. Alternatively, the hydraulic pressure command value of the CR hydraulic pressure Per may be corrected by using the CR hydraulic pressure Per detected by a CR hydraulic pressure sensor 574 or a piston stroke detected by a piston stroke sensor in the clutch CR. As the engine rotation speed Ne begins to increase, feedback control is executed with the use of the first electric rotary machine MG1 such that a desired trajectory of increase in the engine rotation speed Ne is obtained. Since the response of the first electric rotary machine MG1 is higher than the CR hydraulic pressure Per, followability to a target improves. Since a driving torque fluctuates due to fluctuations of the MG1 torque Tg (negative torque) in feedback control, the fluctuations are cancelled by the MG2 torque Tm (see time t5 to time t6). As the engine rotation speed Ne reaches a predetermined rotation speed, the engine 512 is ignited (see time t6). With an increase in the engine torque Te after ignition, the hydraulic pressure command value for decreasing the CR hydraulic pressure Per is output in preparation for engine driving thereafter (see time t6 to time t8). After ignition, it is determined whether the engine 512 has performed complete combustion (see time t7), and, when combustion becomes stable, the engine torque Te is increased (see time t8 and later). Since the drive mode is changed to engine driving that uses the engine power Pe as a main power source, battery electric power that is used for propelling the vehicle 810 is reduced (see time t8 to time t9).

As described above, according to the present embodiment, when the engine 512 is started, not the MG1 torque Tg (positive torque) that is used to start the engine 512 in a state where the clutch C1 is engaged and the clutch CR is released but the clutch CR is operated from the released state toward the engaged state in a state where the clutch C1 is engaged and the MG1 torque Tg (negative torque) is output such that a drop of driving torque is reduced, so it is possible to generate the compensating torque Tmadd with the use of the first electric rotary machine MG1. Thus, when the engine 512 is started, it is possible to easily compensate for a drop of driving torque. Thus, for example, when all the compensating torque Tmadd is provided by the second electric rotary machine MG2, it is possible to expand a motor driving region of the second electric rotary machine MG2, which is determined such that the compensating torque Tmadd is reserved.

According to the present embodiment, when the engine 512 is started, a torque is output from each of the first electric rotary machine MG1 and the second electric rotary machine MG2 such that a drop of driving torque is reduced, so it is possible to generate the compensating torque Tmadd with the use of both the first electric rotary machine MG1 and the second electric rotary machine MG2. Thus, it is easy to reduce a shock at the time of starting the engine.

According to the present embodiment, since the absolute value of the MG1 torque Tg (negative torque) is set to the predetermined value or smaller, it is possible to achieve both an increase in the engine rotation speed Ne with the use of the clutch CR and compensation for a drop of driving torque with the use of the first electric rotary machine MG1.

According to the present embodiment, since the absolute value of the MG1 torque Tg (negative torque) is reduced as the vehicle load reduces, that is, a margin of the MG2 torque Tm relatively increases, the compensating torque Tmadd that is generated by the second electric rotary machine MG2 is increased, so it is possible to stably compensate for a drop of driving torque. Thus, it is easy to reduce a shock at the time of starting the engine.

According to the present embodiment, since a torque by which the MG2 torque Tm is insufficient for a torque for reducing a drop of driving torque is output from the first electric rotary machine MG1, the compensating torque Tmadd that is generated by the second electric rotary machine MG2 is output in preference to the compensating torque Tmadd that is generated by the first electric rotary machine MG1, so it is possible to stably compensate for a drop of driving torque. Thus, it is easy to reduce a shock at the time of starting the engine.

According to the present embodiment, when the engine 512 is started, the MG1 torque Tg is output under feedback control such that the engine rotation speed Ne varies along the target value, so it is possible to reduce variations in the engine rotation speed Ne with the use of the first electric rotary machine MG1 having a higher response than operation of the clutch CR. Thus, it is easy to ensure the combustion stability of the engine 512.

According to the present embodiment, when the response at the time of operating the clutch CR is low, engine start control for increasing the engine rotation speed Ne with the use of the first electric rotary machine MG1 in a state where the clutch C1 is engaged and the clutch CR is released is executed, so it is possible to ensure the response at the time of starting the engine 512.

According to the present embodiment, whether the response at the time of operating the clutch CR is high or low is determined on the basis of the working oil temperature THoil of working oil for operating the clutch CR, and, when the response of the clutch CR is low, the response at the time of starting the engine 512 is ensured by executing engine start control with the use of the first electric rotary machine MG1 in order to ensure a smooth start of the engine 512.

According to the present embodiment, the second differential unit 844 includes a single-pinion planetary gear mechanism in which the first sun gear S1 is the fifth rotating element RE5, the first ring gear R1 is the sixth rotating element RE6 and the first carrier CA1 is the fourth rotating element RE4, so, when the differential status of the second differential unit 844 is controlled in a state where the clutch C1 is engaged and the clutch CR is released, a torque reduced from the engine torque Te is mechanically transmitted to the first ring gear R1.

Next, an eleventh embodiment will be described. In the following description, like reference numerals denote portions common to the embodiments, and the description is omitted.

In the above-described tenth embodiment, when the response at the time of operating the clutch CR is high, CR clutch engaging engine start is executed, and the MG1 torque Tg (negative torque) is output through MG1 assist to provide the compensating torque Tmadd. On the other hand, when the response at the time of operating the clutch CR is low, normal engine start is executed by using the MG torque Tg (positive torque). In normal engine start, the compensating torque Tmadd is provided by using only the MG2 torque Tm. Therefore, when the response at the time of operating the clutch CR is high, it is possible to reduce the MG2 torque Tm that is required to be reserved (that is, the MG2 torque Tm that is left without being used in EV driving) in order to be used as the compensating torque Tmadd at the time of starting the engine. In an extreme case, in an embodiment in which the compensating torque Tmadd is provided by using the MG1 torque Tg (negative torque), it is not required to reserve the MG2 torque Tm in order to be used as the compensating torque Tmadd. On the other hand, when the response at the time of operating the clutch CR is low, combustion stability at the time of starting the engine improves through normal engine start using the MG1 torque Tg (positive torque), but the compensating torque Tmadd is generated with the use of only the second electric rotary machine MG2. Therefore, the electronic control unit 580 narrows the region of EV driving where the vehicle 810 travels by using the second electric rotary machine MG2 as a driving force source in a state where the operation of the engine 512 is stopped in the case where the response at the time of operating the clutch CR is low as compared to the case where the response at the time of operating the clutch CR is high.

Specifically, when the condition determination unit 586 determines that the response at the time of operating the clutch CR is high, the hybrid control unit 582 selects (sets) the first EV region as the region of the one-motor EV mode. On the other hand, when the condition determination unit 586 determines that the response at the time of operating the clutch CR is low, the hybrid control unit 582 selects (sets) the second EV region as the region of the one-motor EV mode. The first EV region is set such that, for example, a high load-side vehicle load region is wide (that is, the required driving torque is expanded to a higher torque region) as compared to the second EV region.

FIG. 38 is a flowchart that illustrates a relevant portion of control operations of the electronic control unit 580, that is, control operations for changing the EV region on the basis of a response at the time of operating the clutch CR. The flowchart is, for example, repeatedly executed during traveling. FIG. 38 has been already described in the above-described seventh embodiment, so the description thereof is omitted.

As described above, according to the present embodiment, the region of EV driving in the case where the response at the time of operating the clutch CR is low is narrower than the region of EV driving in the case where the response at the time of operating the clutch CR is high, so, at the time of starting the engine 512, a margin of the MG2 torque Tm tends to be reserved (that is, the compensating torque Tmadd that is generated by the second electric rotary machine MG2 tends to be reserved).

FIG. 65 is a view that illustrates the schematic configuration of devices regarding traveling of a vehicle 900 according to a twelfth embodiment. In FIG. 65, the vehicle 900 is a hybrid vehicle including the engine 512, the first electric rotary machine MG1, the second electric rotary machine MG2, a power transmission system 902 and the drive wheels 516. The power transmission system 902 includes the first electric rotary machine MG1 and the second electric rotary machine MG2.

The power transmission system 902 is provided in the power transmission path between the engine 512 and the drive wheels 516. The power transmission system 902 includes a first power transmission unit 904, the second power transmission unit 526, the driven gear 530, the driven shaft 532, the final gear 534 (which has a smaller diameter than the driven gear 530), the differential gear 538, and the like, inside the case 522. The driven gear 530 is in mesh with the drive gear 528. The drive gear 528 is an output rotating member of the first power transmission unit 904. The driven gear 530 is fixed to the driven shaft 532 so as to be relatively non-rotatable. The final gear 534 is fixed to the driven shaft 532 so as to be relatively non-rotatable. The differential gear 538 is in mesh with the final gear 534 via the differential ring gear 536. The power transmission system 902 includes the axles 540 coupled to the differential gear 538, and the like.

The first power transmission unit 904 is arranged coaxially with the input shaft 542 that is an input rotating member of the first power transmission unit 904, and includes a second differential unit 906, a first differential unit 908 and the clutch CR. The second differential unit 906 includes the second planetary gear mechanism 848 (second differential mechanism) and the first electric rotary machine MG1. The first differential unit 908 includes the first planetary gear mechanism 850 (first differential mechanism), the clutch C1 and the brake B1.

In the second differential unit 906, the first carrier CA1 is the fourth rotating element RE4 that is an input element coupled to the output rotating member of the first differential unit 908 (that is, the second carrier CA2 of the first planetary gear mechanism 850), and serves as an input rotating member of the second differential unit 906. The first sun gear S1 is integrally coupled to the rotor shaft 552 of the first electric rotary machine MG1, and is the fifth rotating element RE5 that is a reaction element to which the first electric rotary machine MG1 is coupled such that power is transmittable. The first ring gear R1 is integrally coupled to the drive gear 528, and is the sixth rotating element RE6 that is an output element coupled to the drive wheels 516. The first ring gear R1 serves as an output rotating member of the second differential unit 906.

In the first differential unit 908, the second sun gear S2 is the first rotating element RE1 that is integrally coupled to the input shaft 542 and to which the engine 512 is coupled via the input shaft 542 such that power is transmittable. The second sun gear S2 serves as an input rotating member of the first differential unit 908. The second ring gear R2 is the third rotating element RE3 selectively coupled to the case 522 via the brake B1. The second carrier CA2 is the second rotating element RE2 coupled to the input rotating member of the second differential unit 906 (that is, the first carrier CA1 of the second planetary gear mechanism 848). The second carrier CA2 serves as an output rotating member of the first differential unit 908. The second sun gear S2 and the second carrier CA2 are selectively coupled to each other via the clutch C1. The first sun gear S1 and the second ring gear R2 are selectively coupled to each other via the clutch CR. Thus, the clutch C1 is the first engaging device that selectively couples the first rotating element RE1 to the second rotating element RE2. The clutch CR is the second engaging device that selectively couples the fifth rotating element RE5 to the third rotating element RE3. The brake B1 is the third engaging device that selectively couples the third rotating element RE3 to the case 522 that is the non-rotating member.

The second planetary gear mechanism 848 is able to serve as a power split mechanism that distributes the power of the engine 512, input to the first carrier CA1, between the first electric rotary machine MG1 and the first ring gear R1 in a state where differential motion is permitted. Thus, the second differential unit 906 serves as a known electrical differential unit (electrical continuously variable transmission). That is, the second differential unit 906 is an electrical transmission mechanism in which the differential status of the second planetary gear mechanism 848 is controlled as a result of control over the operation status of the first electric rotary machine MG1.

The first differential unit 908 is able to establish four states, that is, a direct-coupling state, an underdrive state, a neutral state and an internal lock state, by changing the operation statuses of the clutch C1 and brake B1. Specifically, when the clutch C1 is engaged, the first differential unit 908 is placed in the direct-coupling state where the rotating elements of the first planetary gear mechanism 850 rotate integrally. When the brake B1 is engaged, the first differential unit 908 is placed in the underdrive state where the rotation speed of the second carrier CA2 is reduced from the engine rotation speed Ne. When the clutch C1 is released and the brake B1 is released, the first differential unit 908 is placed in the neutral state where the differential motion of the first planetary gear mechanism 850 is permitted. When the clutch C1 is engaged and the brake B1 is engaged, the first differential unit 908 is placed in the internal lock state where the rotation of each of the rotating elements of the first planetary gear mechanism 850 stops.

The first power transmission unit 904 is able to constitute an electrical continuously variable transmission that operates at a power split ratio different from a power split ratio in the second differential unit 906. That is, in the first power transmission unit 904, in addition to the fact that the first carrier CA1 (fourth rotating element RE4) is coupled to the second carrier CA2 (second rotating element RE2), the first sun gear S1 (fifth rotating element RE5) is coupled to the second ring gear R2 (third rotating element RE3) by engaging the clutch CR. As a result, the second differential unit 906 and the first differential unit 908 constitute one differential mechanism, the second differential unit 906 and the first differential unit 908 as a whole are allowed to serve as an electrical continuously variable transmission that operates at a power split ratio different from the power split ratio of the second differential unit 906 alone.

In the first power transmission unit 904, the first differential unit 908 and the second differential unit 906 by which the four states are established are coupled to each other, and the vehicle 900 is able to achieve a plurality of drive modes (described later) in synchronization with a change of the operation status of the clutch CR.

In the thus configured first power transmission unit 904, the power of the engine 512 and the power of the first electric rotary machine MG1 are transmitted from the drive gear 528 to the driven gear 530. Therefore, the engine 512 and the first electric rotary machine MG1 are coupled to the drive wheels 516 via the first power transmission unit 904 such that power is transmittable.

In the second power transmission unit 526, the power of the second electric rotary machine MG2 is transmitted to the driven gear 530 without passing through the first power transmission unit 904. Therefore, the second electric rotary machine MG2 is coupled to the drive wheels 516 such that power is transmittable without passing through the first power transmission unit 904. That is, the second electric rotary machine MG2 is an electric rotary machine coupled to the axles 540 that are the output rotating members of the power transmission system 902 such that power is transmittable without passing through the first power transmission unit 904.

The thus configured power transmission system 902 is suitably used for an FF vehicle. In the power transmission system 902, the power of the engine 512, the power of the first electric rotary machine MG1 or the power of the second electric rotary machine MG2 is transmitted to the driven gear 530, and is transmitted from the driven gear 530 to the drive wheels 516 via the final gear 534, the differential gear 538, the axles 540, and the like, sequentially. In the vehicle 900, the engine 512, the first power transmission unit 904 and the first electric rotary machine MG1 are arranged along the axis different from the axis along which the second electric rotary machine MG2 is arranged, so the axial length is reduced.

The vehicle 900 includes the electronic control unit 580 including a controller that controls the devices regarding traveling. The vehicle 900 further includes the power control unit 518, the battery unit 520, the hydraulic control circuit 554, a mechanical oil pump (not shown), and the like.

The drive modes that are allowed to be performed by the vehicle 900 will be described with reference to FIG. 66, and FIG. 67 to FIG. 74. FIG. 66 is an operation engagement chart that shows the operation status of each of the clutch C1, the brake B1 and the clutch CR in each drive mode. A circle mark, a blank, a triangle mark, "G" and "M" in the chart of FIG. 66 are the same as those of FIG. 52 according to the above-described tenth embodiment, so the description is omitted. As shown in FIG. 66, the vehicle 900 is able to selectively execute an EV drive mode and an HV drive mode as a drive mode.

FIG. 67 to FIG. 74 are nomographs that relatively show the rotation speeds of rotating elements RE1 to RE6 in the second planetary gear mechanism 848 and the first planetary gear mechanism 850. In these nomographs, vertical lines Y1 to Y4 represent the rotation speeds of the rotating elements. In order from the left side when facing toward the sheet, the vertical line Y1 represents the rotation speed of the first sun gear S1 that is the fifth rotating element RE5 coupled to the first electric rotary machine MG1 and the rotation speed of the second ring gear R2 that is the third rotating element RE3 that is selectively coupled to the case 522 via the brake B1, the vertical line Y2 represents the rotation speed of the first carrier CA1 that is the fourth rotating element RE4 and the rotation speed of the second carrier CA2 that is the second rotating element RE2, the first carrier CA1 and the second carrier CA2 being coupled to each other, the vertical line Y3 represents the rotation speed of the first ring gear R1 that is the sixth rotating element RE6 coupled to the drive gear 528, and the vertical line Y4 represents the rotation speed of the second sun gear S1 that is the first rotating element RE1 coupled to the engine 512. Various marks, that is, an open square mark, an open circle mark, an open rhombus mark, a solid circle mark, a solid rhombus mark, an arrow, clutch C1, continuous line and dashed line, are the same as those of FIG. 53 to FIG. 60 of the above-described tenth embodiment, so the description is omitted.

Figure 67:
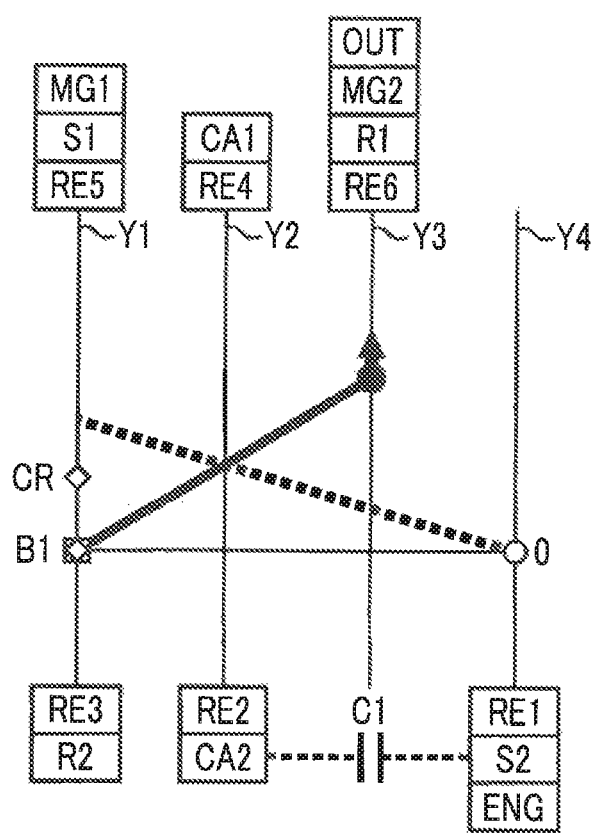
FIG. 67 is a nomograph in one-motor EV mode in the vehicle shown in FIG. 65.

FIG. 67 is a nomograph in one-motor EV mode. As shown in FIG. 66, the one-motor EV mode is achieved in a state where all the clutch C, the brake B1 and the clutch CR are released. The hybrid control unit 582 stops the operation of the engine 512, and outputs the MG2 torque Tm for propelling the vehicle 900 from the second electric rotary machine MG2. FIG. 67 shows a case at the time when the vehicle 900 travels forward in a state where the second electric rotary machine MG2 rotates in the positive direction (that is, the rotation direction of the first ring gear R1 at the time when the vehicle 900 travels forward) to output a positive torque. At the time when the vehicle 900 travels backward, the second electric rotary machine MG2 is rotated in the reverse direction in contrast to the operation at the time when the vehicle 900 travels forward. When engine brake is additionally used, as shown in FIG. 66, the clutch C1 or the clutch CR is engaged (see engine brake is additionally used in the one-motor EV mode). Engine brake is allowed to function by engaging the brake B1.

Figure 68:
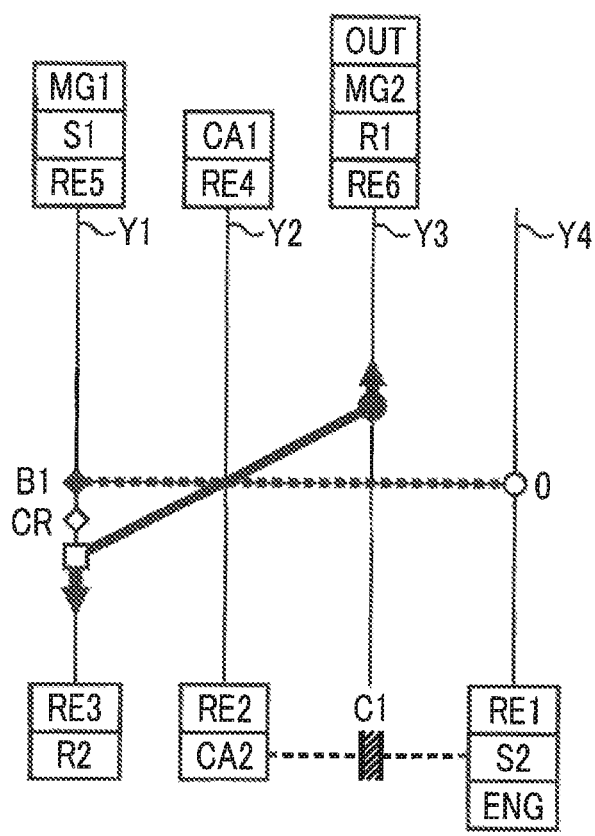
FIG. 68 is a nomograph in two-motor EV mode in the vehicle shown in FIG. 65.

FIG. 68 is a nomograph in two-motor EV mode. As shown in FIG. 66, the two-motor EV mode is achieved in a state where the clutch C1 and the brake B1 are engaged and the clutch CR is released. The hybrid control unit 582 stops the operation of the engine 512, and causes the first electric rotary machine MG1 and the second electric rotary machine MG2 to output the MG1 torque Tg and the MG2 torque Tm for propelling the vehicle 900. FIG. 68 shows a case at the time when the vehicle 900 travels forward in a state where the second electric rotary machine MG2 rotates in the positive direction to output a positive torque and the first electric rotary machine MG1 rotates in the negative direction to output a negative torque. At the time when the vehicle 900 travels backward, the first electric rotary machine MG1 and the second electric rotary machine MG2 are rotated in the reverse direction in contrast to the operation at the time when the vehicle 900 travels forward.

Figure 69:
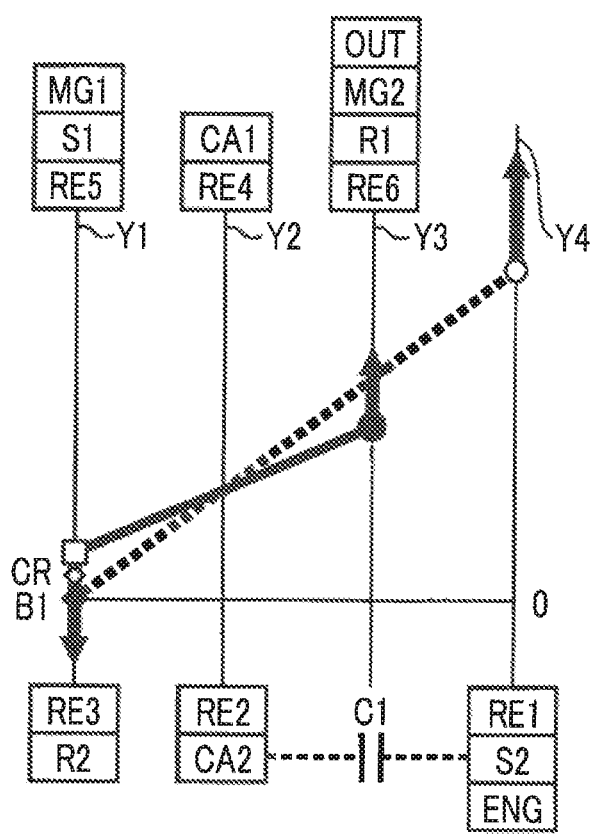
FIG. 69 is a nomograph at the time when the vehicle travels forward in O/D HV mode in the HV drive mode in the vehicle shown in FIG. 65 in the case of low gear input.
Figure 70:
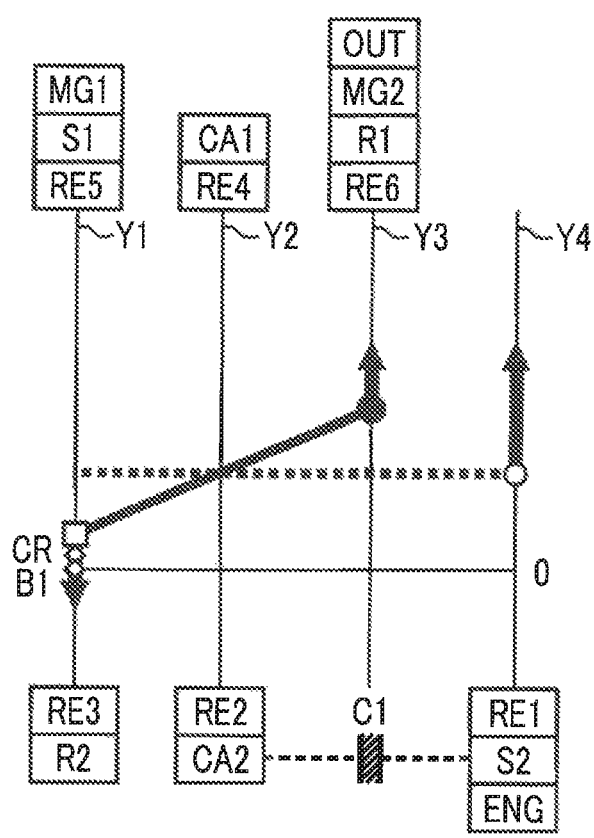
FIG. 70 is a nomograph at the time when the vehicle travels forward in O/D HV mode in the HV drive mode in the vehicle shown in FIG. 65 in the case of high gear input.
Figure 71:
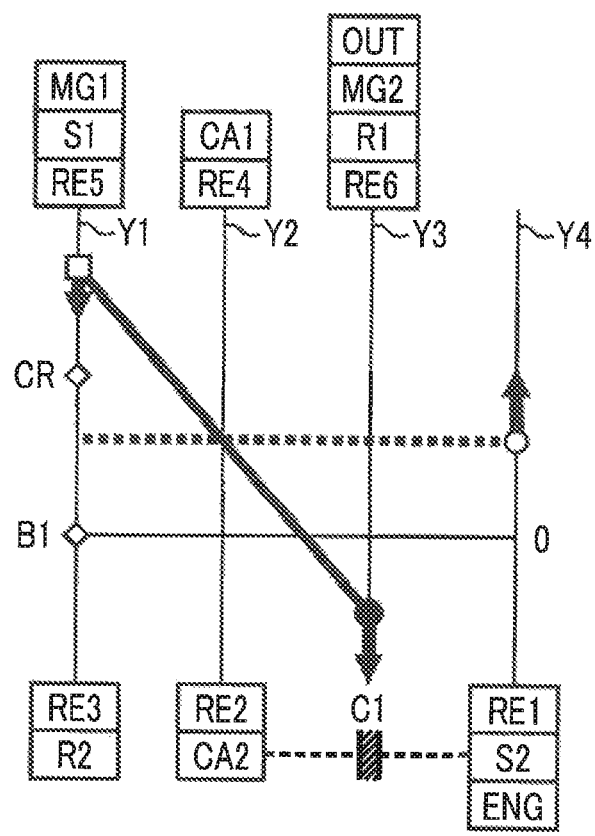
FIG. 71 is a nomograph at the time when the vehicle travels backward in O/D HV mode in the HV drive mode in the vehicle shown in FIG. 65 in the case of high gear input.

FIG. 69 is a nomograph at the time when the vehicle 900 travels forward in O/D HV mode in the HV drive mode, and shows a case of low gear input where the engine rotation speed Ne is reduced in speed and input to the components that achieve the function of the electrical continuously variable transmission. FIG. 70 is a nomograph at the time when the vehicle 900 travels forward in O/D HV mode in the HV drive mode, and shows a case of high gear input where the engine rotation speed Ne is input at a constant speed to the components that achieve the function of the electrical continuously variable transmission. FIG. 71 is a nomograph at the time when the vehicle 900 travels backward in O/D HV mode in the HV drive mode, and shows a case of high gear input where the engine rotation speed Ne is input at a constant speed to the components that achieve the function of the electrical continuously variable transmission. As shown in FIG. 66, low gear input in the O/D HV mode (hereinafter, referred to as O/D HV mode Lo) is achieved in a state where the brake B1 is engaged and the clutch C1 and the clutch CR are released. As shown in FIG. 66, high gear input in the O/D HV mode (hereinafter, referred to as O/D HV mode Hi) is achieved in a state where the clutch C1 is engaged and the brake B1 and the clutch CR are released. In the O/D HV mode Lo, the clutch C1 is released and the brake B1 is engaged, and the first differential unit 908 is placed in the underdrive state, so the power of the engine 512 is transmitted to the first carrier CA1 coupled to the second carrier CA2 in a state where the engine rotation speed Ne is reduced. On the other hand, in the O/D HV mode Hi, the clutch C1 is engaged and the brake B1 is released, and the first differential unit 908 is placed in the direct-coupling state, so the power of the engine 512 is transmitted to the first carrier CA1 coupled to the second carrier CA2 in a state where the engine rotation speed Ne remains unchanged. In addition, in the O/D HV mode, the clutch CR is released, so the second differential unit 906 alone constitutes an electrical continuously variable transmission. Thus, the first power transmission unit 904 is able to distribute the power of the engine 512, input to the first carrier CA1, between the first sun gear S1 and the first ring gear R1. That is, in the first power transmission unit 904, the engine direct torque is mechanically transmitted to the first ring gear R1 by providing a reaction force against the engine torque Te, which is input to the first carrier CA1, with the use of the first electric rotary machine MG1, and electric power generated by the first electric rotary machine MG1 by using the power of the engine 512, distributed to the first electric rotary machine MG1, is transmitted to the second electric rotary machine MG2 via a predetermined electrical path. The hybrid control unit 582 causes the engine 512 to operate, causes the MG1 torque Tg that is a reaction torque against the engine torque Te to be output through power generation of the first electric rotary machine MG1, and causes the MG2 torque Tm to be output from the second electric rotary machine MG2 by using electric power generated by the first electric rotary machine MG1. FIG. 69 shows a case at the time when the vehicle 900 travels forward in a state where the second electric rotary machine MG2 is outputting a positive torque in the positive direction. At the time when the vehicle 900 travels backward, the second electric rotary machine MG2 is rotated in the reverse direction in contrast to the operation at the time when the vehicle 900 travels forward. FIG. 70 shows a case at the time when the vehicle 900 travels forward in a state where the second electric rotary machine MG2 rotates in the positive direction to output a positive torque. FIG. 71 shows a case at the time when the vehicle 900 travels backward in a state where the second electric rotary machine MG2 rotates in the negative direction to output a negative torque.

Figure 72:
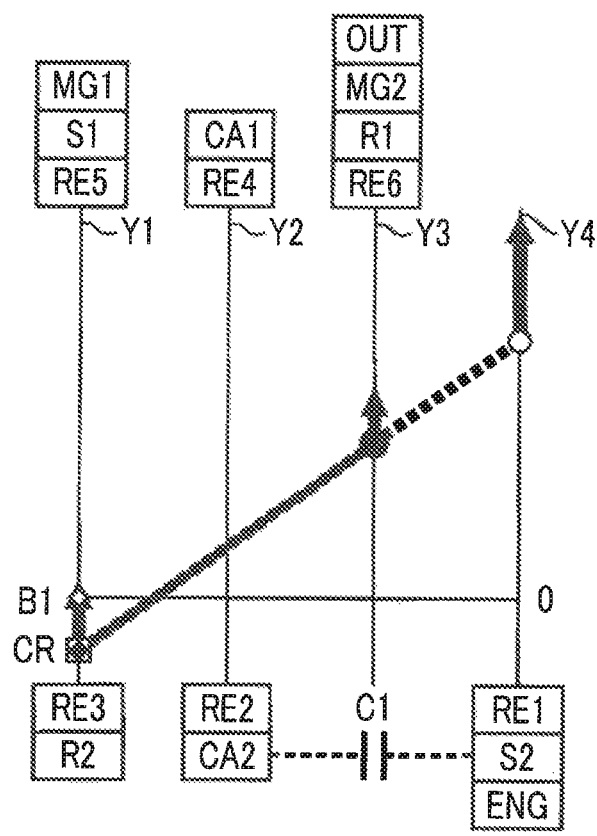
FIG. 72 is a nomograph in U/D HV mode in the HV drive mode in the vehicle shown in FIG. 65.

FIG. 72 is a nomograph in U/D HV mode in the HV drive mode. As shown in FIG. 66, the U/D HV mode is achieved in a state where the clutch C1 and the brake B1 are released and the clutch CR is engaged. In the U/D HV mode, the second differential unit 906 and the first differential unit 908 as a whole constitute an electrical continuously variable transmission that operates at a power split ratio different from the power split ratio of the second differential unit 906 alone. Thus, the first power transmission unit 904 is able to distribute the power of the engine 512, which is input to the second sun gear S2, between the first sun gear S1 and the first ring gear R1. That is, in the first power transmission unit 904, the engine direct torque is mechanically transmitted to the first ring gear R1 by providing a reaction force against the engine torque Te, which is input to the second sun gear SS, with the use of the first electric rotary machine MG1, and electric power generated by the first electric rotary machine MG1 by using the power of the engine 512, distributed to the first electric rotary machine MG1, is transmitted to the second electric rotary machine MG2 via a predetermined electrical path. The hybrid control unit 582 causes the engine 512 to operate, causes the MG1 torque Tg that is a reaction torque against the engine torque Te to be output through power generation of the first electric rotary machine MG1, and causes the MG2 torque Tm to be output from the second electric rotary machine MG2 by using electric power generated by the first electric rotary machine MG1. FIG. 72 shows a case at the time when the vehicle 900 travels forward in a state where the second electric rotary machine MG2 rotates in the positive direction to output a positive torque. At the time when the vehicle 900 travels backward, the second electric rotary machine MG2 is rotated in the reverse direction in contrast to the operation at the time when the vehicle 900 travels forward.

As described with reference to FIG. 69 to FIG. 72, the O/D HV mode and the U/D HV mode differ from each other in the rotating element, to which the power of the engine 512 is input, in the components that achieve the function of the electrical continuously variable transmission, so the O/D HV mode and the U/D HV mode differ from each other in the power split ratio at the time when the first power transmission unit 904 is caused to serve as the electrical continuously variable transmission. The engine direct torque in the O/D HV mode is reduced from the engine torque Te. On the other hand, the engine direct torque in the U/D HV mode is increased from the engine torque Te. In the present embodiment, the second differential unit 906 alone constitutes the electrical continuously variable transmission in the O/D HV mode (see FIG. 69 to FIG. 71). Thus, when the differential status of the second differential unit 906 is controlled as a result of control over the operation status of the first electric rotary machine MG1 in a state where the clutch C1 is engaged and the clutch CR is released, a torque reduced from the engine torque Te is mechanically transmitted to the first ring gear R1.

Figure 73:
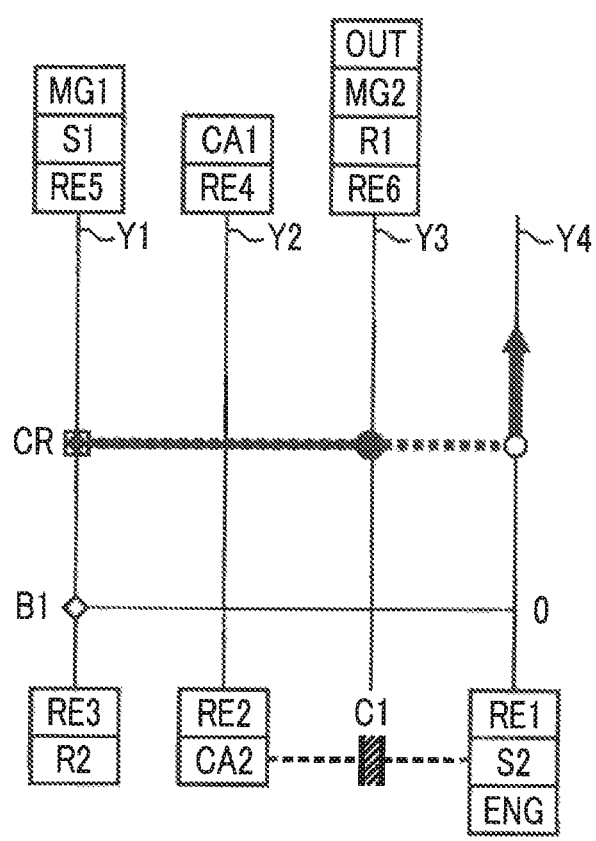
FIG. 73 is a nomograph in fixed gear mode in the HV drive mode in the vehicle shown in FIG. 65 in the case of direct coupling.

FIG. 73 is a nomograph in fixed gear mode in the HV drive mode, and shows a case of direct coupling where the rotating elements of the second differential unit 906 and first differential unit 908 are integrally rotated. As shown in FIG. 66, the direct-coupling fixed gear mode is achieved in a state where the clutch C1 and the clutch CR are engaged and the brake B1 is released. Thus, the first power transmission unit 904 is able to directly output the power of the engine 512 from the first ring gear R1. The hybrid control unit 582 causes the engine 512 to output the engine torque Te for propelling the vehicle 900. Thus, the hybrid control unit 582 is allowed to not only cause the engine torque Te to be output but also cause at least one of the first electric rotary machine MG1 and the second electric rotary machine MG2 to output a torque for propelling the vehicle 900.

Figure 74:
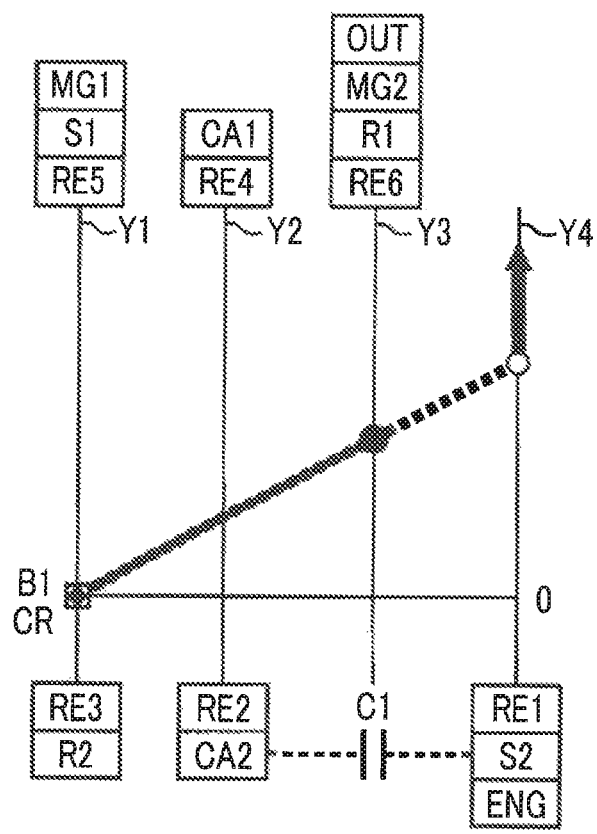
FIG. 74 is a nomograph in fixed gear mode in the HV drive mode in the vehicle shown in FIG. 65 in the case of U/D.

FIG. 74 is a nomograph in the fixed gear mode in the HV drive mode, and shows a case of underdrive (U/D) where the rotation of the engine 512 is reduced in speed and output from the first ring gear R1. As shown in FIG. 66, the U/D in the fixed gear mode (hereinafter, referred to as U/D fixed gear mode) is achieved in a state where the brake B1 and the clutch CR are engaged and the clutch C1 is released. In the U/D fixed gear mode, the clutch CR is engaged, so the second differential unit 906 and the first differential unit 908 constitute one differential mechanism. In addition, in the U/D fixed gear mode, the brake B1 is engaged and the clutch C1 is released, so the first differential unit 908 is placed in the underdrive state. Thus, in the first power transmission unit 904, the rotation of the engine 512, which is input to the second sun gear S2, is reduced in speed and output from the first ring gear R1. The hybrid control unit 582 causes the engine 512 to output the engine torque Te for propelling the vehicle 900. Thus, the hybrid control unit 582 is allowed to not only cause the engine torque Te to be output but also cause the second electric rotary machine MG2 to output a torque for propelling the vehicle 900. The U/D fixed gear mode is advantageous at the time of, for example, hill climbing, towing, or the like.

The hybrid control unit 582 determines which drive mode should be established by applying the vehicle speed V and the vehicle load (for example, required driving torque) to the drive mode change map as shown in FIG. 30 or FIG. 31 of the above-described sixth embodiment. When the determined drive mode is the current drive mode, the hybrid control unit 582 maintains the current drive mode. When the determined drive mode is different from the current drive mode, the hybrid control unit 582 establishes the determined drive mode instead of the current drive mode. In the present embodiment, in the region of each of the direct-coupling fixed gear modes shown in FIG. 30 and FIG. 31, a low vehicle speed-side region may be set for the region of the U/D fixed gear mode.

The power transmission changing unit 584 controls engaging operations (operation statuses) of the clutch C1, brake B1 and clutch CR on the basis of the drive mode established by the hybrid control unit 582. The power transmission changing unit 584 outputs the hydraulic control command signal Sp for engaging and/or releasing each of the clutch C1, the brake B1 and the clutch CR to the hydraulic control circuit 554 in order to allow transmission of power for traveling in the drive mode established by the hybrid control unit 582.

When the engine 512 is started in the one-motor EV mode, the electronic control unit 580 sets the clutch C1, the clutch CR or the brake B1 to an engaged state, and, in this state, ignites fuel while increasing the engine rotation speed Ne with the use of the first electric rotary machine MG1 as needed. In such a start of the engine, the electronic control unit 580 additionally causes the second electric rotary machine MG2 to output the compensating torque Tmadd as a reaction force cancellation torque.

In the vehicle 900 according to the present embodiment, as in the case of the vehicle 810 of the above-described tenth and eleventh embodiments, there is a concern that the second electric rotary machine MG2 cannot sufficiently compensate for a drop of driving torque and, as a result, it is not possible to reduce a shock at the time of starting the engine. In contrast, in the vehicle 900 according to the present embodiment, as in the case of the vehicle 810 of the above-described tenth and eleventh embodiments, CR clutch engaging engine start is executed, and the MG1 torque Tg (negative torque) is output through MG1 assist to provide the compensating torque Tmadd. That is, the control operations of the electronic control unit 580, shown in the above-described tenth embodiment and eleventh embodiment, are allowed to be applied to the vehicle 900 according to the present embodiment. Thus, according to the present embodiment, similar advantageous effects to those of the above-described tenth and eleventh embodiments are obtained.

Figure 75:
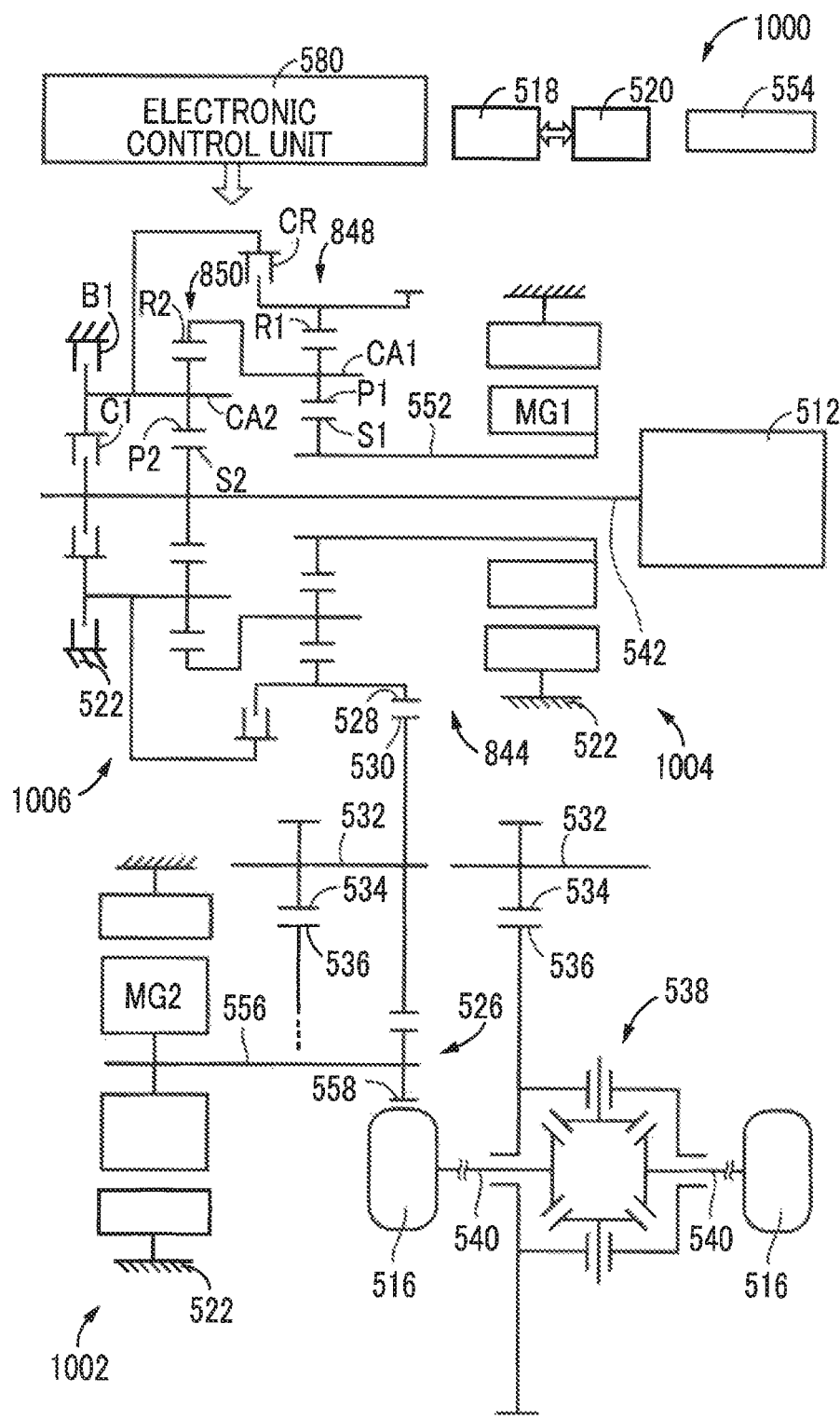
FIG. 75 is a view that illustrates the schematic configuration of devices regarding traveling of a vehicle according to a thirteenth embodiment and that also illustrates a vehicle different from the vehicle shown in FIG. 51 or the vehicle shown in FIG. 65.

FIG. 75 is a view that illustrates the schematic configuration of devices regarding traveling of a vehicle 1000 according to a thirteenth embodiment. In FIG. 75, the vehicle 1000 is a hybrid vehicle including the engine 512, the first electric rotary machine MG1, the second electric rotary machine MG2, a power transmission system 1002 and the drive wheels 516. The power transmission system 1002 includes the first electric rotary machine MG1 and the second electric rotary machine MG2.

The power transmission system 1002 is provided in the power transmission path between the engine 512 and the drive wheels 516. The power transmission system 1002 includes a first power transmission unit 1004, the second power transmission unit 526, the driven gear 530, the driven shaft 532, the final gear 534 (which has a smaller diameter than the driven gear 530), the differential gear 538, and the like, inside the case 522. The driven gear 530 is in mesh with the drive gear 528. The drive gear 528 is an output rotating member of the first power transmission unit 1004. The driven gear 530 is fixed to the driven shaft 532 so as to be relatively non-rotatable. The final gear 534 is fixed to the driven shaft 532 so as to be relatively non-rotatable. The differential gear 538 is in mesh with the final gear 534 via the differential ring gear 536. The power transmission system 1002 includes the axles 540, coupled to the differential gear 538, and the like.

The first power transmission unit 1004 is arranged coaxially with the input shaft 542 that is an input rotating member of the first power transmission unit 1004, and includes the second differential unit 844, a first differential unit 1006 and the clutch CR. The second differential unit 844 includes the second planetary gear mechanism 848 (second differential mechanism) and the first electric rotary machine MG1. The first differential unit 1006 includes the first planetary gear mechanism 850 (first differential mechanism), the clutch C1 and the brake B1.

In the second differential unit 844, the first carrier CA1 is the fourth rotating element RE4 that is an input element coupled to the output rotating member of the first differential unit 1006 (that is, the second ring gear R2 of the first planetary gear mechanism 850), and serves as an input rotating member of the second differential unit 844. The first sun gear S1 is integrally coupled to the rotor shaft 552 of the first electric rotary machine MG1, and is the fifth rotating element RE5 that is a reaction element to which the first electric rotary machine MG1 is coupled such that power is transmittable. The first ring gear R1 is integrally coupled to the drive gear 528, and is the sixth rotating element RE6 that is an output element coupled to the drive wheels 516. The first ring gear R1 serves as an output rotating member of the second differential unit 844.

In the first differential unit 1006, the second sun gear S2 is the first rotating element RE1 that is integrally coupled to the input shaft 542 and to which the engine 512 is coupled via the input shaft 542 such that power is transmittable. The second sun gear S2 serves as an input rotating member of the first differential unit 1006. The second carrier CA2 is the third rotating element RE3 selectively coupled to the case 522 via the brake B1. The second ring gear R2 is the second rotating element RE2 coupled to the input rotating member of the second differential unit 844 (that is, the first carrier CA1 of the second planetary gear mechanism 848). The second ring gear R2 serves as an output rotating member of the first differential unit 1006. The second sun gear S2 and the second carrier CA2 are selectively coupled to each other via the clutch C1. The first ring gear R1 and the second carrier CA2 are selectively coupled to each other via the clutch CR. Thus, the clutch C1 is the first engaging device that selectively couples the first rotating element RE1 to the third rotating element RE3. The clutch CR is the second engaging device that selectively couples the sixth rotating element RE6 to the third rotating element RE3. The brake B1 is the third engaging device that selectively couples the third rotating element RE3 to the case 522 that is the non-rotating member.

The first power transmission unit 1004 differs from the first power transmission unit 824 of the vehicle 810 according to the above-described tenth embodiment in the arrangement of the members, but the coupling relationship among the elements is the same except that the rotating elements of the first differential unit 1006, which are selectively coupled to each other by the clutch C1, are different from the rotating elements of the first differential unit 846 of the vehicle 810, which are selectively coupled to each other by the clutch C1. In the engaged state of the clutch C1 in the first differential unit 1006, as well as the engaged state of the clutch C1 in the first differential unit 846, the first differential unit 1006 is placed in the direct-coupling state where the rotating elements of the first planetary gear mechanism 850 are integrally rotated. For this reason, the first differential unit 1006, as well as the first differential unit 846, is able to establish four states, that is, a direct-coupling state, a reverse rotation speed change state of the engine 512, a neutral state and an internal lock state, by changing the operation statuses of the clutch C1 and brake B1. The first power transmission unit 1004, as well as the first power transmission unit 824, is able to constitute an electrical continuously variable transmission that operates at a power split ratio different from a power split ratio in the second differential unit 844. Therefore, in the first power transmission unit 1004, as well as the first power transmission unit 824, the first differential unit 1006 and the second differential unit 844 by which the four states are established are coupled to each other, and the vehicle 1000, as well as the vehicle 810, is able to achieve a plurality of drive modes in synchronization with a change of the operation status of the clutch CR.

In the thus configured first power transmission unit 1004, the power of the engine 512 and the power of the first electric rotary machine MG1 are transmitted from the drive gear 528 to the driven gear 530. Therefore, the engine 512 and the first electric rotary machine MG1 are coupled to the drive wheels 516 via the first power transmission unit 1004 such that power is transmittable.

In the second power transmission unit 526, the power of the second electric rotary machine MG2 is transmitted to the driven gear 530 without passing through the first power transmission unit 1004. Therefore, the second electric rotary machine MG2 is coupled to the drive wheels 516 such that power is transmittable without passing through the first power transmission unit 1004. That is, the second electric rotary machine MG2 is an electric rotary machine coupled to the axles 540 that are the output rotating members of the power transmission system 1002 such that power is transmittable without passing through the first power transmission unit 1004.

The thus configured power transmission system 1002 is suitably used for an FF vehicle. In the power transmission system 1002, the power of the engine 512, the power of the first electric rotary machine MG1 or the power of the second electric rotary machine MG2 is transmitted to the driven gear 530, and is transmitted from the driven gear 530 to the drive wheels 516 via the final gear 534, the differential gear 538, the axles 540, and the like, sequentially. In the vehicle 1000, the engine 512, the first power transmission unit 1004 and the first electric rotary machine MG1 are arranged along the axis different from the axis along which the second electric rotary machine MG2 is arranged, so the axial length is reduced.

The vehicle 1000 includes the electronic control unit 580 including a controller that controls the devices regarding traveling. The vehicle 1000 further includes the power control unit 518, the battery unit 520, the hydraulic control circuit 554, the mechanical oil pump (not shown), and the like.

The vehicle 1000 is able to selectively execute an EV drive mode and an HV drive mode as a drive mode. Each drive mode that is allowed to be executed in the vehicle 1000 and the operation statuses of the engaging devices in each drive mode are the same as each drive mode and the operation statuses of the engaging devices, shown in the chart of FIG. 52 of the above-described tenth embodiment. Since the clutch C1 according to the present embodiment selectively couples the second sun gear S2 to the second carrier CA2, nomographs corresponding to the drive modes are the same as nomographs obtained by replacing the clutch C1 arranged so as to couple the second carrier CA2 (third rotating element RE3) to the second ring gear R2 (second rotating element RE2) with the clutch C1 arranged so as to couple the second sun gear S2 (first rotating element RE1) to the second carrier CA2 (third rotating element RE3) in the nomographs of FIG. 53 to FIG. 60 of the above-described tenth embodiment. Thus, the nomographs in the present embodiment are not shown, and description with reference to the nomographs is omitted.

The control operations of the electronic control unit 580, shown in the above-described tenth and eleventh embodiments, are allowed to be applied to the vehicle 1000 according to the present embodiment. Thus, according to the present embodiment, similar advantageous effects to those of the above-described tenth and eleventh embodiments are obtained.

The tenth to thirteenth embodiments are described in detail with reference to the accompanying drawings; however, the disclosed technical feature is applicable to other embodiments.

For example, in the above-described embodiments, as shown in the flowchart of FIG. 63, CR clutch engaging engine start with MG1 assist or normal engine start is selected and executed on the basis of whether the compensating torque Tmadd that is generated by the second electric rotary machine MG2 is insufficient, and the working oil temperature THoil; however, the invention is not limited to this configuration. For example, an embodiment in which the engine start method is changed on the basis of whether the compensating torque Tmadd is insufficient or the working oil temperature THoil may be employed or an embodiment in which the engine is constantly started through CR clutch engaging engine start with MG1 assist may be employed. In these embodiments, S10, S20, S40 in the flowchart of FIG. 63 are omitted as needed. When the clutch CR is configured to change its operation status depending on electrical power, whether to execute CR clutch engaging engine start may be determined on the basis of the status of an electrical power supply source. In this way, the steps of the flowchart of FIG. 63 can be changed as needed.

In the above-described embodiments, each of the second differential units 844, 906 includes a single-pinion second planetary gear mechanism 848 in which the first carrier CA1 is the fourth rotating element RE4, the first sun gear S1 is the fifth rotating element RE5 and the first ring gear R1 is the sixth rotating element RE6; however, the invention is not limited to this configuration. For example, each of the second differential units 844, 906 may include a single-pinion second planetary gear mechanism in which the first carrier CA1 is the fourth rotating element RE4, the first ring gear R1 is the fifth rotating element RE5 and the first sun gear S1 is the sixth rotating element RE6. In such a case, for example, in the nomographs of FIG. 53 to FIG. 60 of the above-described tenth embodiment, the first sun gear S1 and the first ring gear R1 are interchanged with each other. In short, each of the second differential units 844, 906 just needs to include a single-pinion planetary gear mechanism in which one of the first sun gear S1 and the first ring gear R1 is the fifth rotating element RE5, the other is the sixth rotating element RE6 and the first carrier CA1 is the fourth rotating element RE4. Each of the second differential units 844, 906 may include a double-pinion planetary gear mechanism instead of a single-pinion second planetary gear mechanism. In the case of a double-pinion planetary gear mechanism, one of the sun gear and the carrier is the fifth rotating element, the other is the sixth rotating element, and the ring gear is the fourth rotating element.

In the above-described embodiments, each of the vehicles 810, 900, 1000 includes the brake B1. Instead, the brake B1 does not always need to be provided. Even when each of the vehicles 810, 900, 1000 does not include the brake B1, each of the vehicles 810, 900, 1000 is able to selectively establish the one-motor EV mode or the HV drive mode, and is able to change the control mode between the O/D HV mode and the U/D HV mode in the HV drive mode. In short, as long as a vehicle includes the engine 512, the second differential unit 844, 906, the first differential unit 846, 908, 1006, and the second electric rotary machine MG2 coupled to the drive wheels 516 such that power is transmittable, the invention is allowed to be applied to the vehicle. Drive wheels W2 to which the second electric rotary machine MG2 is coupled such that power is transmittable do not always need to be the same as the drive wheels 516 to which the sixth rotating element of the second differential unit 844, 906 is coupled such that power is transmittable. For example, one of the pair of front wheels and the pair of rear wheels may be the drive wheels 516, and the other may be the drive wheels W2. In such a case, the drive wheels 516 and the drive wheel W2 are the drive wheels, and the sixth rotating element and the second electric rotary machine MG2 are coupled to the drive wheels together such that power is transmittable. The embodiments are described by using the power transmission systems 814, 902, 1002 that are respectively suitably used for the FF vehicles 810, 900, 1000; however, the disclosed technical features are also applicable to a power transmission system that is used for a vehicle of another system, such as an FR system and an RR system.

The above-described embodiments are only illustrative, and may be implemented in modes including various modifications or improvements on the basis of the knowledge of persons skilled in the art.

What is claimed is:

1. A power transmission system for transmitting power from an engine, the power transmission system characterized by comprising:
   a first differential mechanism connected to the engine, the first differential mechanism including a first rotating element, a second rotating element and a third rotating element, the first rotating element being connected to the engine;
   a second differential mechanism including a fourth rotating element, a fifth rotating element and a sixth rotating element, the fourth rotating element being connected to the second rotating element of the first differential mechanism, the fifth rotating element being connected to a first electric rotary machine, the sixth rotating element being an output element;
   a first engaging unit that is at least one of an engaging unit configured to releasably couple two of the first rotating element, the second rotating element and the third rotating element to each other and an engaging unit configured to releasably couple the third rotating element to a stationary element; and
   a second engaging unit configured to releasably couple the third rotating element of the first differential mechanism to one of the fifth rotating element and sixth rotating element of the second differential mechanism,
   wherein:
   the power transmission system includes a first HV drive mode and a second HV drive mode in which the engine is used as a power source, and a different status of the second differential mechanism is controlled by the first electric rotary machine, and in the first HV drive mode, the first engaging unit is caused to be engaged while the second engaging unit is caused to be released, and in the second HV drive mode, the first engaging unit is caused to be released while the second engaging unit is caused to be engaged.

2. The power transmission system according to claim 1, wherein each of the first differential mechanism and the second differential mechanism is a planetary gear mechanism,
the first rotating element is a sun gear,
the second rotating element is a carrier,
the third rotating element is a ring gear,
the fourth rotating element is a carrier,
the fifth rotating element is a sun gear,
the sixth rotating element is a ring gear,
the first engaging unit includes an engaging unit configured to releasably couple the first rotating element to the second rotating element and an engaging unit configured to releasably couple the third rotating element to the stationary element, and
the second engaging unit is configured to releasably couple the third rotating element to the fifth rotating element.

3. The power transmission system according to claim 1, wherein each of the first differential mechanism and the second differential mechanism is a planetary gear mechanism,
the first rotating element is a sun gear,
the second rotating element is a ring gear,
the third rotating element is a carrier,
the fourth rotating element is a carrier,
the fifth rotating element is a sun gear,
the sixth rotating element is a ring gear,
the first engaging unit includes an engaging unit configured to releasably couple the first rotating element to the third rotating element and an engaging unit configured to releasably couple the third rotating element to the stationary element, and
the second engaging unit is configured to releasably couple the third rotating element to the sixth rotating element.

4. The power transmission system according to claim 1, wherein each of the first differential mechanism and the second differential mechanism is a planetary gear mechanism,
the first rotating element is a sun gear,
the second rotating element is a ring gear,
the third rotating element is a carrier,
the fourth rotating element is a ring gear,
the fifth rotating element is a sun gear,
the sixth rotating element is a carrier,
the first engaging unit includes an engaging unit configured to releasably couple the first rotating element to the third rotating element and an engaging unit configured to releasably couple the third rotating element to the stationary element, and
the second engaging unit is configured to releasably couple the third rotating element to the sixth rotating element.

5. The power transmission system according to claim 1, wherein each of the first differential mechanism and the second differential mechanism is a planetary gear mechanism,
the first rotating element is a carrier,
the second rotating element is a sun gear,
the third rotating element is a ring gear,
the fourth rotating element is a sun gear,
the fifth rotating element is a ring gear,
the sixth rotating element is a carrier,
the first engaging unit includes an engaging unit configured to releasably couple the first rotating element to the third rotating element and an engaging unit configured to releasably couple the third rotating element to the stationary element, and
the second engaging unit is configured to releasably couple the third rotating element to the fifth rotating element.

6. The power transmission system according to claim 1, wherein each of the first differential mechanism and the second differential mechanism is a planetary gear mechanism,
the first rotating element is a ring gear,
the second rotating element is a sun gear,
the third rotating element is a carrier,
the fourth rotating element is a sun gear,
the fifth rotating element is a ring gear,
the sixth rotating element is a carrier,
the first engaging unit includes an engaging unit configured to releasably couple the first rotating element to the third rotating element and an engaging unit configured to releasably couple the third rotating element to the stationary element, and
the second engaging unit is configured to releasably couple the third rotating element to the fifth rotating element.

7. The power transmission system according to claim 1, wherein where a power split ratio at which a power of the engine is distributed between the fifth rotating element and the sixth rotating element in a state where the first engaging unit is engaged and the second engaging unit is not engaged is a first power split ratio and a power split ratio at which the power of the engine is distributed between the fifth rotating element and the sixth rotating element in a state where the second engaging unit is engaged and the first engaging unit is not engaged is a second power split ratio, the first power split ratio is different from the second power split ratio.

8. A vehicle characterized by comprising:

the power transmission system according to claim 1;
the first electric rotary machine of which an operating status is controlled to control a differential status of the second differential mechanism;
the engine coupled to the first rotating element such that power is transmittable;
a drive wheel coupled to the sixth rotating element; and
a second electric rotary machine coupled to the drive wheel such that power is transmittable.

9. The vehicle according to claim 8, wherein the electronic control unit is configured to, when the engine is started, output a torque from the first electric rotary machine such that a drop of an output torque from the drive wheel is reduced.

10. The vehicle according to claim 9, wherein the electronic control unit is configured to, when the engine is started, output a torque from each of the first electric rotary machine and the second electric rotary machine such that a drop of an output torque from the drive wheel is reduced.

11. The vehicle according to claim 9, wherein
the electronic control unit is configured to set a torque, which is output from the first electric rotary machine, to a predetermined value or smaller.

12. The vehicle according to claim 9, wherein
the electronic control unit is configured to reduce a torque that is output from the first electric rotary machine as a traveling load of the vehicle reduces.

13. The vehicle according to claim 9, wherein
the electronic control unit is configured to output, from the first electric rotary machine, a torque by which a torque of the second electric rotary machine is insufficient for a torque for reducing a drop of an output torque from the drive wheel.

14. The vehicle according to claim 9, wherein
the electronic control unit is configured to, when the engine is started, output a torque from the first electric rotary machine under feedback control such that a rotation speed of the engine varies along a target value.

15. The vehicle according to claim 8, wherein
the electronic control unit is configured to, when controllability at the time of operating the second engaging unit is higher than a predetermined criterion, execute engine start control for operating the second engaging unit from the released state toward the engaged state in a state where the first engaging unit is engaged, and
the electronic control unit is configured to, when the controllability at the time of operating the second engaging unit is lower than the predetermined criterion, execute engine start control for increasing a rotation speed of the engine with the use of the first electric rotary machine in a state where the first engaging unit is engaged and the second engaging unit is released.

16. The vehicle according to claim 15, wherein
the electronic control unit is configured to narrow a region of motor diving in the case where the controllability at the time of operating the second engaging unit is lower than the predetermined criterion as compared to a region of the motor driving in the case where the controllability at the time of operating the second engaging unit is higher than the predetermined criterion, and the motor driving is a drive mode in which the vehicle travels by using the second electric rotary machine as a driving force source in a state where an operation of the engine is stopped.

17. The vehicle according to claim 15, wherein
the electronic control unit is configured to, at least one of when a temperature of working oil for operating the second engaging unit is higher than a predetermined oil temperature and when the temperature of the working oil is lower than a second predetermined oil temperature that is higher than the predetermined oil temperature, determine that the controllability at the time of operating the second engaging unit is higher than the predetermined criterion.

18. The vehicle according to claim 8, wherein
the second differential mechanism includes a single-pinion planetary gear mechanism of which one of a sun gear and a ring gear is the fourth rotating element, the other of the sun gear and the ring gear is the fifth rotating element and a carrier is the sixth rotating element.

19. A vehicle according to claim 8, wherein,
the first electric rotary machine is configured so that an operating status of the first electric rotary machine is controlled to control a differential status of the second differential mechanism;
the engine being coupled to the first rotating element such that power is transmittable; and comprising:
a drive wheel coupled to the sixth rotating element;
a second electric rotary machine coupled to the drive wheel such that power is transmittable; and
an electronic control unit configured to
when the engine is started, operate the second engaging unit from a released state toward an engaged state when the first engaging unit is engaged, and
when the engine is started, output a torque from the first electric rotary machine such that a drop of an output torque from the drive wheel is reduced.

20. The vehicle according to claim 19, wherein
the electronic control unit is configured to, when the engine is started, output a torque from each of the first electric rotary machine and the second electric rotary machine such that a drop of an output torque from the drive wheel is reduced.

21. The vehicle according to claim 19, wherein
the electronic control unit is configured to set a torque, which is output from the first electric rotary machine, to a predetermined value or smaller.

22. The vehicle according to claim 19, wherein
the electronic control unit is configured to reduce a torque that is output from the first electric rotary machine as a traveling load of the vehicle reduces.

23. The vehicle according to claim 19, wherein
the electronic control unit is configured to output, from the first electric rotary machine, a torque by which a torque of the second electric rotary machine is insufficient for a torque for reducing a drop of an output torque from the drive wheel.

24. The vehicle according to claim 19, wherein
the electronic control unit is configured to, when the engine is started, output a torque from the first electric rotary machine under feedback control such that a rotation speed of the engine varies along a target value.

25. The vehicle according to claim 19, wherein
the electronic control unit is configured to execute engine start control for operating the second engaging unit from the released state toward the engaged state in a state where the first engaging unit is engaged when controllability at the time of operating the second engaging unit is higher than a predetermined criterion, and execute engine start control for increasing a rotation speed of the engine with the use of the first electric rotary machine in a state where the first engaging unit is engaged and the second engaging unit is released when the controllability at the time of operating the second engaging unit is lower than the predetermined criterion.

26. The vehicle according to claim 25, wherein
the electronic control unit is configured to narrow a region of motor diving in the case where the controllability at the time of operating the second engaging unit is lower than the predetermined criterion as compared to a region of the motor driving in the case where the controllability at the time of operating the second engaging unit is higher than the predetermined criterion, and the motor driving is a drive mode in which the vehicle travels by using the second electric rotary machine as a driving force source in a state where an operation of the engine is stopped.

27. The vehicle according to claim 25, wherein
the electronic control unit is configured to, at least one of when a temperature of working oil for operating the second engaging unit is higher than a predetermined oil temperature and when the temperature of the working oil is lower than a second predetermined oil temperature that is higher than the predetermined oil temperature, determine that the controllability at the time of operating the second engaging unit is higher than the predetermined criterion.

28. The vehicle according to claim 19, wherein the second differential mechanism includes a single-pinion planetary gear mechanism of which one of a sun gear and a ring gear is the fourth rotating element, the other of the sun gear and the ring gear is the fifth rotating element and a carrier is the sixth rotating element.

29. The vehicle according to claim 8, wherein the power transmission system is configured such as a torque increased from a torque of the engine is mechanically transmitted to the sixth rotating element when the differential status of the second differential mechanism is controlled when the first engaging unit is engaged and the second engaging unit is released; and comprising an electronic control unit configured to, when the engine is started, operate the second engaging unit from a released state toward an engaged state when the first engaging unit is engaged.

* * * * *